(12) United States Patent
Yoshioka et al.

(10) Patent No.: US 9,619,151 B2
(45) Date of Patent: Apr. 11, 2017

(54) REGION MANAGEMENT APPARATUS, REGION MANAGEMENT METHOD, AND PROGRAM

(75) Inventors: Makoto Yoshioka, Chiba (JP);
Mitsuhiro Kokubun, Chiba (JP);
Toshio Shinjo, Chiba (JP)

(73) Assignee: Makoto Yoshioka, Kanagawa (JP)

( * ) Notice: Subject to any disclaimer, the term of this patent is extended or adjusted under 35 U.S.C. 154(b) by 1520 days.

(21) Appl. No.: 13/323,407

(22) Filed: Dec. 12, 2011

(65) Prior Publication Data

US 2012/0089806 A1    Apr. 12, 2012

Related U.S. Application Data

(63) Continuation of application No. PCT/JP2010/003456, filed on May 21, 2010, and a
(Continued)

(30) Foreign Application Priority Data

Jun. 11, 2009 (JP) ................................. 2009-140531
Feb. 15, 2010 (JP) ................................. 2010-029920

(51) Int. Cl.
*G06F 13/00* (2006.01)
*G06F 3/06* (2006.01)
*G06F 12/02* (2006.01)

(52) U.S. Cl.
CPC .......... *G06F 3/0608* (2013.01); *G06F 3/0643* (2013.01); *G06F 3/0644* (2013.01); *G06F 3/0683* (2013.01); *G06F 12/0292* (2013.01)

(58) Field of Classification Search
CPC ........... G06F 12/02; G06F 13/02; G06F 12/00
See application file for complete search history.

(56) References Cited

U.S. PATENT DOCUMENTS 5,490,274 A * 2/1996 Zbikowski et al. .......... 711/112
5,732,402 A * 3/1998 Lehman ........................ 707/781

FOREIGN PATENT DOCUMENTS

EP    0632365 A2    1/1995
JP    61-253530 A    11/1986
(Continued)

OTHER PUBLICATIONS

Extended Search Report issued in European Application No. 11742033.1, dated Apr. 25, 2014.
(Continued)

*Primary Examiner* — Charles Rones
*Assistant Examiner* — Han Doan
(74) *Attorney, Agent, or Firm* — Michael Best & Friedrich LLP

(57) ABSTRACT

To provide a technology that, regardless of the capacity of a storage device, enables its areas to be flexibly partitioned and managed, and, when a file is allocated to a region also, can also use its areas effectively by means of an efficient method. When a region size of a storage device is expressed as the sum of mutually differing power-of-2 values, and areas whose size is one of the power-of-2 sizes configuring that sum are taken to be master partitions, to partition the areas into partitions each of whose size is the size made by successively dividing each master partition in half and to generate an allocation table holding allocation information expressing the allocation status of each of the files that have partitions with each of the sizes included in the master partitions. To manage a region based on the allocation information stored in the allocation table.

69 Claims, 56 Drawing Sheets

Related U.S. Application Data continuation of application No. PCT/JP2011/000729, filed on Mar. 9, 2011.

(56) References Cited

FOREIGN PATENT DOCUMENTS

| JP | 02-071342 A | 3/1990 |
|---|---|---|
| JP | 02-096231 A | 4/1990 |
| JP | 03-092941 A | 4/1991 |
| JP | 05-046447 A | 2/1993 |
| JP | 07-028693 A | 1/1995 |

OTHER PUBLICATIONS

Taku Yasui, Hajimete Manabu Linux Kernel, vol. 6, No. 1, pp. 123-130, Nikkei Linux, Jan. 8, 2004.
Hong Min et al., An Efficient Dynamic Memory Allocator for Sensor Operating Systems, pp. 1159-1164, Proceedings of the 2007 ACM symposium on Applied computing, Mar. 2007.
Method for Allocating Computer Disk Space to a file of know size, vol. 27, No. 10B, pp. 6260-6261, IBM Corp., Mar. 1985.
International Search Report mailed on Jul. 13, 2010.
International Search Report mailed on Mar. 15, 2011.

\* cited by examiner

REGION MANAGEMENT APPARATUS, REGION MANAGEMENT METHOD, AND PROGRAM

CROSS-REFERENCE TO RELATED APPLICATIONS

This application is a continuation of PCT/JP2010/003456 filed on May 21, 2010 and PCT/JP2011/000729 filed on Feb. 9, 2011.

PCT/JP2010/003456 and PCT/JP2011/000729 are based and claims the benefit of priority of the prior Japanese Patent Application Nos. 2009-140531 and 2010-029920, filed on Jun. 11, 2009 and Feb. 15, 2010 respectively, the entire contents of which are incorporated herein by reference. The contents of PCT/JP2010/003456 and PCT/JP2011/000729 are incorporated herein by reference in their entity.

BACKGROUND OF THE INVENTION

Field of the Invention

This invention is related to an apparatus, method, and program that manages the regions of a storage apparatus.

Description of Related Art

Previously, file systems such as, for example, FAT (File Allocation Tables) or NTFS (NT File System) were used as the method to manage data stored in a storage device like a hard disk and so forth.

FIG. 1A is a drawing describing the region allocation for an external storage device such as a hard disk, used in prior art.

For example, as shown in FIG. 1A, by means of an unshown utility program for a disk allocator or other such means, 4 regions, 1 to 4 (191, 192, 193, 194), are allocated in external storage device 306 storage area and each are assigned to some file system. A master boot record 195 with a region management table 195*a* holding region management data are disposed at the beginning of the regions. FIG. 1A shows an example of region management table 195*a* that includes the region information 196 for region number 3 with its entries of region number 196*a*, start position 196*b*, and region size 196*c*. Region number 196*a* holds the region number that identifies the region, and in the example it is number 3. The start position holds information on the starting address of the region, and in the example these contents are omitted. Region size 196*c* holds the number of allocation units for that region and in this example it is 52.

The disk allocation management for the files in each region is complicated by the allocation methods unique to the file systems assigned to each region. For example, a FAT keeps a link list showing the blocks allocated to each file. And a NTFS keeps information on the start position and number of contiguous blocks for the blocks allocated to each file.

To resolve the problem of allocation management for each of these files systems, for example, the art of a buddy system was proposed, as disclosed in patent reference 1 below. A buddy system partitions the storage area in sizes that are a power of 2 and manages allocation that way. A basic buddy system is employed in the allocation of memory objects in a simple system that does not use a virtual storage method.

FIG. 1B is a drawing describing the allocation principles of the buddy system. FIG. 1B shows an assigned area 490 whose size is 2 to the 3rd power (=8) and a tree configuration 580 associated with that assigned area and a bit map 400 pointing to used areas corresponding to nodes in the tree configuration 580.

The tree configuration 580 models hierarchically the relations between the areas that are successive partitions in two (halving) of the size of assigned area 490 down to a predetermined allocation unit size. When the region level at the level of the allocation unit size is taken to be level 1, as shown in the drawing, the level of the root node is 4.

As shown by the arrow with dotted lines, the root node 480 of the tree configuration 580 corresponds to the total area (level 4 region) of the assigned area 490 before partitioning, and the "8" depicted inside the node corresponds to the size of the corresponding assigned area 490. Also, the numbers in parentheses are level-internal numbers to distinguish areas within the same level.

Node 440 connected to the root node 480 by link 540 and node 441 connected to the root node 480 by link 541 correspond to the area (level 3 region) of the assigned area 490 partitioned in half. The size of each of those regions is the 4 shown in the drawing.

Below node 440 is node 420 with a size of 2 and connected by link 520, and node 421 with a size of 2 and connected by link 521. In the same way, below node 441 is node 422 with a size of 2 and connected by link 522, and node 423 with a size of 2 and connected by link 523. These 4 nodes correspond to level 2 regions.

Below node 420 is node 410 with a size of 1 and connected by link 510, and node 411 with a size of 1 and connected by link 511. In the same way, below node 421 is node 412 with a size of 1 and connected by link 512, and node 413 with a size of 1 and connected by link 513, and below node 422 is node 414 with a size of 1 and connected by link 514, and node 415 with a size of 1 and connected by link 515, and below node 423 is node 416 with a size of 1 and connected by link 516, and node 417 with a size of 1 and connected by link 517. These 8 nodes correspond to level 1 regions. Each of the nodes other than the root node 480 corresponds to a single area that is a half of the area corresponding to its parent node. Thus the sum of the area sizes at each level is equal to the size of the assigned area 490.

The bit map 400 shown in FIG. 1B holds bit values corresponding to each of the nodes in the tree configuration 580, as shown by the arrow with dotted line. The bit values at the bit positions shown by the level internal numbers 409 for level 4 shown by the bit map 400 with the label 408 indicate which of the regions at level 4 are being used. The bit values with the level internal numbers 0 and 1 at level 3 shown with the label 404 indicate which of those regions are being used. In the same way, the bit values with the level internal numbers 0 to 3 at level 2 shown with the label 402 indicate which of those regions in level 2 are being used, and the bit values with the level internal numbers 0 to 7 at level 1 shown with the label 401 indicate which of those regions in level 1 are being used.

As shown by FIG. 1B, a bit "1" is set in the level internal number 0 for level 4, the level internal number 0 for level 3, the level internal number 0 for level 2, and the level internal number 0 for level 1, and indicate that whole area corresponding to that bit position cannot be reused. In other words, because the status shown by the bit "1" in the level internal number 0 at level 1 indicates that the area with size 1 corresponding to node 410 is being used, that indicates that an area with a larger size including that area cannot be used as is.

In accordance to the above noted buddy system, when a file or memory area of a certain size is to be allocated, it is sufficient to search for and allocate an available (empty) area among the areas whose sizes are equal to that requested size or exceed it by power-of-2 difference, and when it is released, it is sufficient to return it to the group of available (empty) areas with that size, and thus the allocation and release of files and memory areas and the related area management is simplified.

Patent Document 1: JP 1995-28693 A

SUMMARY OF THE INVENTION

However because memory area is allocated in units of the power of 2 in the buddy system, when, for example, a file of 2.1 GB is to be allocated, an area of 4 GB must be allocated and of that area 1.9 GB is unused but is not available to previous file systems and thus memory space cannot be used effectively.

Also for example, even if the total capacity of a storage device is 127 GB, the largest region (where a region is a physical or logical allocation area) that can be managed has to be a 64 GB region for a requester requesting a storage area.

In other words, although the allocation and release of files and memory objects allocated in areas that are in units of a power of 2 and the related area management is simplified in the buddy system, because there is no management of the area left over from power-of-2 size area when an area is obtained that is not a power-of-2 size or when an area is an area left over from an area that is not a power-of-2 size when an area with a power-of-2 size is obtained, the problem exists that these areas are not utilized effectively.

Whereat, this invention enables the management of remaining storage areas even when an area that is not a power-of-2 size is obtained from a power-of-2 size area and even when an area that is a power-of-2 size is obtained from an area whose size is not a power-of-2 size, and the memory management means is also intended to provide a technology that can enable effective usage of areas by an efficient method for allocating files and memory areas.

In accordance with one preferred embodiment of this invention, a region size is obtained, and when the region size is expressed as a product of a sum of mutually differing powers of 2 computed from that allocation size and the region allocation unit size, each of the areas with a product of a power-of-2 size configuring that sum and the region allocation unit size is made a master partition, and the region is partitioned by assigning master partitions contiguously in the sequence of their sizes, and a multi-partition table that, corresponding to the master partitions and to each of the partitions whose area sizes have been successively partitioned by halving each of the master partitions, holds allocation information expressing the status of the file allocations for each of the partitions and the master partitions of each size respectively is generated and based on the allocation information stored in the multi-partition table, the allocation of files to the partitions including the master partitions is managed.

Also, in accordance with another embodiment of this invention, when the power-of-2 number that stipulates the partition size is made the partition level, the multi-partition table holds the partition allocation information in the partition level sequence of the partition and in the disposition sequence of the partition in the region at the same partition level, and a partition number that is an identifying number for identifying the partition corresponding to that allocation information is assigned according to the storage sequence of the allocation information, and partition allocation is managed using the partition number.

Also, in accordance with another embodiment of this invention, if the size of the file that is requested for allocation is the sum of partition sizes at differing partition levels, a first-pass allocated segment is sought for among empty partitions at a partition level 1 higher than the partition level of the largest partition size and that has a size that is larger than the allocation request size, and the first-pass allocated segment is partitioned into a second-pass allocated segment that is an area allocated contiguously in the sequence of the partition levels from partitions with differencing partition levels and an area that allocated contiguously from the remaining areas and which is a partition with differing partition levels than those of the second-pass allocated segment and which is allocated as a contiguous multilevel segment in the opposite sequence to the sequence of the partition levels, and unavailable is set in the allocation statuses in the multilevel allocation table corresponding to the partitions in the second-pass allocated segment, and second-pass available is set in the allocation statuses in the multilevel allocation table corresponding to the partitions configuring the contiguous multilevel segment.

In accordance with another preferred embodiment of this invention, in order to implement the management of file allocation by using the allocation information stored in the multi-partition table, a virtual region that is a virtual region with a size that is the smallest power of 2 multiplied by the region allocation unit size that encompasses a physical region with that size is virtually obtained, and this virtual region is successively partitioned by halving the master partition as in the buddy system, and the multi-partition table that holds file allocation information for each partition with each size and the master partition corresponding to the physical region, respectively, is generated.

Then, when the power-of-2 exponent that stipulates the partition size is made the partition level, the multi-partition table holds the partition allocation information in the partition level sequence of the partition and in the disposition sequence of the partition in the region at the same partition level, and a partition number that is an identifying number for identifying the partition corresponding to that allocation information is assigned according to the storage sequence of the allocation information, and partition allocation is managed using the partition number.

The multi-partition table is made so that it does not hold allocation information for partitions corresponding to areas that first come into being from the partitioning of the virtual region but that don't actually exist as regions.

Also, in accordance with another embodiment of this invention, if the size of the file that is requested for allocation is the sum of partition sizes at differing partition levels, a first-pass allocatable partition that is to be allocated as a first-pass allocated segment is sought for among empty partitions at a partition level one higher than the partition level of the largest partition size in the allocation request and that has a size that is larger than the allocation request size, and the first-pass allocated segment is partitioned into a second-pass allocated segment that is an area allocated contiguously in the sequence of the partition levels from partitions with differencing partition levels and an area that allocated contiguously from the remaining areas and which is a partition with differing partition levels than those of the second-pass allocated segment and which is allocated as a contiguous multilevel segment in the opposite sequence to the sequence of the partition levels, and unavailable is set in the allocation statuses in the multilevel allocation table corresponding to the partitions in the second-pass allocated segment, and second-pass available is set in the allocation statuses in the multilevel allocation table corresponding to the partitions configuring the contiguous multilevel segment.

Because, in accordance with this invention, storage areas are managed by a combination of power-of-2 sizes, storage areas with any size can be effectively managed, and because allocation management is performed for regions that have been partitioned into partitions of each size, and because files are allocated in continuous storage areas with no waste, effective utilization of storage areas can be expected.

Hereinbelow details of preferred embodiments of this invention are described referencing the drawings.

Figure 2A:
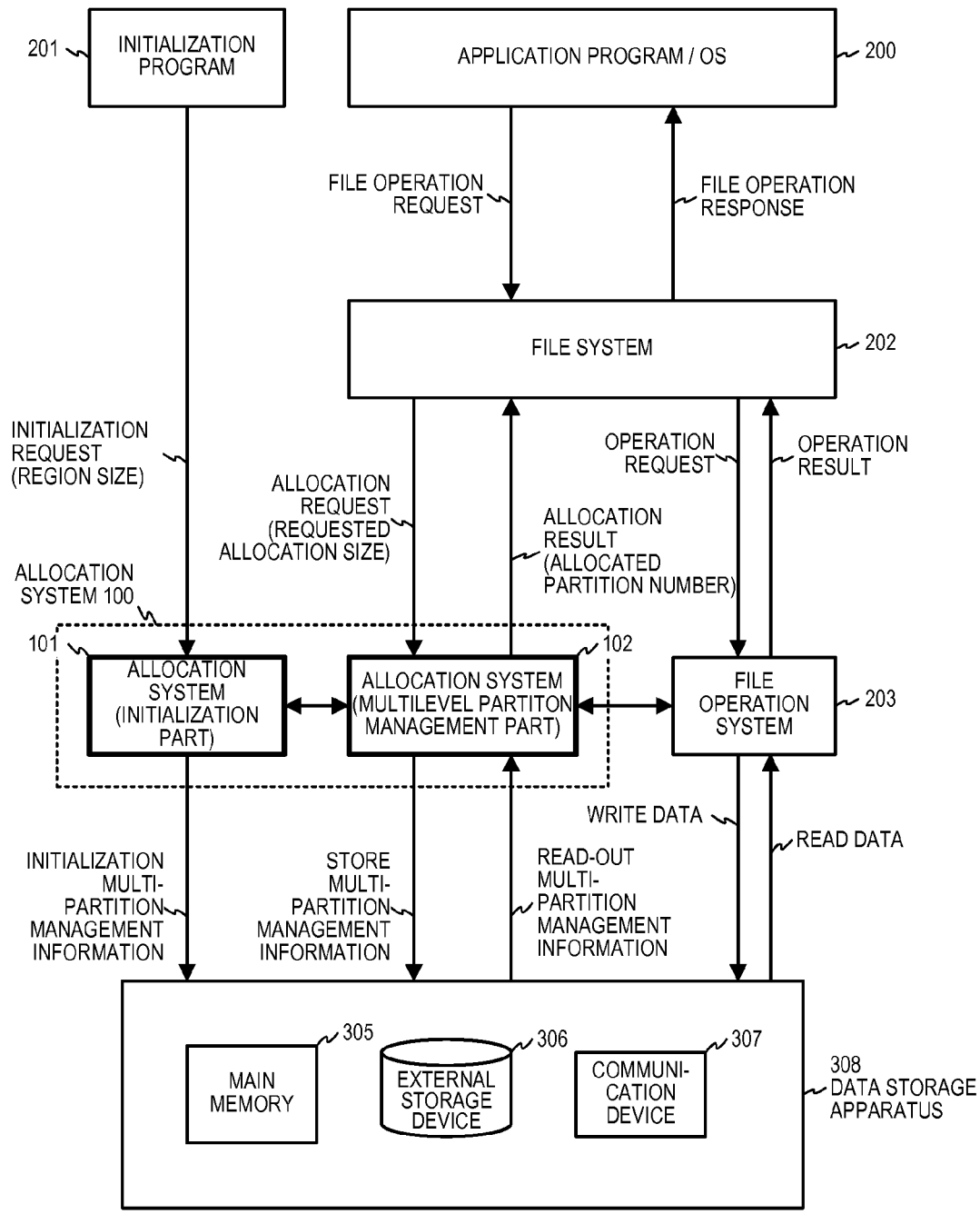
FIG. 2A is a drawing describing an example of a software and hardware environment of the allocation system in one embodiment of this invention.

FIG. 2A is a drawing describing an example of a software and hardware environment of the allocation system in one embodiment of this invention. The allocation system 100 is composed of an initialization part 101 and a multi-partition management part 102. Details of the initialization and multi-partition management are explained below.

The initialization part 101 receives an initialization request specifying a region size from an initialization program 201 such as, for example, a disk allocator or the initialization part of a file system and initializes the multi-partition management information of a region partitioned in a data storage device 308 configured of, for example, main memory 305, external storage device 306, and/or remote data storage device 307 accessed through telecommunication equipment.

The multi-partition management part 102 receives a partition allocation request from file system 202 that includes an allocation request size, partitions a region, in other words, divides and allocates partitions, by storing multi-partition management information in accordance with that request, reads out the stored multi-partition management information, and returns the allocation result including its allocated partition number to file system 202.

The file system 202 receives a file operation request from a system 200 using files of some application program, OS and so forth and if that file operation request requires the allocation of a partition for the file, it makes an allocation request, including the allocation request size, to the multi-partition management part 102 of allocation system 100, and it receives the allocation results, and specifying the partition number returned from the multi-partition management part of the allocation system 100 as the allocated partition number, it makes a file operation request to the file operation system 203. File operation system 203 acquires the address of the allocated partition from the multi-partition management part 102 by means of the specified partition number, reads or writes data as file operations on the file stored in a data storage device as file operations, and returns the results to file system 202. File system 202 returns the operation results received from file operation system 203 to the system 200 that uses files of some application program, OS and so forth, as an operation response.

Even if file system 202 and/or file operation system 203 already exist, an allocation system 100 in accordance with this invention can be used by adjusting the interface with the allocation system 100 in accordance with this invention. Also, even without extending the description to the system 200 that uses files of some application program, OS and so forth, the same solution can be applied to a previously existing initialization program 201. Hence, hereinbelow descriptions of programs and systems are omitted.

Figure 2B:
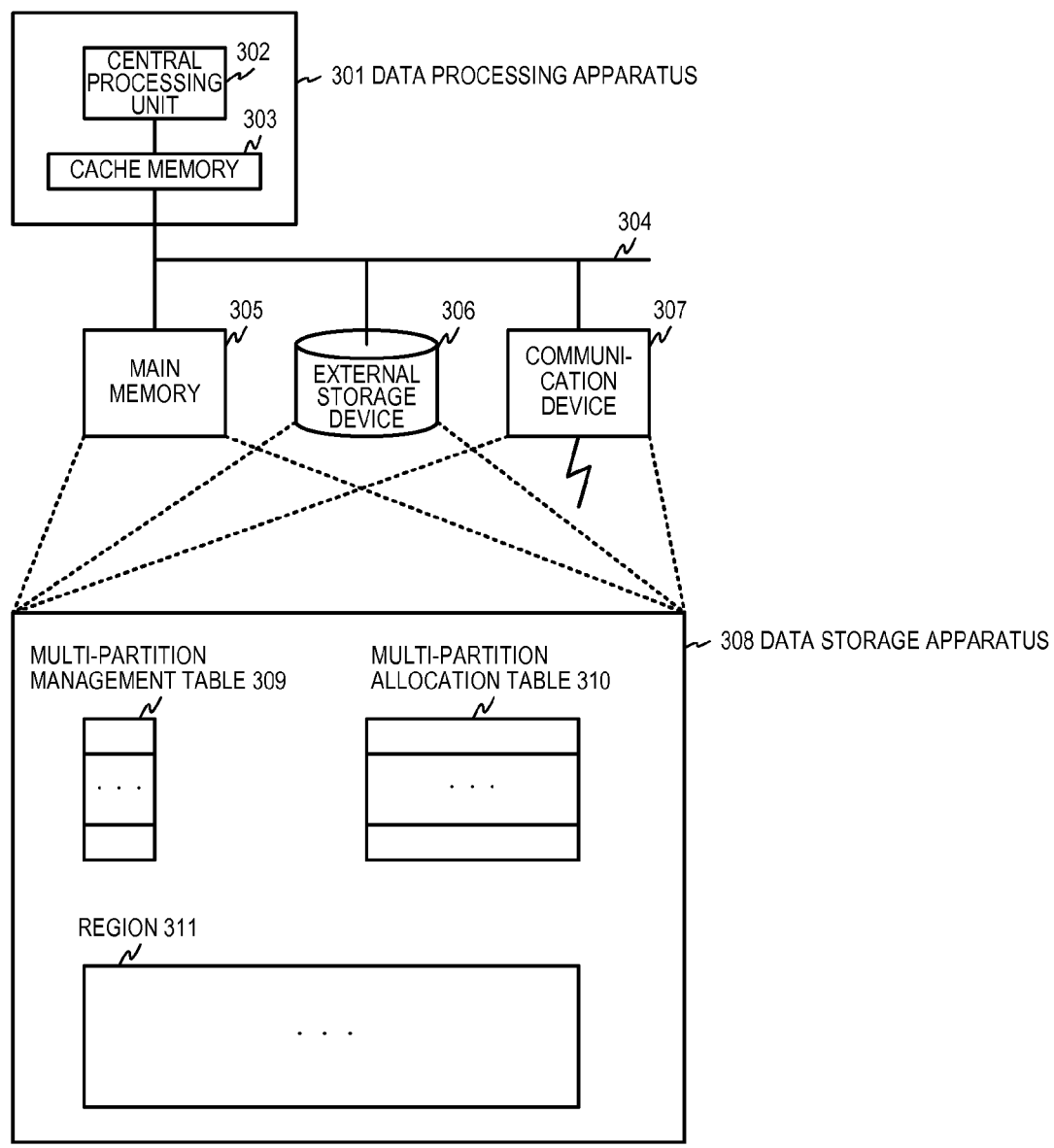
FIG. 2B is a drawing describing an exemplary hardware configuration in one embodiment of the present invention.

FIG. 2B is a drawing describing an exemplary hardware configuration in one embodiment of the present invention.

The storage device region management and allocating and releasing of partitions for files in accordance with one embodiment of this invention is effected by data processing unit 301 equipped with at least central processing unit 302 and cache memory 303, using data storage device 308. As is explained below, the data storage device 308 includes the multi-partition management table 309 that manages each partition level of a partition in a multilevel way, the multi-partition allocation table 310 that keeps the allocation status of each partition, and the region 311 that is the object of the management. As shown in FIG. 2B, the data storage device 308 can be realized by main memory 305 or external storage device 306 or a combination of them, or by using a device situated remotely and connected by telecommunication equipment 307.

In other words, although it can be thought that most frequently main memory 305 is placed inside data processing unit 301, and multi-partition allocation table 310 and multi-partition management table 309 are held in main memory 305, and region 311 is allocated in external storage device 306, it is clear from the description below that, in an application of this invention, the regions can even be allocated in main memory 305.

Although in the example shown in FIG. 2B, main memory 305, external storage device 306, and telecommunication equipment 307 are connected to data processing unit 301 by a single bus 304, there is no restriction to this connection method. Also, although it is not particularly illustrated, a temporary memory area can of course be used to enable various values obtained during processing to be used in subsequent processing. And then in the descriptions below, the values stored or set in a temporary memory area may be called by the name of that temporary memory area and conversely the name of a temporary memory area can be made the name of the data stored or set in that temporary memory area.

Hereinbelow details of a first embodiment and a second embodiment of this invention are described referencing the drawings.

Figure 3A:
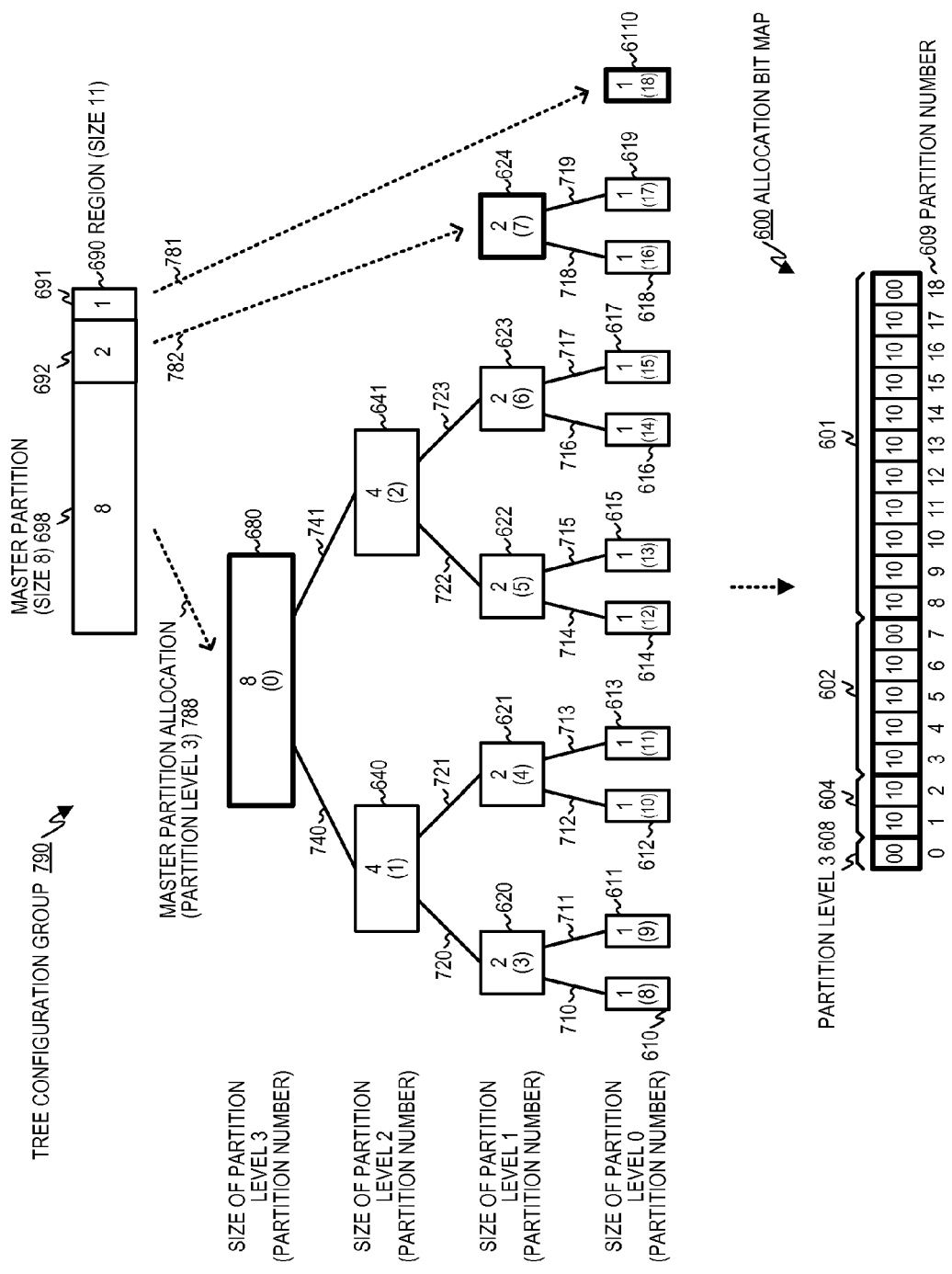
FIG. 3A is a drawing describing an overview of region management in a first embodiment of this invention.

FIG. 3A is a drawing describing an overview of region management in a first embodiment of this invention. The overview of region management in the first embodiment of this invention is provided along with definitions of some terminology which are common in the first embodiment and the second embodiments, referencing FIG. 3A.

Figure 1A:
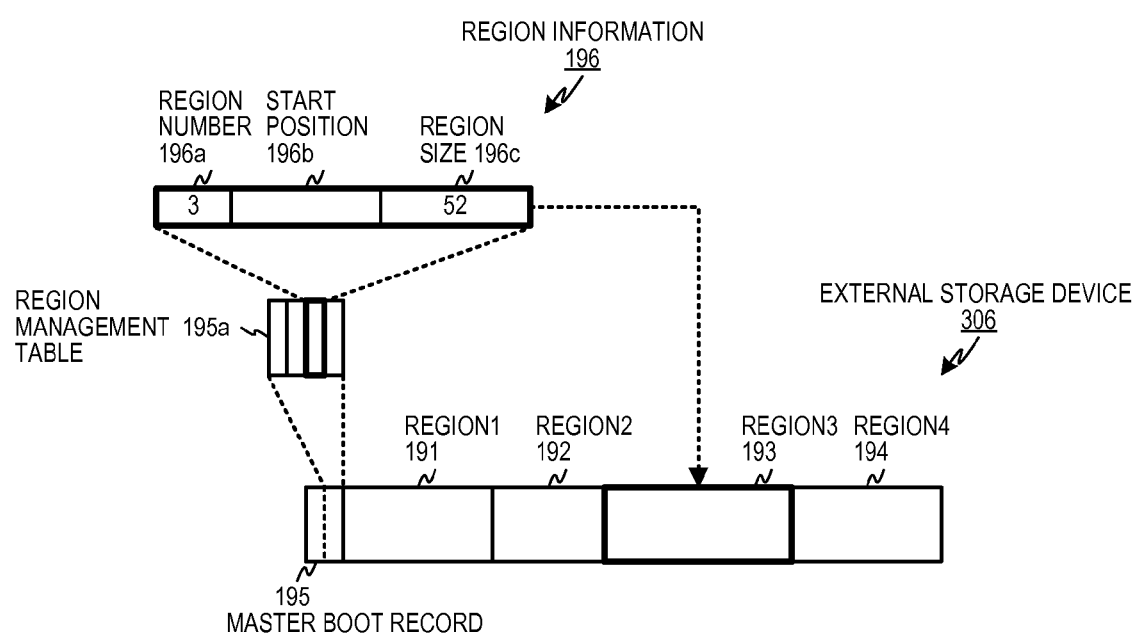
FIG. 1A is a drawing describing region allocation for an external storage device.

First, region is defined once more. In this invention, as was shown in the description referencing FIG. 1A, a region is an area that is pre-allocated, and is the first area to be allocated. This invention assumes that regions have been already obtained. A region, in this invention, is a physical or logical area allocated for a requestor who is requesting a storage area, and the requestor and the agent that executes the allocation are not limited to a file system or a disk allocator. Also, a region in this invention is not limited to a storage area in an external storage device and, for example, can be an area pre-allocated in the various storage devices included in data storage device 308 explained below referencing FIG. 2B.

Additionally, memory area, in this invention, is defined once again. A memory area is an area requested from a requestor who is requesting the allocation of an area in a region and is an area within the region allocated for that requestor by a region management apparatus. If the requestor is a file system, the memory area allocated to the file system could be, depending on the file system, an area to be used to store files. Because the description below describes examples of a file system being the requestor, the expression "to allocate a file" or expressions like "to allocate a file and memory area" are used.

A partition is an area that is not yet allocated by a request from a requester to allocate an area. Because a region is a pre-assigned area, it is a partition and, as such, it is a special kind of a partition.

To partition or partitioning is to assign an area or to partition-assign an area, and this may also be called an allocation. An area is a partition or region. Especially when the size of a region is expressed as a product of the sum of mutually different power-of-2 sizes and the allocation unit size, the partitioning of the region by allocating contiguously from the region each of those areas with a product of a power-of-2 size that constitute the sum and the allocation unit size, in the sequence of those sizes, is called master partitioning. Also the partitions allocated by master partitioning are called master partitions. Master partitioning is the initial allocating of regions in this invention. In the description hereinbelow, although master partitions are allocated from the beginning of an area in the sequence of large to small, from the description below it will be clear to one skilled in the art that allocating in the sequence of small to large can also be implemented in this proposed invention.

A segment is a single area or a set of multiple areas that have been allocated by a request from a requester to allocate an area.

Partitioning a partition into a plurality of partitions that have a size that is a product of a power of 2 and the allocation unit size is called to multi-partition or multi-partitioning.

Also a partition that has been multi-partitioned is called a multilevel segment. Also, in the description below, mention of the actual allocation unit area is omitted, and, as for area sizes, there may be cases wherein the description may be that of sizes and so forth or may be that of simply 2 to the n-th power. And, to abbreviate the description, in order to call the value 3 stored in the region number 196a shown in the example in FIG. 1A, for example, as the region number 196a, the values stored or set in memory areas may be called by the name of that memory area.

In the example shown in FIG. 3A, the total size of region 690 is 11, and it is partitioned into the master partition 698 with a size of $2^3=8$, the master partition 692 with a size of $2^1=2$, and the master partition 691 with a size of $2^0=1$. In other words, the master partitions 698, 692, and 691 are the initial allocation of region 690.

The number that is the power-of-2 partition size of a partition or master partition allocated by partitioning or master partitioning is called the partition level. The partition levels of the master partitions 698, 692, and 691 are 3, 1, and 0, respectively.

Continuing the description using the terminology defined above, the region management method that is the basis for this invention partitions the region consecutively into partitions, which have been allocated out of the allocation-unit areas of the region into units of mutually differing powers-of-2, and manages those partitions as consecutively allocated partitions.

FIG. 3A also illustrates the tree configuration group 790 corresponding to the multi-partitioning of region 690 and the bit map 600 showing the allocation statuses of the partitions, being a bit map reduced from the allocation status bit maps corresponding to the nodes in the tree configuration group 790.

Figure 1B:
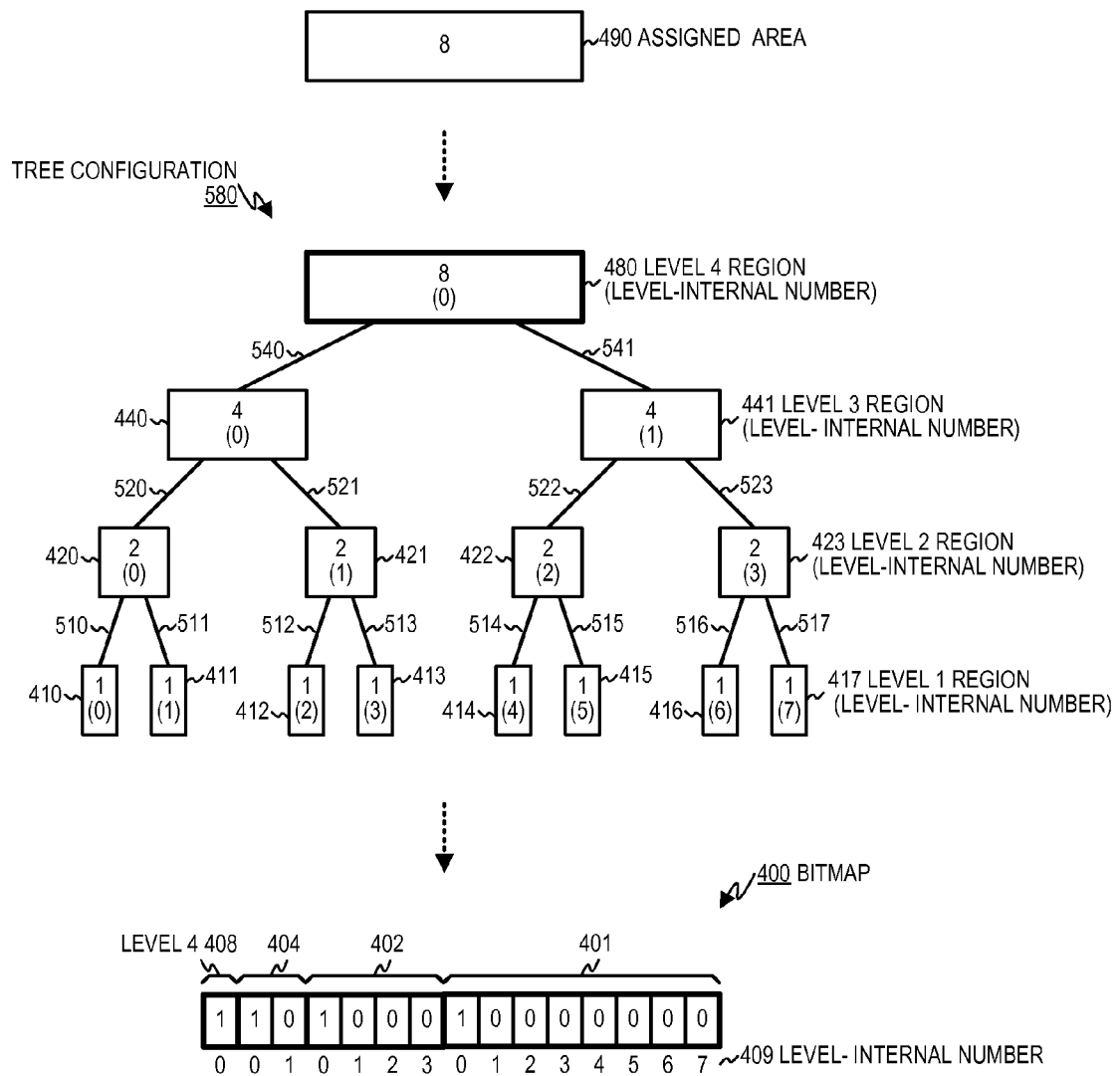
FIG. 1B is a drawing describing the allocation principles of the buddy system.

The tree configuration group 790 is configured from the tree with the root node 680, corresponding to the master partitioning that allocated master partition 698; from the tree with the root node 624, corresponding to the master partitioning that allocated master partition 692; and from the tree with the root node 6110, corresponding to the master partitioning that allocated master partition 691. In other words, root node 680 corresponds to the master partitioning that allocated all of the master partition 698 at partition level 3 as shown by the dotted-line arrow 788 (hereinbelow this may be called master partitioning 788), and root node 624 corresponds to the master partitioning that allocated all of the master partition 698 at partition level 1 as shown by the dotted-line arrow 782 (hereinbelow this may be called master partitioning 782), and root node 6110 corresponds to the master partitioning that allocated all of the master partition 698 at partition level 0 as shown by the dotted-line arrow 781 (hereinbelow this may be called master partitioning 781). Each of the tree configurations is such that, from the point that they are binary trees, are similar to the configuration of tree configuration 580 illustrated in FIG. 1B.

The "8" written in the root node 680 corresponds to the size of the associated master partition 698. Also, the parenthesized numbers are the partition numbers that identify each of the partitions (sometimes called a partition unit) that multi-partitioned region 690 into each partition at each partition level. The partition number of the master partition 788 corresponding to the master partition 698 with the largest size is 0. Also, hereinbelow, the partition number may be called the partition number of the partition partitioned by the partition identified by that partition number. In other words, instead of expressing the partition number of master partition 788, the partition number of master partition 698 may be used. Also a partition partitioned by a partition unit with a given partition number may be called the partition with that partition number.

Node 640 connected by link 740 to root node 680 and node 641 connected by link 741 to root node 680 correspond to partitions that divide master partition 698 into 2 and allocate partitions with a partition level 2 and whose size is 4. Each of their partition numbers are the ending positions 1 and 2 for the partition numbers following that of the 0 corresponding to the node one position higher at partition level 3.

Below node 640 are the node 620 with a size 2 and connected by link 720 and the node 621 with a size 2 and connected by link 721. In the same way, below node 641 are the node 622 with a size 2 and connected by link 722 and the node 623 with a size 2 and connected by link 723. These four nodes correspond to the partitioning of the partition at partition level 1. Also the partition numbers corresponding to these four nodes are the numbers 3 to 6 following the number 2 that is the last number associated with the nodes at partition level 2, which is the partition level one higher.

Below node 620 are the node 610 with a size 1 and connected by link 710 and the node 611 with a size 1 and connected by link 711. In the same way, below node 621 are the node 612 with a size 1 and connected by link 712 and the node 613 with a size 1 and connected by link 713, and below node 622 are the node 614 with a size 1 and connected by link 714 and the node 615 with a size 1 and connected by link 715, and below node 623 are the node 616 with a size 1 and connected by link 716 and the node 617 with a size 1 and connected by link 717. These eight nodes correspond to the partitioning of the partition at partition level 0. Also the partition numbers corresponding to these eight nodes follow the last number associated with the nodes at partition level 1 which is the partition level one higher in the tree with the root node 680, which number is the number, 7, that is, they are assigned the numbers 8 to 15.

In the same way, node 618 connected to root node 624 by link 718 and node 619 connected to root node 624 by link 719 correspond to partitions that divide master partition 692 into 2 and allocate partitions with a partition level 0 and whose size is 1.

The partition number for root node 624 is the number 7, which follows the ending partition number 6 associated with the last node in partition level 1 of the tree corresponding to master partitioning 788. The partition number for node 618 is the number 16, which follows the ending partition number 15 associated with the last node in partition level 0 of the tree corresponding to the master partitioning 788, and the partition number for node 619 is the number 17, which follows that number.

Also, the tree corresponding to the master partitioning 781 that allocates the master partition 691 whose size is 1 comprises only the node 6110, which is its root node, as shown by the dotted-line arrow 781. The partition number for node 6110 is the number 18, which follows the ending partition number 17 associated with the last node in partition level 0 of the tree corresponding to the master partitioning 782.

Next, the property of a partition number in accordance with a preferred embodiment of this invention is described. First, when a region subject to memory management with a certain size is received, a master partitioning corresponding to that size is performed and multi-partitioning is also done for each partition level. In the example shown in FIG. 3A, when the region 690 with the size 11 is received, the tree configuration group 790 corresponding to it can be generated. Then, starting from the nodes in the highest partition level in the tree configuration group, then moving to the lower level nodes, partition numbers can be uniquely assigned in ascending number sequence from left to right within the same partition level, as shown in FIG. 3A.

Then, by managing the partition numbers at each partition level, when a partition number is given, a partition level with partitioned partitions of that size can be retrieved by means of the partition unit identified by that partition number and furthermore, based on the difference between the starting partition number at that partition level and the given partition number the position in the region of the partition to be allocated can be retrieved by means of the partition unit.

As shown by the dotted-line arrow, the bit map 600 shown in FIG. 3A holds bit values that are a reduction into a bit map of the allocation statuses corresponding to each node in tree configuration group 780. In the example shown in FIG. 3A, a 2 bit value is associated with each node. Details about the bit values in bit map 600 are explained below. At this point, a simple description is provided for the example shown in FIG. 3A.

The bit values in bit map 600 show the allocation status, after initial allocation, of each partition corresponding to the node with that partition number. The bit value 00 that is at the bit position for partition level 3 shown with label 608, and for which the bit position for partition level 3 has the value 0 in the partition numbers 609, indicates that the partition whose partition has partition number 0 is first-pass available. The bit value 10 found at the bit positions for partition level 2 shown with label 604, and being the bit values for partition numbers 1 and 2, indicates that the allocation statuses of those partitions are "reserved". In the same way, the bit values with the bit positions for partition number 3 to 6 in partition level 1 shown by label 602 indicate that the allocation statuses of those partitions are "reserved", and the bit value with the bit position for partition number 7 indicates that the allocation status of that partition is "first-pass available". Also, the bit values with the bit positions for partition number 8 to 17 in partition level 0 shown by label 601 indicate that the allocation statuses of those partitions are "reserved", and the bit value with the bit position for partition number 18 indicates that the allocation status of that partition is "first-pass available".

The difference between an allocation status of "first-pass available" and "reserved" is related to prioritization when allocating a "first-pass available" area with the allocation request size. In other words, even if an area actually is in a first-pass available state, areas are used starting from those whose allocation status indicates that they are "first-pass available".

Next, the initialization of multi-partition management information in the first embodiment of this invention is described referencing FIG. 3B and FIG. 4A to FIG. 4C. The initialization of multi-partition management information may at times be expressed as the initialization of a region.

Figure 3B:
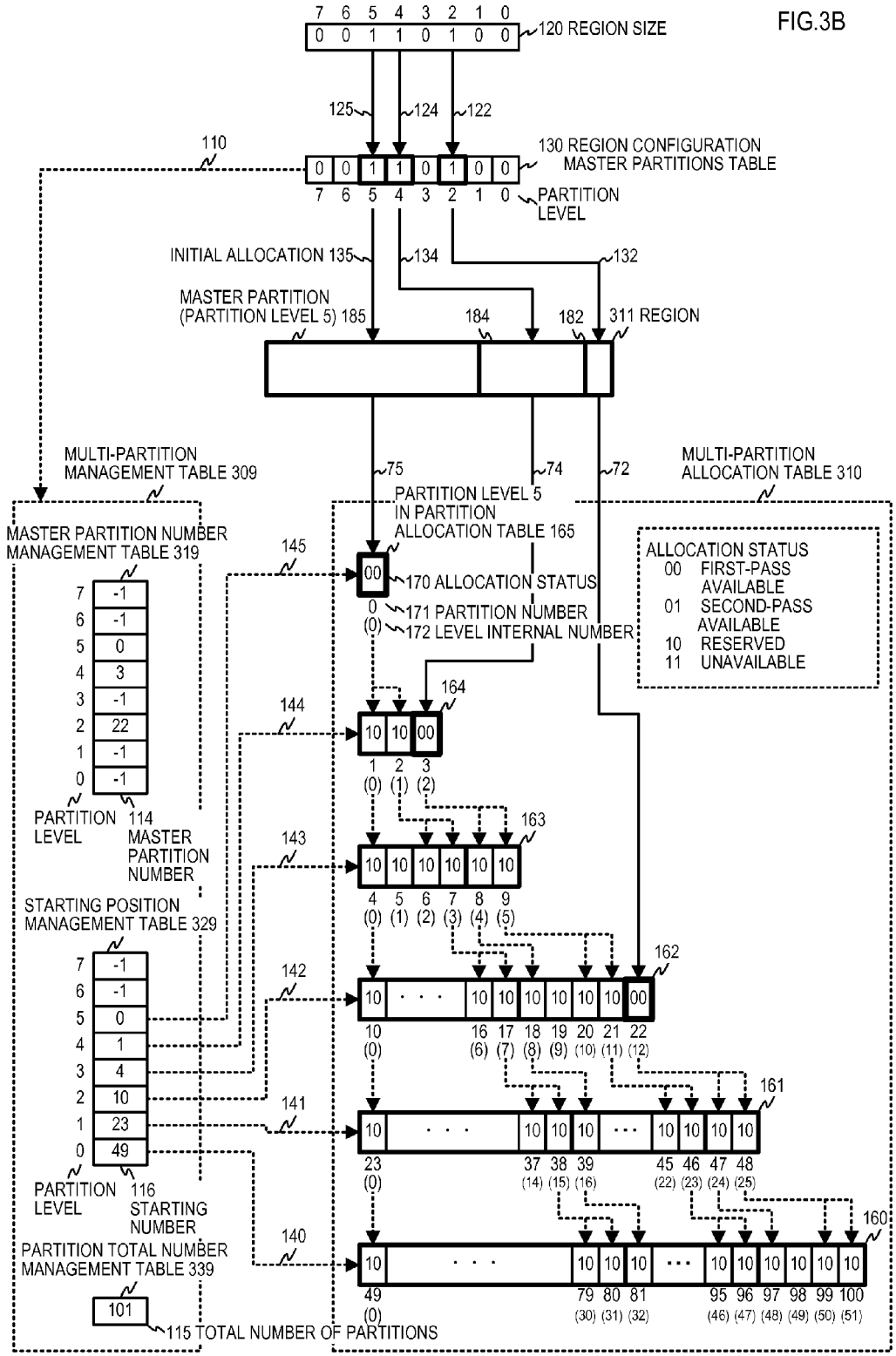
FIG. 3B is a drawing describing an example of the initialization status of a region corresponding to a region size in the first embodiment of this invention.

FIG. 3B is a drawing describing an example of the initialization status of a region corresponding to a region size.

As was noted in the description of FIG. 2A above, the initialization part of the allocation system initializes a region from among the regions allocated to a file system when an initialization request is received that includes the region size for that region. In the region size 120 shown in FIG. 3B the region size "52" included in an initialization request for region 311 allocated to that file system is displayed in binary format, and because $52=2^5+2^4+2^2$, the second bit, the 4th bit and the 5th bit are "1".

The region configuration master partitions table 130 is generated in response to the region size received from that initialization program. The region configuration master partitions table 130, as shown by the subscripts 0 to 7, is configured from entries whose bit value is 1, corresponding to a partition level, and in the example shown in FIG. 3B they are the 8 entries corresponding to the partitions from partition level 0 to the highest partition level 7. As shown by the arrows 122, 124, and 125, the region configuration master partitions table has set in it the bit values for the entries for the corresponding partition levels in accordance with the bit values when the region size is expressed in binary form.

As region 311 shown in FIG. 3B shows the correspondence relationship by the arrows 135, 134, and 132 from the region configuration master partitions table 130, the master partitions 185, 184, and 182 are initially partitioned with a partition level size that corresponds to the entries that have a bit value of 1 in the region configuration master partitions table 130.

Furthermore, the partition level corresponding to a master partition may sometimes be called a master partition level. In other words, region configuration master partitions table 130 can be said to be a table that shows master partition levels by the bit value 1.

As shown in FIG. 3B, multi-partition management table 319 includes the master partition number management table 309, the start position management table 329, and the total number of partitions management table 339. The master partition number management table 319 and the start position management table 329 are configured of entries corresponding to the partition levels, as shown by the tags 0 to 7, the same as the entries in the region configuration master partitions table 130. The entries of master partition number management table 319 are composed of master partition number 114, and the entries of start position management table 329 are composed of start position 116. The values in each entry are set during initialization processing based on the values in region configuration master partitions table 130. In total number of partitions management table 339 is set total number of partitions 115, which is the total number of the partition units partitioned in accordance with the region size that was the subject of the initialization. Saying it differently, the sum total of partitions partitioned out for the partition level size at each partition level is set in total number of partitions 115. In the example of FIG. 3A the value 19 is set, corresponding to the partition numbers 0 to 18. In the example shown in FIG. 3B, 101 are set, corresponding to the partition numbers 0 to 100.

When, as will be explained below, multi-partition allocation table 310 has an entry corresponding to a master partition at a given partition level, master partition number 114 holds the partition numbers of those master partitions, and when multi-partition allocation table 310 has no entry corresponding to a master partition, "−1" is set the entry for that partition level as a meaningless partition number. In the example in FIG. 3B, the values in each entry in master partition number 114 are, in sequence from the highest partition level, −1, −1, 0, 3, −1, 22, −1, and −1.

Start position 116 is the partition number associated with a starting entry in the single-level partition allocation table at each partition level, of the partition numbers uniquely associated with each entry in multi-partition allocation table 310, and the values of each of the entries in start position 116 shown in the example in FIG. 3B are, in sequence from the highest partition level, −1, −1, 0, 1, 4, 10, 23, and 49. Details of how these values are set are described below referencing FIG. 4A to FIG. 4C.

Multi-partition allocation table 310 manages the allocation statuses of areas within region 311, and are the same as the allocation bit map 600 shown in FIG. 3A. However, as shown in FIG. 3B, in addition to partition number 171, level internal number 172 is also associated with each entry in multi-partition allocation table 310. Multi-partition allocation table 310 is generated and initialized during initialization processing based on the values in multi-partition management table 309.

Multi-partition allocation table 310, as shown in the figure by dotted-line arrows 140 to 145, is configured from the single-level partition allocation tables 160 to 165 corresponding to each partition level from the lowest partition level up to the highest partition level whose bit value in region configuration master partitions table 130 is a "1".

The entries in each single-level partition allocation table are configured of the 2-bit allocation status 170 for the partition with the partition number corresponding to that entry. The allocation status bit values "00", "01", "10", and "11" correspond to the "first-pass available", "second-pass available", "reserved", and "unavailable" statuses of the partition with that respective partition number. Although details of the meaning of these statuses will be described later, by using two bits for allocation status 170, the discrimination of "second-pass available" is enabled and memory areas can be used without any waste.

Also each entry in single-level partition allocation tables 160 to 165, as shown by arrows 75, 74, and 72, corresponds to a master partition, in other words, to a master partition, and to a partition one partition level above whose partition has been partitioned into 2; in other words, it corresponds to the partition that has divided the partition one partition level above into 2.

Each entry in multi-partition allocation table 310 can be assigned partition number 171 which is a consecutive number from 0 starting from the first entry at the highest partition level in single-level partition allocation table 165 to the entry at the ending position in the lowest partition level in single-level partition allocation table 160. Also, a level internal number 172, a consecutive number starting from 0, can be assigned to each entry in each single-level partition allocation table from the beginning entry to the entry in the ending position. The start position 116 in start position management table 329 is the start position of the partition numbers at that partition level.

As was described above referencing FIG. 3A, when a region size, in other words, a region configuration master partitions table, is provided, the configuration of the multi-partition allocation table is uniquely determined, and the position in a region of a partition to be partitioned and its size is also uniquely determined by a partition unit identified by a partition number.

In the initial status of multi-partition allocation table 310, the allocation statuses 170 of the entries corresponding to the master partitions have "00" indicating "first-pass available" as shown by arrows 75, 74, and 72, and the allocation statuses of the other entries are initialized to "10" indicating "reserved". Thus, when seen from the point of view of partitions whose allocation status is "first-pass available", the master partitions 185, 184, and 182 in region 311 are divide-allocated, and region 311 is initially allocated in the sense of "setting" certain partitions, of the partitions managed by multi-partition allocation table 310, as first-pass available. Details of the initialization of multi-partition allocation table 310 are described later referencing FIG. 4A to FIG. 4C.

Also, the method for assigning the numbers for the partition number 171 and level internal number 172 are merely illustrative, and if the method enables the file allocation management described below, for example if the starting number is a 1 instead of a 0, or if the sequence of assigning the numbers is reverse sequence, and so forth, the fact that various modifications are possible will be clear to one skilled in the art.

Just as was described above, in accordance with this invention, the region 311 is allocated to the file system using the multi-partition allocation table 310, and the same single area is managed over multiple levels by means of the allocation statuses 170 corresponding to a given partition level.

Partition allocation using multi-partition allocation table 310 acquires the partition numbers of a first-pass allocatable partition at a given partition level or contiguous first-pass allocatable partitions at differing partition levels by searching the multi-partition allocation table in accordance with the size in the allocation request, and allocation is done by making those partition numbers "unavailable". If there are no first-pass allocatable partitions, second-pass allocatable partitions are sought for. As shown in FIG. 2A, the partition numbers that were made "unavailable" are returned, as allocated partition numbers, from the allocation system to the file system that has made the file allocation request. When the file operation system receives a file operation request specifying this partition number, address information for the partitions with these partition numbers are received from the multi-partition management part. The multi-partition management part searches the multi-partition management table 309 using the partition numbers and acquires the partition level and level internal number of the partitions corresponding to these partition numbers and this information enables knowledge of the position within a region and the size of the partitions allocated to the file. Details of this processing are described later.

Figure 4A:
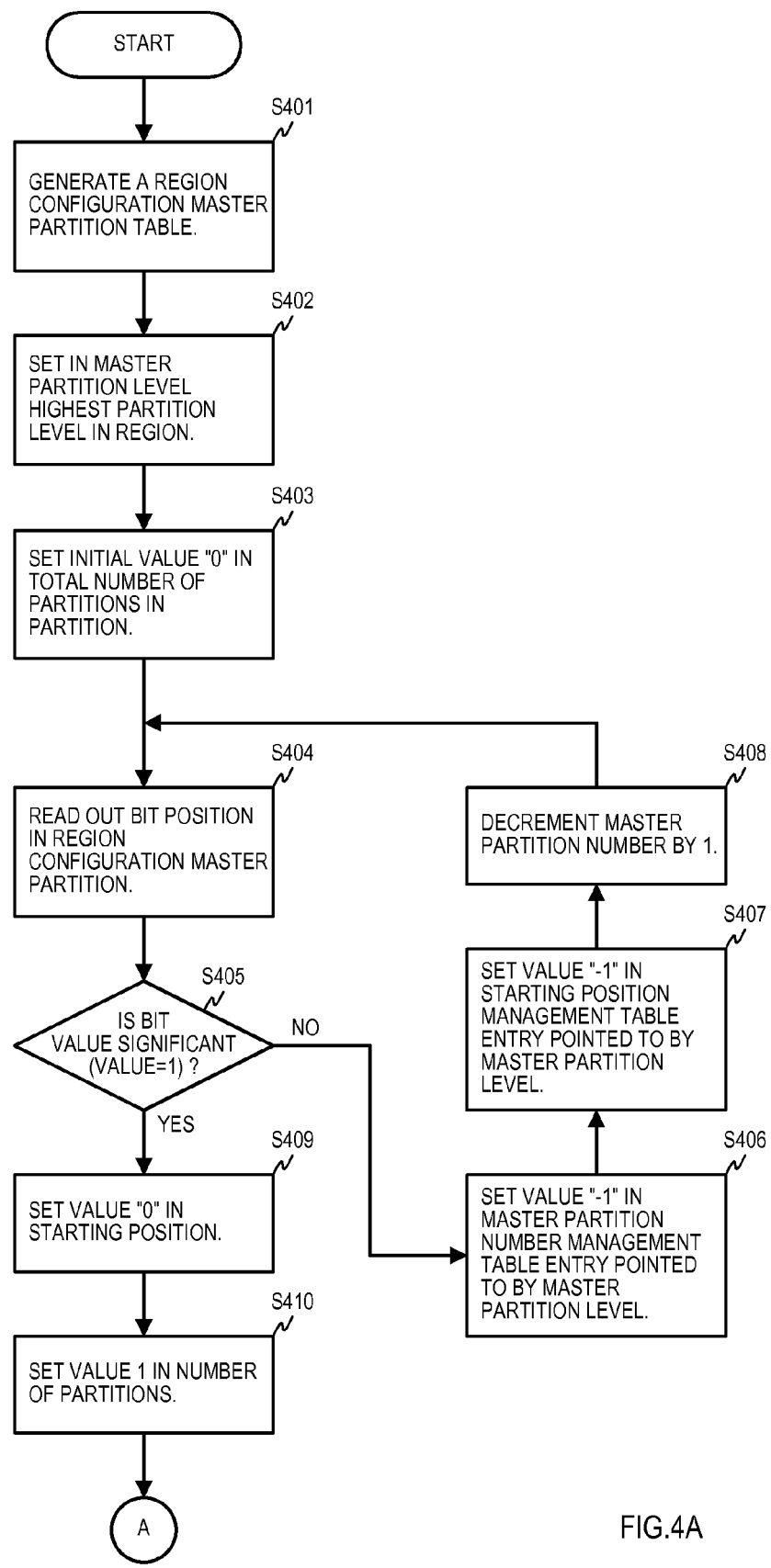
FIG. 4A is a drawing describing an example of the processing flow of the prior stage for initializing a region in the first embodiment of this invention.
Figure 4B:
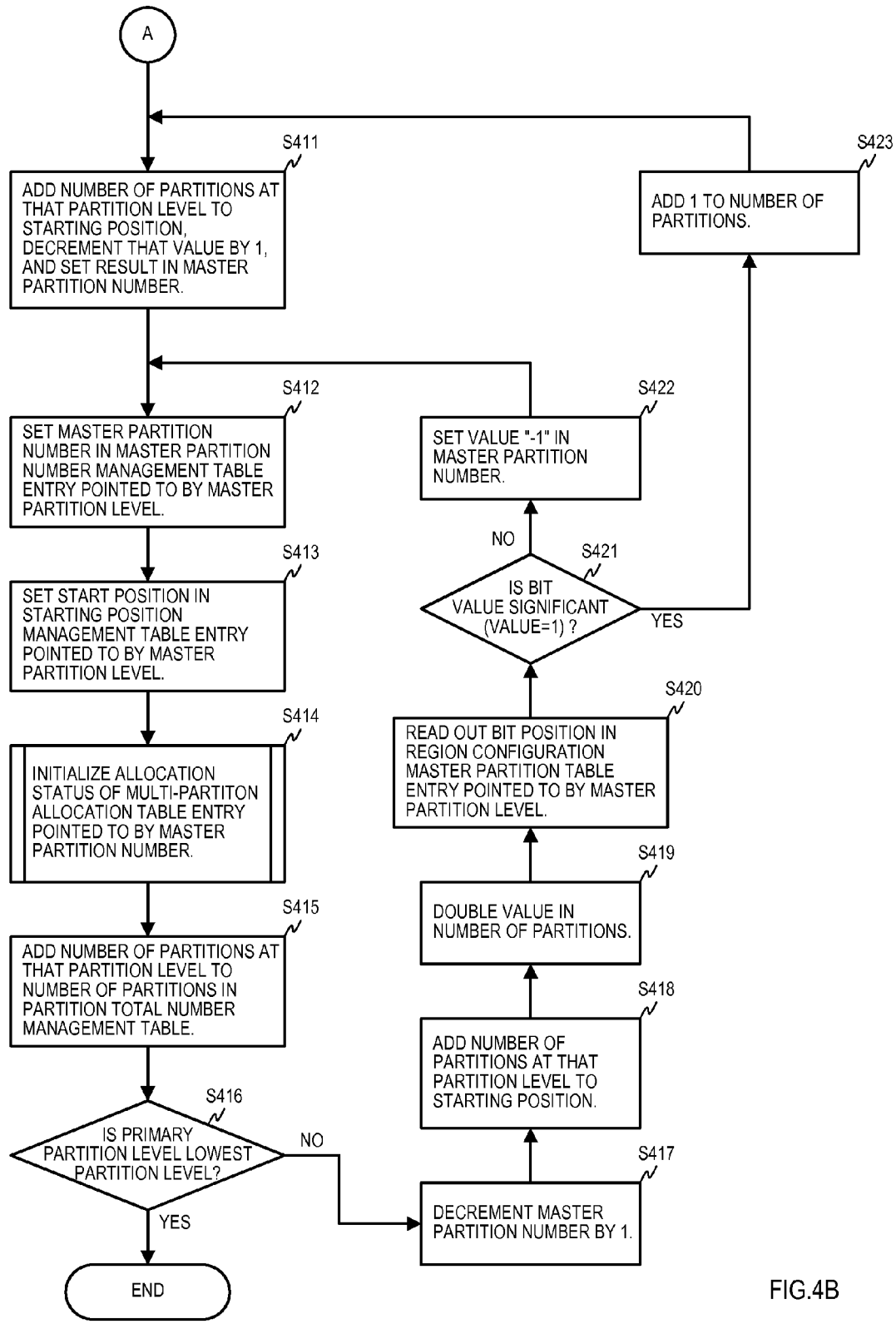
FIG. 4B is a drawing describing an example of the processing flow of the latter stage for initializing a region in the first embodiment of this invention.
Figure 4C:
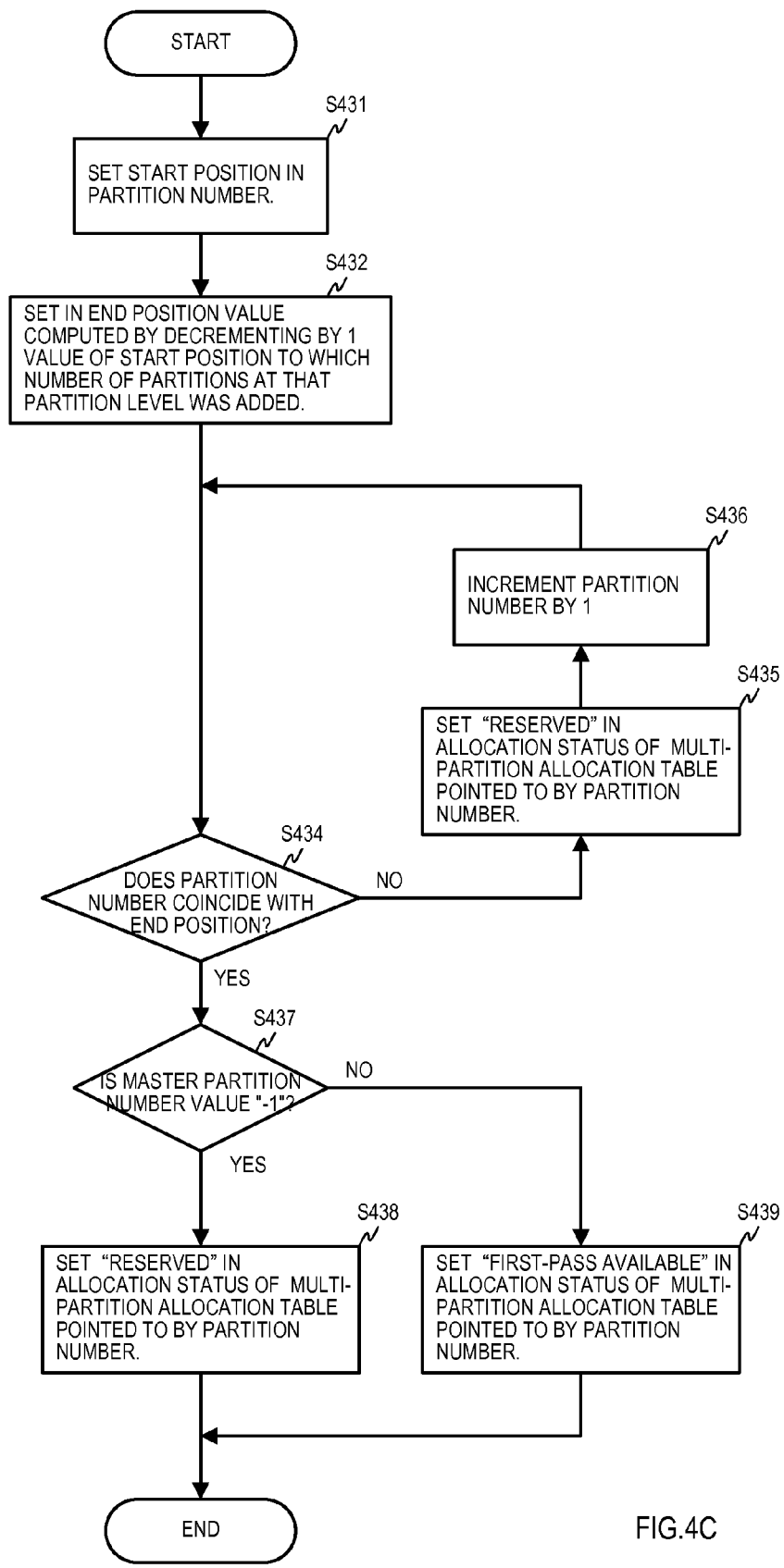
FIG. 4C is a drawing describing the processing flow to initialize a multi-partition allocation table for each of the partition levels in the first embodiment of this invention.

Next the processing to initialize a region is described referencing FIG. 4A, FIG. 4B, and FIG. 4C. Here, the processing to initialize a region, concretely speaking, is, for example, the processing to initially set the values in the multi-partition management table 309 and the multi-partition allocation table 310 shown in FIG. 3B. Hereinbelow, the processing is described referencing multi-partition management table 309 and multi-partition allocation table 310 as an example.

FIG. 4A is a drawing describing an example of the processing flow of the prior stage for initializing a region.

As shown in FIG. 4A, first at step S401, a region configuration master partitions table is generated wherein the bit values at the partition levels in the entry are set in accordance with the bit values for the region size when it is expressed in binary form, which region size is received from a program requesting the initialization of a region.

Next, proceeding to step S402, the highest partition level in the region configuration master partitions table is set in the master partition level, and at step S403, the value 0 is set in the total number of partitions in the total number of partitions management table as its initial value and processing proceeds to step S404. In the example shown in FIG. 3B, region configuration master partitions table 130 is generated and 7 is set in the master partition level. The master partition level that is set with the highest partition level in the region configuration master partitions table in step S402 above is one example of an unillustrated temporary memory area noted above.

At step S404, the bit value in the region configuration master partitions table pointed to by the master partition level is extracted, and at step S405 a determination is made whether that extracted bit value is significant, in other words, is the value 1.

If the above extracted bit value is not 1, processing branches to step S406 and the value "−1" is set in the entry in the master partition number management table pointed to by the master partition level, and next, proceeding to step S407, the value "−1" is set in the entry in the start position management table pointed to by the master partition level, and at step S408, the master partition level is decremented by 1, and processing returns to step S404.

The processing loop of the above steps S404 to S408 is repeated until the first time a determination is made at step S405 that the bit value in the region configuration master partitions table is significant. In the example shown in FIG. 3B, because the bit values in the region configuration master partitions table are 0 until 5 is set in the master partition level, the value "−1" is set at both partition level 7 and partition level 6 entries in the master partition number management table 319 and the start position management table 329 by this processing loop.

Conversely, if the extracted bit value is 1, processing proceeds to step S409 wherein the value 0 is set in the start position and at step S410 the value 1 is set in the number of partitions, and processing proceeds to step S411 shown in FIG. 4B. The above start position in step S409 and the number of partitions in step S410 are also examples of the above noted unillustrated temporary memory areas. The names of the data are taken to be the names of the temporary memory areas, respectively.

FIG. 4B is a drawing describing an example of the processing flow of the latter stage for initializing a region.

At step S411, the number of partitions is added to the start position, 1 is subtracted, and the resulting value is set in the master partition number. The first time step S411 is processed, the value 1 is set in the number of partitions by the processing of step S410 and in subsequent processing that value is set by the processing of step S423 described below.

Next, proceeding to step S412, the master partition number is set in the master partition number management table entry pointed to by the master partition level, and at step S413, the start position is set in the start position management table entry pointed to by the master partition level. In the first processing of step S412 and step S413 for the example shown in FIG. 3B, a 0 is set for partition level 5 in the master partition number management table 319 and start position management table 329 respectively.

Next, proceeding to step S414, the allocation status of the multi-partition allocation table entry for the partition level pointed to by the master partition level is initialized. Details of the processing in step S414 are explained below referencing FIG. 4C.

Next, proceeding to step S415, the number of partitions obtained at step S414 is added to the total number of partitions in the total number of partitions management table, and processing proceeds to step S416.

At step S416, a determination is made whether the master partition level is the lowest partition level and if it is the lowest partition level, processing is terminated, and if it is not the lowest partition level, processing branches to step S417.

At step S417, the master partition level is decremented by 1, and at step S418, the number of partitions is added to the start position, and at step S419, the number of partitions is multiplied by 2, and processing proceeds to step S420.

At step S420, the bit value at the partition level in the region configuration master partitions table pointed to by the master partition level is extracted, and at step S421, a determination is made whether that extracted bit value is significant, in other words, is the value 1. If, at step S420, the bit value extracted at the partition level in the region configuration master partitions table pointed to by the master partition level is not significant, processing branches to step S422, wherein the value "−1" is set in the master partition number, and processing returns to step S412. If the bit value is significant, processing branches to step S423, wherein the number of partitions is incremented by 1, and processing returns to step S411.

The processing loop of the above steps S411 to S423 is repeated until a determination is made in step S416 that the master partition level is the lowest partition level. In that case, if the bit at the partition level in the region configuration master partitions table pointed to by the master partition level is a non-significant bit, in other words, that bit value is "0", the value "−1" is set in the master partition number at that partition level, just as described above.

In the example shown in FIG. 3B, 1 is set in partition level 4 in the start position management table 329, and 3, which in the second processing of step S411 is the sum of the start position 1 and the number of partitions 3, decremented by 1, is set in partition level 4 of the master partition number management table 319. Also, the value 4, which is the start position 1 at partition level 4 to which the number of partitions 3 has been added, is set in partition level 3 in the start position management table 329, and −1 is set in partition level 4 in the master partition number management table 319 in the processing of step S422. In the same way thereafter, the values 22, −1, and −1 are set in partition levels 2, 1, and 0, respectively, in the master partition number management table 319. Also, the values 10, 23, and 49 are set in partition levels 2, 1, and 0, respectively, of the start position management table 329, and 101 is set in the total number of partitions management table 339.

FIG. 4C is a drawing describing the processing flow to initialize a multilevel allocation table for each of the partition levels in one embodiment of this invention. By the processing flow exemplified in FIG. 4C, the single-level partition allocation tables corresponding to each partition level are initialized, from the lowest partition level configuring the multi-partition allocation table up to the highest partition level in the region configuration master partitions table whose bit value is a 1. In the example in FIG. 3B, FIG. 4C describes the processing that sets in each of the values in the single-level partition allocation tables 160 to 165 the values illustrated in the drawing. Every time the processing loop of steps S411 to S423 shown in FIG. 4B is executed, a single-level partition allocation table from single-level partition allocation table 165 up to single-level partition allocation table 160 is initialized, and the initialization of multi-partition allocation tables 310 is completed.

As shown in FIG. 4C, at step S431, the start position is set in the partition number, and at step S432, the number of partitions is added to the start position, the value 1 is subtracted, and the result is set in the end position number. The start position in step S431 and step S432 is that set at step S409 shown in FIG. 4A or set at step S418 shown in FIG. 4B. Also, number of partitions at step S432 is that set in step S410 shown in FIG. 4A or set in step S419 or step S423 shown in FIG. 4B.

The processing of step S431 and step S432 is the processing to set the starting position partition number and the ending position partition number, respectively, in the single-level partition allocation table entries corresponding to each partition level.

Next, proceeding to step S434, a determination is made whether the partition number and the end position number coincide. If the partition number and the end position number do not coincide, at step S435, "reserved" is set in the allocation status of the multi-partition allocation table entry pointed to by the partition number, and at step S436, the partition number is incremented by 1, and processing returns to step S434, wherein the determination whether the partition number and the end position number coincide is repeated. The processing loop of these steps S434 to S436 is the processing to set "reserved" in the allocation statuses in the single-level partition allocation table entries pointed to by the partition number from the starting partition number in the single-level partition allocation table corresponding to the partition level being processed up to one partition number before the end position number.

Conversely, when the determination in step S434 is that the partition number and the end position number do coincide, processing proceeds to step S437 wherein a determination is made whether the master partition number has the value −1. The master partition number herein is the one set in step S411 or step S422 shown in FIG. 4B.

When at step S437 a determination is made that the master partition number is the value "−1", at step S438, "reserved" is set in the allocation status entry in the multi-partition allocation table pointed to by the partition number, and processing is terminated, and when at step S437, a determination is made that the master partition number is not the value "−1", at step S439, "first-pass available" is set in the allocation status entry in the multi-partition allocation table pointed to by the partition number, and processing is terminated.

The processing of these steps S438 and S439 is the processing to set the allocation status for the partition number at the ending position in the single-level partition allocation table corresponding to the partition level being processed. As shown in FIG. 3B, the partition number of a partition unit corresponding to a master partition is the ending position of the partition numbers corresponding to the partition level for that master partition, and the allocation status in the single-level partition allocation table entry with the partition number of the ending position is "00", in other words, "first-pass available", as shown by the allocation statuses for partition numbers 0, 3, and 22. The allocation status of all the other multi-partition allocation table entries is "10", in other words, "reserved".

In the region initialization described above in detail, the introduction of "reserved" as a partition allocation status, as well as "first-pass available", is to enable the easy securing of a large contiguous first-pass available partition. For example, in the example in FIG. 3B, if a partition allocation with a size of 16 is requested from the file system, the master partition 184, in other words, the partition with partition number 3, can be selected from among the master partitions whose partition status is "first-pass available". If there is no allocation status called "reserved" the partitions with partition numbers 1 and 2 also become "first-pass available" and then if in the future an allocation request is issued for a partition whose size is larger than 16, in order to allocate a contiguous partition, a means that selects the partition with partition number 3 from out of partition numbers 1, 2, and 3 is necessary in order to use the partitions effectively. However, that means will be more complicated than introducing "reserved" as an allocation status.

Also, although in this preferred embodiment the status of "reserved" is employed and expressed with the two-bit value "10", the setting of the allocation status of a partition as "reserved" is to exempt that partition from being allocated. Thus, in the above noted step S438, a status other than "first-pass available", which alternative status indicates that the partition with that partition number should not be allocated, can be set in the allocation status of the multi-partition allocation table entry pointed to by the partition number.

Next, referencing FIG. 5 to FIG. 11C, the allocation of partitions using multi-partition management information in the first embodiment of this invention is described. First, as was noted in the description of FIG. 2A, the allocation of partitions is done by the multi-partition management part of the allocation system after region initialization by receiving from a file system an allocation request that includes an allocation request size.

Figure 5:
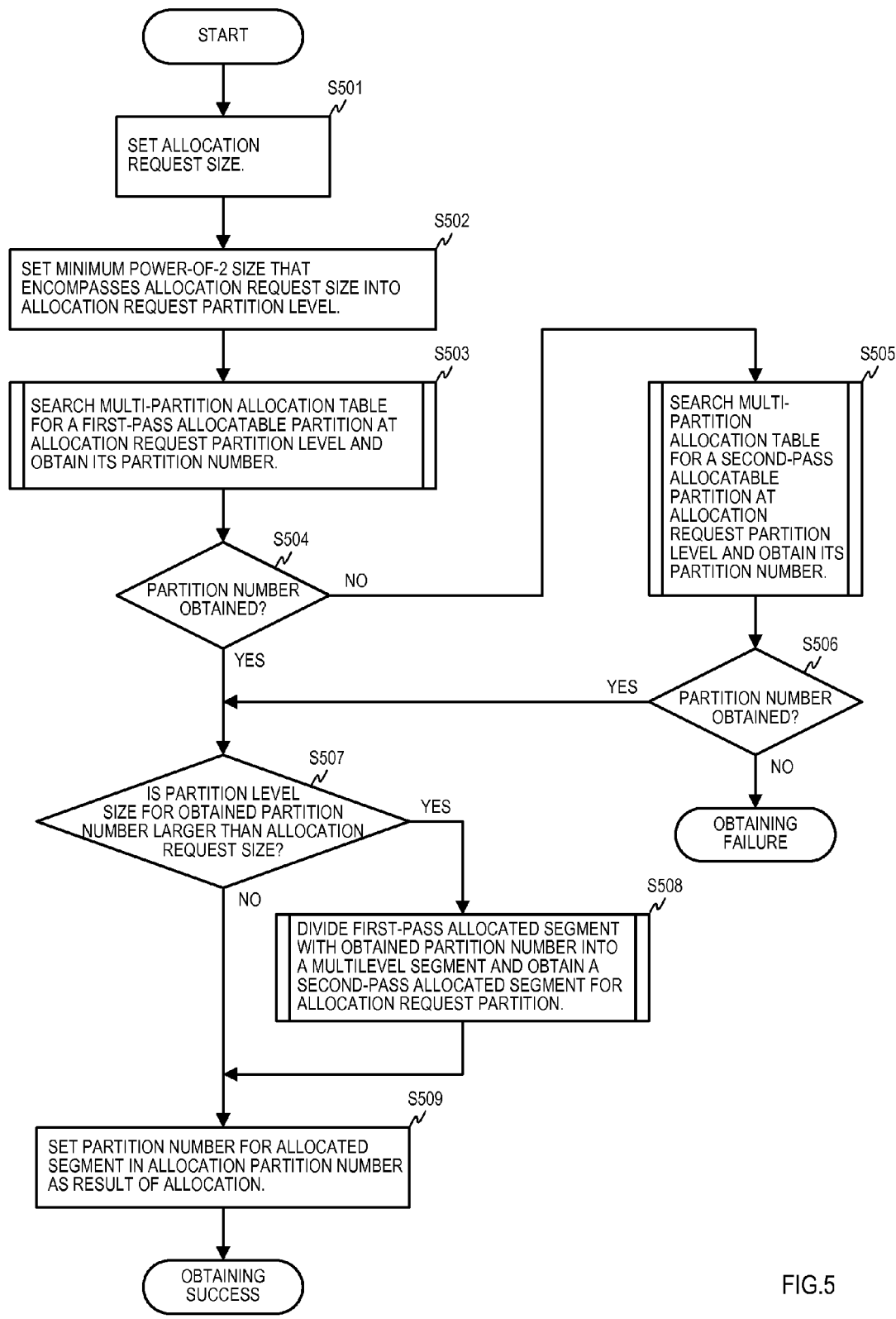
FIG. 5 is a drawing describing an example of the processing flow of an overview of the overall processing for partition partitioning.

FIG. 5 is a drawing describing an example of the processing flow of an overview of the overall processing for partition partitioning, which example of the processing flow is common in the first and second embodiments.

First, at step S501, the allocation request size is set, and at step S502, the exponent of the size with the smallest power-of-2 size that encompasses the allocation request size is set as the allocation request partition level. For example, if the allocation request size is 11 (expressed in binary as "01011"), 4, which is the exponent of 2 raised to the 4th power, equaling 16 (expressed in binary as "10000"), is set as the allocation request partition level. Also, if the allocation request size is 8, which is a power-of-2 value, 3, which is its power-of-2 exponent, is set as the allocation request partition level.

Next, proceeding to step S503, the multi-partition allocation table is referenced and a first-pass allocatable partition, one whose partition allocation status is "first-pass available", is sought for from among the partitions at an allocation request partition level, and the partition number of a first-pass allocatable partition is obtained. Details of the processing of step S503 are explained later referencing FIG. 6.

At step S504, a determination is made whether the partition number of a partition whose status is "first-pass available" could be obtained, and if it is obtained, processing proceeds to step S507, and if it is not obtained, processing proceeds to step S505.

At step S505, the multi-partition allocation table is referenced and a second-pass allocatable partition, one whose partition allocation status is "second-pass available", is sought for from among the partitions at an allocation request partition level, and the partition number of a second-pass allocatable partition is obtained. Details of the processing of step S505 are explained later referencing FIG. 9.

At step S506, a determination is made whether the partition number of a partition whose status is "second-pass available" could be obtained, and if it is obtained, processing proceeds to step S507, and if it is not obtained, partition allocation processing is terminated as an obtaining failure.

At step S507, a determination is made whether the size of the partition corresponding to the partition level with the partition number obtained in the processing in step S503 is larger than the allocation request size set in step S501. If the allocation request size does not coincide with a power-of-2 value, in other words, if when it is expressed in binary form there are multiple significant bit positions (in this case the allocation request is called a multibit request and conversely when the allocation request coincides with a power-of-2 it is called a single-bit request), then the size of the obtained partition is larger than the allocation request size. Hence, the determination in step S507 is a determination whether the allocation request is a multibit request or a single-bit request.

If the determination in step S507 is that it is a single-bit request processing proceeds to step S509, and if the determination in step S507 is that it is a multibit request processing branches to step S508. At step S508, the first-pass allocated segment corresponding to the obtained partition number is partitioned into a multilevel segment and an area with the allocation request size is obtained in the multilevel segment and processing proceeds to step S509. Also, although the area obtained by the partitioning is a multilevel segment composed of a plurality of partitions, hereinbelow this area is called a second-pass allocated segment. Details of the processing in step S508 are described later, referencing FIG. 11A to FIG. 11C for the first embodiment and FIG. 23A to FIG. 23C for the second embodiment. Also, details about first-pass allocation and second-pass allocation are described later.

At step S509, the partition number of the partition allocated as a first-pass allocated segment by first-pass allocation is set in the allocated partition number as allocation results, and processing is terminated. The allocated partition number set here is returned to the file system as allocation results, as shown in FIG. 3A. The multi-partition management part of the allocation system can obtain, from the multi-partition management table, the relative address from the starting position of the allocated region allocated to the file system up to the starting position of the area allocated to the file for which the allocation request is made, using the allocated partition number corresponding to that file.

Next, details of the processing of step S503, step S505, and step S508 in FIG. 5 are described.

Figure 6:
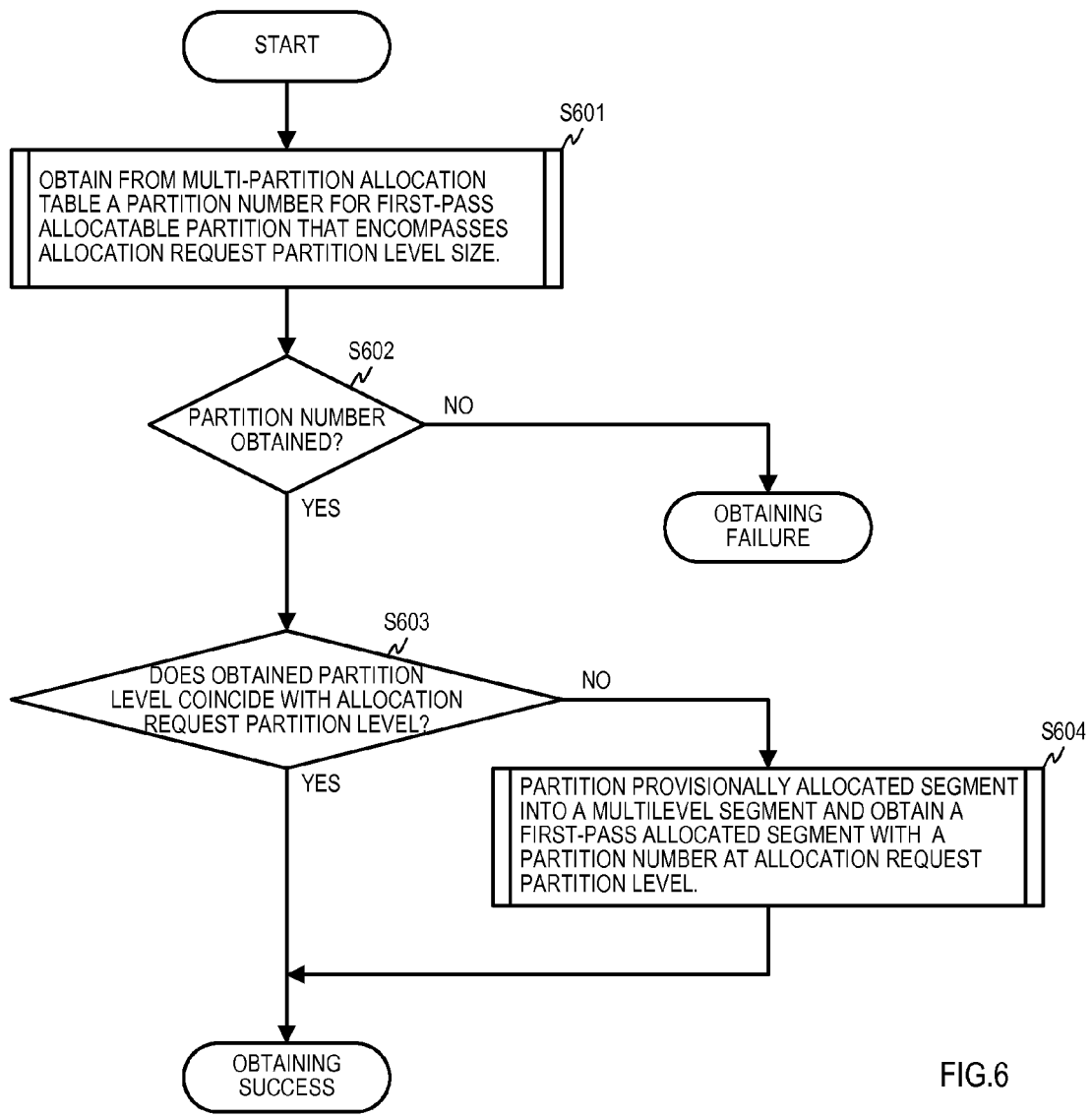
FIG. 6 is a drawing describing an example of the processing flow to search for a first-pass allocatable partition at an allocation request partition level and to obtain the partition number of the first-pass allocatable partition.

FIG. 6 is a drawing describing the details of the processing in step S503 of FIG. 5, and the drawing describes an example of the processing flow to search for a first-pass allocatable partition at an allocation request partition level and to obtain the partition number of the first-pass allocatable partition. The example of the processing flow is common to the first and second embodiments.

As shown in the drawing, at step S601, a first-pass allocatable partition that includes the size of an allocation request partition level is sought for in the multi-partition allocation table, and the partition number of the first-pass allocatable partition is obtained. In accordance with the multi-partition management in one embodiment of the present invention, even if a first-pass allocatable partition at an allocation request partition level cannot be found, if a first-pass allocatable partition exists at a partition level higher than the allocated partition level, that can be found. For example, in the example shown in FIG. 3B, if the allocation request partition level is 3, no partitions at partition level 3 are first-pass available, as shown by the single-level partition allocation table 163 at partition level 3. However, the partition with the partition number 3 is a first-pass allocatable partition at partition level 2, and that partition number 3 is obtained. In this way the allocation of a first-pass allocatable partition at a partition level higher than the allocated partition level may be called provisional allocation. Details of step S601 are described below referencing FIG. 7A to FIG. 7D for the first embodiment and FIG. 20A to FIG. 20C for the second embodiment.

Next, at step S602, a determination is made whether a partition number was obtained in the processing of step S601, and if it was not obtained, obtaining failure is returned and processing is terminated, and if it is obtained, processing proceeds to step S603.

At step S603, a determination is made whether the partition level related to the partition number obtained in the processing of step S601 (obtained partition level) and the allocation request partition level coincide. This determination is equivalent to a determination whether provisional allocation has been performed. If the obtained partition level and the allocation request partition level coincide, obtaining success is returned and processing is terminated, and if the obtained partition level and the allocation request partition level do not coincide, in other words, if provisional allocation has been performed, processing branches to step S604.

At step S604, the provisionally allocated segment is partitioned into a multilevel segment and a first-pass allocated segment with a partition number at the allocation request partition level is obtained. In other words, a partition with the size of the allocation request partition level is obtained as a first-pass allocated segment, and its partition number is obtained, obtaining success is returned and processing is terminated. Details of step S604 are described below referencing FIG. 8A and FIG. 8B for the first embodiment and FIG. 21A to FIG. 21B for the second embodiment.

Figure 7A:
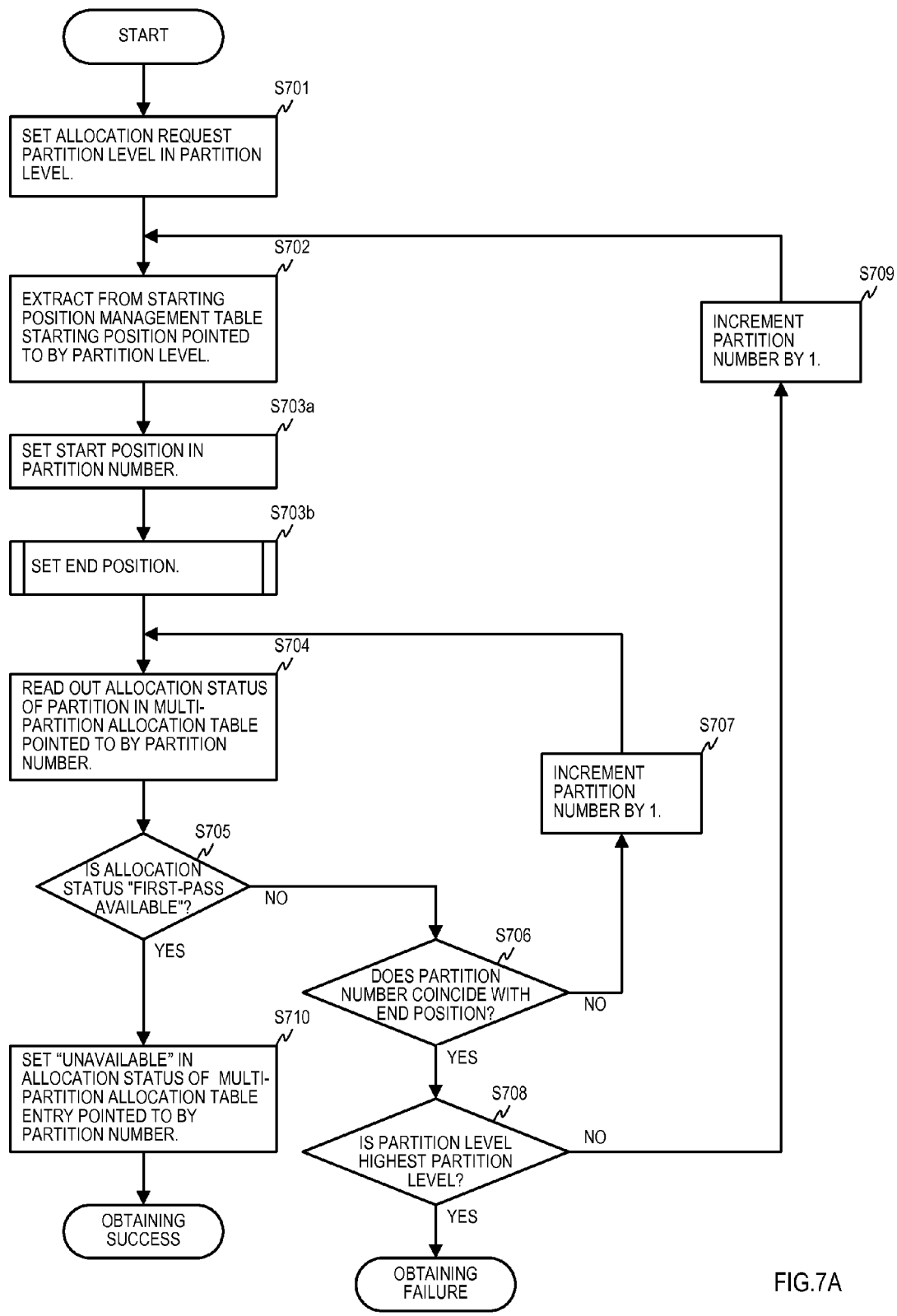
FIG. 7A is a drawing describing an example of the processing flow to search for a first-pass allocatable partition that includes the size of the allocation request partition level and to obtain the partition number of the first-pass allocatable partition in the first embodiment of this invention.

FIG. 7A is a drawing describing the details of the processing at step S601 of FIG. 6, and the drawing describes an example of the processing flow to search for a first-pass allocatable partition that includes the size of the allocation request partition level and to obtain the partition number of the first-pass allocatable partition in the first embodiment of this invention.

As shown in the drawing, in step S701, the allocation request partition level is set in the partition level. Here the value of the allocation request partition level is the one set in step S502 in FIG. 5.

Next, in step S702, the start position pointed by the partition level is extracted from the start position management table. Then, at step S703a, the extracted start position is set in the partition number and, at step S703b, the number of the partition number ending position in the single-level partition allocation table at the partition level currently being processed is set in the end position number. Details of the processing in step S703b is explained below referencing FIG. 7D.

Next, proceeding to step S704, the allocation status of the multi-partition allocation table entry pointed by the value set in the partition number is read out. Then, at step S705, a determination is made whether the read-out allocation status is "first-pass available". When the determination in step S705 is that the allocation status is "first-pass available", processing proceeds to step S710.

Conversely, when the determination in step S705 is that the allocation status is "not first-pass available", processing branches to step S706. Then, at step S706, a determination is made whether the partition number and the end position number set at step S703b coincide. If the partition number and end position number do not coincide, processing branches to step S707, the partition number is incremented by 1, and processing returns to step S704. Thereinafter, 1 each is added to the partition numbers within the same single partition level and a partition with a "first-pass available" status is sought for.

When the determination in step S706 is that the partition number and end position number coincide, processing proceeds to step S708 wherein a determination is made whether the partition level is the highest partition level. If the partition level is the highest partition level, obtaining failure is returned and processing is terminated.

If the determination step S708 is that the partition level is not the highest partition level (if the partition level is a lower partition level than the highest partition level) processing proceeds to step S709 wherein the partition level is incremented by 1 and processing returns to step S702.

When return is made to step S702 the above processing is repeated and one by one the allocation statuses in the multi-partition allocation table for the higher partition level are sought out. When the search result is that a partition with a first-pass available status is obtained, processing proceeds to step S710.

At step S710, the allocation status in the multi-partition allocation table entry pointed to by the value set in the partition number is set to unavailable and processing is terminated. The result of the processing in FIG. 7A is that the values set respectively in the temporary memory areas of partition number and partition level and data expressing whether the obtaining was a success or failure are all output as search results.

Figure 7B:
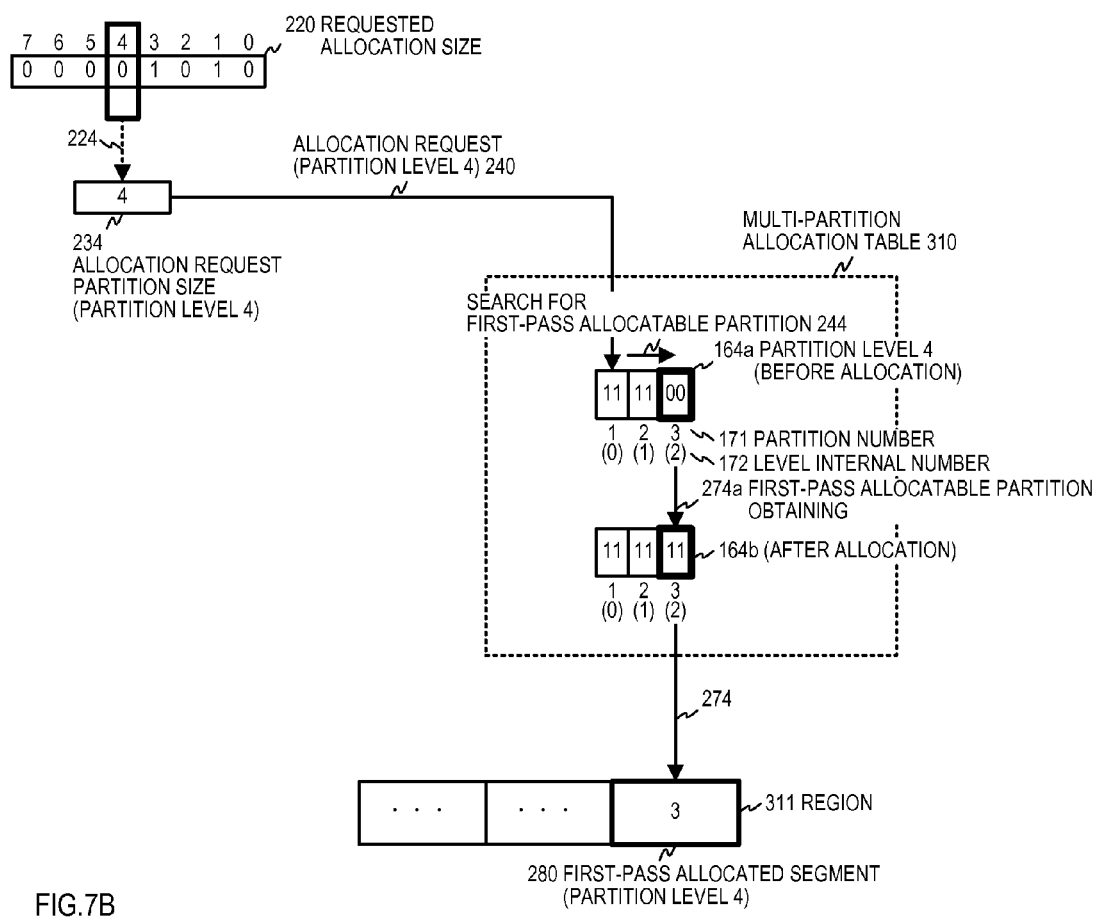
FIG. 7B is a drawing describing, by means of a concrete example, a partition search when a first-pass allocatable partition exists at the allocation request partition level in the first embodiment of this invention.
Figure 7C:
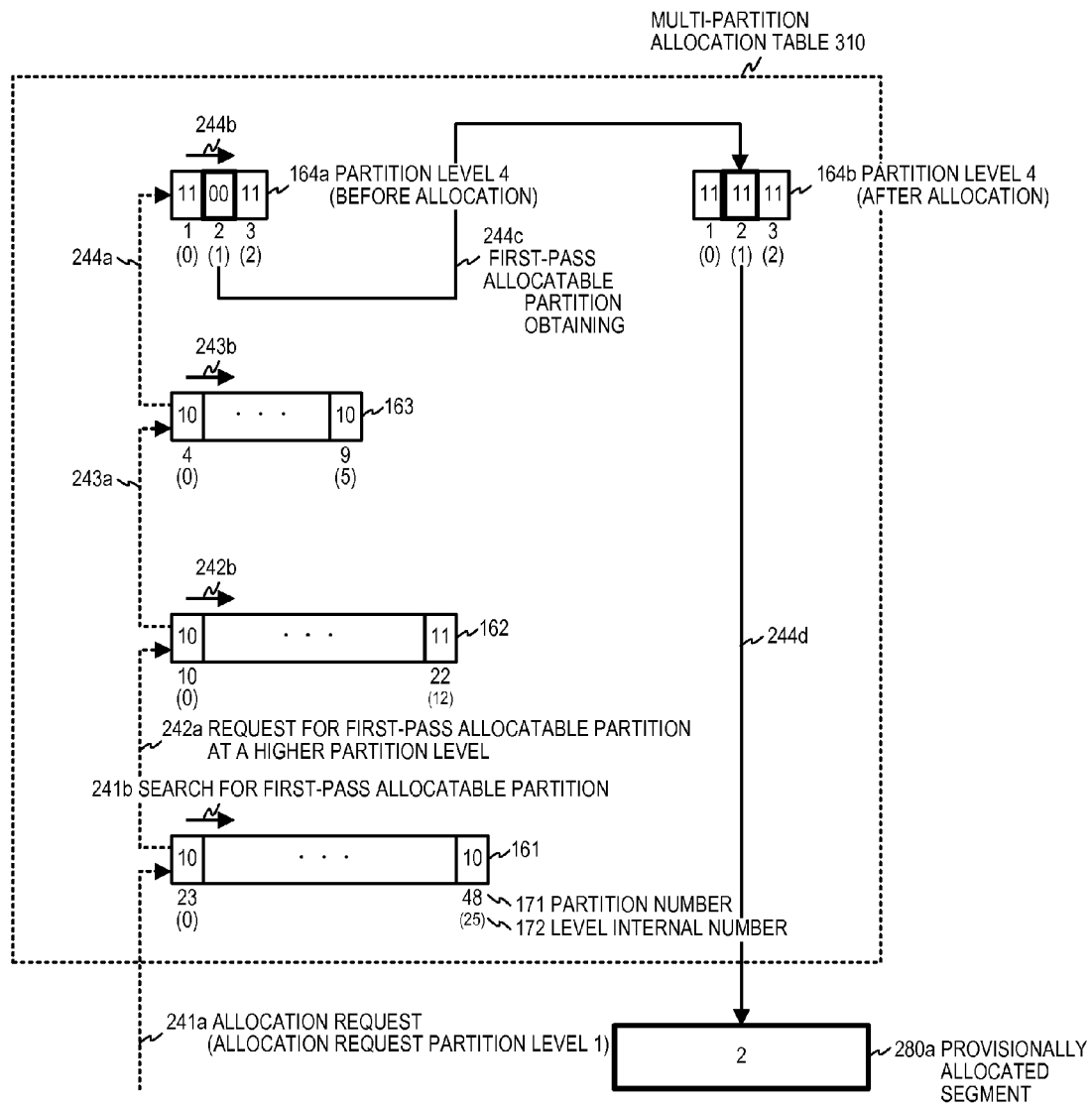
FIG. 7C is a drawing describing a concrete example of a partition search when a first-pass allocatable partition does not exist at an allocation request partition level in the first embodiment of this invention.

FIG. 7B and FIG. 7C are drawings describing, by means of a concrete example, the partition search for a first-pass allocatable partition shown in FIG. 7A referencing the multi-partition allocation table 310 shown in FIG. 3B.

The example shown in FIG. 7B is an example wherein the allocation request is a multibit request and a first-pass allocatable partition is sought for at the allocation request partition level. As shown in the drawing the bit value 1 is set in the first bit (partition level 1) and the third bit (partition level 3). Thus, partition level 4, which is a partition level above partition level 3, is set in the allocation request partition level 234, as shown by the dotted-line arrow 224. The setup up to this point is the processing that occurs in step S501 and step S502 in FIG. 5.

Next, by means of the allocation request 240 at partition level 4, shown by the solid-line arrow in the drawing, a search 244 is made for a first-pass allocatable partition (with the label 164a, before allocation) in the single-level partition allocation table entries at partition level 4 in multi-partition allocation table 310.

In the example in the drawing, the allocation status for partition number 1 and 2 in partition number 171 are both "11" and thus unavailable while the allocation status for partition number 3 is "00" and thus first-pass available. Thus the obtaining 274a of the first-pass allocatable partition is done as shown by the solid-line arrow in the drawing, and "11" is set in allocation) as shown in the single-level partition allocation table at partition level 4, indicating that it is unavailable. As a result, as shown by the arrow 274 in the drawing, the partition with partition level 4 and partition number 3 is allocated as first-pass allocated segment 280 in region 311. The above allocation of first-pass allocated segment 280 is done by the processing loop of steps S704 to S707 and by step S710 shown in FIG. 7A.

Next, using the example shown in FIG. 7C, a case is described wherein a first-pass allocatable partition cannot be found at the allocation request partition level and the allocation request is a single-bit request. Although allocation request size 220 is not depicted in FIG. 7C, the allocation request is a single-bit request wherein the first bit is a 1 because the allocation request 241a pointed out by the dotted-line arrow contains allocation request partition level 1 shown in the parentheses.

If a first-pass allocatable partition cannot be found at the allocation request partition level, in the flow shown in FIG. 7A, a branch at step S706 is taken to step S708, and the processing loop through step S709, returning to step S702 is repeated until a first-pass allocatable partition is found at a higher partition level.

The process corresponding to this repetitive processing is the processing shown in FIG. 7C wherein, from a lower partition level (partition level 1 in FIG. 7C), successively referencing a higher partition level single-level partition allocation table and if a partition with a first-pass available status does not exist within the partition level being searched, once again a higher partition level is searched. Successively from partition level 1, each partition in a partition level is checked for a first-pass available status in sequence from the start position of that partition level.

First, a first-pass allocatable partition search is requested at partition level 1 which is the allocation request partition level shown by the dotted-line arrow 241a in the drawing, and of the tables in multi-partition allocation table 310, the allocation statuses in single-level partition allocation table 161 at partition level 1 are checked for a partition with a first-pass available status, in ascending sequence of partition numbers from partition number 23 which is the start position until partition number 48 which is the end position number (see arrow 241b in FIG. 7C). In the example shown in the drawing, because even if a search is done up to the partition whose partition number is the end position number 48, no partitions have a first-pass available status, a search for a first-pass allocatable partition is requested at partition level 2 which is the higher level partition determined by incrementing the partition level by one, shown by dotted-line arrow 242a in the drawing. Then, the allocation statuses in single-level partition allocation table 162 at partition level 2 are checked for a partition with a first-pass available status, in ascending sequence of partition numbers from partition number 10 which is the start position until partition number 22 which is the end position number (see arrow 242b in FIG. 7C). Because even if a search is done up to the partition whose partition number is the end position number 22, no partitions have a first-pass available status, a search for a first-pass allocatable partition is requested at partition level 3 which is the higher level partition determined by incrementing the partition level by one, shown by dotted-line arrow 243a in the drawing. In the same way, regarding single-level partition allocation table 163 at partition level 3, although a successive search is done from the partition whose partition number 4 is the start position up to the partition whose partition number 9 is the end position number, because no first-pass allocatable partitions are obtained, a search for a first-pass allocatable partition is requested at partition level 4 which is the higher level partition determined by incrementing the partition level by one (see dotted-line arrow 244a in FIG. 7C).

In the example shown in FIG. 7C, the result of a search for first-pass allocatable partitions in the single-level partition allocation table at partition level 4 before allocation, affixed with the label 164a, is that the partition with the partition number 2, whose allocation status is "00", is obtained, and the allocation status of partition number 2 in the single-level partition allocation table at partition level 4 after allocation, affixed with the label 164b, has been changed to "unavailable" expressed with "11", as shown the arrow 244c obtaining "first-pass available" in FIG. 7C. In other words, the partition with partition number 2 is provisionally allocated, as shown by arrow 244d, and is obtained as provisionally allocated segment 280a.

Also, first-pass allocatable partition search processing is not limited to the method of the above searching of partition numbers in ascending sequence, and any search algorithm can be applied.

Next the processing to obtain the end position number of the partition numbers in the single-level partition allocation table at the partition level currently being processed is described.

Figure 7D:
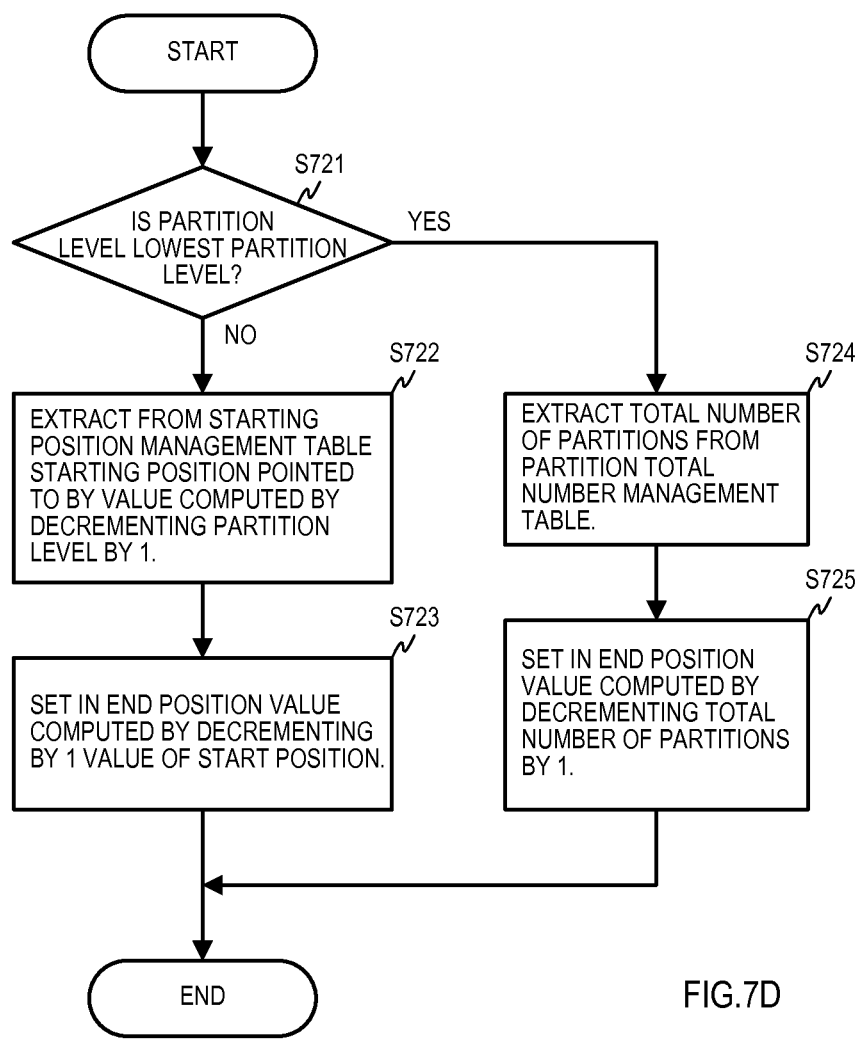
FIG. 7D is a drawing describing an example of the processing flow to obtain an end position number for a partition level in the first embodiment of this invention.

FIG. 7D is a drawing describing an example of the processing flow to obtain the partition number of the ending position at each partition level in the first embodiment of this invention.

As shown in FIG. 7D, at step S721, a determination is made whether the partition level currently being processed is the lowest partition level, and if it is not the lowest partition level, processing proceeds to step S722 and if it is the lowest partition level, processing proceeds to step S724.

At step S722, the start position pointed to by the value computed by decrementing the partition level by one is extracted from the start position management table, and at step S723, the value computed by decrementing that extracted start position by one is set in the end position number, and processing is terminated.

Conversely, at step S724, the total number of partitions is extracted from the total number of partitions management table, and at step S725, the value computed by decrementing that extracted total number of partitions by 1 is set in the end position number, and processing is terminated. The processing described above referencing FIG. 7A to FIG. 7D obtains a first-pass allocated segment or a provisionally allocated segment.

Figure 8A:
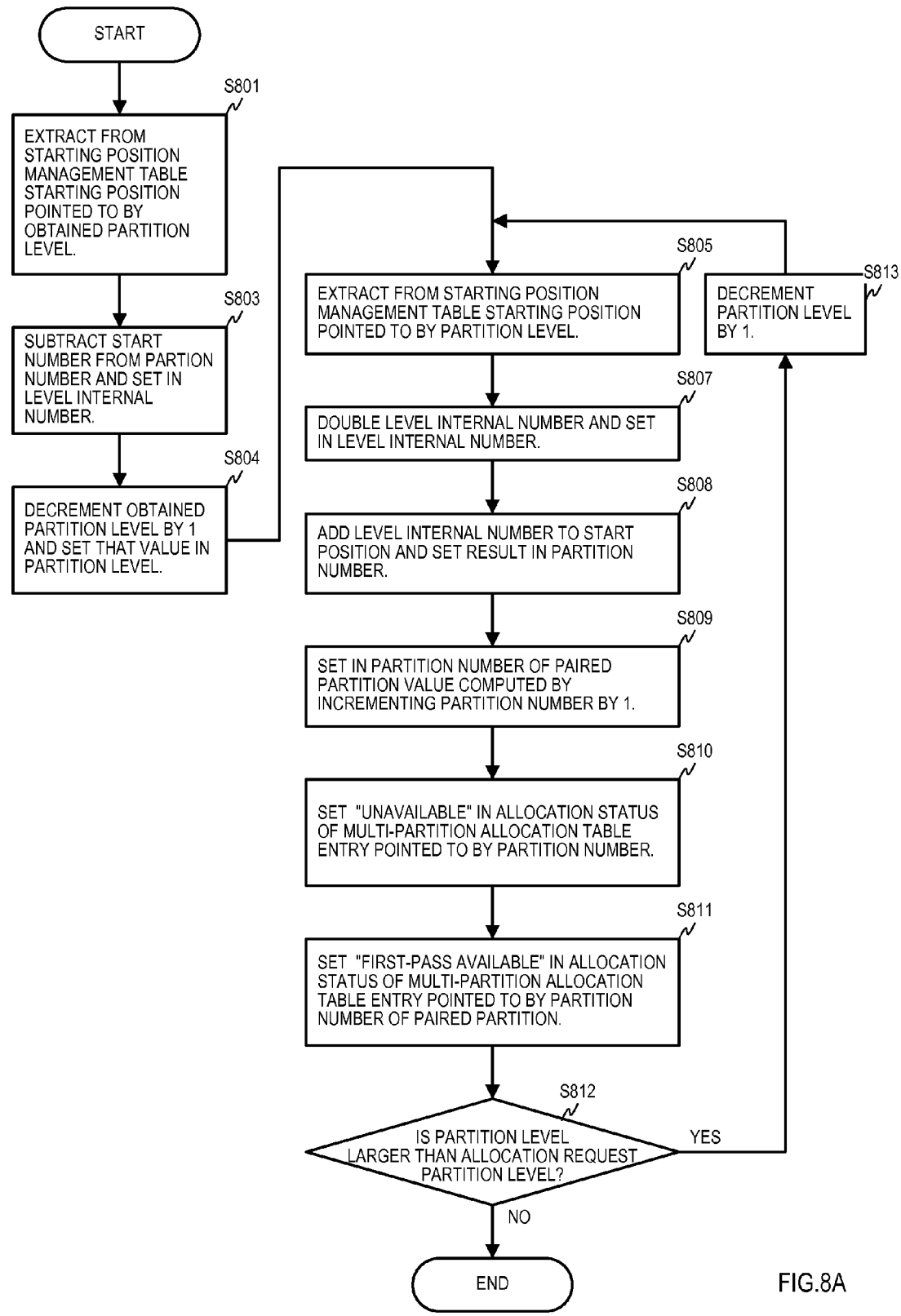
FIG. 8A is a drawing describing an example of the processing flow to multi-partition a provisionally allocated segment and obtain a first-pass allocated segment in the first embodiment of this invention.

FIG. 8A is a drawing describing the details of the processing in step S604 of FIG. 6, and it describes the an example of the processing flow to multi-partition a partition provisionally allocated in step S601 and obtain a first-pass allocated segment with a partition number at the allocation request partition level in the first embodiment of this invention.

First, at step S801, the start position pointed to by the partition level obtained at step S601 in FIG. 6 is extracted from the start position management table. Because the processing flow in FIG. 8A presumes that provisional allocation has been done, the partition size at the obtained partition level is larger than the allocation request partition. Next, proceeding to step S803, the value obtained by subtracting the start position extracted at step S801 from the obtained partition number is set in the level internal number. Next, proceeding to step S804, the value computed by decrementing the obtained partition level by one is set in the partition level, and processing proceeds to step S805.

At step S805, the start position pointed to by the partition level is extracted from the start position management table. Then, at step S807, the value computed by doubling the value set in the level internal number is set in the level internal number. This processing corresponds to the fact that the partitions corresponding to and in a partition level 1 lower than a given partition consist of partition pairs.

Next, proceeding to step S808, the value computed by adding the level internal number to the start position is set in the partition number. At step S809, the value computed by adding 1 to the partition number is set in the paired partition number. For example, a partition at a given partition level whose level internal number is "10" has its partition divided into two at a partition 1 level lower wherein the corresponding partitions have level internal numbers "20" and "21".

Next, proceeding to step S810, "unavailable" is set in the allocation status of the multi-partition allocation table entry pointed to by the partition number, and at step S811, "first-pass available" is set in the allocation status of the multi-partition allocation table entry pointed to by the partition number of the paired partition and processing proceeds to step S812.

At step S812, a determination is made whether the partition level is larger than the allocation request partition level, and if it is larger, processing branches to step S813, wherein the value computed by decrementing the partition level by 1 is set in the partition level and processing returns to step S805. If the determination result is that it is not larger, in other words, if the partition level coincides with the allocation request partition level, processing is terminated. As was described above, the obtained partition level is larger than the allocation request partition level. Then, by repeating the processing loop from step S805 to step S813 while decrementing the partition level by 1 each time, the determination at step S812 that the partition level is not larger than the allocation request partition level occurs when the partition level coincides with the allocation request partition level.

By means of the above processing, a provisionally allocated segment is multi-partitioned, and a first-pass allocated segment is obtained. The above processing of step S804 and the processing loop of steps S805 to S813 starts from the provisionally allocated segment, and divides the partition into a pair of partitions at a partition level 1 lower, and sets "unavailable" in the allocation status of the partition with the lower partition number and sets "first-pass available" in the allocation status of the partition with the higher partition number.

In accordance with the first embodiment of this invention, the obtained provisionally allocated segment is not made completely unavailable, and because the partition at an allocation request partition level with the lower partition number in the provisionally allocated segment is allocated by first-pass allocation and the remaining contiguous area is set as "first-pass available", the area can be used effectively. Also it is clear to one skilled in the art that this method is not limited to using the lower partition number in the first-pass allocation and the higher partition number can be used.

Figure 8B:
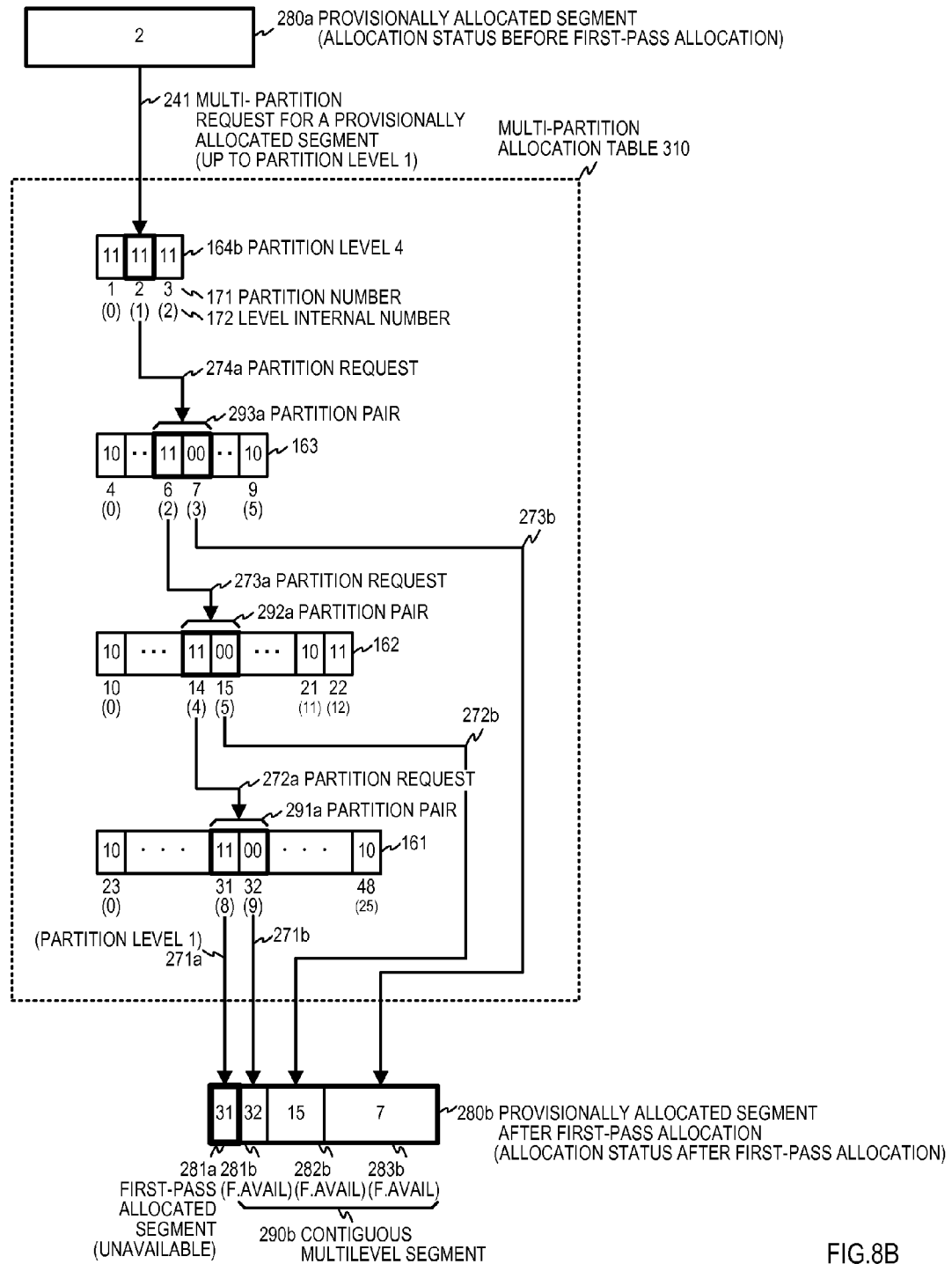
FIG. 8B is a drawing describing, by means of a concrete example, the processing to multi-partition a provisionally allocated segment and to obtain a first-pass allocated segment in the first embodiment of this invention.

FIG. 8B is a drawing describing, by means of a concrete example and referencing the multi-partition allocation table 310 shown in FIG. 3B, the processing to multi-partition a provisionally allocated segment obtained by the processing shown in FIG. 8A and to obtain a first-pass allocated segment in the first embodiment of this invention.

In the example shown in FIG. 8B, in the same way as for the example shown in FIG. 7C, the allocation request is a single-bit request, and it is a request to obtain a first-pass allocated segment from the provisionally allocated segment 280a shown in FIG. 7C.

FIG. 8B shows provisionally allocated segment (partition number 2) with label 280a with its allocation status before first-pass allocation. Processing starts from the single-level partition allocation table at partition level 4 with the label 164b by a multi-partition request that requests the partitioning of each related partition from partition level 4 up to partition level 1 in the provisionally allocated segment, shown by arrow 241 from provisionally allocated segment 280a. The same allocation statuses as those shown FIG. 7C are stored in single-level partition allocation table 164b.

By the partition request shown by arrow 274a from the entry, in single-level partition allocation table 164b at partition level 4, with the partition number 171 whose value is 2 and with the level internal number 172 whose value is 1, wherein the allocation status has been set as "unavailable" by provisional allocation, unavailable "11" is set in the allocation status of the partition (hereinafter expressed as "level internal number 2 partition") made by the partitioning out of single-level partition allocation table 163 at partition level 3 the partition unit with level internal number 2, and first-pass available "00" is set in the allocation status of the partition with level internal number 3 which along with level internal number 2 configure the partition pair 293a made by that partitioning (hereinafter expressed as "level internal number 2 partition and level internal number 3 partition configuring the partition pair 293a"). This setup processing is executed by the processing of steps S805 to S811 of FIG. 8A in partition level 3. The value 4 is extracted as the start position, and by the initial processing of steps S801 to S803 in FIG. 8A, because 1 is set in the level internal number, at step S807, the value 2, which is the double of that value, is set in the level internal number. Then, the value 6, which is computed by adding the level internal number 2 to the start position 4 is obtained as the partition number. Also, the value 7 is obtained as the partition number of its pair.

Hereinbelow, in the same way, by a partition request from the entry with partition number 6 marked as unavailable, shown by the arrow 273*a*, In single-level partition allocation table 162 at partition level 2, unavailable "11" is set in the allocation status of the partition with level internal number 4 (partition number 14) and first-pass available "00" is set in the allocation status of the partition with level internal number 5 (partition number 15) which configures the partition pair 292*a* along with the partition with level internal number 4.

Also, because "first-pass available" is set in the allocation status of partition number 7, as shown by the associated arrow 273*b*, the partition 283*b* for partition number 7 with the first-pass available status is allocated to the provisionally allocated segment, marked with label 280*b*, after first-pass allocation.

Next, by a partition request from the entry with partition number 14 marked as unavailable, shown by the arrow 272*a*, in single-level partition allocation table 161 at partition level 1, unavailable "11" is set in the allocation status of the partition with level internal number 8 (partition number 31) and first-pass available "00" is set in the allocation status of the partition with level internal number 9 (partition number 32) which configures the partition pair 291*a* along with the partition with level internal number 8. Then, because "first-pass available" is set in the allocation status of partition number 15, as shown by the associated arrow 272*b*, the partition 282*b* for partition number 15 with the first-pass available status is allocated to the provisionally allocated segment 280*b* after first-pass allocation.

Because the multi-partition request has reached partition level 1, as shown by each of the arrows 271*a* and 271*b*, partition 281*a* with partition number 31 is first-allocated to the provisionally allocated segment 280*b* after first-pass allocation as "unavailable" and partition 281*b* with partition number 32 is allocated as "first-pass available".

By means of the above multi-partitioning, the provisionally allocated segment 280*b* after first-pass allocation is divided into the unavailable first-pass allocated segment 281*a* and the contiguous multilevel segment 290*b* comprised of the first-pass allocatable partitions 281*b*, 282*b*, and 283*b* and adjacent to the first-pass allocated segment 281*a*.

Figure 9:
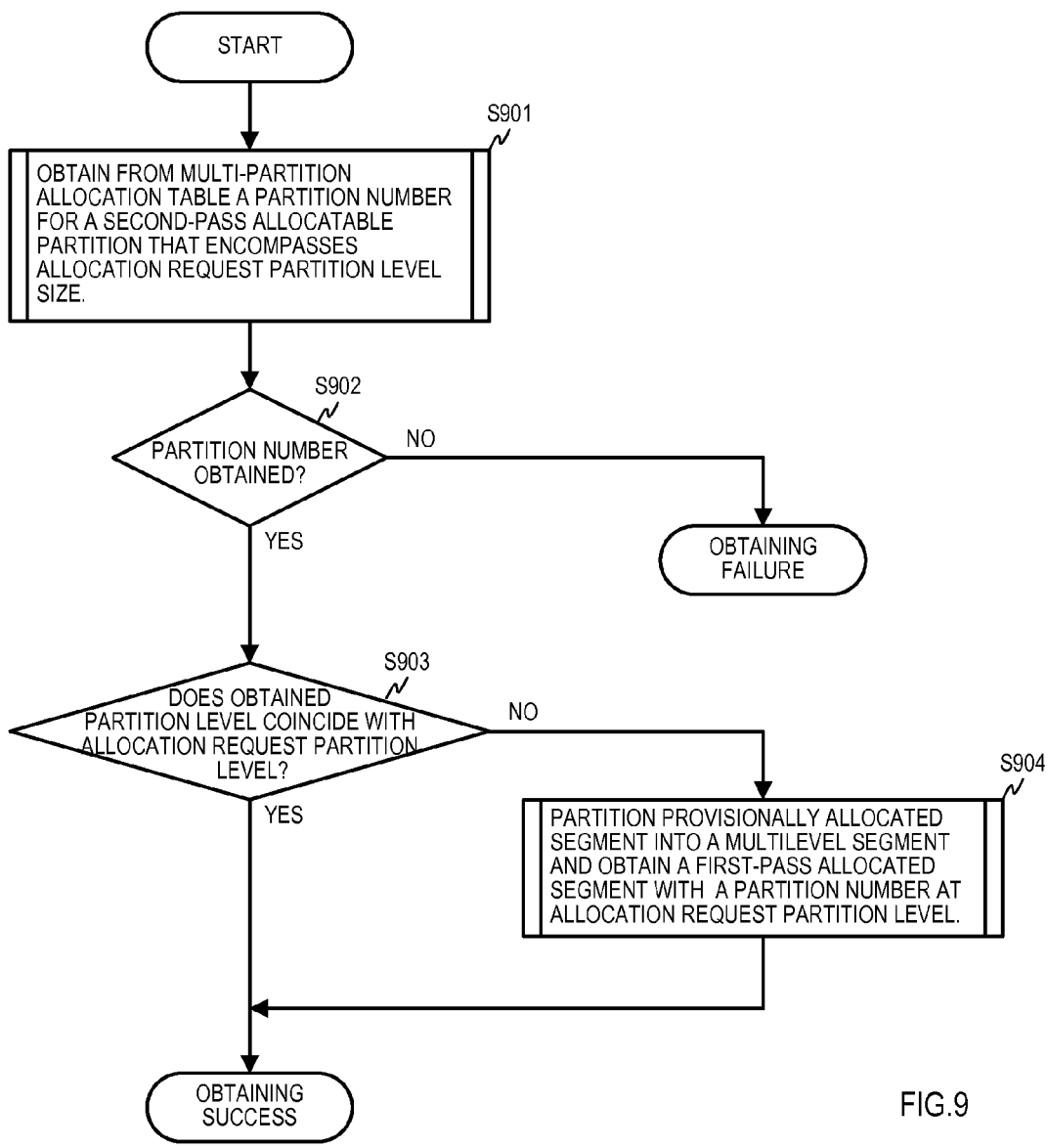
FIG. 9 is a drawing describing an example of the processing flow to search for a second-pass allocatable partition at an allocation request partition level and to obtain the partition number of the second-pass allocatable partition.

FIG. 9 is a drawing describing the details of the processing in step S505 of FIG. 5 and it describes an example of the processing flow to search, by means of the multi-partition allocation table, for a second-pass allocatable partition at an allocation request partition level and to obtain the partition number of the second-pass allocatable partition, which example of the processing flow is common in the first and second embodiments. Second-pass available is set as the allocation status of a partition that configures a contiguous multilevel segment left over after a first-pass allocated segment is divided, as is described later, referencing FIG. 11A to FIG. 11C for the first embodiment and FIG. 23A to FIG. 23C for the second embodiment.

Because the search for a second-pass allocatable partition is the same as a search for a first-pass allocatable partition, and the flow shown in FIG. 9 of a search for a second-pass allocatable partition corresponds to the flow shown in FIG. 6 of a search for a first-pass allocatable partition, and steps S901 to S904 in FIG. 9 are such that the wording "first-pass allocatable partition" in steps S601 to S604 shown in FIG. 6 is replaced by the wording "second-pass allocatable partition", that description is omitted.

Figure 10A:
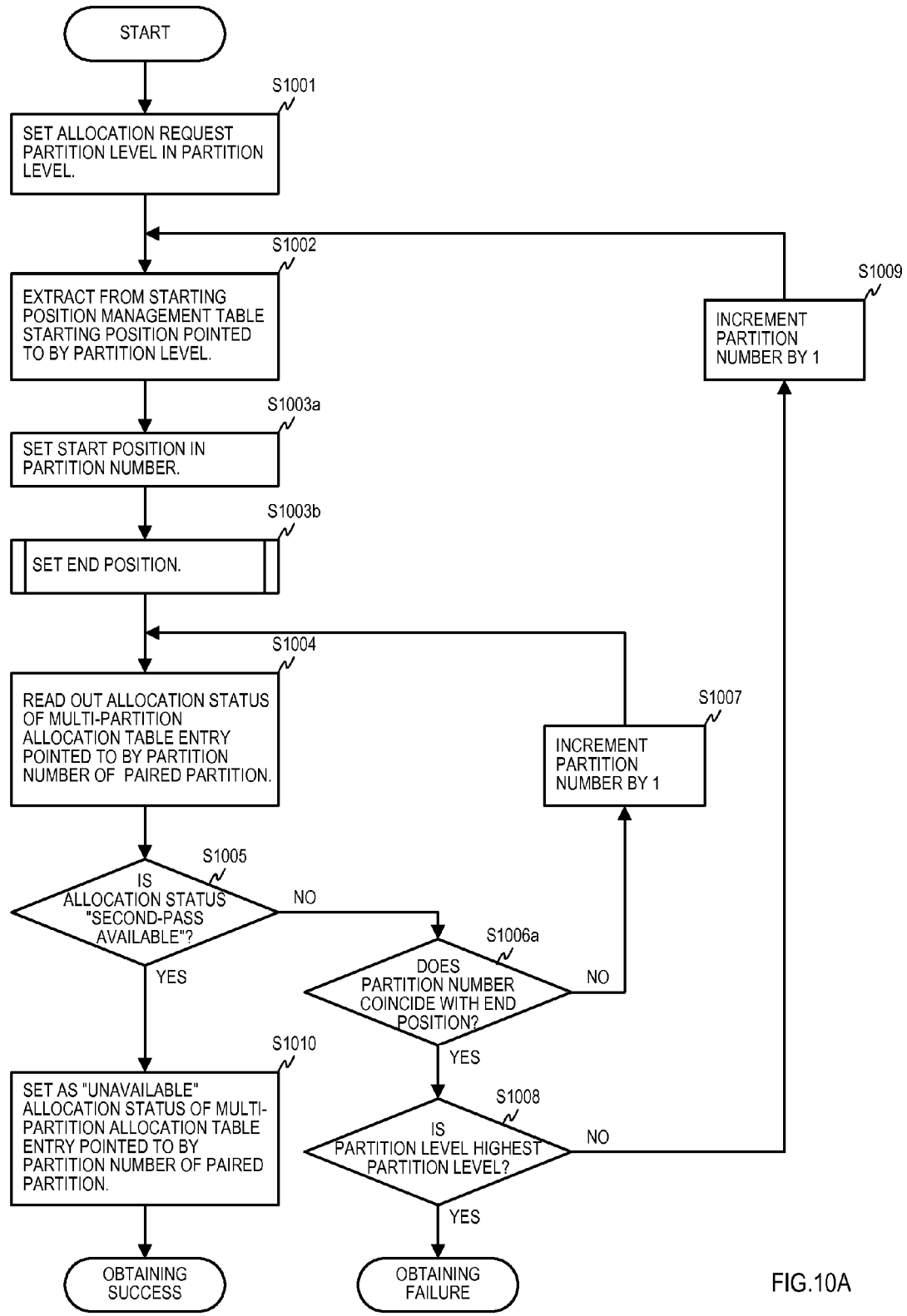
FIG. 10A is a drawing describing an example of the processing flow to search for a second-pass allocatable partition that includes the size of the allocation request partition level and to obtain the partition number of the second-pass allocatable partition in the first embodiment of this invention.

Also, FIG. 10A, which describes details of the processing in step S901 of FIG. 9, is a drawing describing an example of the processing flow that uses the multi-partition allocation table to search for a second-pass allocatable partition that has a size equal to or greater than the size of the allocation request partition level and to obtain the partition number of the second-pass allocatable partition in the first embodiment of this invention. It corresponds to the drawing describing the processing flow that uses the multi-partition allocation table to search for an first-pass allocatable partition that has a size equal to or greater than the size of the allocation request partition level and to obtain the partition number of the first-pass allocatable partition shown in FIG. 7A. Because the steps S1001 to S1009 in FIG. 10A differ only in that the determination in step 705 of FIG. 7A is whether the allocation status is first-pass available whereas the determination in step 1005 of FIG. 10A is whether the allocation status is second-pass available, description of FIG. 10A is omitted.

Figure 10B:
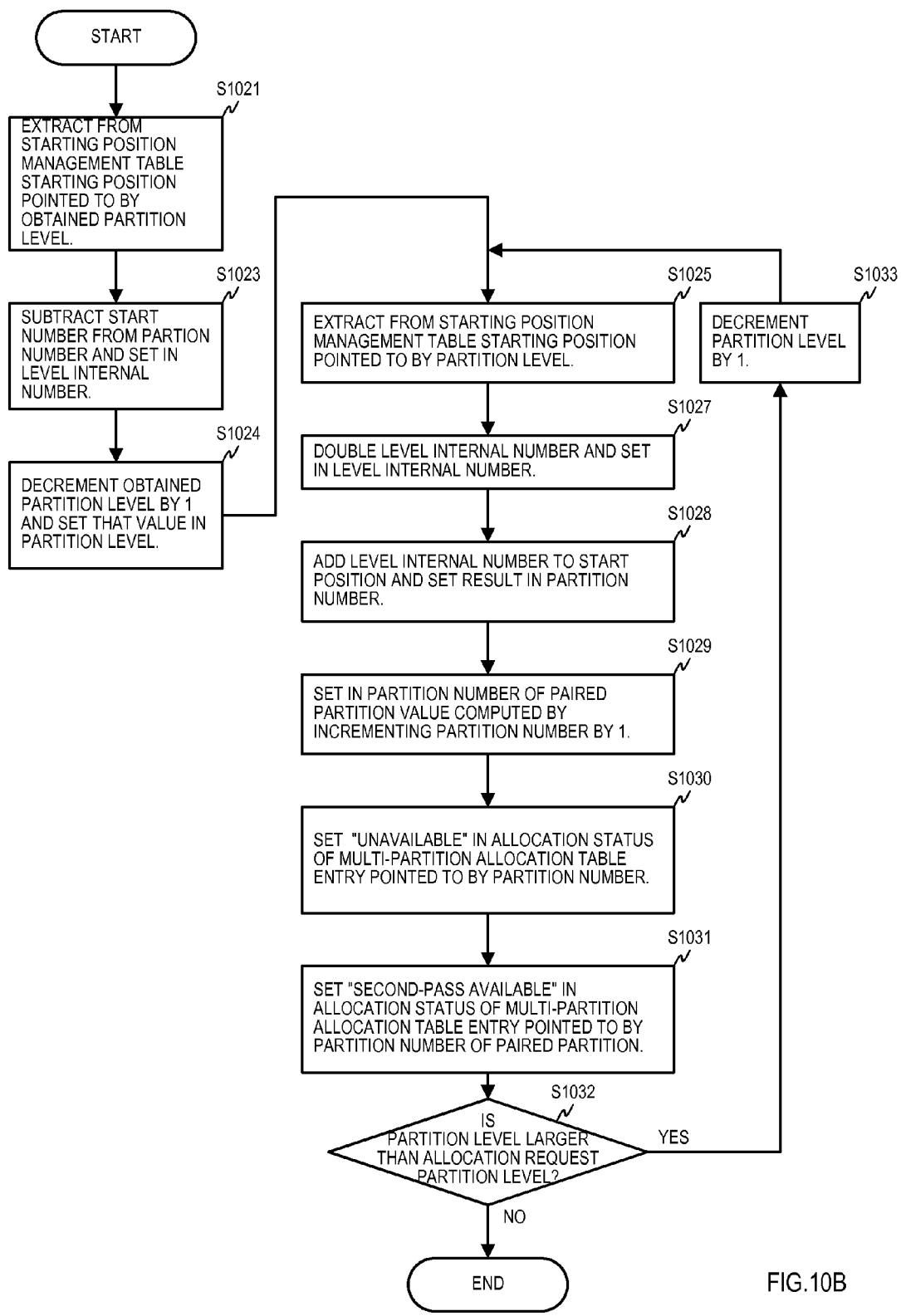
FIG. 10B is a drawing describing an example of the processing flow to multi-partition a provisionally allocated segment and obtain a first-pass allocated segment in the first embodiment of this invention.

Also, in the same way, FIG. 10B, which describe details of the processing in step S904 of FIG. 9, is a drawing describing the processing flow to multi-partition the provisionally allocated segment obtained in the processing of step S901 and to obtain a first-pass allocated segment with a partition number at the allocation request partition level in the first embodiment of this invention. It corresponds to the drawing describing the processing flow to multi-partition the provisionally allocated segment obtained in the processing of step S601 of FIG. 6 and to obtain a first-pass allocated segment with a partition number at the allocation request partition level shown in FIG. 8A. Because the steps S1021 to S1033 in FIG. 10B differ only in that first-pass available is set in the allocation status of the multi-partition allocation table entry pointed to by the partition number of the paired partition in step 811 of FIG. 8A whereas second-pass available is set in the allocation status of the multi-partition allocation table entry pointed to by the partition number of the paired partition in step S1031, description of FIG. 10B is omitted.

Figure 11A:
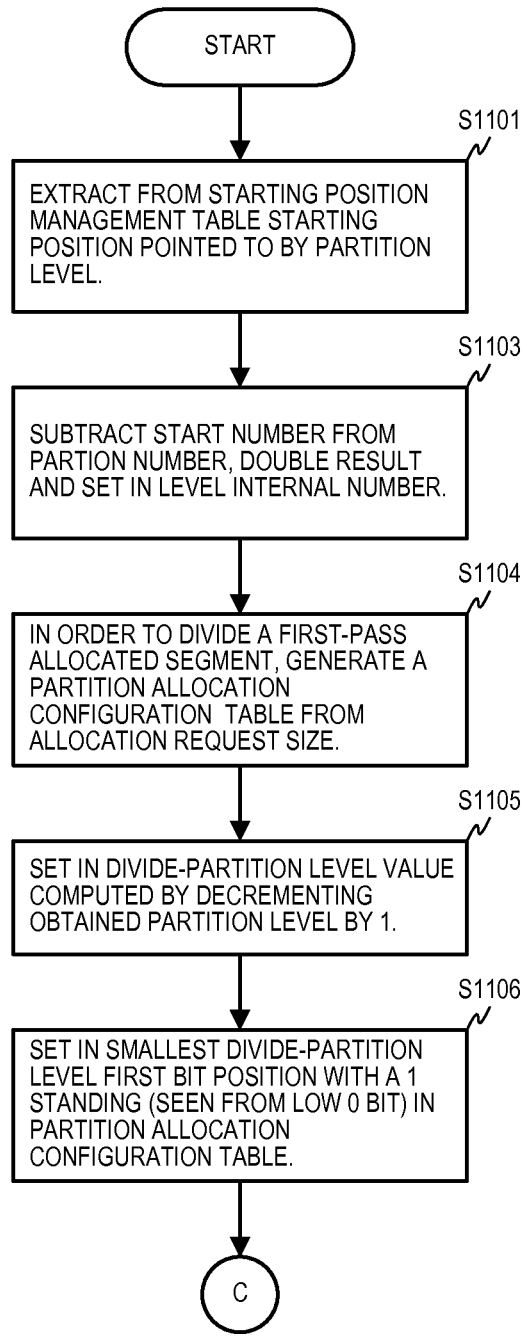
FIG. 11A is a drawing describing an example of the processing flow for the prior stage of multi-partitioning of a first-pass allocated segment and obtaining a second-pass allocated segment with the allocation request size in the first embodiment of this invention.
Figure 11B:
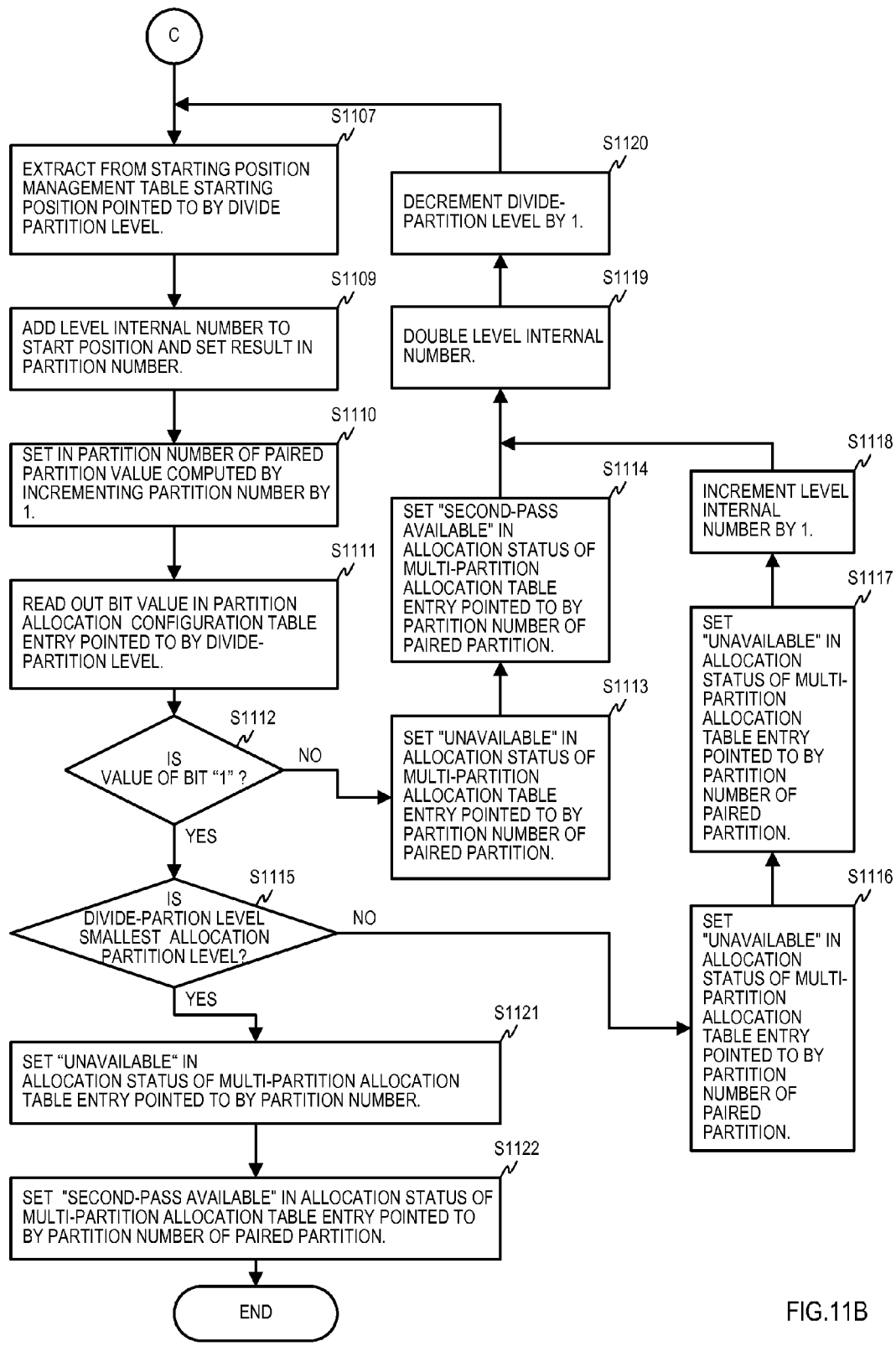
FIG. 11B is a drawing describing an example of the processing flow for the latter stage of multi-partitioning of a first-pass allocated segment and obtaining a second-pass allocated segment with the allocation request size in the first embodiment of this invention.
Figure 11C:
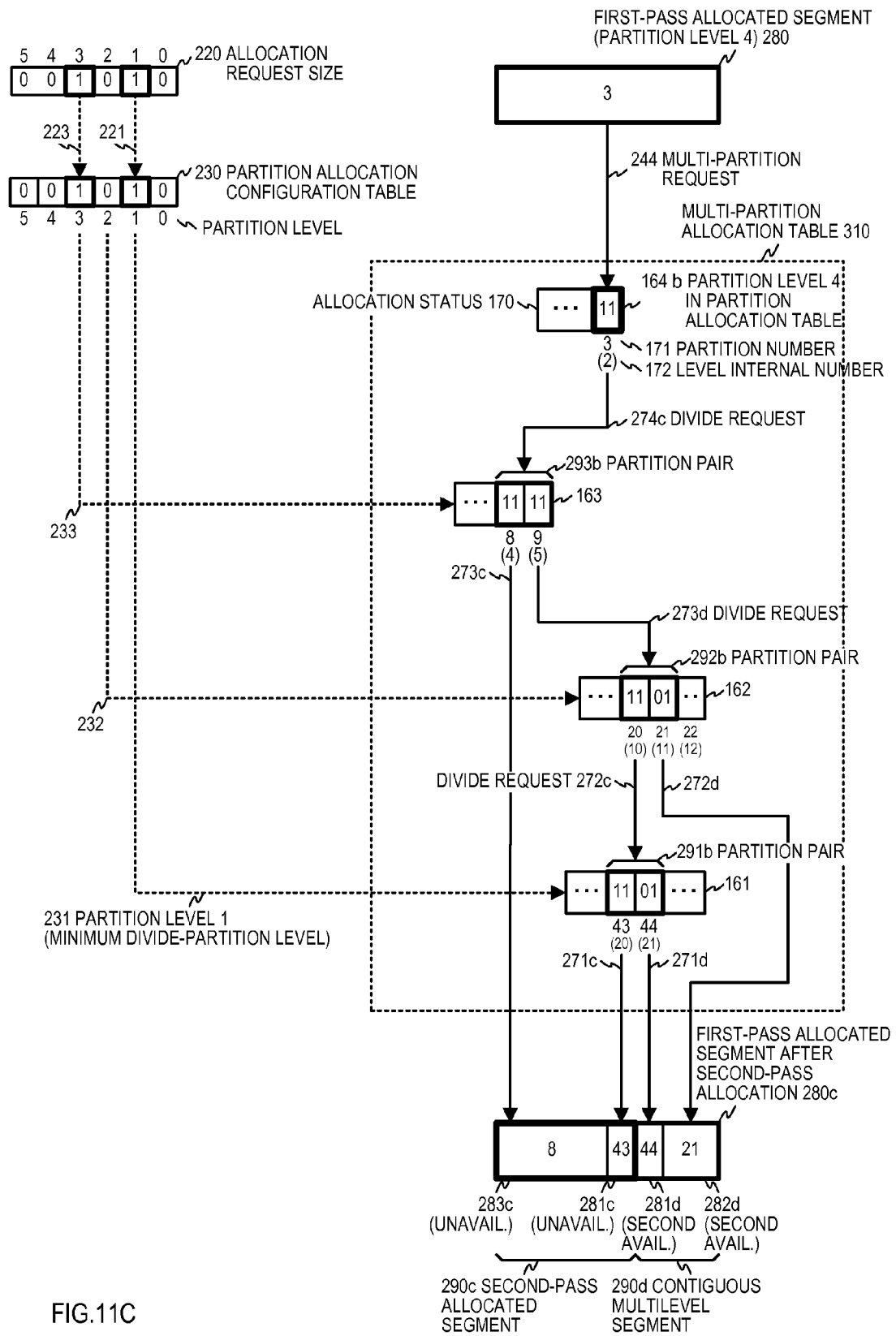
FIG. 11C is a drawing describing, by means of a concrete example, the processing to multi-partition a first-pass allocated segment and obtain a second-pass allocated segment with the allocation request size in the first embodiment of this invention.

Next details of the processing at step S508 of FIG. 5 in the first embodiment of this invention are described referencing FIG. 11A to FIG. 11C.

FIG. 11A is a drawing describing the processing flow for the prior stage of multi-partitioning of a first-pass allocated segment with the obtained partition number and obtaining a second-pass allocated segment with the allocation request size.

First, at step S1101, the start position pointed by the partition level of the obtained first-pass allocated segment (obtained partition level) is extracted from the start position management table, and at step S1103, the value computed by subtracting the start position from the partition number of the obtained first-pass allocated segment and doubling the result is set as the level internal number.

Next, proceeding to step S1104, in order to divide the first-pass allocated segment, a configuration partition table is generated from the allocation request size, consisting of the bit values of the allocation request size expressed in binary form. Then, at step S1105, the value computed by decrementing the obtained partition level by 1 is set as the divide-partition level.

Next, proceeding to step S1106, the position of a bit in the partition allocation configuration table whose bit value is one and whose bit position is the lowest when seen from the 0th bit position is set as the minimum divide-partition level, and processing proceeds to step S1107 in FIG. 11B. For example, when the bit values in the partition allocation configuration table are "1010", the bit position 1 is set in the minimum divide-partition level.

FIG. 11B is a drawing describing the processing flow for the latter stage of multi-partitioning of a first-pass allocated segment with the obtained partition number and obtaining a second-pass allocated segment with the allocation request size in the first embodiment of this invention.

At step S1107, the start position pointed to by the divide-partition level set in step S1105 is extracted from the start position management table. Then, at step S1109, the value set in the level internal number is added to the extracted start position and the result is set in the partition number, and at step S1110, the partition number is incremented by 1 and the result is set in the partition number of the paired partition.

Next, proceeding to step S1111, the bit value in the partition allocation configuration table position pointed to by the divide-partition level is extracted, and at step S1112, a determination is made whether the extracted bit value is a 1.

In step S1112, if the determination is that the extracted bit value is not 1 (is 0) processing branches to step S1113, and if the determination is that the extracted bit value is 1, processing proceeds to step S1115.

At step S1113, unavailable is set in the allocation status of the multi-partition allocation table entry pointed by the partition number, and at step S1114, second-pass available is set in the allocation status of the multi-partition allocation table entry pointed by the partition number of the paired partition, and processing proceeds to step S1119.

Otherwise, at step S1115 a determination is made whether the divide-partition level coincides with the smallest divide-partition level set in step S1106. If the divide-partition level does not coincide with the smallest divide-partition level, processing branches to step S1116 and if they coincide, processing proceeds to step S1121.

At step S1116, "unavailable" is set in the allocation status of the multi-partition allocation table entry pointed to by the partition number, and at step S1117, "unavailable" is set in the allocation status of the multi-partition allocation table entry pointed to by the pair partition number. Next, proceeding to step S1118, the level internal number is incremented by 1 and processing proceeds to the above cited step S1119.

At step S1119, the level internal number is doubled and processing proceeds to step S1120, wherein the divide-partition level is decremented by 1, and processing returns to step S1107.

When a determination is made in step S1115 that the divide-partition level coincides with the minimum divide-partition level and processing proceeds to step S1121 wherein "unavailable" is set in the allocation status of the multi-partition allocation table entry pointed by the partition number, and at step S1122, "second-pass available" is set in the allocation status of the multi-partition allocation table entry pointed by the pair partition number, and processing is terminated.

FIG. 11C is a drawing describing, by means of a concrete example referencing the multi-partition allocation table 310 shown in FIG. 3B, the processing shown in FIG. 11A and FIG. 11B to multi-partition a first-pass allocated segment and obtain a second-pass allocated segment with the allocation request size. Because of the value set in allocation request size 220 and the fact that the first-pass allocated segment has been made to be the first-pass allocated segment 280 at partition number 3, the example in FIG. 11C is one that performs second-pass allocation following up on the first-pass allocation shown in the example in FIG. 7B.

Just as was shown in FIG. 7B, the bit values of bit 1 and bit 3 in allocation request size 220 are 1 when it is expressed in binary form. The partition allocation configuration table 230 is configured from entries consisting of single bits corresponding to partition levels as shown by the digits 0 to 5 below it, and in the example shown in FIG. 11C, 6 entries are provided corresponding to levels from partition level 0 to the highest partition level 5. Just as shown by the associations depicted by the dotted-line arrows 223 and 221 in the drawing, in correspondence to the bit values when the allocation request size is expressed in binary form, corresponding bit values are set in the partition level entries. The setup up to here is performed in the processing of step S501 in FIG. 5 and step S1104 in FIG. 11A.

Based on the bit values in the above noted partition allocation configuration table 230, second-pass allocation is executed. Multi-partitioning starts from the single-level partition allocation table at partition level 4, which is the obtained partition level marked with label 164b by a multi-partition request from the first-pass allocated segment shown by arrow 244 from first-pass allocated segment 280 up partition level 1 which is the minimum divide-partition level. The same allocation statuses as those shown FIG. 7B are stored in single-level partition allocation table 164b.

Regarding the partition request 274c for the partition with partition number 3 at partition level 4, because the bit value corresponding to partition level 3 in partition allocation configuration table 230, as shown by the associated dotted-line arrow 233, is a 1, the processing of step S1116 and step S1117 in FIG. 11B sets "11" indicating "unavailable" in both the allocation statuses of level internal number 4 (partition number 8) and level internal number 5 (partition number 9) in single-level partition allocation table 163 at partition level 3, which are partitions at partition level 3 and are the partition pair 293b corresponding to the single group of partitions with the same area as the partition with partition number 3.

Because the level internal number is incremented by 1 in the processing of step S1118 that follows step S1117 in FIG. 11B, next the partition with the level internal number 5 (partition number 9) at partition level 3 becomes the object of partition request 273d. Because the bit value corresponding to partition level 2 in the partition allocation configuration table 230 is a 0, as shown by the correspondence of the dotted-line arrow 232, the processing of step S1113 and step S1114 in FIG. 11B sets "11", indicating unavailable, in the allocation status of level internal number 10 (partition number 20) and sets "01", indicating second-pass available, in the allocation status of level internal number 11 (partition number 21) in the single-level partition allocation table 162 at partition level 2, both of which are partitions at partition level 2 and are part of the partition pair 292b that corresponds to the set of partitions occupying the same area as the partition for partition number 9.

Next, the partition with level internal number 10 (partition number 20) at partition level 2 becomes subject to partition request 272c. Because the bit value corresponding to partition level 1 in partition allocation configuration table 230 is a 1, as shown by the associated dotted-line arrow 231, and also the partition level 1 is the minimum divide-partition level, the processing of step S1121 and step S1122 in FIG. 11B sets "11" indicating "unavailable" in the allocation status of level internal number 20 (partition number 43) and "01", indicating "second-pass available", in the allocation status of level internal number 21 (partition number 44) in the single-level partition allocation table 161 at partition level 1, both being partitions at partition level 1 and being the partition pair 291*b* corresponding to the single group of partitions with the same area as the partition with partition number 20.

With the above, the modification of the multi-partition allocation table 310 in accordance with the second-pass allocation is completed. The modification of multi-partition allocation table 310 multi-partitions the first-pass allocated segment 280, as shown by first-pass allocated segment 280*c* after the second-pass allocation. As shown by the associating arrow 273*c*, partition 283*c* with partition number 8 at partition level 3 is allocated as "unavailable" and concatenated with it, as shown by the associating arrow 271*c*, partition 281*c* with partition number 43 at partition level 1 is allocated as "unavailable" and second-pass allocated segment 290*c* is allocated as a multilevel segment. Also, as shown by the associating arrow 272*d*, partition 282*d* with the partition number 21 at partition level 2 is allocated as "second-pass available" and concatenated with it, as shown by the associating arrow 271*d*, partition 281*d* with the partition number 44 at partition level 1 is allocated as "second-pass available" and both together are allocated as contiguous multilevel segment 290*d*. In second-pass allocated segment 290*c*, the partitions are allocated in descending sequence of partition level and in contiguous multilevel segment 290*d* the partitions are allocated in ascending sequence of the partition level, the opposite sequence to that of second-pass allocated segments.

Even if second-pass allocation is performed, although the partition number obtained in the first-pass allocation is sent to the file system as the allocated partition number, because, as is clear from the above description, the starting position of the partition with the partition number obtained in the first-pass allocation (3 in the above example) is the same as the starting position of the partition that was secondary allocated in the second-pass allocation, an address query from the file operation system regarding the allocated area with the specified partition number can be handled.

Also, although the second-pass allocation is done using the lower partition number in the above description, it is clear to one skilled in the art that this can be done using the higher partition number, as was noted above regarding the first-pass allocation after provisional allocation.

Next, referencing FIG. 12 to FIG. 17C, the release of an "unavailable" segment allocated by a first-pass allocation or a second-pass allocation, which may be depicted below only as an allocated segment, in the first embodiment of this invention is described. Just as for allocation of partitions, the partition release processing due to file deletion and so forth also is performed in the multi-partition management part of the allocation system.

Figure 12:
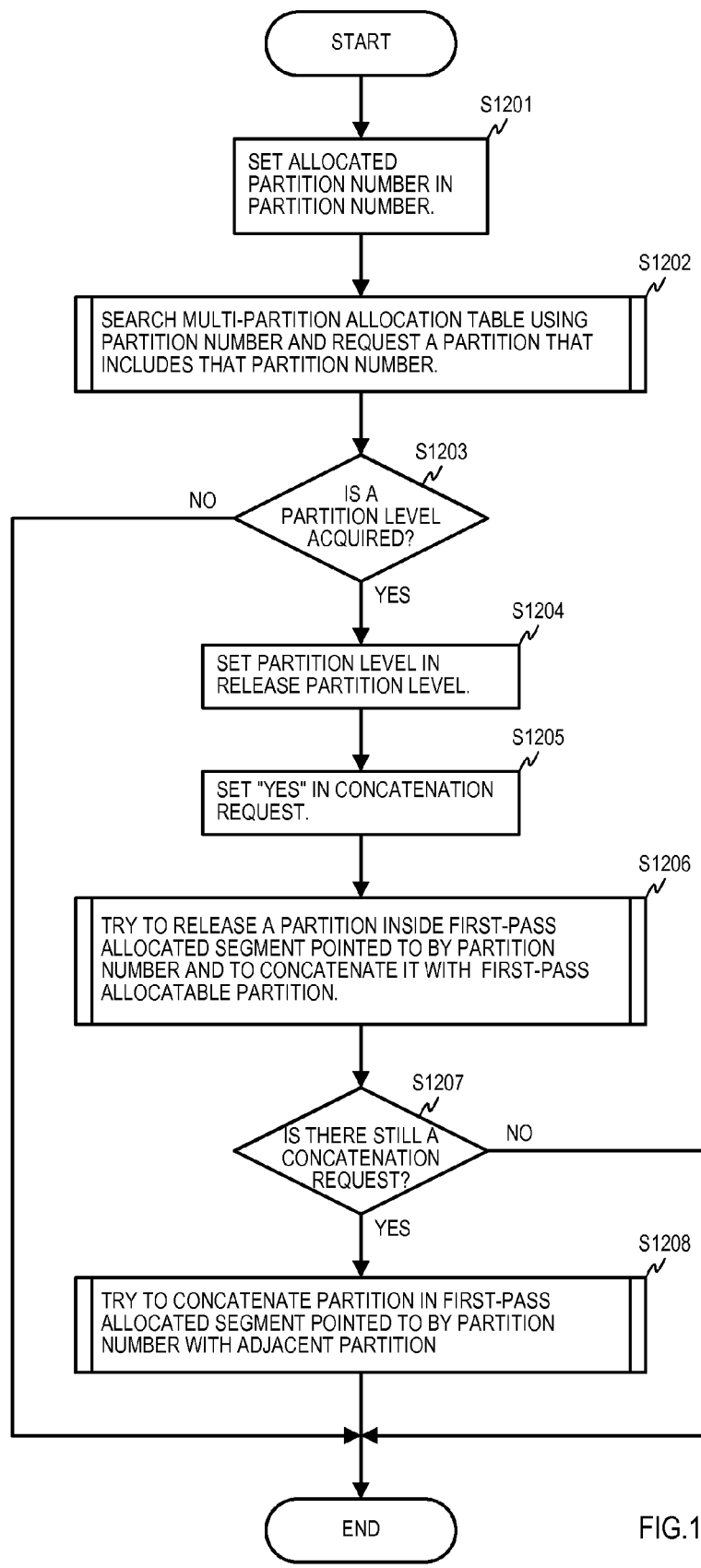
FIG. 12 is a drawing describing an example of the processing flow in an overview of the overall processing to try to release an allocated segment and concatenate it with a first-pass allocatable partition.

FIG. 12 is a drawing describing an example of the processing flow in an overview of the overall processing to try to release an allocated segment and concatenate it with a first-pass allocatable partition, which example of the processing flow is common to the first and second embodiments. By the allocated segment release-processing and first-pass allocatable partition concatenation shown in FIG. 12, the allocation status of the partition that includes the allocated segment that is released is reset, and that partition can be re-allocated.

As shown in the drawing, in step S1201, the allocated partition number is set in the partition number. This allocated partition number is returned to the file system when a partition that is subject to be released is allocated to a file and can be included in the file system's allocated segment release request. Also, the allocation request size can also be included at the same time.

Next, at step S1202, the multi-partition management table is searched using the set partition number, and the partition level corresponding to that partition number is obtained. Details of the processing in step S1202 are described later referencing FIG. 13 for the first embodiment and FIG. 24 for the second embodiment.

Next, proceeding to step S1203, a determination is made whether a partition level was obtained in the processing of step S1202, and if it was not obtained, processing is terminated. If it was obtained, processing proceeds to step S1204.

At step S1204, the partition level obtained in the processing of step S1202 is set in the release partition level, and in step S1205, a temporary memory area named concatenation request is initialized with the flag "exists" to attempt concatenation of first-pass allocatable partitions.

Next, in step S1206, the release of a partition included inside the first-pass allocated segment pointed to by the partition number and the concatenation of the partition with a first-pass allocatable partition is attempted. If the original allocation request was a single-bit request, the processing of step S1206 is terminated by setting "first-pass available" in the allocation status of the partition number set at step S1201. If the original allocation request was a multibit request, second-pass allocation had been performed, and not only is the release of the second-pass allocation area performed but an attempt is also made to concatenate the released partition with "second-pass available" partitions of a contiguous multilevel segment and to set "first-pass available" in the allocation status of the partition at the higher partition level. Details of the processing in step S1206 are described later referencing FIG. 14A and FIG. 14B.

Next, proceeding to step S1207, a determination is made whether the concatenation request contains the flag "exists". If "exists" is not there, processing is terminated, and if it is there, in step S1208, an attempt is made to concatenate the first-pass allocated segment pointed to by the partition number with a contiguously adjacent partition and to set the allocation status of the higher level partition to "first-pass available". Although it will become clear in the description hereinafter, when "exists" is in the concatenation request and processing proceeds to step S1208, there are cases wherein a first-pass allocated segment was released in the processing of step S1206. Details of the processing in step S1208 are described later referencing FIG. 17A, FIG. 17B, and FIG. 17C.

When the processing of step S1208 is terminated, the processing shown in FIG. 12 is terminated.

Figure 13:
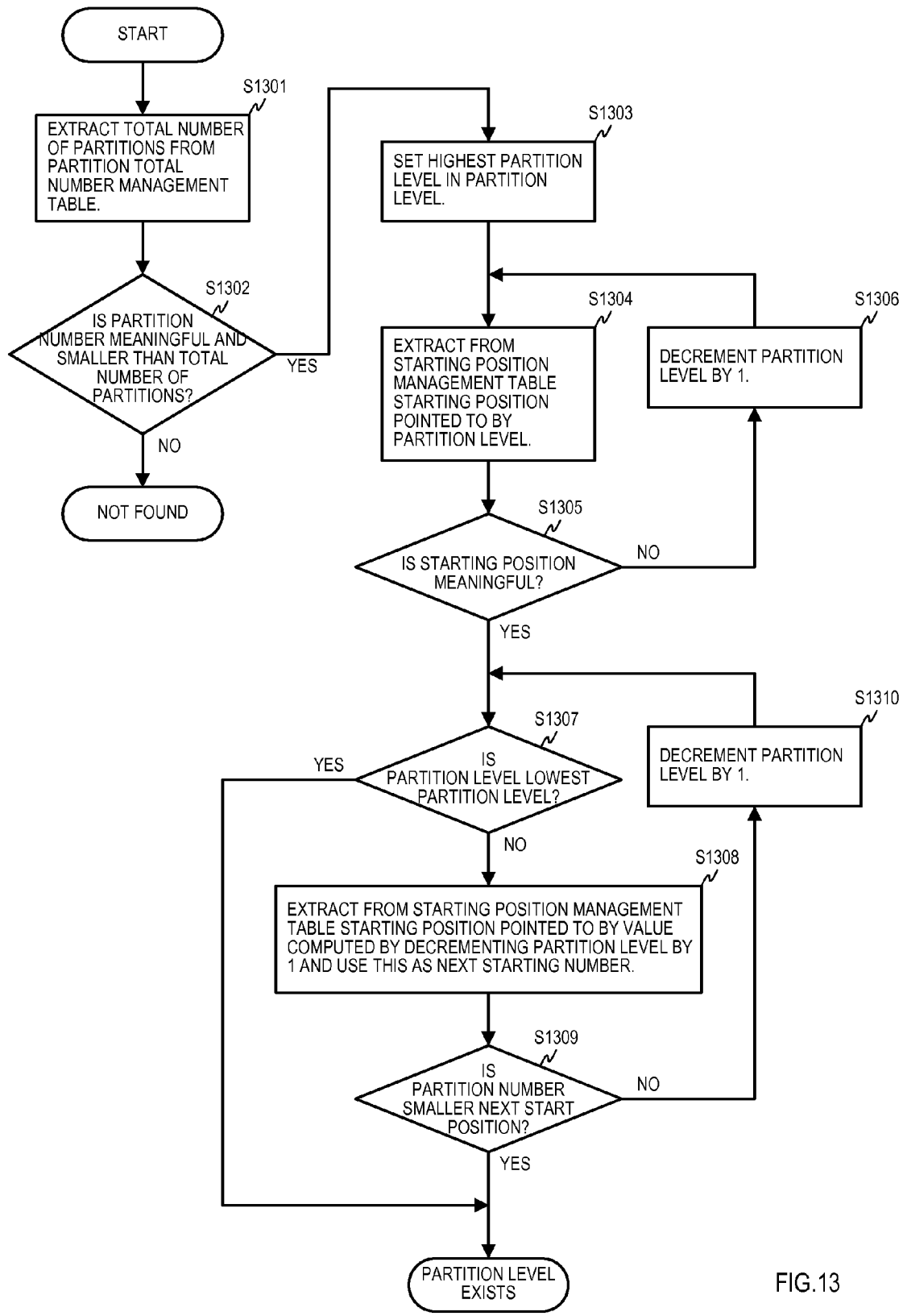
FIG. 13 is a drawing describing an example of processing flow to search a multi-partition management table by means of a partition number and to request a partition level corresponding to the partition number in the first embodiment of this invention.

FIG. 13 is a drawing describing the details of the processing in step S1202 of FIG. 12, and it is a drawing describing one example of the processing flow to search the multi-partition management table using the partition number and obtain the partition level corresponding to that partition number in the first embodiment of this invention.

First, at step S1301, the total number of partitions is extracted from the total number of partitions management table. Then, at step S1302, a determination is made whether the partition number is both significant and smaller than the total number of partitions. Here the allocated partition number provided by the allocated segment release requestor at step S1201 in FIG. 12 is set in the partition number. The processing of step S1302 checks whether the value of this allocated partition number is within an effective range and also guarantees for the later processing the existence of a partition unit in the partition level corresponding to the partition number.

If the determination result of step S1302 is negative, "no corresponding partition level" is returned and processing is terminated, and if it is positive, processing proceeds to step S1303.

At step S1303, the highest partition level in the multi-partition management table is set in the partition level as an initial value. In the example shown in FIG. 3B, 7 is set in the partition level.

Next, at step S1304, the start position pointed to by the partition level is extracted from the start position management table, and at step S1305, a determination is made whether the extracted start position is significant. If the start position is not significant, processing proceeds to step S1306 wherein the partition level is decremented by 1, and processing returns to step S1304. The above noted processing loop of steps S1304 to S1306 is that processing that skips the partition level determination processing from the highest partition level to a partition level 1 higher than the partition level of the partition that was actually allocated.

Conversely, if the extracted start position is significant, processing proceeds to step S1307, wherein a determination is made whether the partition level is the lowest partition level. If the partition level is the lowest partition level, information about lowest partition level 0 is returned showing the existence of a partition level, and processing is terminated. If the partition level is not the lowest partition level, processing proceeds to step S1308, wherein the start position pointed to by the value computed by decrementing partition level by one is extracted from the start position management table as the next start position, and at step S1309, a determination is made whether the partition number is smaller than the next start position. If the determination is that the partition number is smaller than the next start position, the partition level is returned showing the existence of a partition level and processing is terminated.

If the determination at step S1309 is that the partition number is not smaller than the next start position, processing proceeds to step S1310, wherein the partition level is decremented by 1 and processing returns to step S1307.

The processing loop of the above steps S1307 to S1310 is repeated decrementing the partition levels by 1 each, and before the partition level becomes the lowest partition level, when in the determination at step S1309 for a given partition level for the first time the partition number is smaller than the start position of the next partition level, that the partition level is the partition level related to the partition unit pointed to by the partition number. When the partition level becomes the lowest partition level before the partition number becomes smaller than the start position of the next partition level, the lowest partition level, in other words, partition level 0, becomes the pertinent partition level.

Figure 14A:
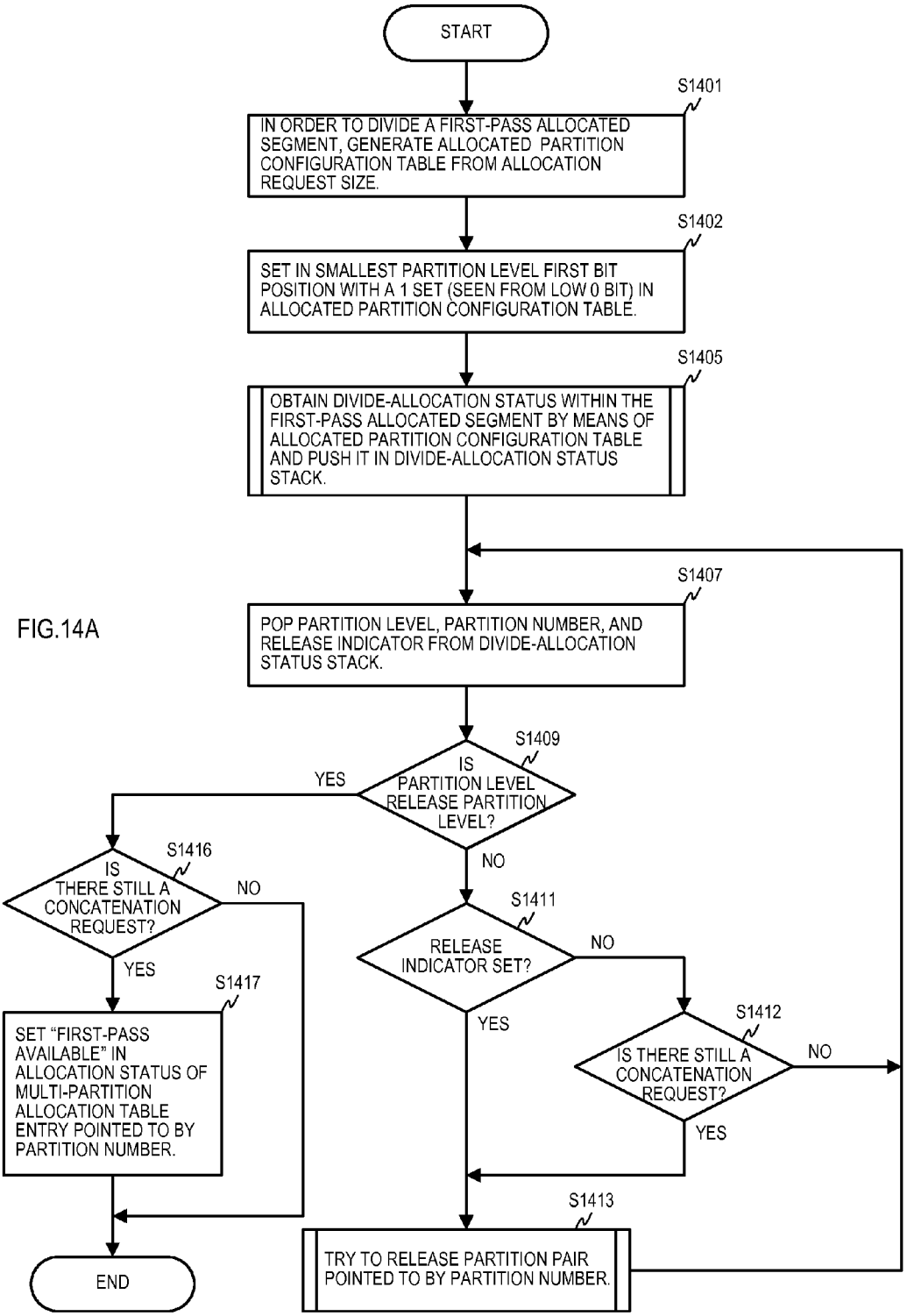
FIG. 14A is a drawing describing an example of the processing flow to try to release a partition included in the first-pass allocated segment and to concatenate it with a first-pass allocatable partition.
Figure 14B:
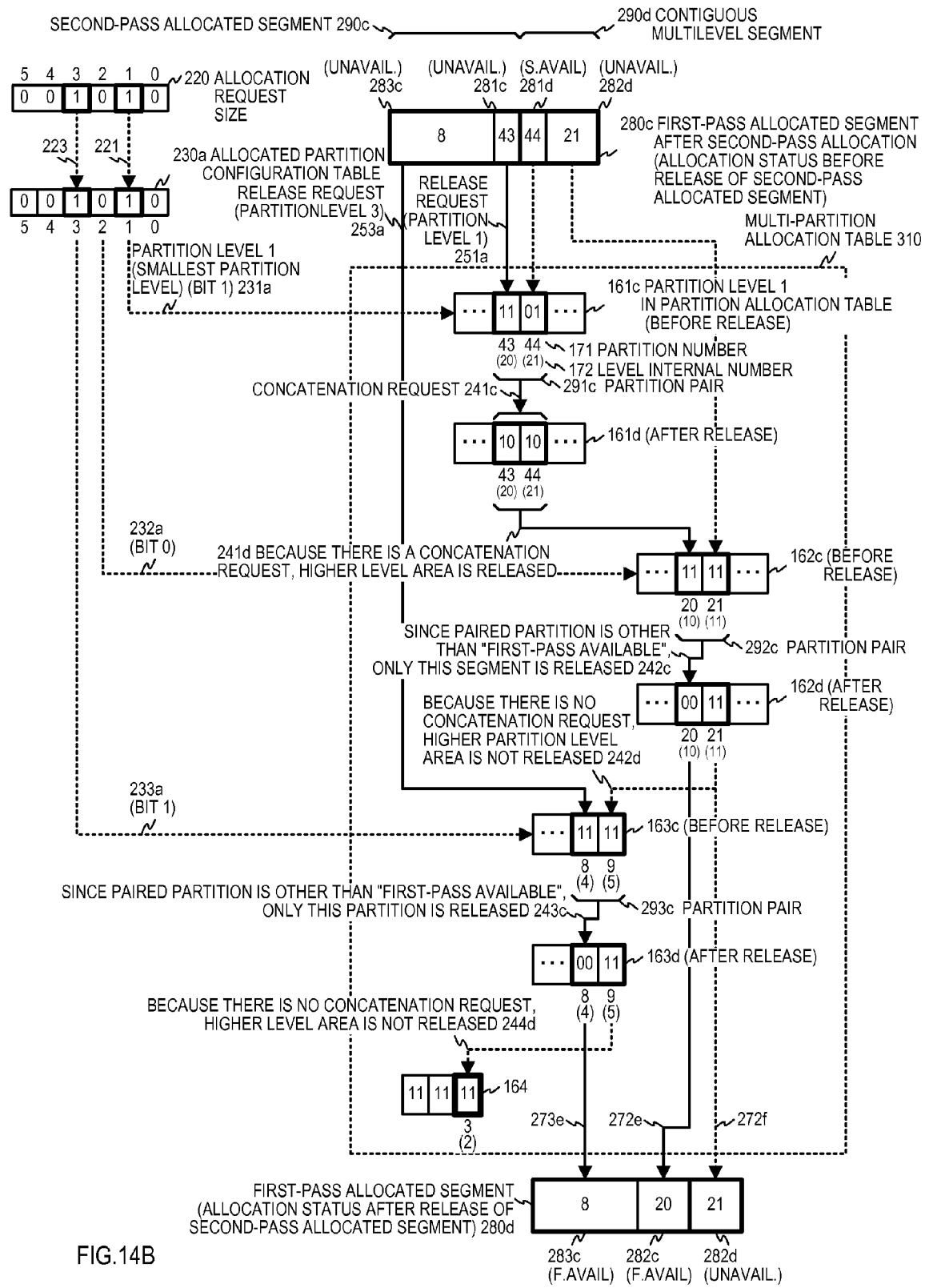
FIG. 14B is a drawing describing, by means of a concrete example, the processing to try to release a partition included in the first-pass allocated segment and to concatenate it with a first-pass allocatable partition in the first embodiment of this invention.

Next, referencing FIG. 14A and FIG. 14B, details of the processing of step S1206 in FIG. 12 regarding the first embodiment of this invention are described.

FIG. 14A is a drawing describing an example of the processing flow to try to release a partition included in the first-pass allocated segment and to concatenate it with a first-pass allocatable partition, which example of the processing flow is common in the first and second embodiments.

First, in step S1401, the allocated partition configuration table is generated from the allocation request size. The allocation request size can be made the size that is included in the file system release request that made the partition release request, as noted above. The allocated partition configuration table is generated in the same way as in the processing of step S1104 shown in FIG. 11A. Although the description in FIG. 11A is for an allocation request with a multibit request, it is clear that for a single-bit request the allocated partition configuration table is configured such that its bit value has a 1 bit in 1 single place.

Next, proceeding to step S1402, the bit position with the first bit 1 when seen from the lowest 0 bit in the allocated partition configuration table is set in the minimum partition level.

At step S1405, the divide-allocation status within the first-pass allocated segment is obtained from the allocated partition configuration table and is pushed into the divide-allocation status stack, and processing proceeds to step S1407. Here, what is called the divide-allocation status is the partition level, partition number, and release indication of the partition that is divide-allocated out of the first-pass allocated segment. When a bit value in the allocated partition configuration table entry pointed to by the partition level is a 1, the release indication is taken to be "exists" and when the bit value is 0, the release indication is taken to be "does not exist". Details of the processing in step S1405 are described later referencing FIG. 15.

In step S1407, the divide-allocation status stack is popped, and the partition level, partition number, and release indication are read out.

Next, proceeding to step S1409, a determination is made whether the read-out partition level is the release partition level, and if the partition level is the release partition level, processing branches to step S1416, and if it is not the release partition level, processing proceeds to step S1411. Also, if the original allocation request was a single-bit request, the first determination processing in step S1409 results in a branch to step S1416.

At step S1411, a determination is made whether the release indication read-out at step S1407 is "exists". If the release indication is "exists", processing proceeds to step S1413, and if the release indication is "does not exist", processing proceeds to step S1412.

At step S1412, a determination is made whether the concatenation request contains "exists". If it contains "exists", processing proceeds to step S1413 and if it does not contain "exists", processing returns to S1407.

At step S1413 an attempt is made to release the partition pair pointed to by the partition number, and processing returns to step S1407. Details of the processing of step S1413 are described later referencing FIG. 16.

When in the above noted determination in step 1409, the partition level is determined to coincide with the release partition level and a branch is made to S1416, the processing of S1416 and below is the partition release processing at that release partition level.

At step S1416, a determination is made whether the concatenation request contains "exists" and if it does not contain "exists" processing is terminated, and if it does contain "exists", in step S1417, the allocation status in the multi-partition allocation table entry pointed to by the partition number is made "first-pass available" and processing is terminated. In other words, even in the case of a multibit request, if the concatenation request contains "exists", the allocation status of a first-pass allocated segment consisting of a second-pass allocated segment and a contiguous multilevel segment is set to "first-pass available" by the processing of step S1417.

FIG. 14B is a drawing describing, by means of a concrete example, the processing, shown in FIG. 14A and in the later noted FIG. 16, to try to release a partition included in the first-pass allocated segment and to concatenate it with an first-pass allocatable partition in the first embodiment of this invention, referencing the multi-partition allocation table 310 shown in FIG. 3B.

The example shown in FIG. 14B is one wherein a second-pass allocated segment, secondary-allocated by a multibit request that is just like the one shown in the example in FIG. 11C, is released and is concatenated with an adjacent partition and the allocation status of the partition at the higher partition level is set to "first-pass available". Thus, the values set in the allocation request size 220 are the same as those shown in FIG. 11C and the values set in the allocated partition configuration table 230a are the same as those set in the partition allocation configuration table 230 shown in FIG. 11C.

The first-pass allocated segment 280c after second-pass allocation shown in FIG. 14B is the partition with the allocation statuses before the second-pass allocated segment is released and concatenated, and whereas partition 282d with partition number 21 in the first-pass allocated segment 280c shown in FIG. 11C after second-pass allocation was marked as "second-pass available" here it is marked as "unavailable". The allocation status of partition 281d with partition number 44 remains the same "second-pass available".

The release and concatenation processing is done from partition level 1, which is the minimum partition level, successively to higher partition levels, while referencing the bit values in the allocated partition configuration table 230a.

First, the bit value in allocated partition configuration table 230a corresponding to partition level 1, which is the minimum partition level, is a 1, (shown by the associating dotted-line arrow 231a). In other words, because the release indication is "exists", the processing shown in step S1413 of FIG. 14A, in other words, the processing shown in FIG. 16, is executed. As shown by the arrow 251a for the partition level 1 release request, because the release of partition 281c is guaranteed, and, in the single-level partition allocation table at partition level 1 before release marked with label 161c, "second-pass available" is the allocation status of the partition at partition number 44 paired with the partition whose partition number 171 value is 43 whose level internal number 172 value is 20, the determination in step S1605 of FIG. 16, described later, becomes affirmative, and the concatenation request (shown by arrow 241c) is made "exists" wherein "first-pass available" is set in the allocation status of the partition at the partition level 1 higher than the partition pair 291c at partition level 1, consisting of the partition at partition number 43 and the partition at partition number 44, and "reserved" is set the allocation statuses of partition number 43 and its pair partition number 44, in the single-level partition allocation table at partition level 1 after release marked with label 161d. When "first-pass available" is set for the partition at the higher partition level, setting "reserved" in the allocation statuses of the partitions included in that partition at a partition level 1 lower is the same as the case of the initial setting of multi-partition allocation table 310 shown in FIG. 3B.

Because the bit value in allocated partition configuration table 230a corresponding to partition level 2 is a 0, (shown by the associating dotted-line arrow 232a) and concatenation request 241c contains "exists", a release request is made for the partition at partition number 20 in the single-level partition allocation table at partition level 2 before release marked with label 162c, which is the partition at the next higher partition as shown by the arrow 241d. Because the partition with partition number 21, which configures the partition pair 292c along with the partition with partition number 20, is "unavailable" the determination in step S1605 of FIG. 16 becomes negative, and a shown by arrow 242c, only the partition with partition number 20 is freed, and the allocation statuses of partition pair 292c become "first-pass available" and "unavailable" as shown by the single-level partition allocation table at partition level 2 after release marked with label 162d. Also, the concatenation request becomes "does not exist". Thus, as shown by the dotted-line arrow 242d, the partition with partition number 9 whose allocation status is unavailable and which is the higher partition of the partition pair 292c, marked with label 163c, is not released, as shown in the single-level partition allocation table at partition level 3 before release.

Next, the bit value in allocated partition configuration table 230a corresponding to partition level 3 is a 1, (shown by the associating dotted-line arrow 233a), and partition 283c is released, as shown by the arrow 253a for the partition level 3 release request. However, as was noted above, the partition with partition number 9 whose allocation status is "unavailable" was not released and is unavailable. Thus, as shown by the arrow 243c, only the partition with partition number 8 that configures the partition pair 293c along with the partition with partition number 9 is released, and the allocation statuses of partition pair 293c become "first-pass available" and "unavailable" as shown by the single-level partition allocation table at partition level 3 after release marked with label 163d. Also, because the concatenation request becomes "does not exist", the partition, as shown by the dotted-line arrow 244d, which is the higher partition of the partition pair 293c and is the partition with partition number 9 whose allocation status is unavailable is not released and its allocation status remains "unavailable", as shown in the single-level partition allocation table at partition level 4 before release marked with label 164.

By means of the partition release and concatenation processing above, first-pass allocated segment 280d whose allocation statuses are those after the second-pass allocated segment has been released has been partitioned into first-pass allocatable partition 283c whose partition number is 8, first-pass allocatable partition 282c whose partition number is 20, and unavailable partition 282d whose partition number is 21, as shown by the arrows 273e, 272e and dotted-line arrow 272f showing the relationship to the allocation statuses in multi-partition allocation table 310.

Figure 15:
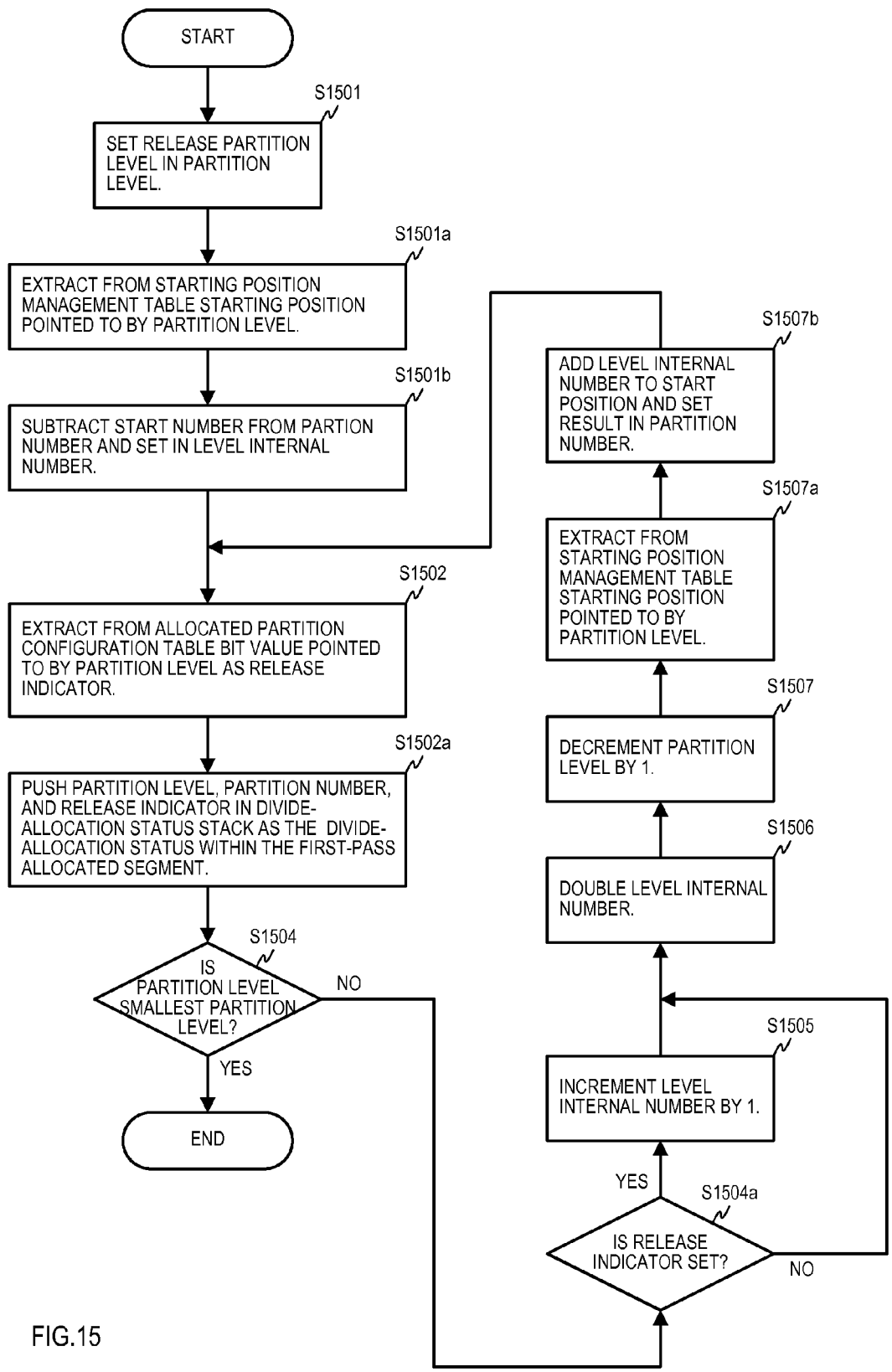
FIG. 15 is a drawing describing an example of processing flow to request a divide-allocation status inside a first-pass allocated segment and push it into the divide-allocation status stack in the first embodiment of this invention.

FIG. 15 is a drawing describing details of the processing of step S1405 in FIG. 14A and is a drawing describing an example of processing flow to request a divide-allocation status inside a first-pass allocated segment, using the allocated partition configuration table, and push it into the divide-allocation status stack in the first embodiment of this invention.

First, at step S1501, the release partition level set at step S1204 shown in FIG. 12 is set in the partition level, and next, proceeding to step S1501a, the start position pointed to by the partition level is extracted from the start position management table, and at step S1501b, the value computed by decrementing the extracted management information start position from the partition number is set in the level internal number, and processing proceeds to step S1502.

At step S1502, the bit value pointed to by the partition level is extracted from the allocated partition configuration table as the release indication. If the bit value is a 1, the release indication is taken to be "exists", and if the bit value is a 0, the release indication is taken to be "does not exist".

Then, in step S1502a, the partition level, the partition number, and the release indication are pushed into the divide-allocation status stack as the divide-allocation status within the first-pass allocated segment.

Next, proceeding to step S1504, a determination is made whether the partition level coincides with the minimum partition level. When the determination is that the partition level is larger than the minimum partition level, processing branches to step S1504a, wherein a determination is made whether the release indication is "exists", and if the release indication is not "exists", processing proceeds to step S1506, but if the release indication is "exists", at step S1505, the level internal number is incremented by 1, and processing proceeds to step S1506.

At step S1506, the value of the level internal number is doubled, and at step S1507, the partition level is decremented by 1. Furthermore, at step S1507a, the start position pointed to by the partition level is extracted from the start position management table, and at step S1507b, the value computed by adding the level internal number to the start position is set in the partition number and processing returns to step S1502.

The processing loop of the above steps S1502 to S1507b is repeated until a determination is made in step S1504 that the partition level coincides with the lowest partition level. When the determination in step S1504 is that the partition level coincides with the lowest partition level, processing is terminated.

In the example shown in FIG. 14B, because the partition number is initialized to 3, the partition level is initialized to 4, the level internal number is initialized to 2, and the value of the bit in the allocated partition configuration table entry pointed to by partition level 4 is 0, first 4, 3, and 0 (no release indication) are pushed into the divide-allocation status stack as the partition level, partition number, and release indication, respectively.

Because there is no release indication in the processing of partition level 4, the level internal number is modified to 2×2=4. The partition level is modified to 3, and the partition number is modified to "8" which is the sum of the level internal number "4" and the start position "4" in the start position management table entry pointed to by the partition level 3. Also the value in the bit in the allocated partition configuration table entry pointed to by partition level 3 is 1. Hence 3, 8, and 1 (release indication exists) are pushed into the divide-allocation status stack as the partition level, partition number, and release indication, respectively.

Because the release indication is "exists" in the processing at partition level 3, the level internal number is modified to (4+1)×2=10. The partition level is modified to 2, and the partition number is modified to 20, which is the sum of the level internal number "10" and the start position "10" in the start position management table entry pointed to by the partition level 2. Also, the bit value pointed to by partition level 2 in the allocated partition configuration table is a 0. Thus, 2, 20, and 0 (release indication "does not exist") are pushed into the divide-allocation status stack as the partition level, the partition number and the release indication, respectively.

Because there is no release indication in the processing of partition level 2, the level internal number is modified to 10×2=20. The partition level is modified to 1, which is the minimum partition level, and the partition number is modified to "43" which is the sum of the level internal number "20" and the start position "23" in the start position management table entry pointed to by the partition level 1. Also, the bit value pointed to by partition level 1 in the allocated partition configuration table is a 1. Thus 1, 43, and 1 (release indication "exists") are pushed into the divide-allocation status stack as the partition level, the partition number and the release indication, respectively.

The example shown in FIG. 14B is one wherein the area allocated by a multibit request is released. If an area allocated by a single-bit request is to be released, the release partition level coincides with the minimum partition level and only a single group of partition level, partition number, and release indication has been pushed into the divide-allocation status stack, and the release indication is "exists".

The release of the allocated segment in the example shown in FIG. 14B is done by means of the partition levels, partition numbers, and release indications pushed into the above noted divide-allocation status stack as the divide-allocation statuses and by the concatenation request initially set as "exists" at step S1205 in FIG. 12 and modified by the processing shown in FIG. 16 below.

Figure 16:
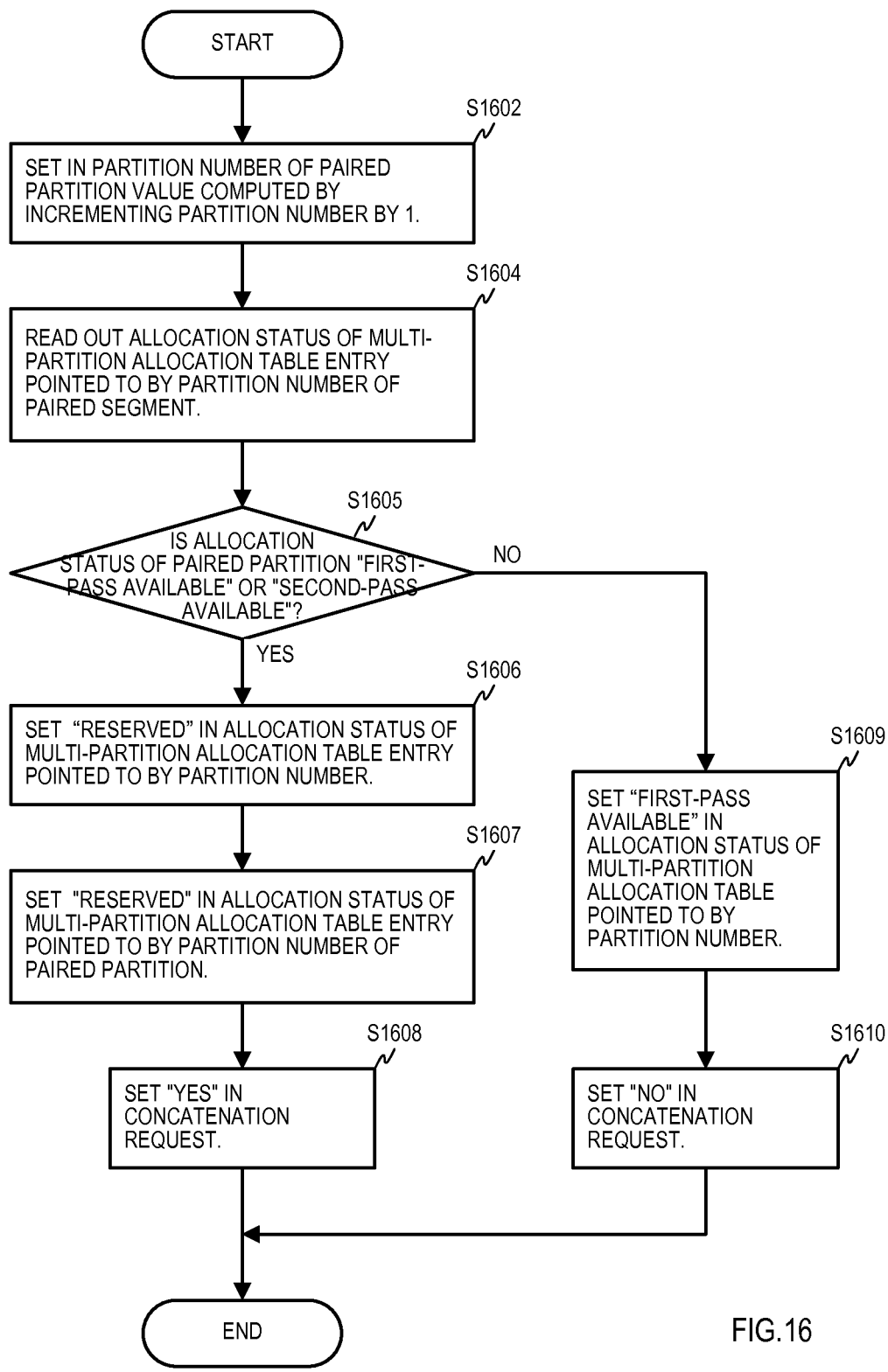
FIG. 16 is a drawing describing an example of processing flow to try to free the partition pair pointed to by the partition number.

FIG. 16 is a drawing describing details of the processing in step S1413 of FIG. 14A, and it describes an example of processing flow to try to free the partition pair pointed to by the partition number, which example of the processing flow is common to the first and second embodiments. The processing steps shown in FIG. 16, just like the processing flow shown in FIG. 14A, is executed at each partition level from the minimum partition level until the partition level one lower than the release partition level by successively popping the divide-allocation status stack.

As shown in the drawing, first, at step S1602, the value computed by adding the value 1 to the partition number is set in the paired partition number, and processing proceeds to step S1604, wherein the allocation status of the multi-partition allocation table entry pointed to by the paired partition number is read out, and at step S1605, a determination is made whether the read-out allocation status is first-pass available or second-pass available. If the read-out allocation status is first-pass available or second-pass available, processing proceeds to step S1606, and if the read-out allocation status is not first-pass available nor second-pass available, processing branches to step S1609.

At step S1606, "reserved" is set in the allocation status of the multi-partition allocation table entry pointed to by the partition number, and at step S1607, "reserved" is set in the allocation status of the multi-partition allocation table entry pointed to by the paired partition number. Next, proceeding to step S1608, "exists" is set in the concatenation request, and processing is terminated. The processing of these steps S1606 to S1608 corresponds to the processing of concatenation request "exists" shown by the arrow 241c in the example shown in FIG. 14B.

Conversely, if the branch to step S1609 is taken, "first-pass available" is set in the allocation status of the multi-partition allocation table entry pointed to by the partition number, and at step S1610, "does not exist" is set in the concatenation request, and processing is terminated. This processing is the processing to release only the partition itself shown by the arrows 242c and 243c shown in the example in FIG. 14B.

Figure 17A:
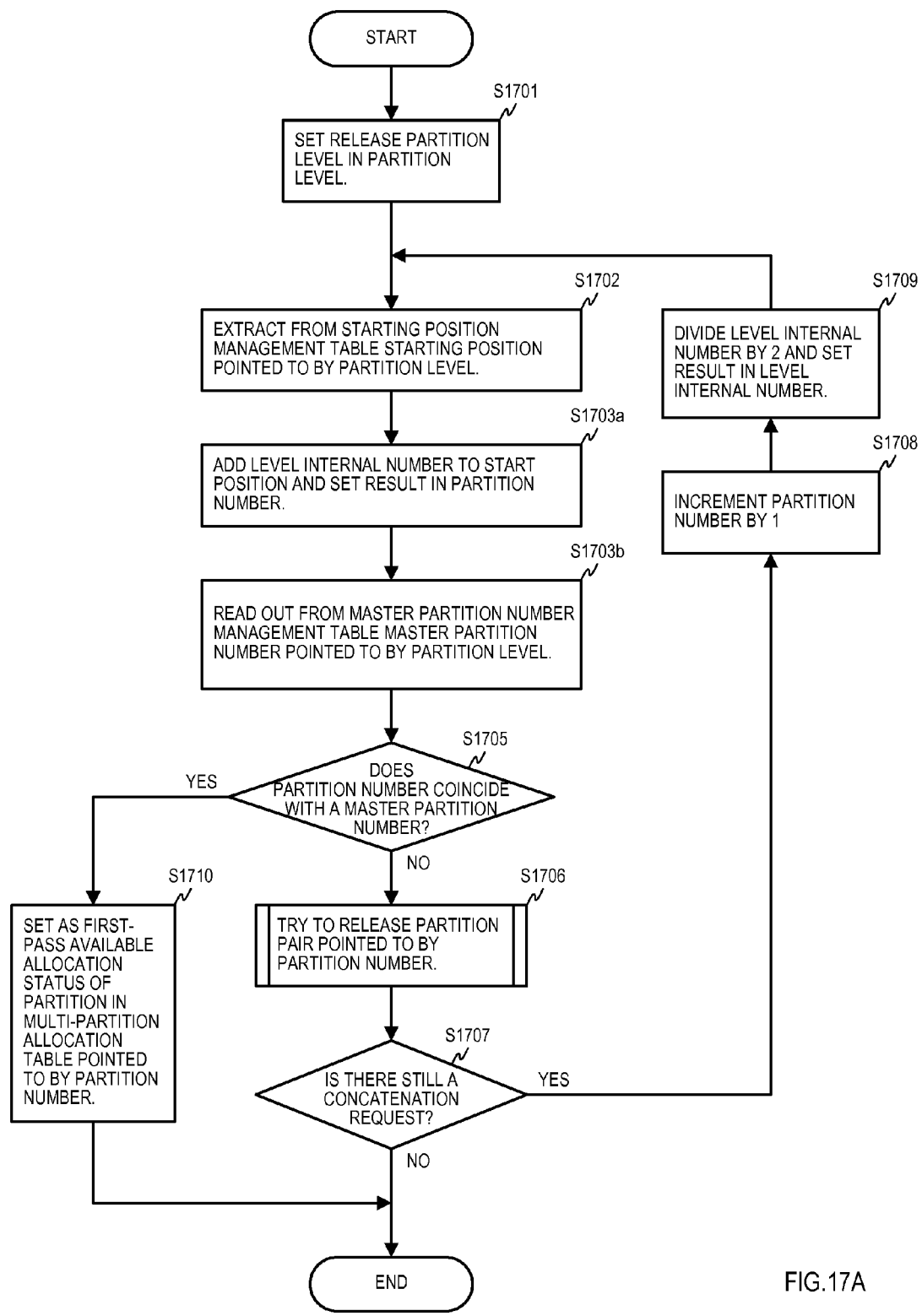
FIG. 17A is a drawing describing an example of the processing flow to try to concatenate a first-pass allocated segment with an adjacent first-pass allocatable partition and to set the allocation status of its higher level partition to first-pass available in the first embodiment of this invention.
Figure 17B:
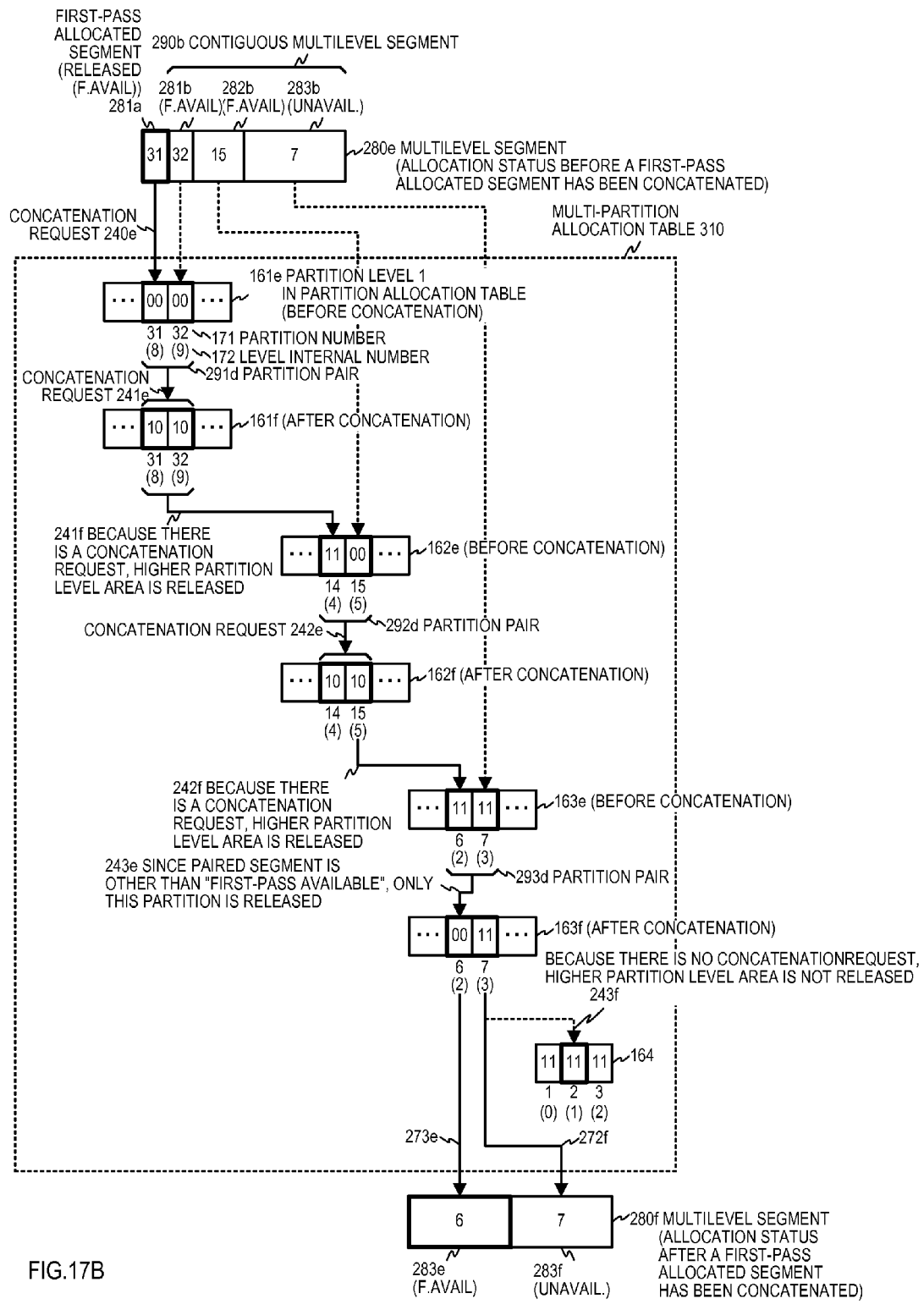
FIG. 17B is a drawing describing, by means of a concrete example, the processing to try to concatenate a first-pass allocated segment with an adjacent first-pass allocatable partition and to set the allocation status of its higher level partition to first-pass available in the first embodiment of this invention.
Figure 17C:
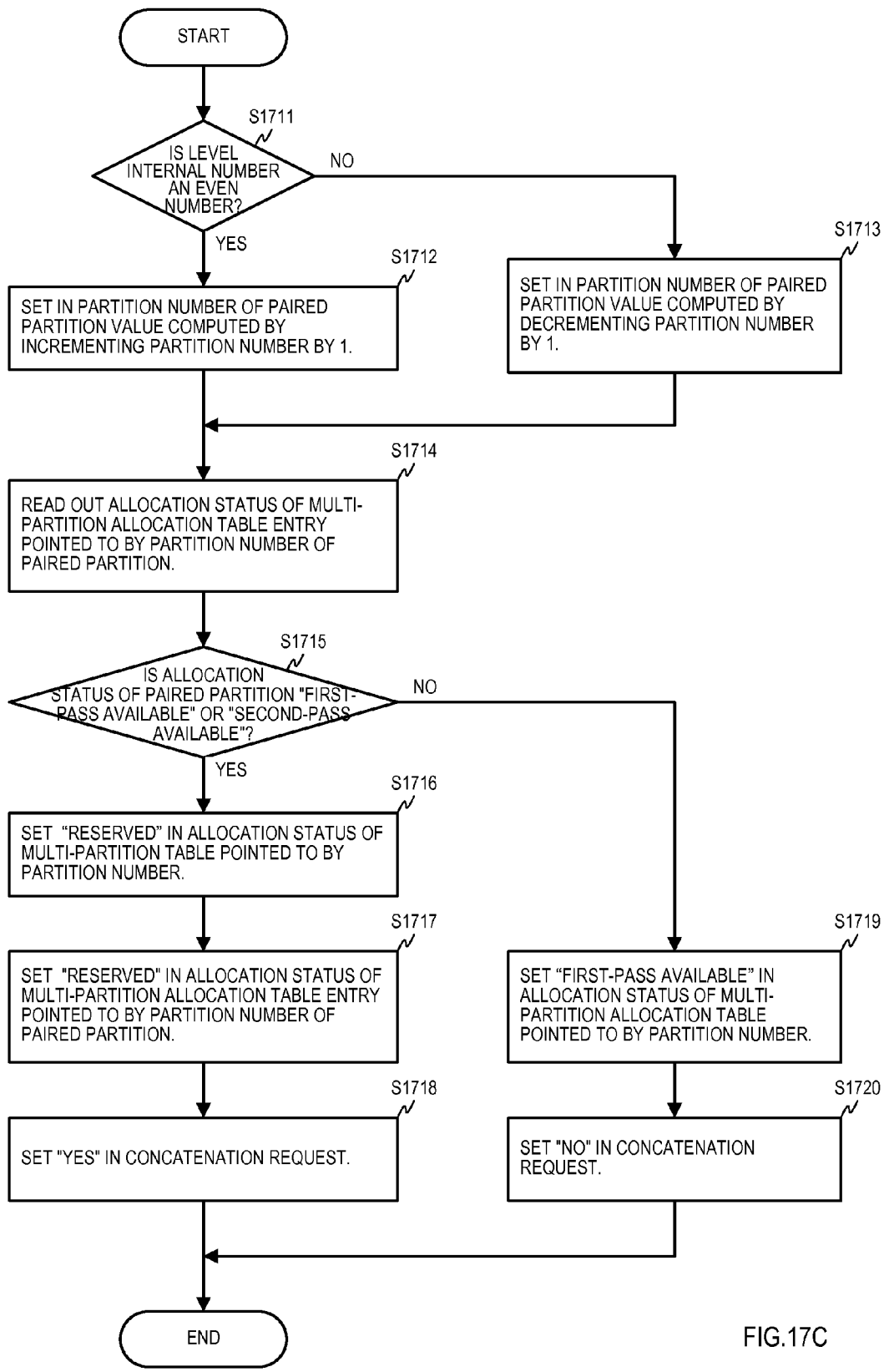
FIG. 17C is a drawing describing an example of the processing flow to try to free the partition pair pointed to by the partition number in the first embodiment of this invention.

Next, details of the processing of step S1208 in FIG. 12 corresponding to the first embodiment of this invention are described referencing FIG. 17A, FIG. 17B, and FIG. 17C.

FIG. 17A is a drawing describing an example of the processing to try to concatenate a first-pass allocated segment with an adjacent first-pass allocatable partition and to set the allocation status of its higher level partition to first-pass available As shown in the drawing, at step S1701, the release partition level is set in the partition level and processing proceeds to step S1702.

At step S1702, the start position pointed to by partition level is extracted from the start position management table, and in step S1703a, the value calculated by adding the level internal number to the extracted start position is set in the partition number, and processing proceeds to step S1703b. In the first-time processing of step S1703a, in other words, during the processing of a release partition level, the level internal number is set by step S1501b of the processing flow in FIG. 15 wherein is shown details of the processing of step S1405 shown in FIG. 14A.

At step S1703b, the master partition number pointed to by the partition level is extracted from the master partition number management table, and processing proceeds to step S1705.

At step S1705, a determination is made whether the partition number coincides with the master partition number. If they coincide, processing branches to step S1710, and if they do not coincide, processing proceeds to step S1706.

At step S1706, an attempt is made to free the partition pair pointed to by the partition number. Details of the processing in step S1706 are described below referencing FIG. 17C.

Next, proceeding to step S1707, a determination is made whether the concatenation request is "exists". If the concatenation request is not "exists", because this means that the determination in step S1605 of FIG. 16 was that the allocation status of the paired partition number was neither first-pass available nor second-pass available, partition concatenation processing is terminated, and if the concatenation request is "exists", processing branches to the processing in step S1708 and thereafter, and partition concatenation processing is attempted at a higher partition level. At step S1708, the partition level is made that of the partition 1 level higher, and proceeding to step S1709, the quotient computed by dividing the level internal number by the value 2 is set in the level internal number, and processing returns to step S1702.

If the determination at step S1705 was that the partition number coincides with the master partition number, a branch is taken to step S1710 wherein "first-pass available" is set in the allocation status of the multi-partition allocation table entry pointed to by the partition number, and processing is terminated. If the partition number coincides with the master partition number, because no partition exists whose partition number is a pair to that partition number, as is clear from the example shown in FIG. 3B, at step S1710, "first-pass available" is set in the allocation status of the multi-partition allocation table entry pointed to by the partition number, and processing is terminated.

FIG. 17B is a drawing describing, by means of a concrete example, the processing, shown in FIG. 17A and in FIG. 17C below, to try to concatenate the first-pass allocated segment with an adjacent first-pass allocatable partition and to set the allocation status of its higher level partition to "first-pass available", referencing the multi-partition allocation table 310 shown in FIG. 3A. Also, in the description below, concatenating a first-pass allocated segment and its adjacent first-pass allocatable partition and making the allocation status of its higher level partition "first-pass available" may be called simply "concatenating."

The example shown in FIG. 17B, just as for the example shown for FIG. 8B, is an example wherein a partition is concatenated with an adjacent partition and the allocation status of its higher level partition is set to "first-pass available" because the partition released is first-allocated by a single-bit request.

In FIG. 17B, a released first-pass allocated segment is made to be a multilevel segment with allocation statuses before concatenation, and the partition with partition number 31 that was marked as provisionally allocated segment 280b after the first-pass allocation shown in FIG. 8B is here shown as released, as well as the multilevel segment 280e wherein partition 283b with partition number 7, which had been "first-pass available" has now become "unavailable". The allocation statuses of the partition 281b with partition number 32 and the partition 282b with the partition number 15 continue to be "first-pass available".

Concatenation processing proceeds successively from partition level 1, which is the release partition level, to a higher partition level wherein concatenation processing is no longer possible. In other words, the released partition 281a with partition number 31 is successively concatenated with partitions that are adjacent and not marked "unavailable."

First, because the determination at step S1207 shown in FIG. 12 is affirmative, the concatenation request shown by arrow 240e is performed for released partition 281a, and the processing is done at partition level 1 which is the release partition level. Because the allocation status of the partition in the single-level partition allocation table at partition level 1 marked with label 161e, which partition has partition number 171 with the value 31 and level internal number 172 with the value 8, and the allocation status of the partition with the partition number 32 that is a pair to that partition are both "first-pass available", "first-pass available" is set in the allocation status of the partition at the higher partition level for the partition pair 291d that is composed of the partition with partition number 31 and the partition with partition number 32, the concatenation request (shown by arrow 241e) is made to be "exists", and "reserved" is set in the allocation statuses of partition number 31 and its pair, partition number 32, as shown in single-level partition allocation table at partition level 1 marked with label 161f. As was noted in the description of FIG. 14B, when "first-pass available" for a partition at a higher partition level, "reserved" is set in the allocation statuses of partitions at lower partition levels encompassed by that partition, which is the same as the case of the initial setting of the multi-partition allocation table 310 shown in FIG. 3B.

Because there is a concatenation request at partition level 2, a partition release request is issued for partition number 14 in the single-level partition allocation table at partition level 2 which is the higher level partition shown by arrow 241f with the label 162e attached to its status before concatenation.

Because the partition for partition number 14 and the partition for partition number 15 which together configure the partition pair 292d are both first-pass available, a concatenation request is taken as existing, as shown by the arrow 242e, and as shown in the single-level partition allocation table for partition level 2 (with label 162f) after concatenation, the allocation statuses of partition number 14 and its pair, partition number 15, are set as "reserved."

Next, because the concatenation request is "exists" at partition level 3, a release request is made for the partition with partition number 6 in the single-level partition allocation table at partition level 2 before concatenation, marked by label 163e, which is the higher level partition, as shown by arrow 242f. Because the partition with partition number 6 and the partition with partition number 7 that together configure partition pair 293d are both "unavailable", as shown by arrow 243e, "first-pass available" is only set in the allocation status of the partition with partition number 6, and the allocation statuses of the partition pair 293d shown the single-level partition allocation table at partition level 3 after concatenation, marked with the label 163f, become first-pass available and unavailable.

Then, because there is no concatenation request, as shown by the dotted-line arrow 243f, the partition with partition number 2, which is the higher level partition and whose allocation status is unavailable, is not released and its allocation status remains unavailable, as shown in the single-level partition allocation table 164 at partition level 4.

By means of the above partition release and concatenation processing, the partitioning status of multilevel segment 280f after the first-pass allocated segment has been concatenated with an adjacent first-pass allocatable partition is that it is partitioned into the first-pass allocatable partition 283e whose partition number is 6 and the unavailable partition 283f whose partition number is 7, as shown by the arrow 273e and arrow 272f showing the relationship between it and the allocations statuses in multi-partition allocation table 310.

FIG. 17C is a drawing describing details of the processing in step S1706 of FIG. 17A and it describes an example of the processing flow to try to free the partition pair pointed to by the partition number in the first embodiment of this invention. Here, what is meant by the partition pair pointed to by the partition number is the partition pair belonging to the partition unit identified by the partition number, and as is described hereinbelow, that partition number is not restricted to being the smaller of the two. Saying it differently, the level internal number corresponding to that partition number is not restricted to being an even number.

Just as in the processing flow shown in FIG. 17A, the processing steps shown in FIG. 17C are executed at each partition level from the release partition level in the direction of higher partition levels, and an attempt is made to concatenate a first-pass available area and to release an area at a higher partition level.

Just as is shown in the drawing, first, at S1711, a determination is made whether the level internal number is an even number. Although the processing flow shown in FIG. 17C is similar to that shown in FIG. 16, in the processing of FIG. 17A, in other words, in the processing of step S1208 in FIG. 12, the level internal number is not restricted to being an even number, as was noted above. The reason for that is that the level internal number corresponding to a first-pass allocated segment that was released and whose status is first-pass available may at times be an even number and at other times be an odd number. Although 8 is specified as the level internal number in the example shown in FIG. 17B, when the partition with the allocated partition number 7 in partition 283f, shown as unavailable in FIG. 17B, becomes first-pass available, its level internal number is 3 and is an odd number.

If the level internal number is an even number, at step S1712, the value computed by adding 1 to the partition number is set in the paired partition number, and processing proceeds to step S1714. If the level internal number is an odd number, at step S1713, the value computed by decrementing the partition number by 1 is set in the paired partition number, and processing proceeds to step S1714.

At step S1714, the allocation status in the multi-partition allocation table entry pointed to by the pair for the partition number is read out, and at step S1715, a determination is made whether the read-out allocation status is first-pass available or second-pass available. If the read-out allocation status is first-pass available or second-pass available, processing proceeds to step S1716; if the read-out allocation status is not first-pass available or second-pass available, processing branches to step S1719.

At step S1716, "reserved" is set in the allocation status of the multi-partition allocation table entry pointed to by the partition number, and at step S1717, "reserved" is set in the allocation status of the multi-partition allocation table entry pointed to by the paired partition number. Next, at step S1718, "exists" is set in the concatenation request for the partition pair, and processing is terminated. The processing of these steps S1716 to S1718 corresponds to the concatenation request processing shown by the arrows 241e and 242e in the example shown in FIG. 17B.

Conversely, if a branch is taken at step S1719, the allocation status in the multi-partition allocation table entry pointed to by the partition number is set to be "first-pass available", and at step S1720, "no" is set in the concatenation request, and processing is terminated. This processing corresponds to processing to release only the original partition pointed to by the arrow 243e, in the example shown in FIG. 17B.

Figure 18A:
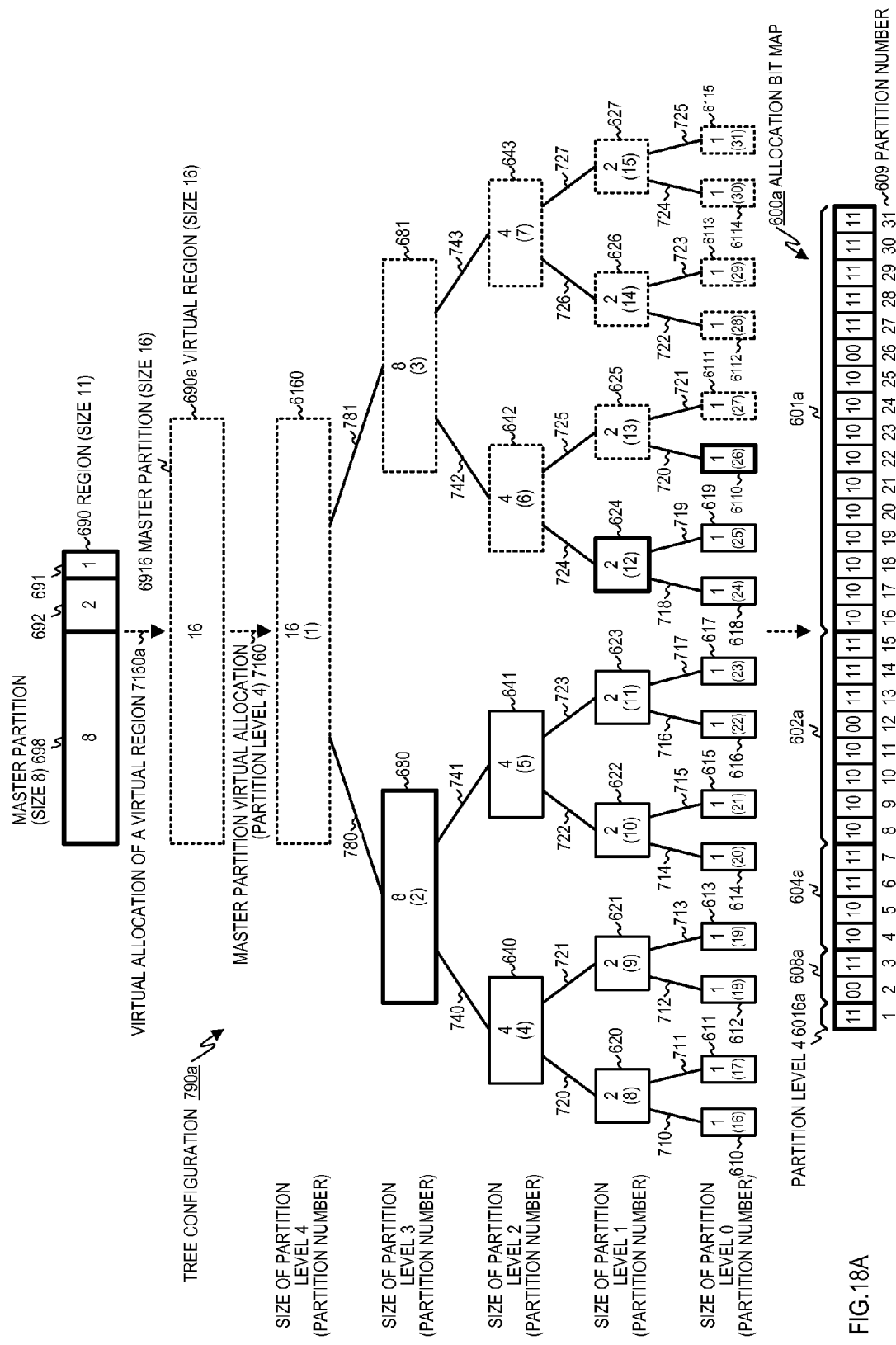
FIG. 18A is a drawing describing the concepts of region management in a second embodiment of this invention.

FIG. 18A is a drawing describing the concepts of region management in the second embodiment of this invention. Because the concept of "virtual allocation" is introduced in the second embodiment of this invention, nodes corresponding to virtually allocated partitions are added to the tree configuration 790a shown in FIG. 18A compared with the tree configuration 790 shown in FIG. 3A. These added nodes and links between two of the added nodes are indicated by the same reference labels as those shown in FIG. 3A.

Hereinbelow the concepts of region management in the second embodiment of this invention are provided along with additional definitions especially related to the second embodiment of this invention, referencing FIG. 18A.

In the example shown in FIG. 18A, region 690 is similarly exemplified as is the region exemplified in FIG. 3A, which describes the concepts of region management in the first embodiment of this invention, and so the description of region 690 is omitted. Also descriptions other than virtual allocation are omitted because they are similar to those of the first embodiment.

In the second embodiment of this invention, a virtual region whose size is the smallest power-of-2 encompassing a region is virtually obtained. The virtual obtaining of the virtual region may at times be called virtual allocation. As shown by the dotted-line arrow 7160a in FIG. 18A, virtual region 690a with the size of 16, which size encompasses the region 690 with the size of 11, is virtually allocated. In order to show that the allocation of virtual region 690a is virtual, virtual region 690a is shown enclosed in a dotted-line rectangle. Then, as shown in the drawing, the master partition 6916 whose size is 16 is initially virtually allocated in virtual region 690a. Because master partition 6916 is also virtually allocated, node 6160 is enclosed in a dotted-line rectangle, just like virtual region 690a.

Also FIG. 18A describes tree configuration 790a whose root node is node 6160 that corresponds with the master partitioning that virtually allocates master partition 6916 and allocation bit map 600a showing allocation statuses of that partition, whose allocation statuses are reduced to allocation statuses corresponding to nodes in tree configuration 790a.

Root node 6160 corresponds to the master partitioning that allocates all of the master partition 6916 at partition level 4 as shown by the dotted-line arrow 7160 (hereinbelow this may be called master partitioning 7160). The tree configuration is the same as the configuration of the tree configuration 580 depicted in FIG. 1B in so far as they both are binary trees.

The "16" written in the root node 6160 corresponds to the size of the associated master partition 6916. Also, the parenthesized numbers are the partition numbers that identify each of the partitions (sometimes called a partition unit) that multi-partition virtual region 690a into each partition at each partition level. The partition number of the master partition 7160 corresponding to the master partition 6916 with the largest size is 1. Also, hereinbelow, the partition number may be called the partition number of the partition partitioned by the partition identified by that partition number. In other words, instead of expressing the partition number of master partition 7160, the partition number of master partition 6916 may be used. Also a partition partitioned by a partition unit with a given partition number may be called the partition with that partition number.

Node 680 connected by link 780 to root node 6160 and node 681 connected by link 781 to root node 6160 correspond to partitions that divide master partition 6916 into 2 and allocate partitions with a partition level 3 and whose size is 8. Each of their partition numbers are the end positions 2 and 3 for the partition numbers following that of the 1 corresponding to the node one position higher at partition level 4.

Below node 680 are node 640 with size 4 connected to link 740 and node 641 with size 4 connected to link 741. In the same way, below node 681 are node 642 with size 4 connected to link 742 and node 643 with size 4 connected to link 743. Each of these 4 nodes corresponds to partitions with partitions at level 2. Also the partition numbers corresponding to these 4 nodes are the numbers 4 to 7, which follow the 3 that is the ending number for the partition numbers of the nodes at partition level 3, which is the partition one level higher.

Below node 640 are the node 620 with a size 2 and connected by link 720 and the node 621 with a size 2 and connected by link 721. In the same way, below node 641 are the node 622 with a size 2 and connected by link 722 and the node 623 with a size 2 and connected by link 723. Also below node 642 are the node 624 with a size 2 and connected by link 724 and the node 625 with a size 2 and connected by link 725. And below node 643 are the node 626 with a size 2 and connected by link 726 and the node 627 with a size 2 and connected by link 727. These eight nodes correspond to the partitioning of the partition at partition level 1. Also the partition numbers corresponding to these eight nodes are the numbers 8 to 15 following the number 7 that is the last number associated with the nodes at partition level 2, which is the partition level one higher.

Below node 620 are the node 610 with a size 1 and connected by link 710 and the node 611 with a size 1 and connected by link 711. In the same way, below node 621 are the node 612 with a size 1 and connected by link 712 and the node 613 with a size 1 and connected by link 713, and below node 622 are the node 614 with a size 1 and connected by link 714 and the node 615 with a size 1 and connected by link 715, and below node 623 are the node 616 with a size 1 and connected by link 716 and the node 617 with a size 1 and connected by link 717. Also below node 624 are the node 618 with a size 1 and connected by link 718 and the node 619 with a size 1 and connected by link 719, and below node 625 are the node 6110 with a size 1 and connected by link 720 and the node 6111 with a size 1 and connected by link 721, and below node 626 are the node 6112 with a size 1 and connected by link 722 and the node 6113 with a size 1 and connected by link 723, and below node 627 are the node 6114 with a size 1 and connected by link 724 and the node 6115 with a size 1 and connected by link 725. These sixteen nodes correspond to the partitioning of the partition at partition level 0. Also the partition numbers corresponding to these sixteen nodes are the numbers 16 to 31 following the number 15 that is the last number associated with the nodes at partition level 1, which is the partition level one higher.

In the tree configuration 790a, nodes 681, 642, 643, 625, 626, 627, 6111, 6112, 6113, 6114, and 6115, corresponding to partitions virtually allocated just like root node 6160, are enclosed in dotted-line rectangles, just like root node 6160.

Also, the nodes 680, 624 and 6110, corresponding, respectively, to the partitions 698, 692 and 691, are enclosed in solid-line rectangles.

Next, the property of a partition number in accordance with the second embodiment of this invention is described. First, when a region subject to memory management with a certain size is received, a virtual partitioning corresponding to that size is performed and multi-partitioning is also done for each partition level in that virtual partition. In the example shown in FIG. 18A, when the region 690 with the size 11 is received, the virtual region 690a whose size is 16 can be virtually obtained, and the tree configuration 790a corresponding to virtual region 690a can be generated. Then, starting from the nodes in the highest partition level in the tree configuration, then moving to the lower level nodes, partition numbers can be uniquely assigned in ascending number sequence from left to right within the same partition level, as shown in FIG. 18A.

Then, by managing the partition numbers at each partition level, when a partition number is given, a partition level with partitioned partitions of that size can be retrieved by means of the partition unit identified by that partition number and furthermore, based on the difference between the starting partition number at that partition level and the given partition number the position in the region of the partition to be allocated can be retrieved by means of the partition unit.

As shown by the dotted-line arrow, the bit map 600a shown in FIG. 18A holds bit values that are a reduction into a bit map of the allocation statuses corresponding to each node in tree configuration 790a. In the example shown in FIG. 18A, a 2 bit value is associated with each node. Details about the bit values in bit map 600a are explained below. At this point, a simple description is provided for the example shown in FIG. 18A.

The bit values in allocation bit map 600a show the allocation status, after initial allocation, of each partition corresponding to the node with that partition number. The bit value 11 that is at the bit position for partition level 4 shown with label 6016a, and for which the bit position for partition level 3 has the value 1 in the partition numbers 609, indicates that the partition whose partition has partition number 1 is virtually allocated (hereinbelow such a partition may be called a virtual partition).

Also, because there is no need to manage virtual partitions, in the description hereinbelow it taken that the map does not hold management information for virtual partitions and the bit value 11 expresses unavailable as the management information for the status of partitions other than virtual partitions (hereinbelow, these may be called simply partitions or physical partitions).

The bit value 00 that is at the bit position for partition level 3 shown with label 608a, and for which the bit position has the value 2 in the partition numbers 609, indicates that the partition whose partition has partition number 2 is first-pass available. Also, the bit value 11 that is at the bit position for partition level 3 shown with label 608a, and for which the bit position has the value 3 in the partition numbers 609, indicates that the partition whose partition has partition number 2 is virtually allocated. In the same way, the bit values 10 for partition numbers 4 and 5 that are at the bit positions in partition level 2 shown with the label 604a indicate that the allocation statuses of those partitions is reserved.

The bit values 11 for partition numbers 6 and 7 that are at the bit positions in partition level 2 shown with the label 604a indicate that the allocation statuses of those partitions are virtually allocated.

The bit values at the bit positions for partition numbers 8 to 11 at partition level 1 shown with label 602a indicate that the allocation status of those partitions is reserved, and the bit value at the bit position for partition number 12 indicates that the allocation status of that partition is first-pass available.

Also, the bit values at the bit positions for partition numbers 13 to 15 indicate that those partitions are virtual partitions.

The bit values at the bit positions for partition numbers 16 to 25 at partition level 0 indicate that the allocation status of those partitions is reserved, and the bit value at the bit position for partition number 26 indicates that the allocation status of that partition is first-pass available. Also, the bit values at the bit positions for partition numbers 27 to 31 indicate that those partitions are virtual partitions.

Next, the initialization of multi-partition management information in the second embodiment of this invention is described referencing FIG. 18B and FIG. 19A to FIG. 19C. The initialization of multi-partition management information may at times be expressed as the initialization of a region.

Figure 18B:
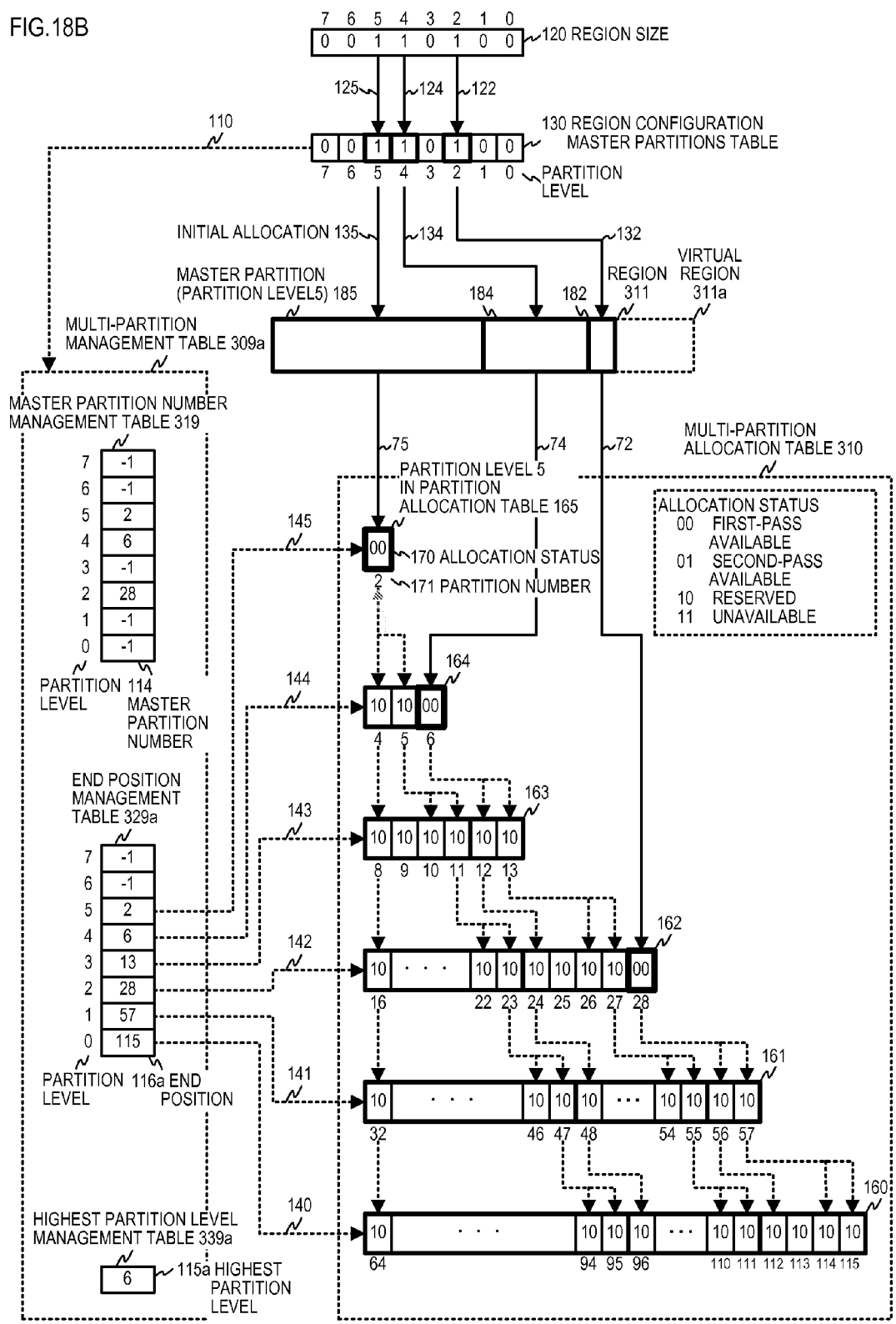
FIG. 18B is a drawing describing an example of the initialization status of a region corresponding to a region size in the second embodiment of this invention.

FIG. 18B is a drawing describing an example of the initialization status of a region corresponding to a region size. The region size exemplified in FIG. 18B is equal to that is exemplified in FIG. 3B, and so are the region configuration master partitions table and the region in initial status. Therefore, tables like the region configuration master partitions table etc. shown in FIG. 18B corresponding to those shown in FIG. 3B are indicated by the same reference labels as those shown in FIG. 3B.

In the descriptions below referencing FIG. 18B, descriptions equal to those referencing FIG. 3B may be omitted.

As shown in FIG. 18B, the virtual region 311a with the smallest power-of-2 size that encapsulates region 311 is virtually obtained, and the partitions at partition level 6 are virtually allocated to virtual region 311a. Then, although it is not shown in FIG. 18B, just as for the master partition 6916 depicted in FIG. 18A, the master partition at partition level 6 is virtually allocated to the whole of virtual region 311a.

As shown in FIG. 18B, multi-partition management table 309a includes the master partition number management table 319, the end position management table 329a, and the highest partition level management table 339a. The master partition number management table 319 and the end position management table 329a are configured of entries corresponding to the partition levels, as shown by the tags 0 to 7, the same as the entries in the region configuration master partitions table 130. The entries of master partition number management table 319 are composed of master partition numbers 114, and the entries of end position management table 329a are composed of end positions 116a. The values in each entry are set during initialization processing based on the values in region configuration master partitions table 130. In the highest partition level management table 339a is set the highest partition level 115a, which is the partition level corresponding to the size of the virtual region 311a. In the example shown in FIG. 18B, the 6 that corresponds to the size of virtual region 311a is set.

When multi-partition allocation table 310, which manages the allocation statuses of regions in partition 311, has an entry corresponding to a master partition at a given partition level, master partition number 114 holds the partition numbers of those master partitions in the entry with that partition level, and when multi-partition allocation table 310 has no entry corresponding to a master partition, "−1" is set the entry for that partition level as a meaningless partition number. In the example in FIG. 18B, the values in each entry in master partition number 114 are, in sequence from the highest partition level, −1, −1, 2, 6, −1, 28, −1, and −1.

Also, as can be understood from the above description of bit map 600a shown in FIG. 18A, no entry corresponding to a virtual partition is set in the multi-partition table and only entries corresponding to physical partitions are set.

End position 116a is the partition number associated with an ending entry in the single-level partition allocation table at each partition level, of the partition numbers uniquely associated with each entry in multi-partition allocation table 310, and the values of each of the entries in end position 116a shown in the example in FIG. 18B are, in sequence from the highest partition level, −1, −1, 2, 6, 13, 28, 57, and 115. Details of how these values are set are described below referencing FIG. 19A to FIG. 19C.

As was mentioned above, multi-partition allocation table 310 manages the allocation statuses of areas within region 311. It is similar to the allocation bit map 600a shown in FIG. 18A, and although partition numbers are assigned including virtual partitions just as in the allocation bit map 600a the allocation status 170, which is an entry holding status management information, is not set for virtual partitions. Multi-partition allocation table 310 is generated and initialized during initialization processing based on the values in multi-partition management table 309a.

From the virtual partition at partition level 6, which is the highest partition level set in the highest partition level management table 339a, the virtual partitions at that partition level 6 are successively divided in 2 and the partitions obtained are assigned sequential numbers in each of the entries in multi-partition tables 310 up to the last partition of the partitions at partition level 0 and, of those sequential numbers, partition number 171, which is the number corresponding to a physical partition can be assigned. The end position 116a in end position management table 329a is the end position of the partition numbers at that partition level.

As can be understood from the above description, referencing FIG. 18A, when a region size, in other words, a region configuration master partitions table, is provided, the configuration of the multi-partition allocation table corresponding to the actual partition is uniquely determined, and the position in a region of a partition to be partitioned and its size is also uniquely determined by a partition unit identified by a partition number.

In the initial status of multi-partition allocation table 310, the allocation statuses 170 of the entries corresponding to the master partitions have "00" indicating "first-pass available" as shown by arrows 75, 74, and 72, and the allocation statuses of the other entries are initialized to "10" indicating "reserved". Thus, when seen from the point of view of partitions whose allocation status is "first-pass available", the master partitions 185, 184, and 182 in region 311 are divide-allocated, and region 311 is initially allocated in the sense of "setting" certain partitions, of the partitions managed by multi-partition allocation table 310, as first-pass available. Details of the initialization of multi-partition allocation table 310 are described later referencing FIG. 19A to FIG. 19C.

Also, the method for assigning the numbers for the partition number 171 is merely illustrative, and if the method enables the file allocation management described below, for example if the starting number is a 0 instead of a 1, or if the sequence of assigning the numbers is reverse sequence, and so forth, the fact that various modifications are possible will be clear to one skilled in the art.

Just as was described above, in accordance with this invention, the region 311 is allocated to the file system using the multi-partition allocation table 310, and the same single area is managed over multiple levels by means of the allocation statuses 170 corresponding to a given partition level.

Partition allocation using multi-partition allocation table 310 obtains the partition numbers of a first-pass allocatable partition at a given partition level or contiguous first-pass allocatable partitions at differing partition levels by searching the multi-partition allocation table 310 in accordance with the size in the allocation request, and allocation is done by making those partition numbers "unavailable". If there are no first-pass allocatable partitions, second-pass allocatable partitions are sought for.

As shown in FIG. 2B, the partition numbers that have been made "unavailable" are returned, as allocated partition numbers, from the allocation system to the file system that has made the file allocation request. When the file operation system receives a file operation request specifying this partition number, address information for the partition with this partition number is received from the multi-partition management part. The multi-partition management part searches the end position management table 329a using that partition number and obtains the partition level, and then the obtained partition level and the partition number enable knowledge of the position within a region and the size of the partition allocated to the file. Details of this processing are described later Next the processing to initialize a region is described referencing FIG. 19A, FIG. 19B, and FIG. 19C. Here, the processing to initialize a region, concretely speaking, is, for example, the processing to initially set the values in the multi-partition management table 309a and the multi-partition allocation table 310 shown in FIG. 18B. Hereinbelow, the processing is described referencing multi-partition management table 309a and multi-partition allocation table 310 as an example.

Figure 19A:
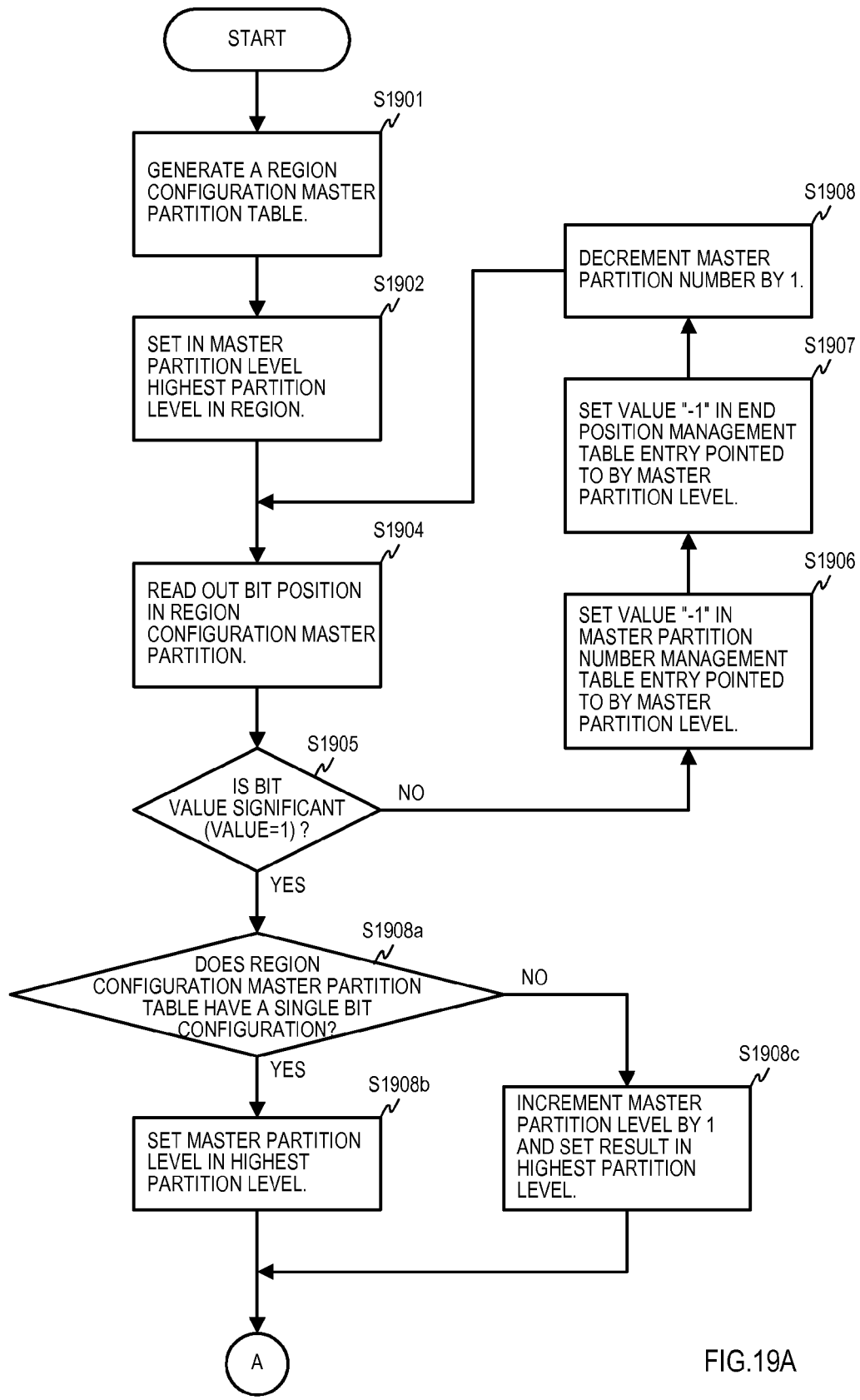
FIG. 19A is a drawing describing an example of the processing flow of the prior stage for initializing a region in the second embodiment of this invention.

FIG. 19A is a drawing describing an example of the processing flow of the prior stage for initializing a region.

As shown in FIG. 19A, first at step S1901, a region configuration master partitions table is generated wherein the bit values at the partition levels in the entry are set in accordance with the bit values for the region size when it is expressed in binary form, which region size is received from a program requesting the initialization of a region. Then, at step S1902, the highest partition level in the region configuration master partitions table is set in the master partition level, and processing proceeds to step S1904.

In the example shown in FIG. 18B, region configuration master partitions table 130 is generated and because the highest partition level is 7, 7 is set in the master partition level. The master partition level that is set with the highest partition level in the region configuration master partitions table in step S1902 above is one example of an unillustrated temporary memory area noted above.

At step S1904, the bit value in the region configuration master partitions table pointed to by the master partition level is extracted, and at step S1905 a determination is made whether that extracted bit value is significant, in other words, is the value 1. If the above extracted bit value is not 1, processing branches to step S1906 and the value "−1" is set in the entry in the master partition number management table pointed to by the master partition level, and next, proceeding to step S1907, the value "−1" is set in the entry in the end position management table pointed to by the master partition level, and at step S1908, the master partition level is decremented by 1, and processing returns to step S1904.

The processing loop of the above steps S1904 to S1908 is repeated until the first time a determination is made at step S1905 that the bit value in the region configuration master partitions table is significant. In the example shown in FIG. 18B, because the bit values in the region configuration master partitions table are 0 until 5 is set in the master partition level, the value "−1" is set at both partition level 7 and partition level 6 entries in the master partition number management table 319 and the end position management table 329a by this processing loop.

Figure 19B:
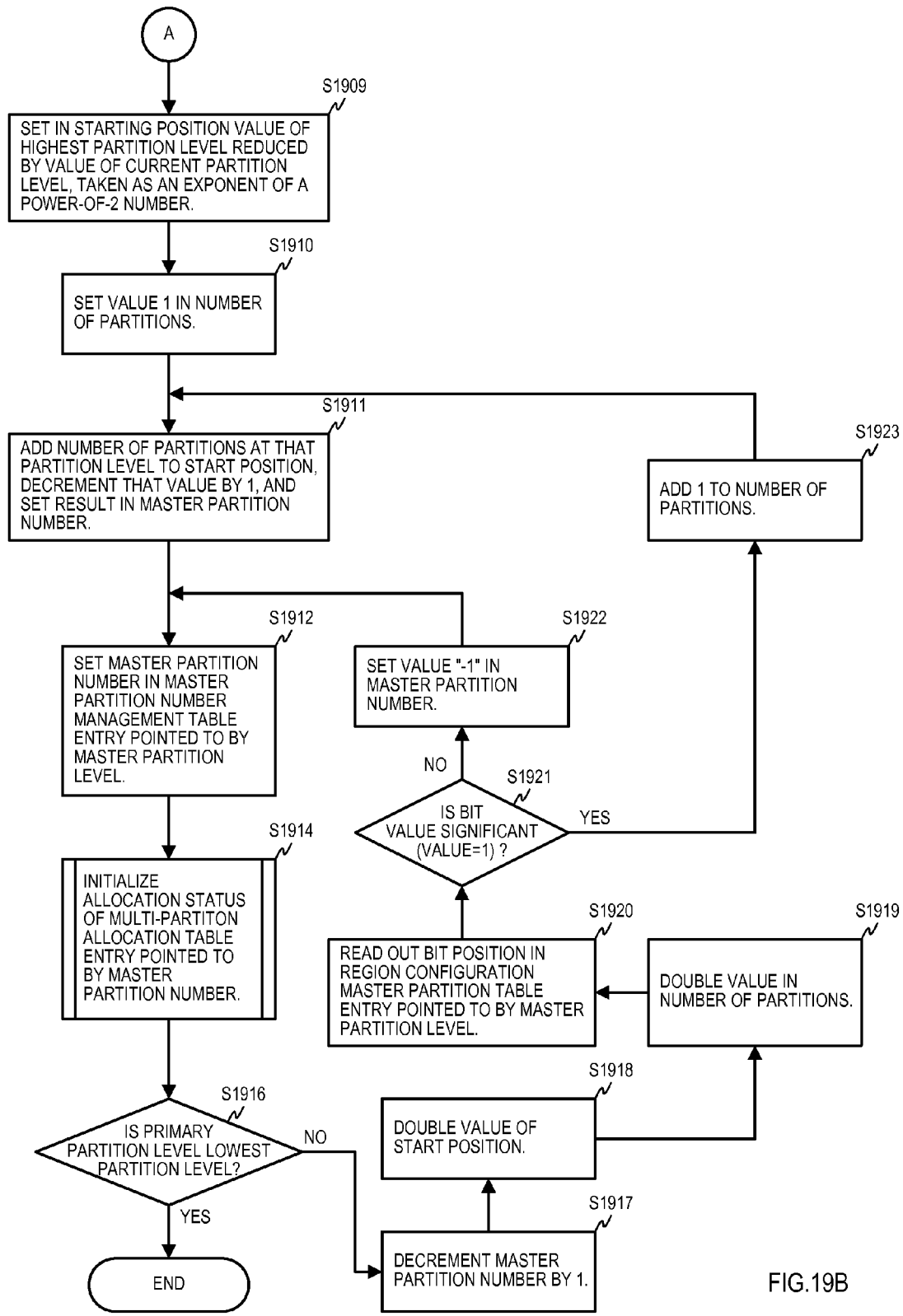
FIG. 19B is a drawing describing an example of the processing flow of the latter stage for initializing a region in the second embodiment of this invention.

Conversely, if the extracted bit value is 1, processing proceeds to step S1908a and a determination is made whether the bit value set in the master partition table configuring the region is 1 for only one entry, in other words, the master partition table configuring the region is a single bit configuration, and if it is single bit configuration, at step S1908b, the master partition level is set in the highest partition level and processing proceeds to step S1909 shown in FIG. 19B, and if it is not a single bit configuration, in other words, is a multibit configuration, at step S1908c, the value calculated by adding 1 to the master partition level is set in the highest partition level, and processing proceeds to step S1909 shown in FIG. 19B. The example shown in FIG. 18B shows a multibit configuration and because the first master partition level having a bit value of 1 in the region configuration master partitions table is 5, 6 is set in the highest partition level. This setting of the highest partition corresponds to obtaining a virtual region and allocating virtually a master partition on it.

FIG. 19B is a drawing describing an example of the processing flow of the latter stage for initializing a region.

At step S1909, the value of the highest partition level reduced by the value of the current master partition level, taken as an exponent of a power-of-2 number, is set in the start position, and at step S1910 the value 1 is set in the number of partitions, and processing proceeds to step S1911. The above start position in step S1909 and the number of partitions in step S1910 are also examples of the above noted unillustrated temporary memory areas. The names of the data are taken to be the names of the temporary memory areas, respectively. In the example shown in FIG. 18B, 2 that is equal to 2 to the power of (6 minus 5) is set in the start position.

At step S1911, the number of partitions is added to the start position, 1 is subtracted, and the resulting value is set in the master partition number. In the example shown in FIG. 18B, the first time step S1911 is processed, because 2 is set in the start position by the processing in step S1909 and 1 is set in the number of partitions by the processing of step S1910, 2 is set in the master partition number.

Next, in step S1912, the master partition number is set in the master partition number management table entry pointed to by the master partition level. In the first processing of step S1912 for the example shown in FIG. 18B, 2 is set in partition level 5 entry in the master partition number management table 319.

Next, proceeding to step S1914, the allocation status of the multi-partition allocation table entry for the partition level pointed to by the master partition level is initialized. Details of the processing in step S1914 are explained below referencing FIG. 19C.

Next, in step S1916, a determination is made whether the master partition level is the lowest partition level and if it is the lowest partition level, processing is terminated, and if it is not the lowest partition level, processing branches to step S1917.

At step S1917, the master partition level is decremented by 1, and at step S1918, the start position is doubled, and at step S1919, the number of partitions is doubled, and processing proceeds to step S1920.

At step S1920, the bit value at the partition level in the region configuration master partitions table pointed to by the master partition level is extracted, and at step S1921, a determination is made whether that extracted bit value is significant, in other words, is the value 1. If, at step S1920, the bit value extracted at the partition level in the region configuration master partitions table pointed to by the master partition level is not significant, processing branches to step S1922, wherein the value "−1" is set in the master partition number, and processing returns to step S1912. If the bit value is significant, processing branches to step S1923, wherein the number of partitions is incremented by 1, and processing returns to step S1911.

The processing loop of the above steps S1911 to S1923 is repeated until a determination is made in step S1916 that the master partition level is the lowest partition level. In that case, if the bit at the partition level in the region configuration master partitions table pointed to by the master partition level is a non-significant bit, in other words, that bit value is "0", the value "−1" is set in the master partition number at that partition level, just as described above.

In the example shown in FIG. 18B, 4 is set in the partition level 4 in the master partition number management table 319 in the initial processing of step S1918, and because the number of partitions is set as 2 at step S1919 and the partition level 4 is set as 3 at step S1923, in step S1911 the partition level 4 is set as 6. Also, −1 is set in the partition level 3 in the master partition number management table 319 in the processing of step S1922. Thereinafter, in the same way, the value 28, −1, −1 are set in partition levels 2, 1, 0, respectively, in master partition number management table 319.

Figure 19C:
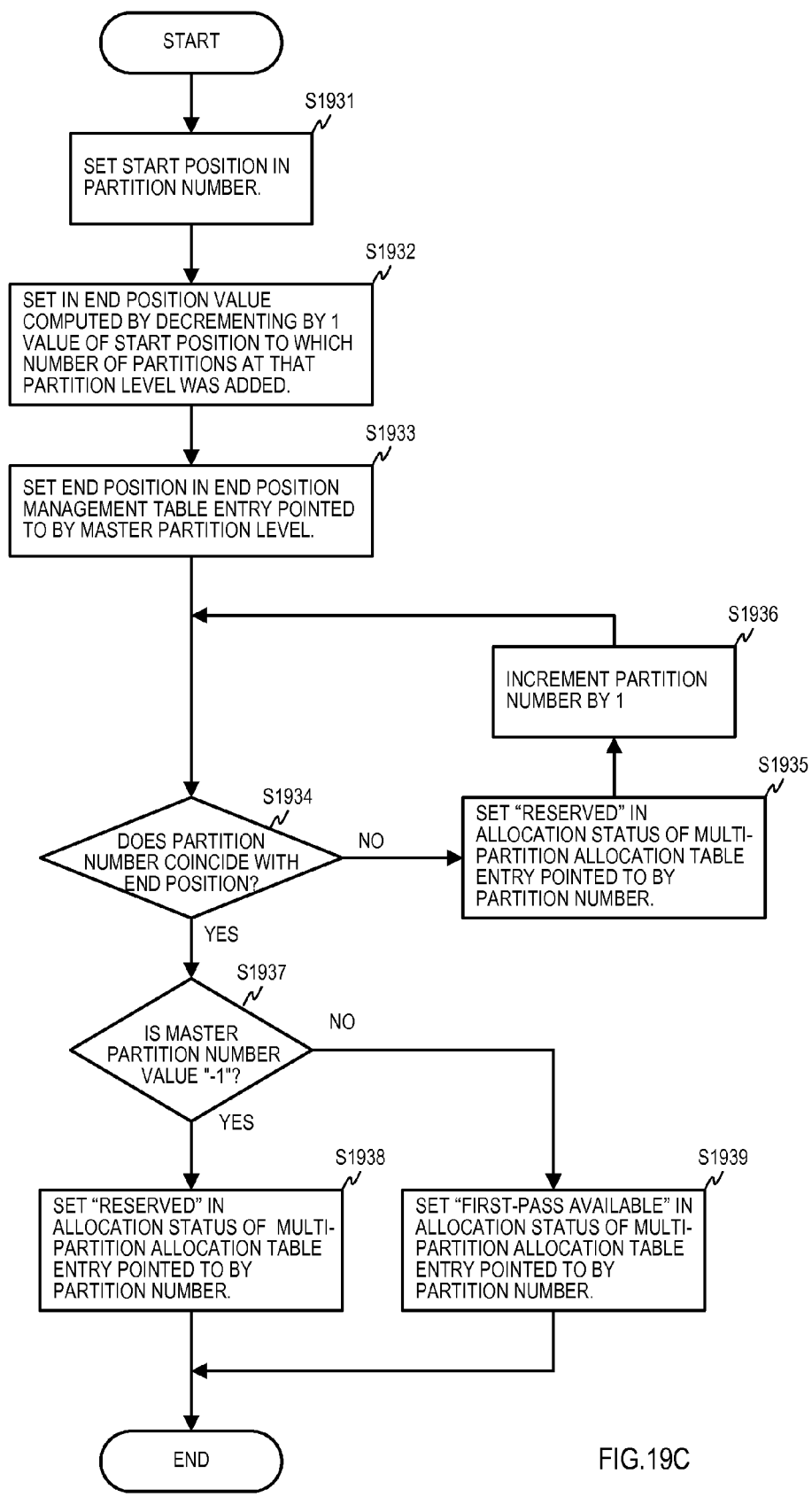
FIG. 19C is a drawing describing the processing flow to initialize a multi-partition allocation table for each of the partition levels in the second embodiment of this invention.

FIG. 19C is a drawing describing the processing flow to initialize a multilevel allocation table for each of the partition levels in the second embodiment of this invention. It describes details of the processing in step S1914 shown in FIG. 19B. By the processing flow exemplified in FIG. 19C, the single-level partition allocation tables corresponding to each partition level are initialized, from the lowest partition level configuring the multi-partition allocation table up to the highest partition level in the region configuration master partitions table whose bit value is a 1. In the example in FIG. 18B, FIG. 19C describes the processing that sets in each of the values in the single-level partition allocation tables 160 to 165 the values illustrated in the drawing. Every time the processing loop of steps S1911 to S1923 shown in FIG. 19B is executed, a single-level partition allocation table from single-level partition allocation table 165 up to single-level partition allocation table 160 is initialized, and the initialization of multi-partition allocation tables 310 is completed.

As shown in FIG. 19C, at step S1931, the start position is set in the partition number, and at step S1932, the number of partitions is added to the start position, the value 1 is subtracted, and the result is set in the end position number. Furthermore, in step S1933, the end position number is set in the end position management table entry pointed to by the master partition level, and processing proceeds to step S1934.

The start position in step S1931 and step S1932 is that set at step S1909 shown in FIG. 19A or set at step S1918 shown in FIG. 19B. Also, number of partitions at step S1932 is that set in step S1910 shown in FIG. 19A or set in step S1919 or step S1923 shown in FIG. 19B.

In the example shown in FIG. 18B, the master partition level is 5 when the processing from step S1931 to step S1933 is executed, and the 2 set at step S1909 shown in FIG. 19B is set in the partition number, and the 1 that is the number of partitions set at step S1910 shown in FIG. 19B is added to the 2 that is the start position, and the 2 that is that value decremented by 1 is set in the end position number.

At step S1934, a determination is made whether the partition number and the end position number coincide. If the partition number and the end position number do not coincide, at step S1935, "reserved" is set in the allocation status of the multi-partition allocation table entry pointed to by the partition number, and at step S1936, the partition number is incremented by 1, and processing returns to step S1934, wherein the determination whether the partition number and the end position number coincide is repeated. The processing loop of these steps S1934 to S1936 is the processing to set "reserved" in the allocation statuses in the single-level partition allocation table entries pointed to by the partition number from the starting partition number in the single-level partition allocation table corresponding to the partition level being processed up to one partition number before the end position number.

Conversely, when the determination in step S1934 is that the partition number and the end position number do coincide, processing proceeds to step S1937 wherein a determination is made whether the master partition number has the value −1. The master partition number herein is the one set in step S1911 or step S1922 shown in FIG. 19B.

When at step S1937 a determination is made that the master partition number is the value "−1", at step S1938, "reserved" is set in the allocation status entry in the multi-partition allocation table pointed to by the partition number, and processing is terminated, and when at step S1937, a determination is made that the master partition number is not the value "−1", at step S1939, "first-pass available" is set in the allocation status entry in the multi-partition allocation table pointed to by the partition number, and processing is terminated.

The processing of these steps S1938 and S1939 is the processing to set the allocation status for the partition number at the end position in the single-level partition allocation table corresponding to the partition level being processed. As shown in FIG. 18B, the partition number of a partition unit corresponding to a master partition is the end position of the partition numbers corresponding to the partition level for that master partition, and the allocation status in the single-level partition allocation table entry with the partition number of the end position is "00", in other words, "first-pass available", as shown by the allocation statuses for partition numbers 2, 6, and 28. The allocation status of all the other multi-partition allocation table entries is "10", in other words, "reserved".

Next, the allocation of partitions using multi-partition management information in the second embodiment of this invention is described. As was noted in the description of the first embodiment, the allocation of partitions is done by the multi-partition management part of the allocation system after region initialization by receiving from a file system an allocation request that includes an allocation request size.

The processing flow itself of an overview of the overall processing for partition partitioning is common to the first and second embodiments as was noted in the description of FIG. 5. Also, the processing flow itself shown in FIG. 6 that describes details of the processing of step S503 shown in FIG. 5 and describes an example of the processing flow to search for a first-pass allocatable partition at an allocation request partition level referencing the multi-partition allocation table and to obtain the partition number of the first-pass allocatable partition is common to the first and second embodiments. Further, the processing flow itself shown in FIG. 9 that describes details of the processing of step S505 shown in FIG. 5 and describes an example of the processing flow to search, by means of the multi-partition allocation table, for a second-pass allocatable partition at an allocation request partition level and to obtain the partition number of the second-pass allocatable partition is common to the first and second embodiments.

Therefore, the descriptions of processing flow of an overview of the overall processing for partition partitioning and the processing flow to search, by means of the multi-partition allocation table, for a first-pass allocatable partition or a second-pass allocatable partition at an allocation request partition level and to obtain the partition number of the first-pass allocatable partition or the second-pass allocatable partition are omitted.

Figure 20A:
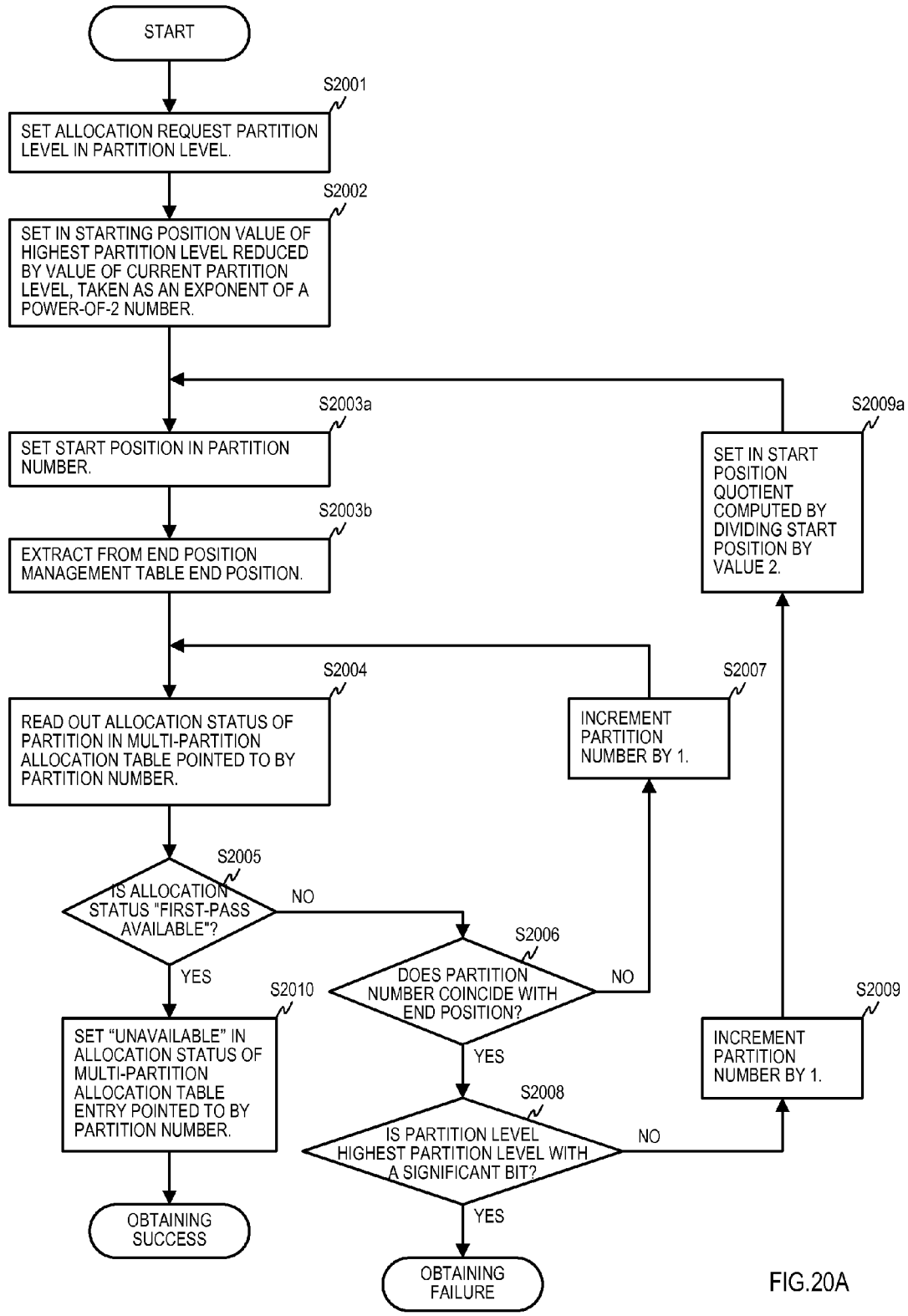
FIG. 20A is a drawing describing an example of the processing flow to search for a first-pass allocatable partition that includes the size of the allocation request partition level and to obtain the partition number of the first-pass allocatable partition in the second embodiment of this invention.
Figure 20B:
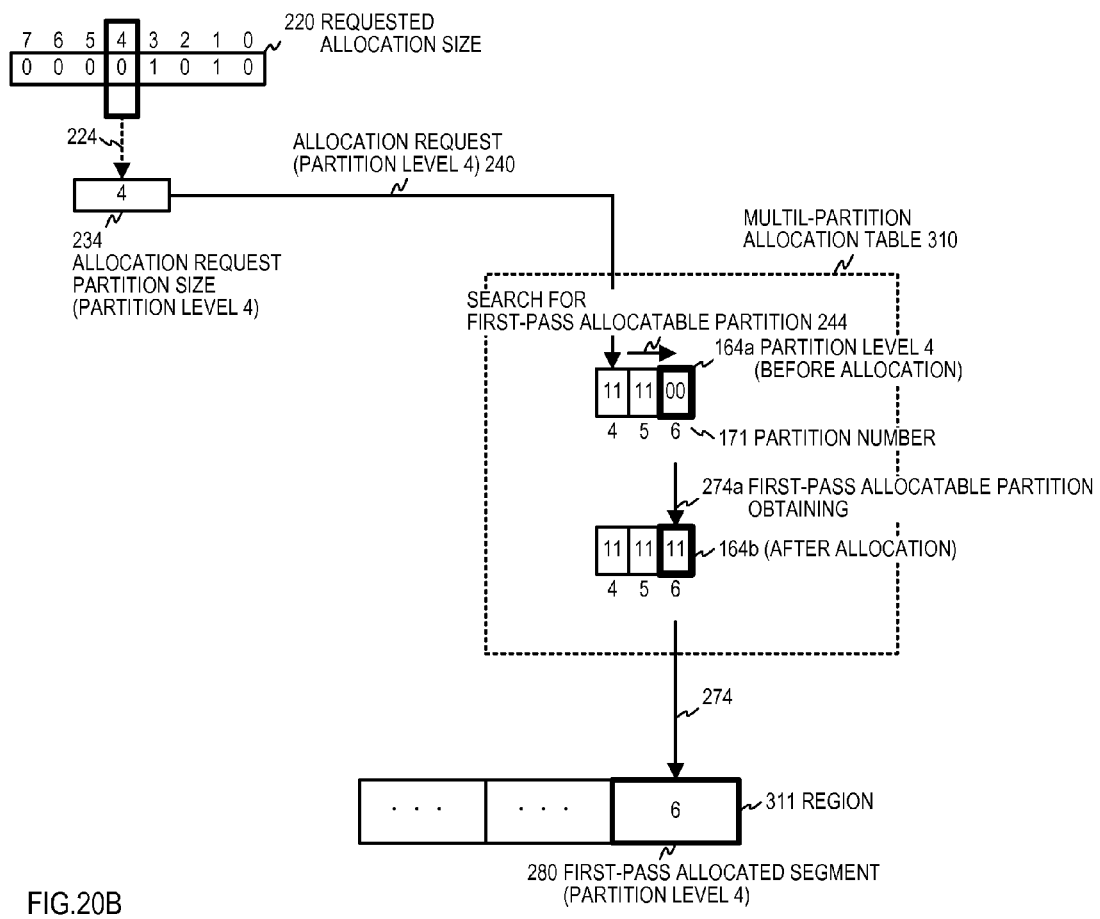
FIG. 20B is a drawing describing, by means of a concrete example, a partition search when a first-pass allocatable partition exists at the allocation request partition level in the second embodiment of this invention.
Figure 20C:
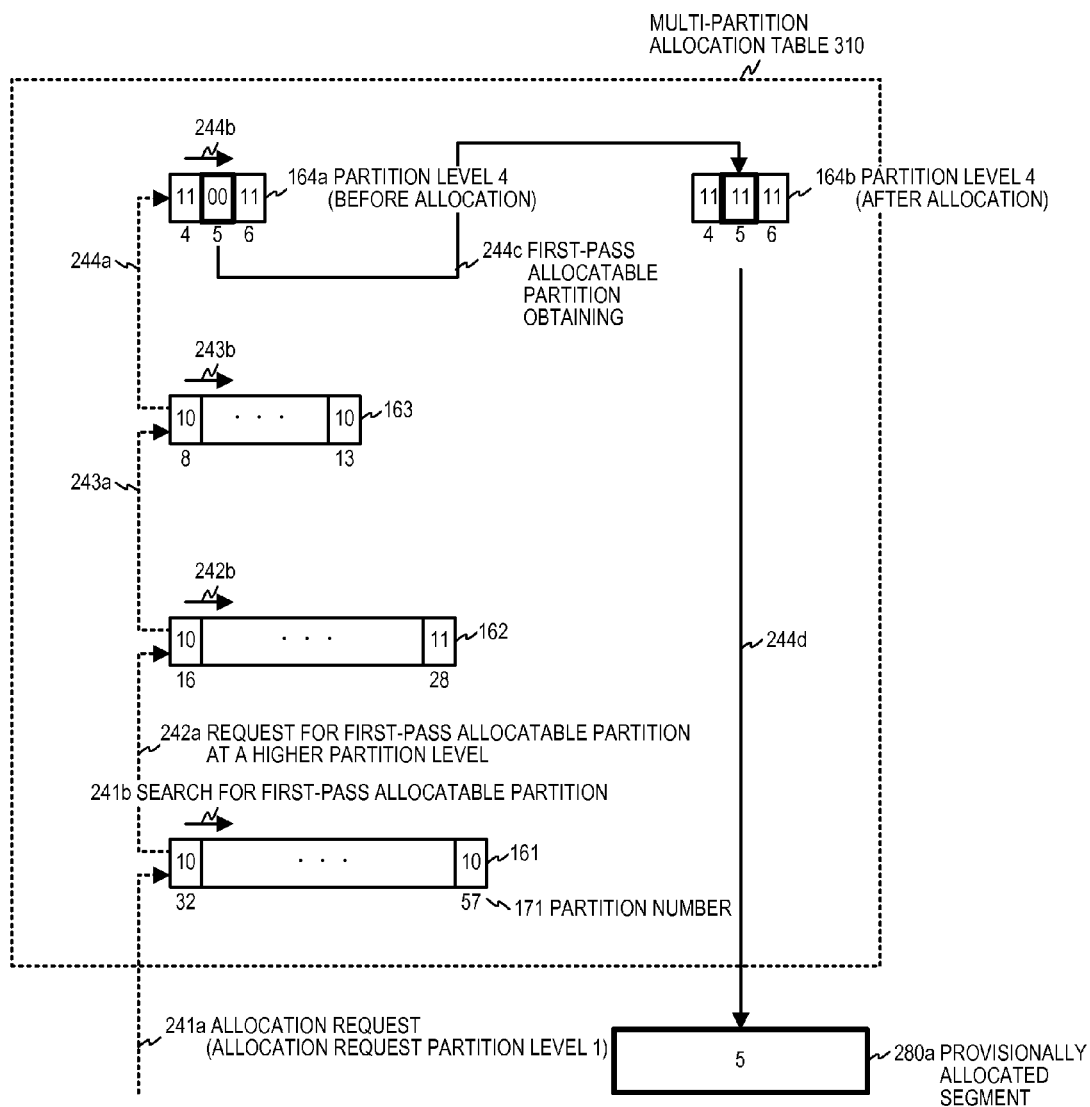
FIG. 20C is a drawing describing a concrete example of a partition search when a first-pass allocatable partition does not exist at an allocation request partition level in the second embodiment of this invention.

Then, referencing FIG. 20A to FIG. 20C, an example is described of the processing to search for a first-pass allocatable partition that includes a partition whose size is the allocation request partition level using the multi-partition allocation table and to obtain the partition number of the first-pass allocatable partition in the second embodiment of this invention.

FIG. 20A is a drawing describing the details of the processing in step S601 of FIG. 6, and the drawing describes an example of the processing flow to search for a first-pass allocatable partition that includes a partition whose size is the allocation request partition level and to obtain the partition number of the first-pass allocatable partition in the second embodiment of this invention.

As shown in the drawing, in step S2001, the allocation request partition level is set in the partition level. Here the value of the allocation request partition level is the one set in step S502 in FIG. 5.

Next, in step S2002, the value of the highest partition level reduced by the value of the current master partition level, taken as an exponent of a power-of-2 number, is set in the start position, and at step S2003a, that start position is set in the partition number. Then, at step S2003b, the end position number pointed to by the partition level currently being processed is extracted from the end position management table.

Next, proceeding to step S2004, the allocation status of the multi-partition allocation table entry pointed by the value set in the partition number is read out. Then, at step S2005, a determination is made whether the read-out allocation status is "first-pass available". When the determination in step S2005 is that the allocation status is "first-pass available", processing proceeds to step S2010.

Conversely, when the determination in step S2005 is that the allocation status is "not first-pass available", processing branches to step S2006. Then, at step S2006, a determination is made whether the partition number and the end position number read out at step S2003b coincide. If the partition number and end position number do not coincide, processing branches to step S2007, the partition number is incremented by 1, and processing returns to step S2004. Thereinafter, 1 each is added to the partition numbers within the same single partition level and a partition with a "first-pass available" status is sought for.

When the determination in step S2006 is that the partition number and end position number coincide, processing proceeds to step S2008 wherein a determination is made whether the partition level is the highest partition level. This determination can be done by a determination whether the start position set at step S2002 is a 1 or 2. If the start position set at step S2002 is a 1 or 2 regardless whether the region configuration master partitions table is a single bit configuration or a multibit configuration, because the search for an first-pass available status partition up to the highest partition level with a significant bit has been completed, obtaining failure is returned and processing is terminated.

If in step S2008 the determination is that the partition level is not the highest partition level with a significant bit (the partition level is a partition level lower than the highest partition level with a significant bit), proceeding to step S2009, the partition level is incremented by 1, and proceeding to step S2009a, the quotient obtained by dividing the start position by 2 is set in the start position, and processing return to step S2003a.

When return is made to step S2003a the above processing is repeated and one by one the allocation statuses in the multi-partition allocation table for the higher partition level are sought out. When the search result is that a partition with a first-pass available status is obtained, processing proceeds to step S2010.

At step S2010, the allocation status in the multi-partition allocation table entry pointed to by the value set in the partition number is set to unavailable and processing is terminated. The result of the processing in FIG. 20A is that the values set respectively in the temporary memory areas of partition number and partition level and data expressing whether the obtaining was a success or failure are all output as search results.

FIG. 20B and FIG. 20C are drawings describing, by means of a concrete example, the partition search for a first-pass allocatable partition shown in FIG. 20A referencing the multi-partition allocation table 310 shown in FIG. 18B.

The example shown in FIG. 20B is an example wherein the allocation request is a multibit request and a first-pass allocatable partition is sought for at the allocation request partition level. As shown in the drawing the bit value 1 is set in the first bit (partition level 1) and the third bit (partition level 3). Thus, partition level 4, which is a partition level above partition level 3, is set in the allocation request partition level 234, as shown by the dotted-line arrow 224. The setup up to this point is the processing that occurs in step S501 and step S502 in FIG. 5.

Next, by means of the allocation request 240 at partition level 4, shown by the solid-line arrow in the drawing, a search 244 is made for a first-pass allocatable partition (with the label 164a, before allocation) in the single-level partition allocation table entries at partition level 4 in multi-partition allocation table 310. In the example in the drawing, the allocation status for partition number 4 and 5 in partition number 171 are both "11" and thus unavailable while the allocation status for partition number 6 is "00" and thus first-pass available. Thus the obtaining 274*a* of the first-pass allocatable partition is done as shown by the solid-line arrow in the drawing, and "11" is set in the allocation status for the partition whose partition number 171 is 6 (with the label 164*b*, after allocation) as shown in the single-level partition allocation table at partition level 4, indicating that it is unavailable. As a result, as shown by the arrow 274 in the drawing, the partition with partition level 4 and partition number 6 is allocated as first-pass allocated segment 280 in region 311. The above allocation of first-pass allocated segment 280 is done by the processing loop of steps S2004 to S2007 and by step S2010 shown in FIG. 20A.

Next, using the example shown in FIG. 20C, a case is described wherein a first-pass allocatable partition cannot be found at the allocation request partition level and the allocation request is a single-bit request. Although allocation request size 220 is not depicted in FIG. 20C, the allocation request is a single-bit request wherein the first bit is a 1 because the allocation request 241*a* pointed out by the dotted-line arrow contains allocation request partition level 1 shown in the parentheses.

If a first-pass allocatable partition cannot be found at the allocation request partition level, in the flow shown in FIG. 20A, a branch at step S2006 is taken to step S2008, and the processing loop through step S2009, returning to step S2002 is repeated until a first-pass allocatable partition is found at a higher partition level.

The process corresponding to this repetitive processing is the processing shown in FIG. 20C wherein, from a lower partition level (partition level 1 in FIG. 20C), successively referencing a higher partition level single-level partition allocation table and if a partition with a first-pass available status does not exist within the partition level being searched, once again a higher partition level is searched. Successively from partition level 1, each partition in a partition level is checked for a first-pass available status in sequence from the start position of that partition level.

First, a first-pass allocatable partition search is requested at partition level 1 which is the allocation request partition level shown by the dotted-line arrow 241*a* in the drawing, and of the tables in multi-partition allocation table 310, the allocation statuses in single-level partition allocation table 161 at partition level 1 are checked for a partition with a first-pass available status, in ascending sequence of partition numbers from partition number 32, which is the start position, until partition number 57, which is the end position number, (see arrow 241*b* in FIG. 20C).

In the example shown in the drawing, because even if a search is done up to the partition whose partition number is the end position number 57, no partitions have a first-pass available status, a search for a first-pass allocatable partition is requested at partition level 2 which is the higher level partition determined by incrementing the partition level by one, shown by dotted-line arrow 242*a* in the drawing. Then, the allocation statuses in single-level partition allocation table 162 at partition level 2 are checked for a partition with a first-pass available status, in ascending sequence of partition numbers from partition number 16, which is the start position, until partition number 28, which is the end position number, (see arrow 242*b* in FIG. 20C).

Because even if a search is done up to the partition whose partition number is the end position number 28, no partitions have a first-pass available status, a search for a first-pass allocatable partition is requested at partition level 3 which is the higher level partition determined by incrementing the partition level by one, shown by dotted-line arrow 243*a* in the drawing. In the same way, regarding single-level partition allocation table 163 at partition level 3, although a successive search is done from the partition with partition number 8, which is the start position, up to the partition with partition number 13, which is the end position number, because no first-pass allocatable partitions are obtained, a search for a first-pass allocatable partition is requested at partition level 4 which is the higher level partition determined by incrementing the partition level by one (see dotted-line arrow 244*a* in FIG. 20C).

In the example shown in FIG. 20C, the result of a search for first-pass allocatable partitions in the single-level partition allocation table at partition level 4 before allocation, affixed with the label 164*a*, is that the partition with the partition number 5, whose allocation status is "00", is obtained, and the allocation status of partition number 5 in the single-level partition allocation table at partition level 4 after allocation, affixed with the label 164*b*, has been changed to "unavailable" expressed with "11", as shown the arrow 244*c* obtaining "first-pass available" in FIG. 20C. In other words, the partition with partition number 5 is provisionally allocated, as shown by arrow 244*d*, and is obtained as provisionally allocated segment 280*a*.

Also, first-pass allocatable partition search processing is not limited to the method of the above searching of partition numbers in ascending sequence, and any search algorithm can be applied.

In accordance with the processing described above referencing FIG. 20A to FIG. 20C, a first-pass allocated segment or a provisionally allocated segment is obtained.

Figure 21A:
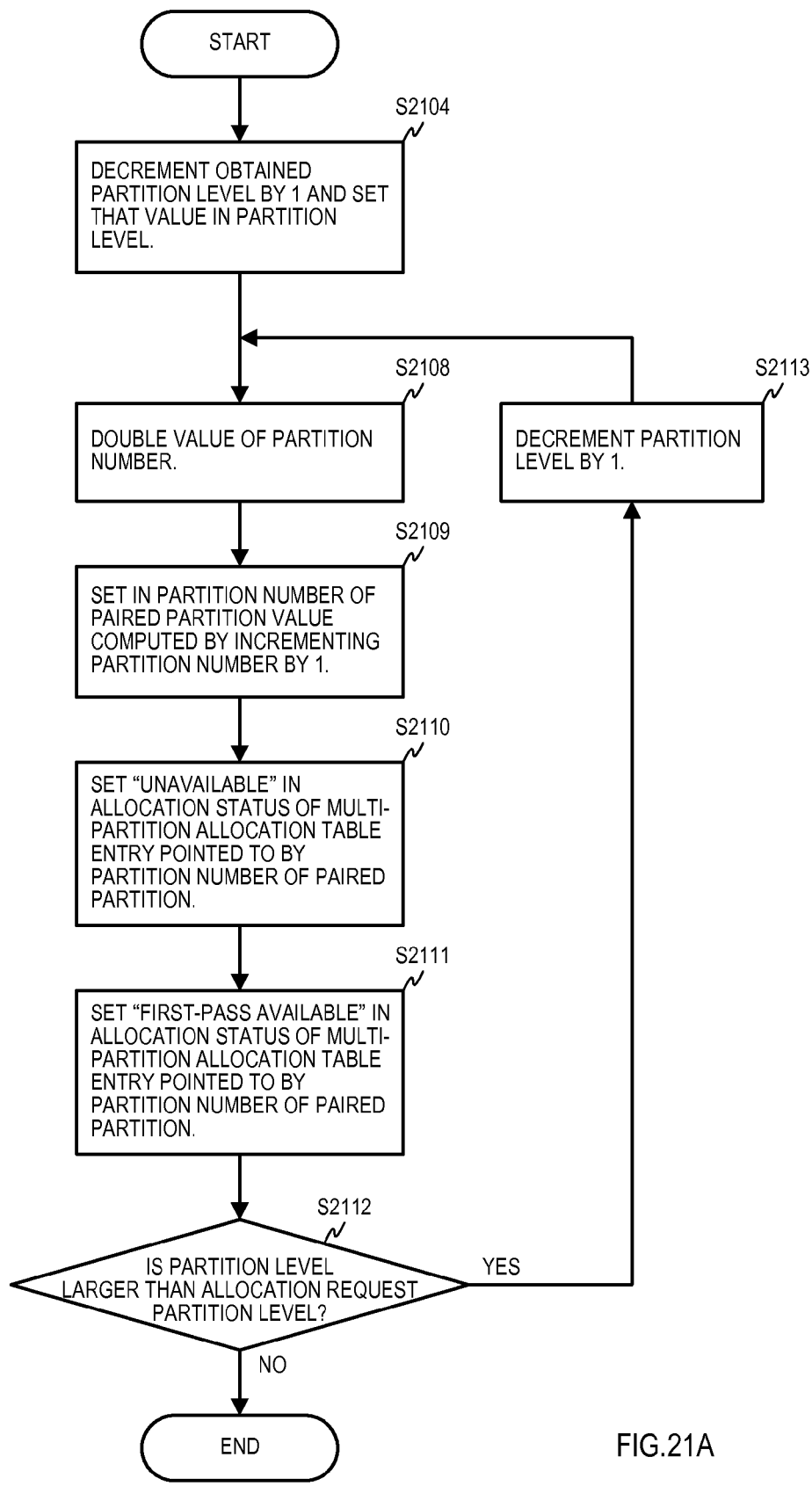
FIG. 21A is a drawing describing an example of the processing flow to multi-partition a provisionally allocated segment and obtain a first-pass allocated segment in the second embodiment of this invention.
Figure 21B:
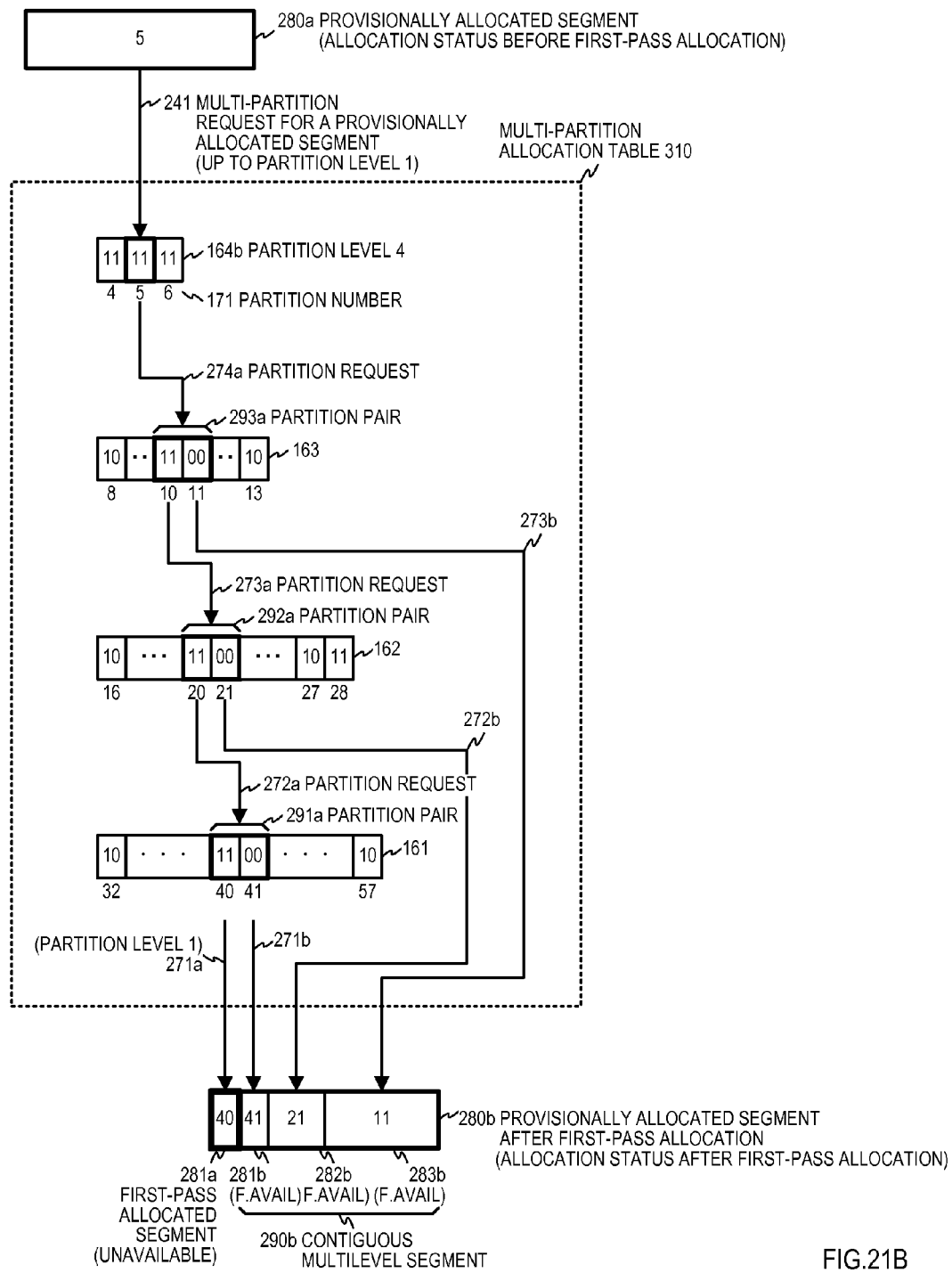
FIG. 21B is a drawing describing, by means of a concrete example, the processing to multi-partition a provisionally allocated segment and to obtain a first-pass allocated segment in the second embodiment of this invention.

Next, referencing FIG. 21A to FIG. 21B, an example of the processing to multi-partition a partition provisionally allocated and obtain a first-pass allocated segment with a partition number at the allocation request partition level in the second embodiment of this invention.

FIG. 21A is a drawing describing the details of the processing in step S604 of FIG. 6, and it describes the an example of the processing flow to multi-partition a partition provisionally allocated in step S601 and obtain a first-pass allocated segment with a partition number at the allocation request partition level.

First, at step S2104, the value computed by decrementing the obtained partition level by one is set in the partition level, and processing proceeds to step S2108.

At step S2108 the value in the partition number is doubled and set in the partition number. The partition number when the first time processing of step S2108 starts is the partition number pointed to by the entry in the multi-partition table whose allocation status has be set as unavailable in step S2010 shown in FIG. 20A. Next, at step S2109, the value computed by adding 1 to the partition number is set in the paired partition number. For example, a partition at a given partition level whose partition number is "10" has its partition divided into two at a partition 1 level lower wherein the corresponding partitions have partition numbers "20" and "21".

Next, at step S2110, "unavailable" is set in the allocation status of the multi-partition allocation table entry pointed to by the partition number, and at step S2111, "first-pass available" is set in the allocation status of the multi-partition allocation table entry pointed to by the partition number of the paired partition and processing proceeds to step S2112.

At step S2112, a determination is made whether the partition level is larger than the allocation request partition level, and if it is larger, processing branches to step S2113, wherein the value computed by decrementing the partition level by 1 is set in the partition level and processing returns to step S2108. If the determination result is that it is not larger, in other words, if the partition level coincides with the allocation request partition level, processing is terminated.

Because the processing shown in FIG. 21A assumes that provisional allocation has occurred, the obtained partition level is larger than the allocation request partition level. Then, by repeating the processing loop from step S2108 to step S2113 while decrementing the partition level by 1 each time, the determination at step S2112 that the partition level is not larger than the allocation request partition level occurs when the partition level coincides with the allocation request partition level.

By means of the above processing, a provisionally allocated segment is multi-partitioned, and a first-pass allocated segment is obtained. The above processing of step S2104 and the processing loop of steps S2108 to S2113 starts from the provisionally allocated segment, and divides the partition into a pair of partitions at a partition level 1 lower, and sets "unavailable" in the allocation status of the partition with the lower partition number and sets "first-pass available" in the allocation status of the partition with the higher partition number.

In accordance with the second embodiment of this invention, the obtained provisionally allocated segment is not made completely unavailable, and because the partition at an allocation request partition level with the lower partition number in the provisionally allocated segment is first-allocated and the remaining contiguous area is set as "first-pass available", the area can be used effectively. Also it is clear to one skilled in the art that this method is not limited to using the lower partition number in the first-pass allocation and the higher partition number can be used.

FIG. 21B is a drawing describing, by means of a concrete example and referencing the multi-partition allocation table 310 shown in FIG. 18B, the processing to multi-partition a provisionally allocated segment obtained by the processing shown in FIG. 21A and to obtain a first-pass allocated segment.

In the example shown in FIG. 21B, in the same way as for the example shown in FIG. 20C, the allocation request is a single-bit request, and it is a request to obtain a first-pass allocated segment from the provisionally allocated segment 280*a* shown in FIG. 20C.

FIG. 21B shows provisionally allocated segment (partition number 5) with label 280*a* with its allocation status before first-pass allocation. Processing starts from the single-level partition allocation table at partition level 4 with the label 164*b* by a multi-partition request that requests the partitioning of each related partition from partition level 4 up to partition level 1 in the provisionally allocated segment, shown by arrow 241 from provisionally allocated segment 280*a*. The same allocation statuses as those shown FIG. 20C are stored in single-level partition allocation table 164*b*.

By the partition request shown by arrow 274*a* from the entry whose value for its partition number 171 in the partition allocation table 164*b* at partition level 4 is 5 and which has been set as unavailable by an allocation status that is "provisionally allocated", unavailable "11" is set in the allocation status for the partition with partition number 10 by the partitioning of the partition units for partition number 10 (hereinafter, this may be expressed as "partition number 10 partitions") in the partition allocation table 163 at partition level 3, and by partitioning the partition units of partition number 10 and the partition units of partition number 11 that, along with partition 10, configure the partition pair 293*a*, first-pass available "00" is set in the allocation status of the partition with partition number 11 which configures the partition pair 293*a* along with the partition with partition number 10 (hereinbelow this may be expressed as "the partition with partition number 11 which configures the partition pair 293*a* along with the partition with partition number 10"). This setup processing is executed by the processing of steps S2108 to S2111 of FIG. 21A in partition level 3. The initial partition number is 5, and at step S2108, the 10 that is the double of this value is set in the partition number. Also, the value 11 is obtained as the partition number of its pair.

Hereinbelow, in the same way, unavailable "11" is set in the allocation status for the partition with partition number 20 in the partition allocation table 162 at partition level 2 by the partition request shown by the arrow 273*a* corresponding to the entry for partition number 10 marked as unavailable, and first-pass available "00" is set in the allocation status for partition number 21 which is configured along with the partition with partition number 20 as the partition pair 292*a*.

Also, because "first-pass available" is set in the allocation status of partition number 11, as shown by the associated arrow 273*b*, the partition 283*b* for partition number 11 with the first-pass available status is allocated to the provisionally allocated segment, marked with label 280*b*, after first-pass allocation.

Next, by a partition request from the entry with partition number 20 marked as unavailable, shown by the arrow 272*a*, in single-level partition allocation table 161 at partition level 1, unavailable "11" is set in the allocation status of the partition with partition number 40 and first-pass available "00" is set in the allocation status of the partition with partition number 41 which configures the partition pair 291*a* along with the partition with partition number 40. Then, because "first-pass available" is set in the allocation status of partition number 21, as shown by the associated arrow 272*b*, the partition 282*b* for partition number 21 with the first-pass available status is allocated to the provisionally allocated segment 280*b* after first-pass allocation.

Because the multi-partition request has reached partition level 1, as shown by each of the arrows 271*a* and 271*b*, partition 281*a* with partition number 40 is first-allocated to the provisionally allocated segment 280*b* after first-pass allocation as "unavailable" and partition 281*b* with partition number 41 is allocated as first-pass available.

By means of the above multi-partitioning, the provisionally allocated segment 280*b* after first-pass allocation is divided into the unavailable first-pass allocated segment 281*a* and the contiguous multilevel segment 290*b* comprised of the first-pass allocatable partitions 281*b*, 282*b*, and 283*b* and adjacent to the first-pass allocated segment 281*a*.

Next, an example of the processing to search for a second-pass allocatable partition that includes a partition whose size is the allocation request partition level using the multi-partition allocation table and to obtain the partition number of the second-pass allocatable partition in the second embodiment of this invention.

As is described above, the processing flow itself shown in FIG. 9 to search for a second-pass allocatable partition that includes a partition whose size is the allocation request partition level using the multi-partition allocation table and to obtain the partition number of the second-pass allocatable partition is same as the processing flow in the first embodiment.

Figure 22A:
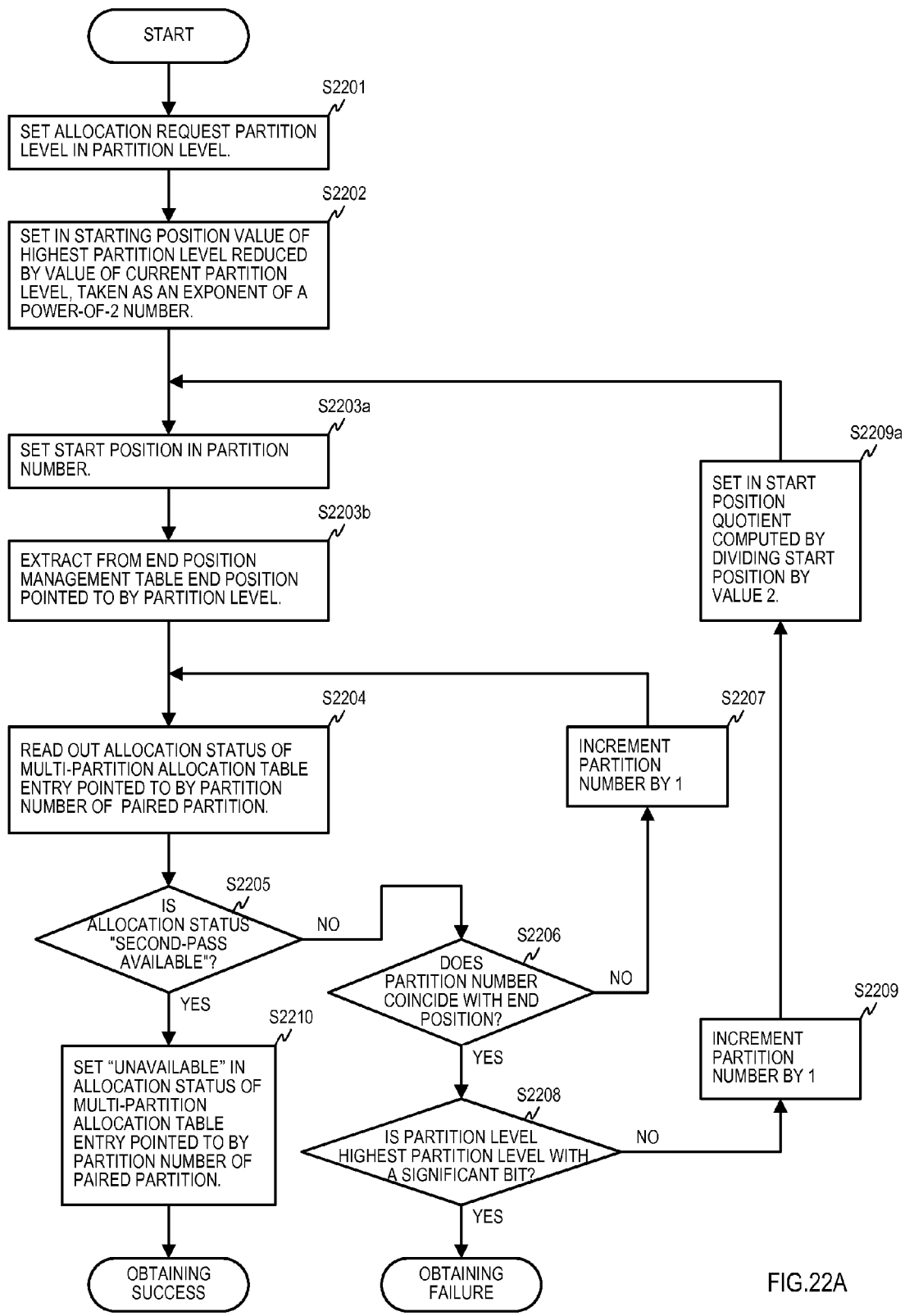
FIG. 22A is a drawing describing an example of the processing flow to search for a second-pass allocatable partition that includes the size of the allocation request partition level and to obtain the partition number of the second-pass allocatable partition in the second embodiment of this invention.

Also, FIG. 22A, which describes details of the processing in step S901 of FIG. 9 in the second embodiment, is a drawing describing an example of the processing flow that uses the multi-partition allocation table to search for a second-pass allocatable partition that has a size equal to or greater than the size of the allocation request partition level and to obtain the partition number of the second-pass allocatable partition. It corresponds to the drawing describing the processing flow that uses the multi-partition allocation table to search for a first-pass allocatable partition that has a size equal to or greater than the size of the allocation request partition level and to obtain the partition number of the first-pass allocatable partition shown in FIG. 20A. Because the steps S2201 to S2210 in FIG. 22A differ only in that the determination in step S2005 of FIG. 20A is whether the allocation status is first-pass available whereas the determination in step S2205 of FIG. 22A is whether the allocation status is second-pass available, description of FIG. 22A is omitted.

Figure 22B:
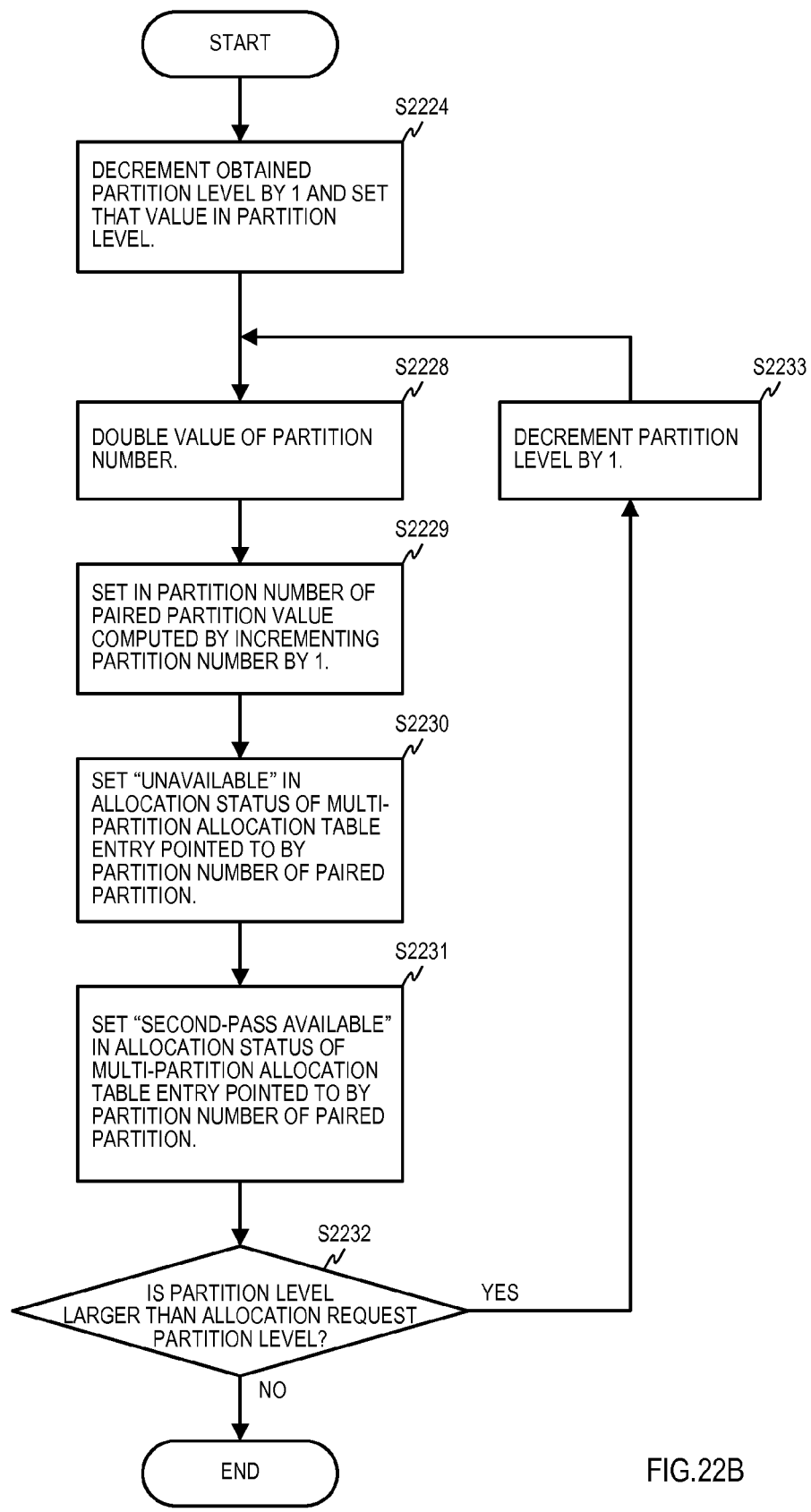
FIG. 22B is a drawing describing an example of the processing flow to multi-partition a provisionally allocated segment and obtain a first-pass allocated segment in the second embodiment of this invention.

Also, in the same way, FIG. 22B, which describes details of the processing in step S904 of FIG. 9 in the second embodiment, is a drawing describing the processing flow to multi-partition the provisionally allocated segment obtained in the processing of step S901 and to obtain a first-pass allocated segment with a partition number at the allocation request partition level. It corresponds to the drawing describing the processing flow to multi-partition the provisionally allocated segment obtained in the processing of step S601 of FIG. 6 and to obtain a first-pass allocated segment with a partition number at the allocation request partition level shown in FIG. 21A. Because the steps S2224 to S2233 in FIG. 22B differ only in that first-pass available is set in the allocation status of the multi-partition allocation table entry pointed to by the partition number of the paired partition in step S2111 of FIG. 21A whereas second-pass available is set in the allocation status of the multi-partition allocation table entry pointed to by the partition number of the paired partition in step S2231, description of FIG. 22B is omitted.

Figure 23A:
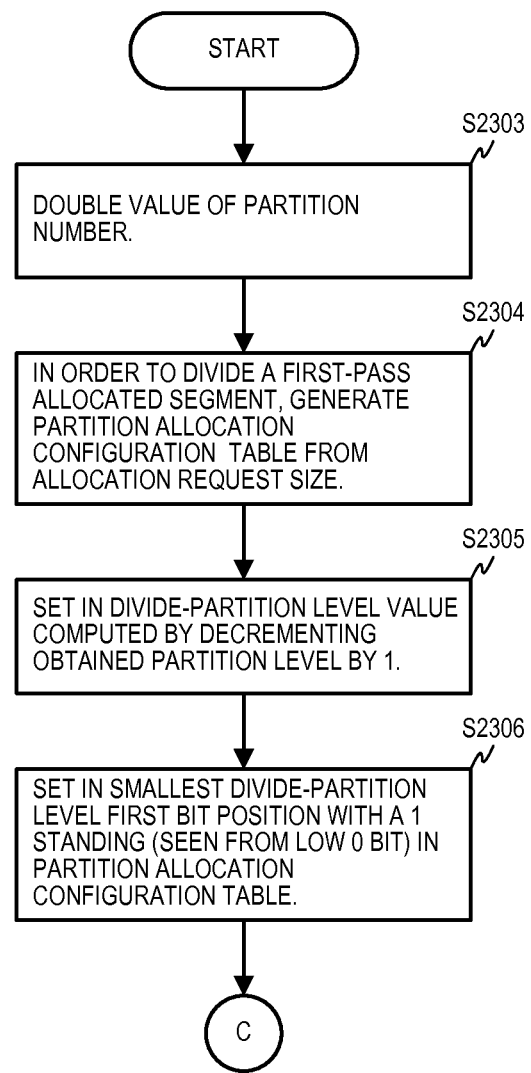
FIG. 23A is a drawing describing an example of the processing flow for the prior stage of multi-partitioning of a first-pass allocated segment and obtaining a second-pass allocated segment with the allocation request size in the second embodiment of this invention.
Figure 23B:
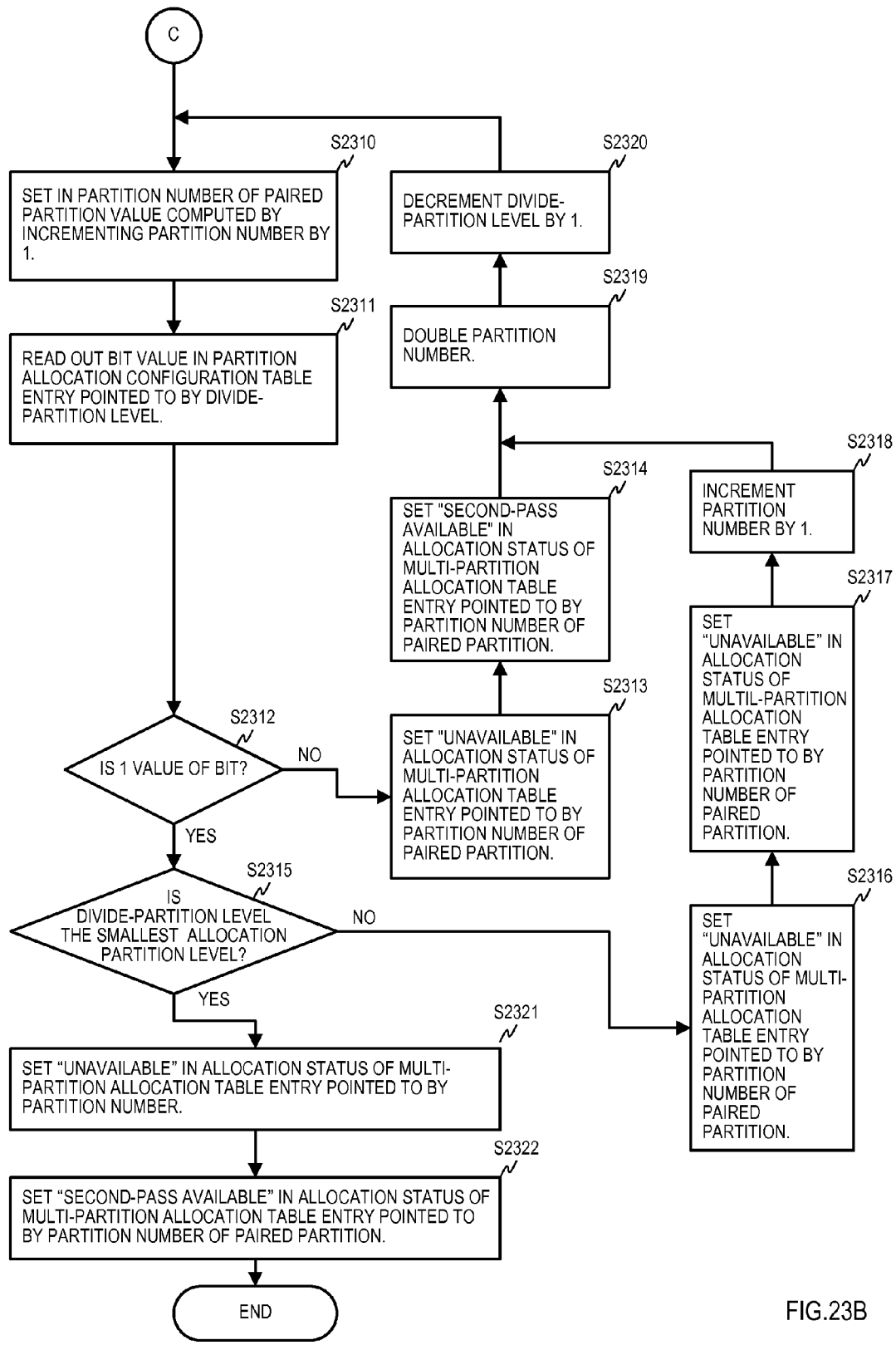
FIG. 23B is a drawing describing an example of the processing flow for the latter stage of multi-partitioning of a first-pass allocated segment and obtaining a second-pass allocated segment with the allocation request size in the second embodiment of this invention.
Figure 23C:
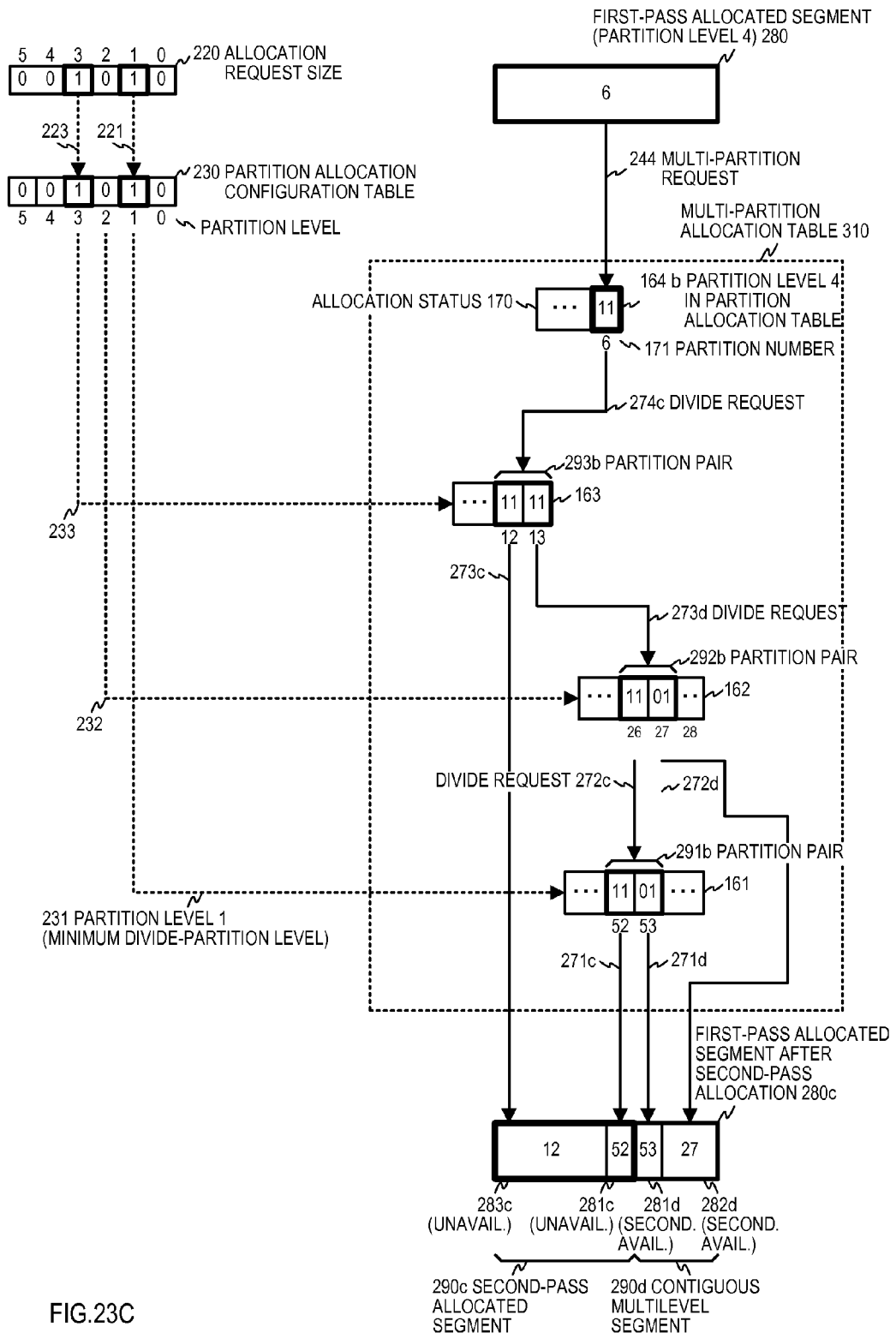
FIG. 23C is a drawing describing by means of a concrete example, the processing to multi-partition a first-pass allocated segment and obtain a second-pass allocated segment with the allocation request size in the second embodiment of this invention.

Next details of the processing in step S508 of FIG. 5 in the second embodiment are described referencing FIG. 23A to FIG. 23C.

FIG. 23A is a drawing describing the processing flow for the prior stage of multi-partitioning of a first-pass allocated segment with the obtained partition number and obtaining a second-pass allocated segment with the allocation request size.

First, at step S2303, the value of the partition number of the obtained first-pass allocated segment is doubled and set as the partition number. In the example shown in FIG. 20B, because the partition number of the obtained first-pass allocated segment is 6, 12 is set as the partition number by the processing of this step S2303.

Next, at step S2304, in order to divide the first-pass allocated segment, a configuration partition table is generated from the allocation request size, consisting of the bit values of the allocation request size expressed in binary form. Then, at step S2305, the value computed by decrementing the obtained partition level by 1 is set as the divide-partition level. In the example shown in FIG. 20B, because the partition level for the first-pass allocated segment obtained is 4, 3 is set as the allocated partition level by the processing of this step S2305.

Next, proceeding to step S2306, the position of a bit in the allocated partition configuration table whose bit value is one and whose bit position is the lowest when seen 0th bit position is set as the minimum divide-partition level, and processing proceeds to step S2307 in FIG. 23B. For example when the allocation request size is that shown in FIG. 20B and the bit values in the partition allocation configuration table are "1010", the bit position 1 is set in the minimum divide-partition level.

FIG. 23B is a drawing describing the processing flow for the latter stage of multi-partitioning of a first-pass allocated segment with the obtained partition number and obtaining a second-pass allocated segment with the allocation request size.

At step S2310, the partition number is incremented by 1 and the result is set in the partition number of the paired partition.

Next, proceeding to step S2311, the bit value in the partition allocation configuration table position pointed to by the divide-partition level is extracted, and at step S2312, a determination is made whether the extracted bit value is a 1.

In step S2312, if the determination is that the extracted bit value is not 1 (is 0) processing branches to step S2313, and if the determination is that the extracted bit value is 1, processing proceeds to step S2315.

At step S2313, unavailable is set in the allocation status of the multi-partition allocation table entry pointed by the partition number, and at step S2314, second-pass available is set in the allocation status of the multi-partition allocation table entry pointed by the partition number of the paired partition, and processing proceeds to step S2319.

Otherwise, at step S2315 a determination is made whether the divide-partition level coincides with the smallest divide-partition level set in step S2306. If the divide-partition level does not coincide with the smallest divide-partition level, processing branches to step S2316 and if they coincide, processing proceeds to step S2321.

At step S2316, "unavailable" is set in the allocation status of the multi-partition allocation table entry pointed to by the partition number, and at step S2317, "unavailable" is set in the allocation status of the multi-partition allocation table entry pointed to by the pair partition number. Next, proceeding to step S2318, the partition number is incremented by 1 and processing proceeds to step S2319.

At step S2319, the partition number is doubled and processing proceeds to step S2320, wherein the divide-partition level is decremented by 1, and processing returns to step S2310.

When a determination is made in step S2315 that the divide-partition level coincides with the minimum divide-partition level and processing proceeds to step S2321 wherein "unavailable" is set in the allocation status of the multi-partition allocation table entry pointed by the partition number, and at step S2322, "second-pass available" is set in the allocation status of the multi-partition allocation table entry pointed by the pair partition number, and processing is terminated.

FIG. 23C is a drawing describing, by means of a concrete example referencing the multi-partition allocation table 310 shown in FIG. 18B, the processing shown in FIG. 23A and FIG. 23B to multi-partition a first-pass allocated segment and obtain a second-pass allocated segment with the allocation request size. Because of the value set in allocation request size 220 and the fact that the first-pass allocated segment has been made to be the first-pass allocated segment 280 at partition number 6, the example in FIG. 23C is one that performs second-pass allocation following up on the first-pass allocation shown in the example in FIG. 20B.

Just as was shown in FIG. 20B, the bit values of bit 1 and bit 3 in allocation request size 220 are 1 when it is expressed in binary form. The partition allocation configuration table 230 is configured from entries consisting of single bits corresponding to partition levels as shown by the digits 0 to 5 below it, and in the example shown in FIG. 23C, 6 entries are provided corresponding to levels from partition level 0 to the highest partition level 5. Just as shown by the associations depicted by the dotted-line arrows 223 and 221 in the drawing, in correspondence to the bit values when the allocation request size is expressed in binary form, corresponding bit values are set in the partition level entries. The setup up to here is performed in the processing of step S501 in FIG. 5 and step S2304 in FIG. 23A.

Based on the bit values in the above noted partition allocation configuration table 230, second-pass allocation is executed. Multi-partitioning starts from the single-level partition allocation table at partition level 4, which is the obtained partition level marked with label 164b by a multi-partition request from the first-pass allocated segment shown by arrow 244 from first-pass allocated segment 280 up partition level 1 which is the minimum divide-partition level. The same allocation statuses as those shown FIG. 20B are stored in single-level partition allocation table 164b.

Regarding the partition request 274c for the partition with partition number 6 at partition level 4, because the bit value corresponding to partition level 3 (partition level 4 decremented by 1) in partition allocation configuration table 230, as shown by the associated dotted-line arrow 233, is a 1, and the processing of step S2316 and step S2317 in FIG. 23B sets "11" indicating "unavailable" in both the allocation statuses of partition number 12 and partition number 13 in single-level partition allocation table 163 at partition level 3, which are partitions at partition level 3 and are the partition pair 293b corresponding to the single group of partitions with the same area as the partition with partition number 6.

Because the partition number is incremented by 1 in the processing of step S2318 that follows step S2317 in FIG. 23B, next the partition with the partition number 13 at partition level 3 becomes the object of partition request 273d. Because the bit value corresponding to partition level 2 in the partition allocation configuration table 230 is a 0, as shown by the correspondence of the dotted-line arrow 232, the processing of step S2313 and step S2314 in FIG. 23B sets "11", indicating unavailable, in the allocation status of partition number 26 and sets "01", indicating second-pass available, in the allocation status of partition number 27 in the single-level partition allocation table 162 at partition level 2, both of which are partitions at partition level 2 and are part of the partition pair 292b that corresponds to the set of partitions occupying the same area as the partition for partition number 13.

Next, the partition with partition number 26 at partition level 2 becomes subject to partition request 272c. Because the bit value corresponding to partition level 1 in partition allocation configuration table 230 is a 1, as shown by the associated dotted-line arrow 231, and also the partition level 1 is the minimum divide-partition level, the processing of step S2321 and step S2322 in FIG. 23B sets "11" indicating "unavailable" in the allocation status of partition number 52 and "01", indicating "second-pass available", in the allocation status of partition number 53 in the single-level partition allocation table 161 at partition level 1, both being partitions at partition level 1 and being the partition pair 291b corresponding to the single group of partitions with the same area as the partition with partition number 26.

With the above, the modification of the multi-partition allocation table 310 in accordance with the second-pass allocation is completed. The modification of multi-partition allocation table 310 multi-partitions the first-pass allocated segment 280, as shown by first-pass allocated segment 280c after the second-pass allocation. As shown by the associating arrow 273c, partition 283c with partition number 12 at partition level 3 is allocated as "unavailable" and concatenated with it, as shown by the associating arrow 271c, partition 281c with partition number 52 at partition level 1 is allocated as "unavailable" and second-pass allocated segment 290c is allocated as a multilevel segment. Also, as shown by the associating arrow 272d, partition 282d with the partition number 27 at partition level 2 is allocated as "second-pass available" and concatenated with it, as shown by the associating arrow 271d, partition 281d with the partition number 53 at partition level 1 is allocated as "second-pass available" and both together are allocated as contiguous multilevel segment 290d. In second-pass allocated segment 290c, the partitions are allocated in descending sequence of partition level and in contiguous multilevel segment 290d the partitions are allocated in ascending sequence of the partition level, the opposite sequence to that of second-pass allocated segment.

Even if second-pass allocation is performed, although the partition number obtained in the first-pass allocation is sent to the file system as the allocated partition number, because, as is clear from the above description, the starting position of the partition with the partition number obtained in the first-pass allocation (6 in the above example) is the same as the starting position of the partition that was secondary allocated in the second-pass allocation, an address query from the file operation system regarding the allocated area with the specified partition number can be handled.

Also, although the second-pass allocation was done using the lower partition number in the above description, it is clear to one skilled in the art that this can be done using the higher partition number, as was noted above regarding the first-pass allocation after provisional allocation.

Next, the release of an allocated segment in the second embodiment of this invention is described. Just as for allocation of partitions, the partition release processing due to file deletion and so forth also is performed in the multi-partition management part of the allocation system.

As was described above, the processing flow itself, shown in FIG. 12, in an overview of the overall processing to try to release an allocated segment and concatenate it with a first-pass allocatable partition is common to the first and second embodiments. Also, the processing flow itself shown in FIG. 14A that describes details of the processing of step S1206 shown in FIG. 12 and describes an example of the processing flow to try to release a partition included in the first-pass allocated segment and to concatenate it with a first-pass allocatable partition, which example of the processing flow is common to the first and second embodiments.

Further, the processing flow itself shown in FIG. 16 that describes details of the processing of step S1413 shown in FIG. 14A and describes an example of the processing flow to try to free the partition pair pointed to by the partition number, which example of the processing flow is common to the first and second embodiments.

Therefore, the descriptions of processing flow of an overview of the overall processing to try to release an allocated segment and concatenate it with a first-pass allocatable partition, the processing flow to try to release a partition included in the first-pass allocated segment and to concatenate it with a first-pass allocatable partition, and the processing flow to try to free the partition pair pointed to by the partition number are omitted.

Then, an example is described of the processing to search the multi-partition management table using the partition number and obtain the partition level corresponding to that partition number in the second embodiment of this invention.

Figure 24:
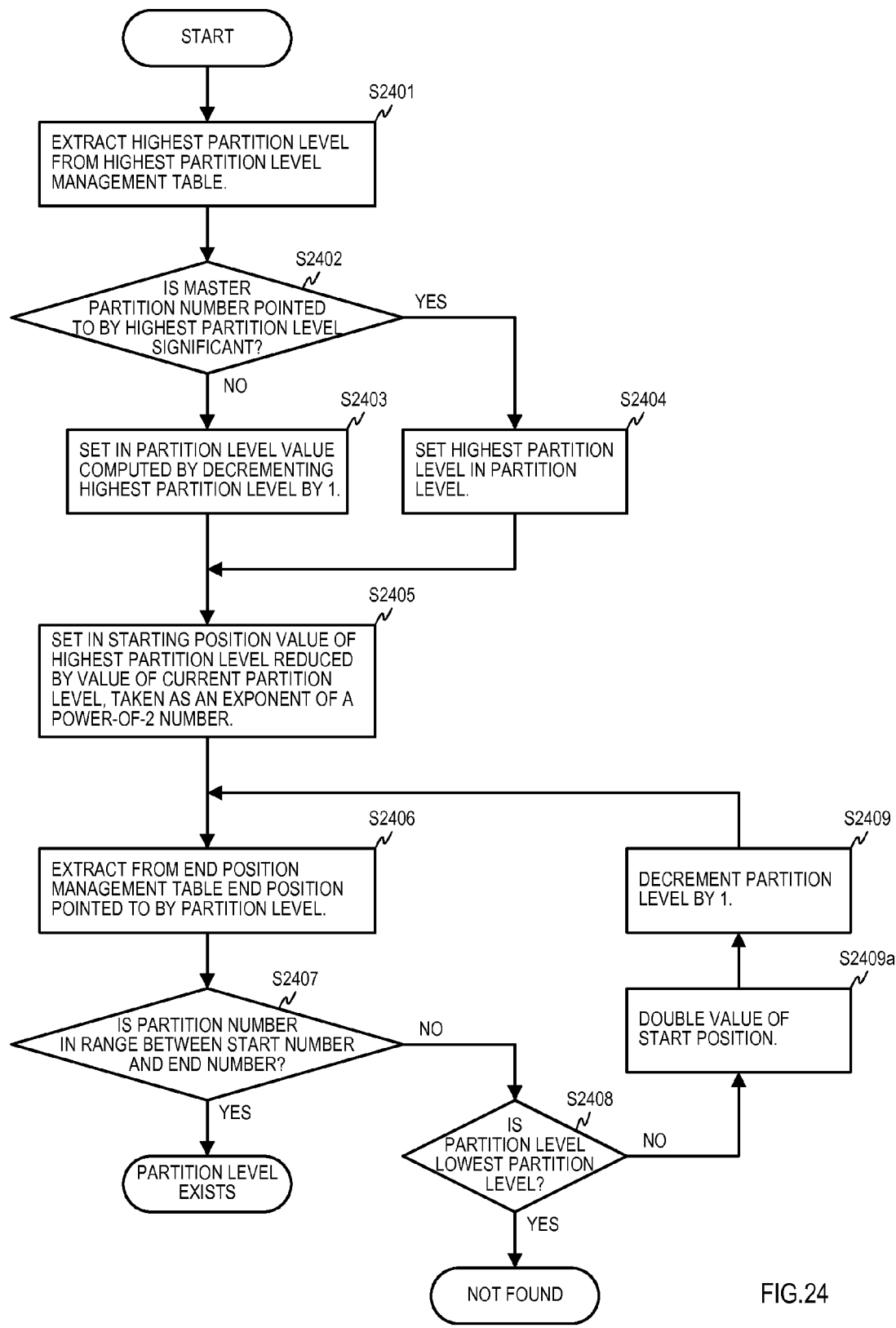
FIG. 24 is a drawing describing an example of processing flow to search a multi-partition management table by means of a partition number and to request a partition level corresponding to the partition number in the second embodiment of this invention.

FIG. 24 is a drawing describing the details of the processing in step S1202 of FIG. 12 and it is a drawing describing one example of the processing flow to search the multi-partition management table using the partition number and obtain the partition level corresponding to that partition number in the second embodiment of this invention.

First, at step S2401, the highest partition level is extracted from the highest partition level management table. Then, at step S2402, a determination is made whether the master partition number in the master partition number management table pointed to by the highest partition level is significant. This determination corresponds to a determination whether the region configuration master partitions table is a single bit configuration or a multibit configuration.

If the result of the determination in step S2402 is negative, that is, region configuration master partitions table is a multibit configuration, at step S2403, the value computed by decrementing the highest partition level by 1 is set in the partition level, and processing proceeds to step S2405. Conversely, if the determination result is positive, at step S2404, the highest partition level is set in the partition level and processing proceeds to step S2405. At step S2405, the value of the highest partition level reduced by the value of the current master partition level, taken as an exponent of a power-of-2 number, is set in the start position.

Next, at step S2406 the end position number pointed to by the partition level is extracted from the end position management table, and at step S2407, a determination is made whether the partition number falls within the range between the start position set at step S2405 and the end position number extracted at step S2406. If this determination is positive, the partition level is returned as "partition level exists" and processing is terminated. If the determination is negative, processing proceeds to step S2408.

At step S2408, a determination is made whether the partition level is the lowest partition level. If the partition level is the lowest partition level, processing is terminated with no appropriate partition level. If the partition level is not the lowest partition level, processing proceeds to step S2409a, wherein the start position is doubled and at step S2409 the partition level is decremented by 1 and a return is made to step S2406.

The processing loop of the above steps S2406 to S2409 is repeated decrementing the partition levels by 1 each, and when in the determination at step S2407 for a given partition level, the partition number is within the range between the start position set in step S2405 or in step S2409a and the end position extracted at step S2406, that partition level is the partition level related to the partition unit pointed to by the partition number. Even if the partition level is the lowest partition level, when the partition number does not fall within the range of the start position set at step S2405 or at step S2409a and the end position number extracted at step S2406, the partition number is invalid, and it can be understood that an appropriate partition level does not exist.

Next, by means of a concrete example, the processing to try to release a partition included in the first-pass allocated segment and to concatenate it with a first-pass allocatable partition in the second embodiment of this invention is described.

Figure 25:
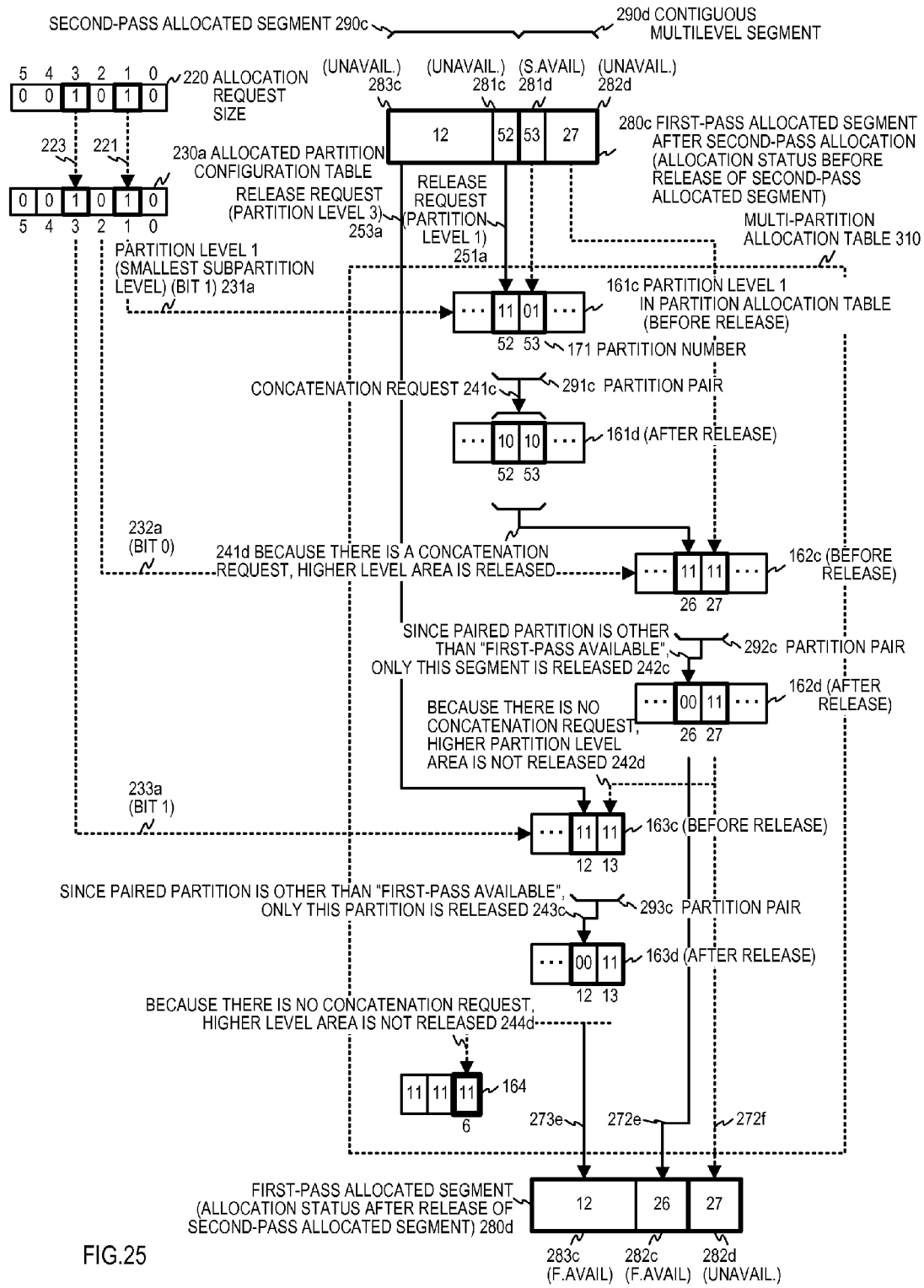
FIG. 25 is a drawing describing, by means of a concrete example, the processing to try to release a partition included in the first-pass allocated segment and to concatenate it with a first-pass allocatable partition in the second embodiment of this invention.

FIG. 25 is a drawing describing, by means of a concrete example, the processing, shown in FIG. 14A and FIG. 16, to try to release a partition included in the first-pass allocated segment and to concatenate it with a first-pass allocatable partition, referencing the multi-partition allocation table 310 shown in FIG. 18B.

The example shown in FIG. 25 is one wherein a second-pass allocated segment, secondary-allocated by a multibit request that is just like the one shown in the example in FIG. 23C, is released and is concatenated with an adjacent partition and the allocation status of the partition at the higher partition level is set to "first-pass available". Thus, the values set in the allocation request size 220 and the allocated partition configuration table 230a are the same as those shown in FIG. 23C.

The first-pass allocated segment 280c after second-pass allocation shown in FIG. 25 is the partition with the allocation statuses before the second-pass allocated segment is released and concatenated, and whereas partition 282d with partition number 21 in the first-pass allocated segment 280c shown in FIG. 23C after second-pass allocation was marked as "second-pass available" here it is marked as "unavailable". The allocation status of partition 281d with partition number 53 remains the same "second-pass available".

The release and concatenation processing is done from partition level 1, which is the minimum partition level, successively to higher partition levels, while referencing the bit values in the allocated partition configuration table 230a.

First, the bit value in allocated partition configuration table 230a corresponding to partition level 1, which is the minimum partition level, is a 1, (shown by the associating dotted-line arrow 231a). In other words, because the release indication is "exists", the processing shown in step S1413 of FIG. 14A, in other words, the processing shown in FIG. 16, is executed. As shown by the arrow 251a for the partition level 1 release request, because the release of partition 281c is guaranteed, and, in the single-level partition allocation table at partition level 1 before release marked with label 161c, "second-pass available" is the allocation status of the partition at partition number 53 paired with the partition whose partition number 171 value is 52, the determination in step S1605 of FIG. 16, described later, becomes affirmative, and the concatenation request (shown by arrow 241c) is made "exists" wherein "first-pass available" is set in the allocation status of the partition at the partition level 1 higher than the partition pair 291c at partition level 1, consisting of the partition at partition number 52 and the partition at partition number 53, and "reserved" is set the allocation statuses of partition number 52 and its pair partition number 53, in the single-level partition allocation table at partition level 1 after release marked with label 161d. When "first-pass available" is set for the partition at the higher partition level, setting "reserved" in the allocation statuses of the partitions included in that partition at a partition level 1 lower is the same as the case of the initial setting of multi-partition allocation table 310 shown in FIG. 18B.

Because the bit value in allocated partition configuration table 230a corresponding to partition level 2 is a 0, (shown by the associating dotted-line arrow 232a) and concatenation request 241c contains "exists", a release request is made for the partition at partition number 26 in the single-level partition allocation table at partition level 2 before release marked with label 162c, which is the partition at the next higher partition as shown by the arrow 241d. Because the partition with partition number 27, which configures the partition pair 292c along with the partition with partition number 26, is "unavailable" the determination in step S1605 of FIG. 16 becomes negative, and a shown by arrow 242c, only the partition with partition number 26 is freed, and the allocation statuses of partition pair 292c become "first-pass available" and "unavailable" as shown by the single-level partition allocation table at partition level 2 after release marked with label 162*d*. Also, the concatenation request becomes "does not exist". Thus, as shown by the dotted-line arrow 242*d*, the partition with partition number 13 whose allocation status is unavailable and which is the higher partition of the partition pair 292*c*, marked with label 163*c*, is not released, as shown in the single-level partition allocation table at partition level 3 before release.

Next, the bit value in allocated partition configuration table 230*a* corresponding to partition level 3 is a 1, (shown by the associating dotted-line arrow 233*a*), and partition 283*c* is released, as shown by the arrow 253*a* for the partition level 3 release request. However, as was noted above, the partition with partition number 13 whose allocation status is "unavailable" was not released and is unavailable. Thus, as shown by the arrow 243*c*, only the partition with partition number 12 that configures the partition pair 293*c* along with the partition with partition number 13 is released, and the allocation statuses of partition pair 293*c* become "first-pass available" and "unavailable" as shown by the single-level partition allocation table at partition level 3 after release marked with label 163*d*. Also, because the concatenation request becomes "does not exist", the partition, as shown by the dotted-line arrow 244*d*, which is the higher partition of the partition pair 293*c* and is the partition with partition number 6 whose allocation status is unavailable is not released and its allocation status remains "unavailable", as shown in the single-level partition allocation table at partition level 4 before release marked with label 164.

By means of the partition release and concatenation processing above, first-pass allocated segment 280*d* whose allocation statuses are those after the second-pass allocated segment has been released has been partitioned into first-pass allocatable partition 283*c* whose partition number is 12, first-pass allocatable partition 282*c* whose partition number is 26, and unavailable partition 282*d* whose partition number is 27, as shown by the arrows 273*e*, 272*e* and dotted-line arrow 272*f* showing the relationship to the allocation statuses in multi-partition allocation table 310.

Figure 26:
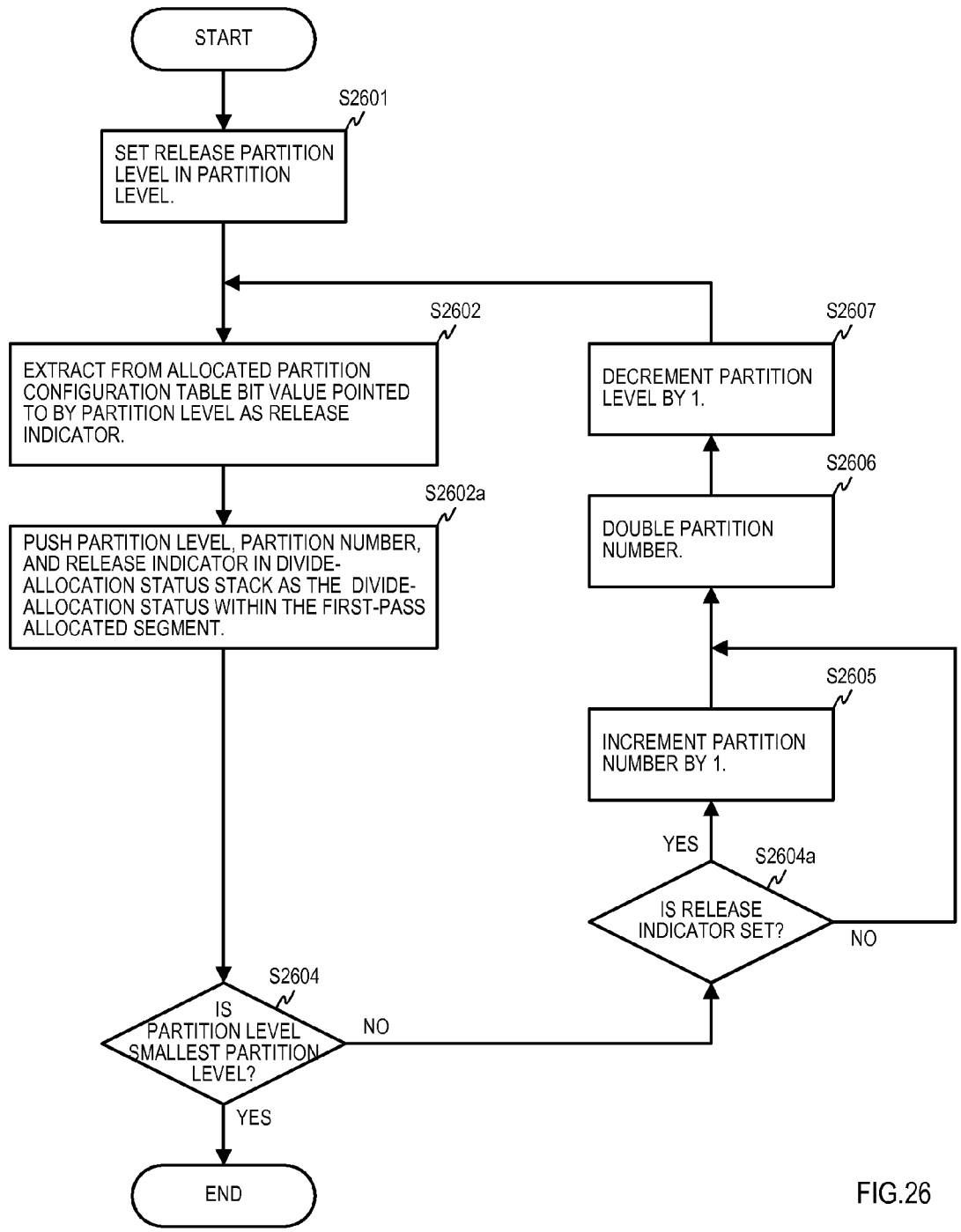
FIG. 26 is a drawing describing an example of processing flow to request a divide-allocation status inside a first-pass allocated segment and push it into the divide-allocation status stack in the second embodiment of this invention.

FIG. 26 is a drawing describing details of the processing of step S1405 in FIG. 14A and is a drawing describing an example of processing flow to request an divide-allocation status inside a first-pass allocated segment, using the allocated partition configuration table, and push it into the divide-allocation status stack in the second embodiment.

First, at step S2601, the release partition level set at step S1204 shown in FIG. 12 is set in the partition level, and processing proceeds to step S2602.

At step S2602, the bit value pointed to by the partition level is extracted from the allocated partition configuration table as the release indication. If the bit value is a 1, the release indication is taken to be "exists", and if the bit value is a 0, the release indication is taken to be "does not exist".

Then, in step S2602*a*, the partition level, the partition number, and the release indication are pushed into the divide-allocation status stack as the divide-allocation status within the first-pass allocated segment.

Next, proceeding to step S2604, a determination is made whether the partition level coincides with the minimum partition level. When the determination is that the partition level is larger than the minimum partition level, processing branches to step S2604*a*, wherein a determination is made whether the release indication is "exists", and if the release indication is not "exists", processing proceeds to step S2606, but if the release indication is "exists", at step S2605, the partition number is incremented by 1, and processing proceeds to step S2606.

At step S2606, the value of the partition number is doubled, and at step S2607, the partition level is decremented by 1, and processing returns to step S2602.

The processing loop of the above steps S2602 to S2607 is repeated until a determination is made in step S2604 that the partition level coincides with the lowest partition level. When the determination in step S2604 is that the partition level coincides with the lowest partition level, processing is terminated.

In the example shown in FIG. 25, because the partition number is initialized to 6 and the partition level is initialized to 4, and the value of the bit in the allocated partition configuration table entry pointed to by partition level 4 is 0, first 4, 6, and 0 (no release indication) are pushed into the divide-allocation status stack as the partition level, partition number, and release indication, respectively.

Because there is no release indication in the processing of partition level 4, the partition number is modified to 6×2=12, and the partition level is modified to 3. Also the value in the bit in the allocated partition configuration table entry pointed to by partition level 3 is 1. Hence 3, 12, and 1 (release indication exists) are pushed into the divide-allocation status stack as the partition level, partition number, and release indication, respectively.

Because the release indication is "exists" in the processing at partition level 3, the partition number is modified to (12+1)×2=26, and the partition level is modified to 2. Also, the bit value pointed to by partition level 2 in the allocated partition configuration table is a 0. Thus, 2, 26, and 0 (release indication "does not exist") are pushed into the divide-allocation status stack as the partition level, the partition number and the release indication, respectively.

Because there is no release indication in the processing of partition level 2, the partition number is modified to 26×2=52. Also, the bit value pointed to by partition level 1 in the allocated partition configuration table is a 1. Thus 1, 52, and 1 (release indication "exists") are pushed into the divide-allocation status stack as the partition level, the partition number and the release indication, respectively.

The example shown in FIG. 25 is one wherein the area allocated by a multibit request is released. If an area allocated by a single-bit request is to be released, the release partition level coincides with the minimum partition level and only a single group of partition level, partition number, and release indication has been pushed into the divide-allocation status stack, and the release indication is "exists".

The release of the allocated segment in the example shown in FIG. 25 is done by means of the partition levels, partition numbers, and release indications pushed into the above noted divide-allocation status stack as the divide-allocation statuses and by the concatenation request initially set as "exists" at step S1205 in FIG. 12 and modified by the processing shown in FIG. 16.

Figure 27A:
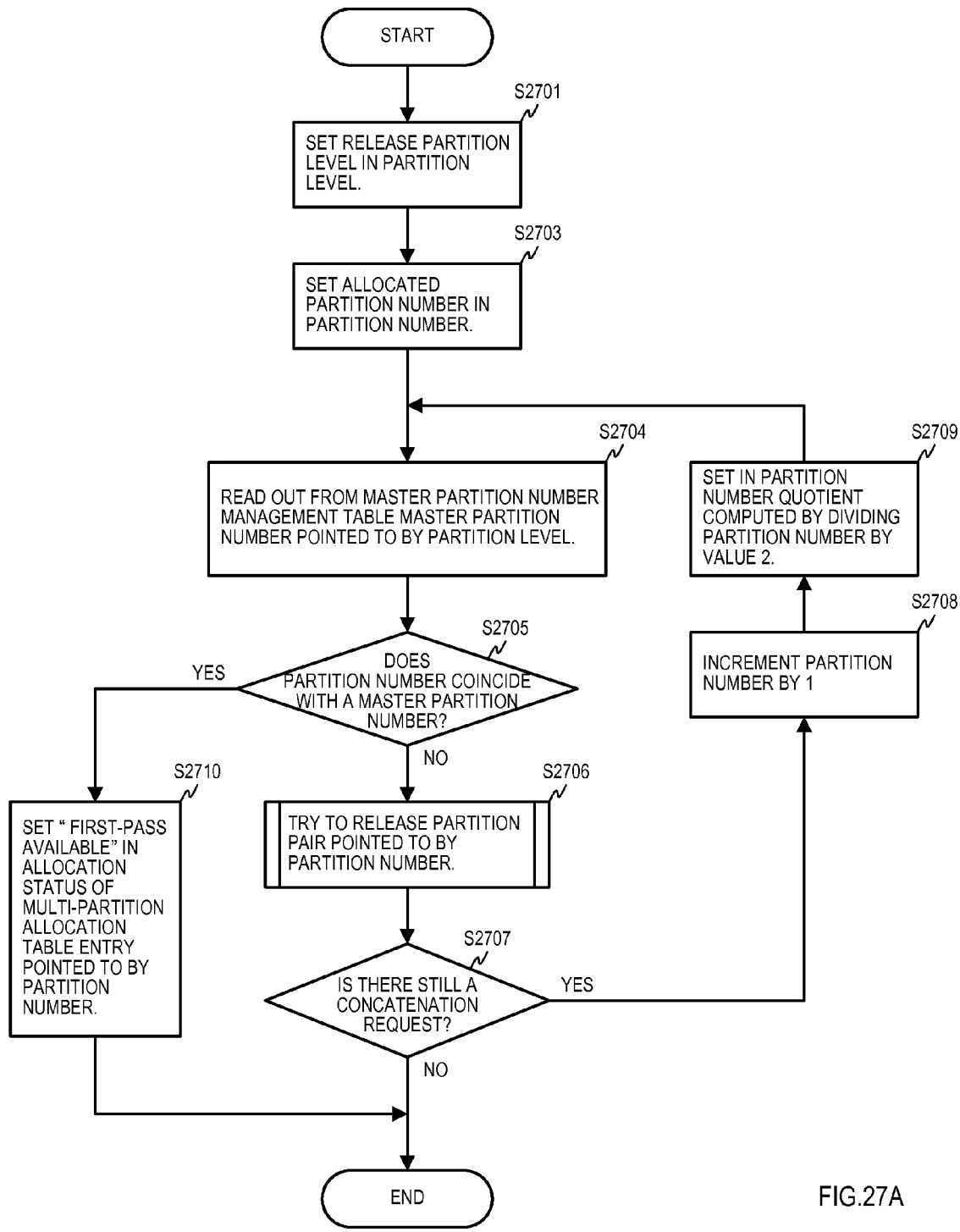
FIG. 27A is a drawing describing an example of the processing flow to try to concatenate a first-pass allocated segment with an adjacent first-pass allocatable partition and to set the allocation status of its higher level partition to first-pass available in the second embodiment of this invention.
Figure 27B:
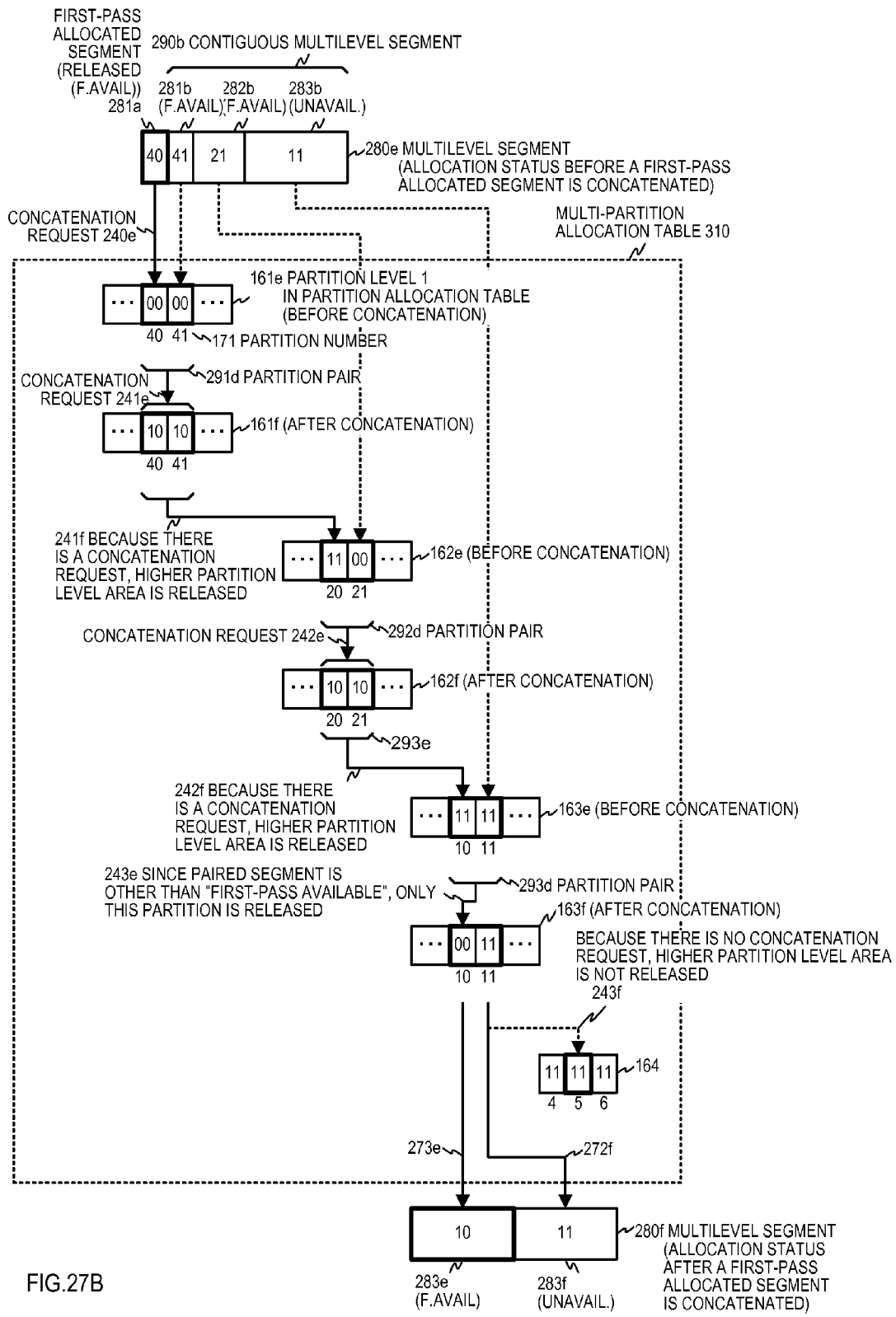
FIG. 27B is a drawing describing, by means of a concrete example, the processing to try to concatenate a first-pass allocated segment with an adjacent first-pass allocatable partition and to set the allocation status of its higher level partition to first-pass available in the second embodiment of this invention.
Figure 27C:
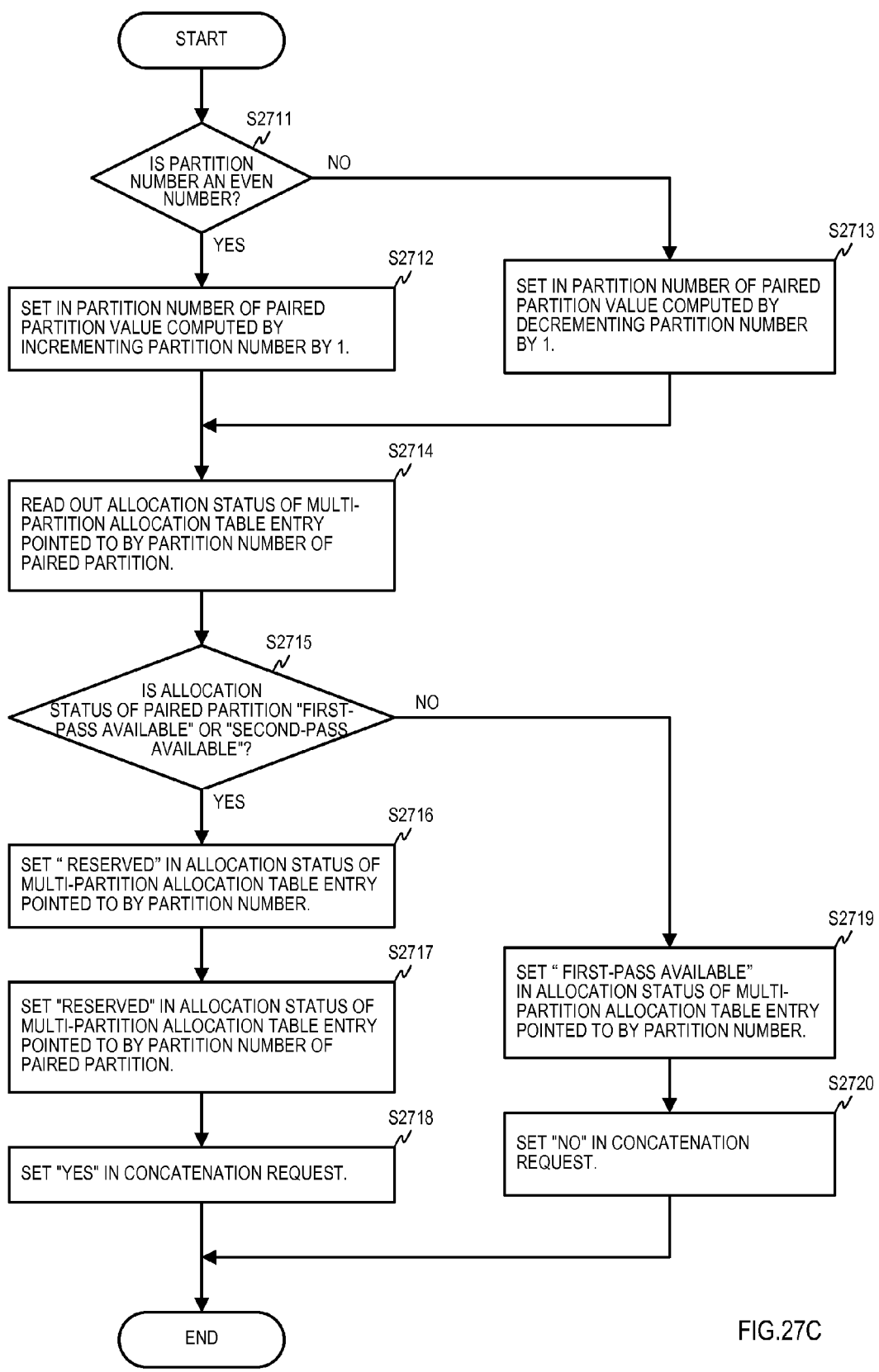
FIG. 27C is a drawing describing an example of the processing flow to try to free the partition pair pointed to by the partition number in the second embodiment of this invention.

Next, details of the processing of step S1208 in FIG. 12 are described referencing FIG. 27A, FIG. 27B, and FIG. 27C.

FIG. 27A is a drawing describing, by means of a concrete example, the processing to try to concatenate a first-pass allocated segment with an adjacent first-pass allocatable partition and to set the allocation status of its higher level partition to first-pass available.

As shown in the drawing, at step S2701, the release partition level is set in the partition level and at step S2703 the allocated partition number is set in the partition number and processing proceeds to step S2704.

At step S2704, the master partition number pointed to by the partition level is extracted from the master partition number management table, and processing proceeds to step S2705. At step S2705, a determination is made whether the partition number coincides with the master partition number. If they coincide, processing branches to step S2710, and if they do not coincide, processing proceeds to step S2706. At step S2706, an attempt is made to free the partition pair pointed to by the partition number. Details of the processing in step S2706 are described below referencing FIG. 27C.

Next, proceeding to step S2707, a determination is made whether the concatenation request is "exists". If the concatenation request is not "exists", because this means that the determination in step S1605 of FIG. 16 was that the allocation status of the paired partition number was neither first-pass available nor second-pass available, partition concatenation processing is terminated, and if the concatenation request is "exists", processing branches to the processing in step S2708 and thereafter, and partition concatenation processing is attempted at a higher partition level.

At step S2708, the partition level is made that of the partition 1 level higher, and proceeding to step S2709, the quotient computed by dividing the partition number by the value 2 is set in the partition number, and processing returns to step S2702. Also, at step S2708, the partition number becomes an even number by the processing at step S2706.

If the determination at step S2705 was that the partition number coincides with the master partition number, a branch is taken to step S2710 wherein "first-pass available" is set in the allocation status of the multi-partition allocation table entry pointed to by the partition number, and processing is terminated. If the partition number coincides with the master partition number, because no partition exists whose partition number is a pair to that partition number, as is clear from the example shown in FIG. 18B, at step S2710, "first-pass available" is set in the allocation status of the multi-partition allocation table entry pointed to by the partition number, and processing is terminated.

FIG. 27B is a drawing describing, by means of a concrete example, the processing, shown in FIG. 27A and in FIG. 27C below, to try to concatenate the first-pass allocated segment with an adjacent first-pass allocatable partition and to set the allocation status of its higher level partition to "first-pass available", referencing the multi-partition allocation table 310 shown in FIG. 18B. Also, in the description below, concatenating a first-pass allocated segment and its adjacent first-pass allocatable partition and making the allocation status of its higher level partition "first-pass available" may be called simply "concatenating".

The example shown in FIG. 27B, just as for the example shown for FIG. 21B, is an example wherein a partition is concatenated with an adjacent partition and the allocation status of its higher level partition is set to "first-pass available" because the partition released was first-allocated by a single-bit request.

In FIG. 27B, a released first-pass allocated segment is made to be a multilevel segment with allocation statuses before concatenation, and the partition with partition number 40 that was marked as provisionally allocated segment 280b after the first-pass allocation shown in FIG. 21B is here shown as released, as well as the multilevel segment 280e wherein partition 283b with partition number 11, which had been "first-pass available" has now become "unavailable". The allocation statuses of the partition 281b with partition number 41 and the partition 282b with the partition number 21 continue to be "first-pass available".

Concatenation processing proceeds successively from partition level 1, which is the release partition level, to a higher partition level wherein concatenation processing is no longer possible. In other words, the released partition 281a with partition number 40 is successively concatenated with partitions that are adjacent and not marked "unavailable".

First, because the determination at step S1207 shown in FIG. 12 is affirmative, the concatenation request shown by arrow 240e is performed for released partition 281a, and the processing is done at partition level 1 which is the release partition level. Because the allocation statuses of the partition in the single-level partition allocation table at partition level 1 marked with label 161e (which partition has partition number 171 with the value 40 and its pair, partition number 172 with the value 41) are both "first-pass available", "first-pass available" is set in the allocation status of the partition at the higher partition level for the partition pair 291d that is composed of the partition with partition number 40 and the partition with partition number 41, the concatenation request (shown by arrow 241e) is made to be "exists", and "reserved" is set in the allocation statuses of partition number 40 and its pair, partition number 41, as shown in single-level partition allocation table at partition level 1 marked with label 161f. As was noted in the description of FIG. 25, when "first-pass available" for a partition at a higher partition level, "reserved" is set in the allocation statuses of partitions at lower partition levels encompassed by that partition, which is the same as the case of the initial setting of the multi-partition allocation table 310 shown in FIG. 18B.

Because there is a concatenation request at partition level 2, a partition release request is issued for partition number 20 in the single-level partition allocation table at partition level 2 which is the higher level partition shown by arrow 241f with the label 162e attached to its status before concatenation. Because the partition for partition number 20 and the partition for partition number 21 which together configure the partition pair 292d are both first-pass available, a concatenation request is taken as existing, as shown by the arrow 242e, and as shown in the single-level partition allocation table for partition level 2 (with label 162f) after concatenation, the allocation statuses of partition number 20 and its pair, partition number 21, are set as "reserved".

Next, because the concatenation request is "exists" at partition level 3, a release request is made for the partition with partition number 10 in the single-level partition allocation table at partition level 2 before concatenation, marked by label 163e, which is the higher partition level partition, as shown by arrow 242f. Because the partition with partition number 10 and the partition with partition number 11 that together configure partition pair 293d are both "unavailable", as shown by arrow 243e, "first-pass available" is only set in the allocation status of the partition with partition number 10, and the allocation statuses of the partition pair 293d shown in the single-level partition allocation table at partition level 3 after concatenation, marked with the label 163f, become first-pass available and unavailable.

Then, because there is no concatenation request, as shown by the dotted-line arrow 243f, the partition with partition number 5, which is the higher level partition and whose allocation status is unavailable, is not released and its allocation status remains unavailable, as shown in the single-level partition allocation table 164 at partition level 4.

By means of the above partition release and concatenation processing, the partitioning status of multilevel segment 280*f* after the first-pass allocated segment has been concatenated with an adjacent first-pass allocatable partition is that it is partitioned into the first-pass allocatable partition 283*e* whose partition number is 10 and the unavailable partition 283*f* whose partition number is 11, as shown by the arrow 273*e* and arrow 272*f* showing the relationship between it and the allocations statuses in multi-partition allocation table 310.

FIG. 27C is a drawing describing details of the processing in step S2706 of FIG. 27A and it describes the processing flow to try to free the partition pair pointed to by the partition number. Here, what is meant by the partition pair pointed to by the partition number is the partition pair belonging to the partition unit identified by the partition number, and as is described hereinbelow, that partition number is not restricted to being the smaller of the two. Saying it differently, the partition number is not restricted to being an even number.

Just as in the processing flow shown in FIG. 27A, the processing steps shown in FIG. 27C are executed at each partition level from the release partition level in the direction of higher partition levels, and an attempt is made to concatenate a first-pass available area and to release an area at a higher partition level.

Just as is shown in the drawing, first, at S2711, a determination is made whether the partition number is an even number. Although the processing flow shown in FIG. 27C is similar to that shown in FIG. 16, in the processing of FIG. 27A, in other words, in the processing of step S1208 in FIG. 12, the partition number is not restricted to being an even number, as was noted above. The reason for that is that the partition number corresponding to a first-pass allocated segment that was released and whose status is first-pass available may at times be an even number and at other times be an odd number. For example, when the partition 283*f*, shown as unavailable in FIG. 27B, is a first-pass allocated segment and it becomes first-pass available, its partition number is 11 and is an odd number.

If the partition number is an even number, at step S2712, the value computed by adding 1 to the partition number is set in the paired partition number, and processing proceeds to step S2714. If the partition number is an odd number, at step S2713, the value computed by decrementing the partition number by 1 is set in the paired partition number, and processing proceeds to step S2714.

At step S2714, the allocation status in the multi-partition allocation table entry pointed to by the pair for the partition number is read out, and at step S2715, a determination is made whether the read-out allocation status is first-pass available or second-pass available. If the read-out allocation status is first-pass available or second-pass available, processing proceeds to step S2716; if the read-out allocation status is not first-pass available or second-pass available, processing branches to step S2719.

At step S2716, "reserved" is set in the allocation status of the multi-partition allocation table entry pointed to by the partition number, and at step S2717, "reserved" is set in the allocation status of the multi-partition allocation table entry pointed to by the paired partition number. Next, at step S2718, "exists" is set in the concatenation request for the partition pair, and processing is terminated. The processing of these steps S2716 to S2718 corresponds to the concatenation request processing shown by the arrows 241*e* and 242*e* in the example shown in FIG. 27B.

Conversely, if a branch is taken at step S2719, the allocation status in the multi-partition allocation table entry pointed to by the partition number is set to be "first-pass available", and at step S2720, "no" is set in the concatenation request, and processing is terminated. This processing corresponds to processing to release only the original partition pointed to by the arrow 243*e*, in the example shown in FIG. 27B.

Next, an example of a function block configuration related to a region management apparatus of this invention is described below.

It is clear that the region management method of this invention can be constructed in a computer by a program executing on a computer, for example, such as on the data processing unit 301 exemplified in FIG. 2B.

Figure 28A:
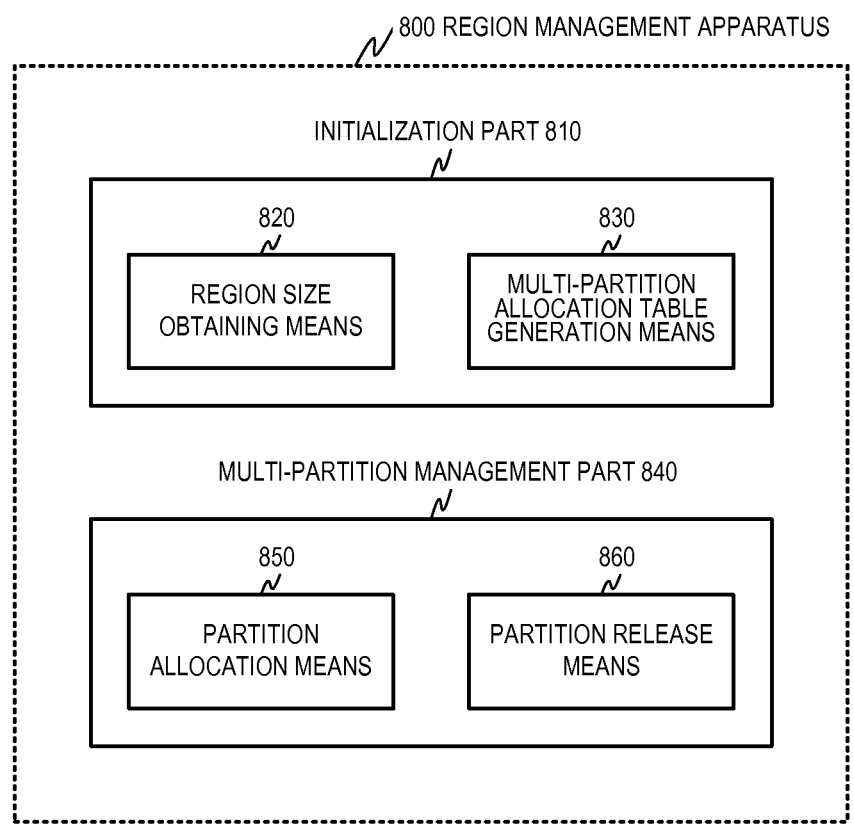
FIG. 28A is a drawing describing an example of a function block configuration of a region management apparatus in one embodiment of this invention.

FIG. 28A is a drawing describing an example of a function block configuration of a region management apparatus in the first and second embodiments of this invention. As shown in the drawing region management apparatus 800 is configured at the highest level from the initialization part 810 and the multi-partition management part 840. The initialization part 810 and the multi-partition management part 840 correspond to the allocation system (initialization part) 101 and the allocation system (multi-partition management part) 102 shown in the example in FIG. 2A.

In the example shown in FIG. 28A, both the initialization part 810 and the multi-partition management part 840 are included in the same region management apparatus 800. However, it will be clear to a person skilled in the art that this invention can be implemented by a region management apparatus that executes initialization processing and another region management apparatus that executes multi-partition management processing, for example, in order to perform a region management for external memory devices.

The initialization part 810 includes the region size obtaining means 820 that obtains the size of regions and the multi-partition allocation table generation means 830. When the region size is expressed as a sum of mutually differing powers of 2 computed from that allocation size and the region allocation unit size, the multi-partition allocation table generation means 830 makes each of the areas with a power-of-2 size configuring that sum into a master partition, and partitions the region by assigning the partitions contiguously in the sequence of their sizes, and divides each of the master partitions into half, successively partitioning the size of each partition down to the region allocation unit size, and generates a multi-partition allocation table holding allocation information that shows the allocation status of each partition corresponding to a partition included in the master partition, and does initialization. The multi-partition allocation table generation means 830 according to the second embodiment of this invention further takes the smallest region with a power-of-2 size encompassing the region as a virtual region and partitions the virtual region into virtual master partitions by means of a partition whose power-of-2 size stipulates the size of that virtual region, and halves that virtual master partition and successively virtually partitions the partitions with each size up to the allocation unit size of the region, and assigns partition numbers, which are used to identify those virtually partitioned virtual partitions, in the partition level sequence of those virtual partitions at the same partition level and in the disposition sequence of those virtual partitions inside the virtual region. The functions of the multi-partition allocation table generation means 830 according to the first embodiment can be enabled by the example of processing flow described referencing FIG. 4A to FIG. 4C, and the functions of the multi-partition allocation table generation means 830 according to the second embodiment can be enabled by the example of processing flow described referencing FIG. 19A to FIG. 19C.

The multi-partition management part 840 includes the partition allocation means 850 that allocates first-pass allocatable partitions to a file or memory area and the partition releasing means 860 that releases an allocated segment from being allocated to a file or memory area.

Figure 28B:
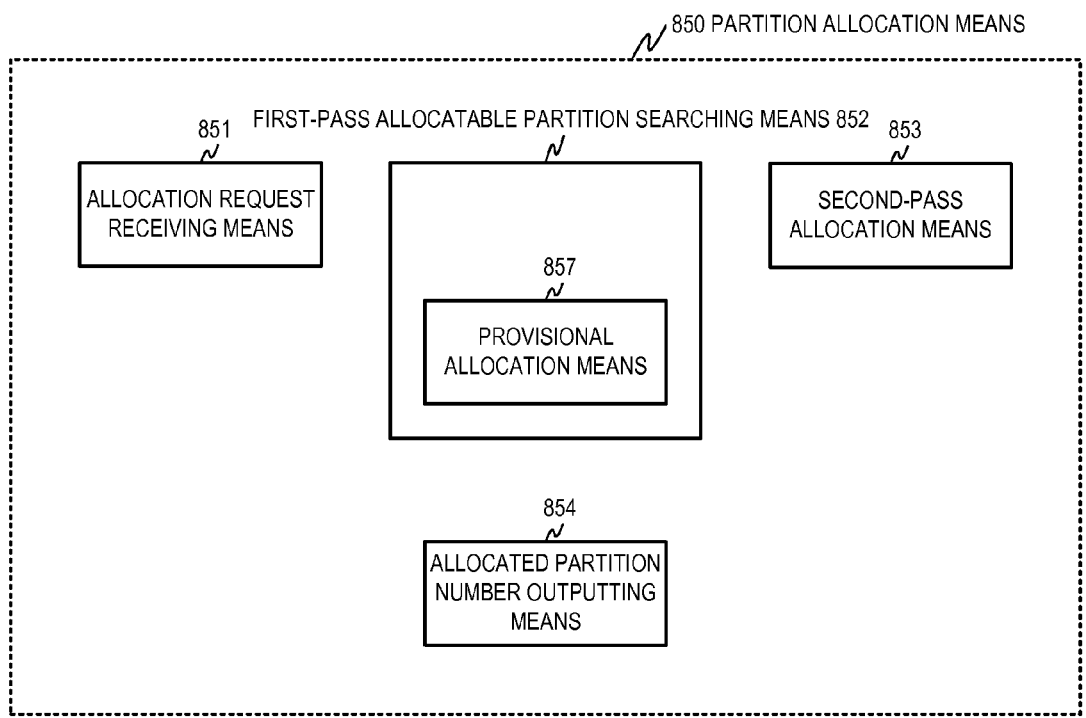
FIG. 28B is a drawing describing an example of a function block configuration of a partition allocation means in one embodiment of this invention.

FIG. 28B is a drawing describing an example of a function block configuration of a partition allocation means in the first and second embodiments of this invention. As shown in the drawing, partition allocation means 850 includes allocation request receiving means 851 that receives allocation requests, first-pass allocatable partition searching means 852, second-pass allocation means 853, and allocated partition number outputting means, and first-pass allocatable partition searching means 852 includes provisional allocation means 857.

The functions of partition allocation means 850 can be enabled by the example of processing flow described referencing FIG. 5.

If the allocation request size, which is the size included in the allocation request, is expressed as a sum of mutually differing powers of 2 computed from that allocation size and the region allocation unit size, and is the sum of the sizes of partitions at differing partition level, the first-pass allocatable partition searching means 852 searches for a first-pass allocated segment that is a first-pass allocatable partition at a partition level 1 higher than the partition level of the largest partition size in the allocation request and whose size is larger than the allocation request size, and if the allocation request size, which is the size included in the allocation request, is expressed as a sum of powers of 2 computed from that allocation size and the region allocation unit size, the first-pass allocatable partition searching means 852 searches for a first-pass allocated segment that is a first-pass allocatable partition with that allocation request size. The functions of the first-pass allocatable partition searching means 852 correspond to the processing flow shown in the example in FIG. 6 and FIG. 9.

If a first-pass allocatable partition cannot be found at the partition level of a first-pass allocated segment, the provisional allocation means 857 in first-pass allocatable partition searching means 852 references the allocation statuses corresponding to partitions at higher partition levels in the multi-partition allocation table, and searches for a first-pass allocatable partition at the higher partition level, and making that partition as a provisionally allocated segment, marks its allocation status in the multi-partition allocation table "unavailable" while dividing the provisionally allocated segment into a first-pass allocated segment and a contiguous multilevel segment that is an allocated area whose contiguous partitions are at a differing partition level in sequence from the smallest partition level in the remaining area, and setting "unavailable" in the allocation status for the multi-partition allocation table entry corresponding to that partition in the first-pass allocated segment, and setting the "first-pass available" status in the allocation status for the multi-partition allocation table entry corresponding to the partition configuring the contiguous multilevel segment. The functions of the provisional allocation means 857 according to the first embodiment corresponds to the processing flow shown in the example in FIG. 7A and FIG. 8A and in FIG. 10A and FIG. 10B, and the functions of the provisional allocation means 857 according to the second embodiment corresponds to the processing flow shown in the example in FIG. 20A and FIG. 21A and in FIG. 22A and FIG. 22B.

If the size of the first-pass allocated segment is larger than the allocation request size, the second-pass allocation means 853 successively divides the first-pass allocated segment into a second-pass allocated segment whose area is allocated contiguously from a partition at a differing partition level, which level is determined successively from the highest partition level, and a contiguous multilevel segment whose allocated area is part of the remaining area and contiguous to a partition at a differing partition level, which level is determined successively from the lowest partition level, and "unavailable" is set in the allocation statuses for multi-partition allocation table entries corresponding to each of the partitions in the second-pass allocated segment, and the "second-pass available" status is set in the allocation status for multi-partition allocation table entry corresponding to the partition configuring the contiguous multilevel segment. The functions of the second-pass allocation means 853 according to the first embodiment correspond to the processing flow shown in the example in FIG. 11A and FIG. 11B, and the functions of the second-pass allocation means 853 according to the second embodiment correspond to the processing flow shown in the example in FIG. 23A and FIG. 345B.

Figure 28C:
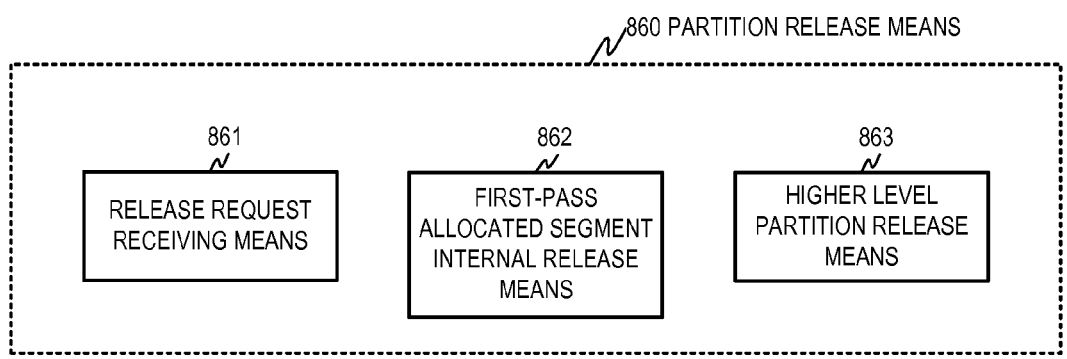
FIG. 28C is a drawing describing an example of a function block configuration of a partition release means in one embodiment of this invention.

FIG. 28C is a drawing describing an example of a function block configuration of a partition release means in the first and second embodiments of this invention. As shown in the drawing, the partition releasing means 860 includes the release request receiving means 851 that receives a release request, the first-pass allocated segment internal release means 862 that tries to release a partition within the first-pass allocated segment, and the higher partition releasing means 863 that tries to release a partition at a partition level higher than the partition level of the first-pass allocated segment.

The functions of the partition releasing means 860 correspond to the processing flow example shown in FIG. 12. If the release request size, which is the size included in the release request, is the sum of the sizes of partitions at differing partition levels, the first-pass allocated segment internal release means 862 obtains the partition number for the smallest partition within the contiguous multilevel segment, and reads out an allocation status from the multi-partition allocation table entry pointed to by that partition number, and if the read-out allocation status is a first-pass available or second-pass available status, sets "reserved" in the allocation statuses for the multi-partition allocation table entries corresponding to the smallest partition within the second-pass allocated segment and the smallest partition within the contiguous multilevel segment while attempting to release the partition at a partition level 1 higher, and if the allocation status of the smallest partition within the contiguous multilevel segment is "unavailable", making the allocation status of the smallest partition within the second-pass allocated segment to be the "first-pass available" status. The functions of the first-pass allocated segment internal release means 862 correspond to the processing flow in the example shown in FIG. 14A.

When a first-pass allocated segment has been released and the allocation status for the multi-partition allocation table entry pointed by its partition number has been made to be the "first-pass available" status, the higher partition releasing means 863 reads out, from the multi-partition allocation table, the allocation status of the partition that is at the same partition level as the first-pass allocated segment and that, when a partition at a partition level 1 higher had been divided into 2, one of those partitions is taken to be the first-pass allocated segment and this partition is the other half of the pair, and if the allocation status of this partition is "first-pass available" or "second-pass available", the higher partition releasing means 863 sets "reserved" in the allocation statuses for the multi-partition allocation table entries corresponding to the former and latter partitions, while trying to release the partition at the higher partition level and, if the allocation status of the partition paired with the partition at the higher level is "unavailable", making the allocation status of the other of the two partitions to be "first-pass available" status. The functions of the higher partition releasing means 863 according to the first embodiment correspond to the processing flow shown in the example in FIG. 17A, and the functions of the higher partition releasing means 863 according to the second embodiment correspond to the processing flow shown in the example in FIG. 27A.

Although the foregoing is a detailed description of a preferred mode of embodying the present invention, the embodiments of the present invention are not limited in this manner, and it will be clear to a person skilled in the art that a variety of modifications thereof are possible. It is clear that the region management method and its art-recognized equivalents in accordance with a preferred mode of embodying the present invention described above can be implemented by a program executing on a computer. Thus that program and a computer-readable storage medium holding the program are included among the preferred embodiments of this invention. Also the storage apparatus managing those regions by the region management method of this invention is included among the preferred embodiments of this invention. And if the storage apparatus includes a medium drive unit and a computer-readable storage medium, the medium whose region is managed by means of the region management method of this invention is included among the preferred embodiments of this invention. As was described above, in accordance with this invention, a storage device can be effectively and efficiently managed regardless of its storage capacity. Also, contiguous areas can be allocated to files by managing in a multilevel way partitions at each partition level using the multi-partition allocation table and multi-partition management table.

What is claimed is:

1. A region management apparatus for managing a region of a storage device comprising:
   an initialization part that includes
      a region size obtaining means that
         obtains a region size, which is a size of the region, and
      a multi-partition allocation table generation means that,
         when the region size is expressed as a product of a sum of mutually differing powers of 2 and a region allocation unit size,
            by means of master partitions whose sizes are products of each power-of-2 configuring the sum and the region allocation unit size,
            partitions a region by dividing the region in a sequence of the sizes of the master partitions, and
            divides each master partition in half, and successively partitions the subdivided partitions with each size down to the region allocation unit size, and
            generates a multi-partition allocation table that, corresponding to each partition including a master partition, holds allocation information expressing allocation statuses of each of the subdivided partitions, and
         performs initialization of the multi-partition allocation table; and
   a multi-partition management part that
      manages the partitioning of each partition based on the allocation information held in the multi-partition allocation table.

2. A region management apparatus according to claim 1, wherein, when the power-of-2 number that prescribes the partition size is made a partition level for a partition,
   the multi-partition allocation table
      holds the partition allocation information in a sequence of partition levels and in the sequence of the partitions arranged in the region at the same partition level, and
   the multi-partition management part
      assigns partition numbers, which are identification numbers that identify the partitions corresponding to the allocation information, in accordance with the stored sequence of the allocation information, and manages the allocation of partitions using the partition numbers.

3. A region management apparatus according to claim 2, wherein the multi-partition allocation table generation means
   sets a "first-pass available" status, which expresses the fact that a partition is "first-pass available" to be used, as an initial value of the allocation information for the master partitions and
   sets a status other than the "first-pass available", which expresses the fact that partition cannot be allocated, as the initial value in allocation information for the partitions obtained by dividing the master partitions.

4. A region management apparatus according to claim 3, wherein the multi-partition management part includes
   an allocation request receiving means that
      receives an allocation request for a file or a memory area that includes a size, and
   a first-pass allocatable partition searching means that,
      if an allocation request size, which is the size included in the allocation request, is expressed as a product of a sum of mutually differing powers of 2 and the region allocation unit size and is the sum of sizes of partitions at differing partition levels,
         searches for, referencing a multi-partition management table, a first-pass allocatable partition that is to be allocated as a first-pass allocated segment at a partition level one higher than the partition level of a largest partition size in the allocation request and that has a size that is larger than the allocation request size and
         makes the partition number corresponding to the first-pass allocated segment to be an allocated partition number, and
      if the allocation request size is expressed as a product of a power of 2 and the region allocation unit size,
         searches for a first-pass allocatable partition as a first-pass allocated segment with the allocation request size and
         makes the partition number corresponding to the first-pass allocated segment to be the allocated partition number, and
   a second pass-allocation means that,
      if the size of the first-pass allocated segment is larger than the allocation request size,
         divides the first-pass allocated segment into
            a second-pass allocated segment whose area is allocated contiguously from partitions at differing partition levels, in the sequence of partition levels, and a contiguous multilevel segment whose area is the remaining area of the first-pass allocated segment and is allocated contiguously to partitions at differing partition levels, which level is determined in reverse order to the sequence of partition levels, and obtains the partition numbers corresponding to each of the partitions in the second-pass allocated segment, and sets "unavailable" in an allocation status of multi-partition allocation table entries corresponding to the partition numbers, and obtains the partition numbers of the partitions configuring the remaining contiguous multilevel segment, and sets a "second-pass available" status in the allocation status of the multi-partition allocation table entries corresponding to the partition numbers, and an allocated partition number outputting means that outputs the allocated partition number as one of allocation results for the file or memory area allocation request, and wherein the partition level of a smallest partition in the second-pass allocated segment coincides with the partition level of a smallest partition in the contiguous multilevel segment, and two smallest partitions are made by dividing in half a partition at a partition level one higher than the above noted partition level in the multi-partition allocation table.

5. A region management apparatus according to claim 4, wherein the first-pass allocatable partition searching means includes a provisional allocation means that, if a first-pass allocatable partition cannot be found at the partition level of the first-pass allocated segment, searches for a first-pass allocatable partition at higher partition levels, referencing allocation statuses corresponding to partitions at the higher partition levels in the multi-partition allocation table, and obtains the partition number of the first-pass allocatable partition, and divides a provisionally allocated segment, which is the segment with that partition number, into a first-pass allocated segment and a contiguous multilevel segment whose area is the remaining area of the provisionally allocated segment and is allocated contiguously to partitions at differing partition levels, in the sequence of partition levels, and obtains the partition numbers of the partitions in the first-pass allocated segment, and sets "unavailable" in the allocation status of the multi-partition allocation table entries corresponding to the partition numbers, and obtains the partition numbers of the partitions configuring the contiguous multilevel segment, and sets the "first-pass available" status in the allocation status of the multi-partition allocation table entries corresponding to the partition numbers.

6. A region management apparatus according to claim 5, if a partition cannot be found with the "first-pass available" status that can be allocated to a file or memory area for which allocation is requested, the first-pass allocatable partition searching means searches the multi-partition allocation table for a partition with the "second-pass available" status.

7. A region management apparatus according to claim 6, wherein the multi-partition management part further includes a release request receiving means that receives a file or memory area release request that includes a size and an allocated partition number, and a first-pass allocated segment internal release means that, if a release size, which is the size included in the release request, is the sum of the sizes of partitions at differing partition levels, obtains the partition number of the smallest partition in the contiguous multilevel segment and reads out the allocation status from the multi-partition allocation table entry pointed to by that partition number, and if the read-out allocation status is the "first-pass available" status or the "second-pass available" status, sets a status other than the "first-pass available" status or the "second-pass available" status in the allocation status of the multi-partition allocation table entries corresponding to the smallest partition in the second-pass allocated segment and the smallest partition in the contiguous multilevel segment, while trying to release the partition at a partition level one higher than that of the smallest partitions, and if the allocation status of the smallest partition in the contiguous multilevel segment is "unavailable", makes the allocation status of the smallest partition in the second-pass allocated segment to be the "first-pass available" status, and a higher level partition releasing means that, when the first-pass allocated segment has been released and the allocation status in the multi-partition allocation table entry pointed to by its partition number has been made the "first-pass available" status, reads out, from the multi-partition allocation table, the allocation status of the partition that is at the same partition level as the first-pass allocated segment and that, when a partition at a partition level one higher is divided into two partitions and one of the subdivided partitions is taken to be the first-pass allocated segment, is the other of the subdivided partitions, and if the allocation status of the other of the subdivided partitions is the "first-pass available" or the "second-pass available", sets a status other than the "first-pass available" or the "second-pass available" in the allocation statuses for the multi-partition allocation table entries corresponding to the one and the other of the subdivided partitions, while trying to release the partition at the higher partition level, and if the allocation status of the other of the subdivided partitions is "unavailable", makes the allocation status of the one of the subdivided partitions to be the "first-pass available" status.

8. A region management method for managing a region of a storage device comprising:

a region size obtaining step that
obtains a region size, which is a size of the region;
a master partitioning step that,
when the region size is expressed as a product of a sum of mutually differing powers of 2 and a region allocation unit size,
by means of master partitions whose sizes are products of each of the power-of-2 values configuring that sum and the region allocation unit size,
partitions a region by dividing the region in a sequence of the sizes of the master partitions;
a multi-partition allocation table generating step that partitions each master partition
by dividing each in half and successively partitioning each size of the subdivided partitions down to the region allocation unit size, and
generates a multi-partition allocation table
holding allocation information expressing an allocation status of each of the partitions corresponding to each of the partitions including the master partitions; and
a multi-partition management step that
manages the allocation of each partition based on the allocation information held in the multi-partition allocation table.

9. A region management method according to claim 8, wherein when the power-of-2 number that prescribes the partition size is made a partition level for a partition,
the multi-partition allocation table
holds the partition allocation information in a sequence of partition levels and in the sequence of the partitions arranged in the region at the same partition level, and
the multi-partition management step
assigns partition numbers, which are identification numbers that identify the partitions corresponding to the allocation information, in accordance with the stored sequence of the allocation information, and
manages the allocation of partitions using the partition numbers.

10. A region management method according to claim 9, wherein the multi-partition allocation table generation step
sets a "first-pass available" status, which expresses the fact that a partition is "first-pass available" to be used, as the initial value of the allocation information for the master partitions and
sets a status other than the "first-pass available", which expresses the fact that partition cannot be allocated, as an initial value in allocation information for the partitions obtained by dividing the master partitions.

11. A region management method according to claim 10, wherein the multi-partition management step includes steps of
an allocation request receiving step that
receives an allocation request for a file or a memory area that includes a size, and
a first-pass allocatable partition searching step that,
if an allocation request size, which is the size included in the allocation request, is expressed as a product of a sum of mutually differing powers of 2 and a region allocation unit size and is the sum of sizes of partitions at differing partition levels,
searches for, referencing a multi-partition management table, a first-pass allocatable partition that is to be allocated as a first-pass allocated segment at a partition level one higher than the partition level of a largest partition size in the allocation request and that has a size that is larger than the allocation request size and
makes the partition number corresponding to the first-pass allocated segment to be an allocated partition number, and
if the allocation request size is expressed as a product of a power of 2 and the region allocation unit size,
searches for a first-pass allocatable partition as a first-pass allocated segment with the allocation request size, and
makes the partition number corresponding to the first-pass allocated segment to be the allocated partition number, and
a second-pass allocation step that,
if the size of the first-pass allocated segment is larger than the allocation request size,
divides the first-pass allocated segment into
a second-pass allocated segment whose area is allocated contiguously from partitions at differing partition levels, in the sequence of partition levels, and
a contiguous multilevel segment whose area is the remaining area of the first-pass allocated segment and is allocated contiguously to partitions at differing partition levels, which level is determined in reverse order to the sequence of partition levels, and
obtains the partition numbers corresponding to each of the partitions in the second-pass allocated segment, and
sets "unavailable" in an allocation status of multi-partition allocation table entries corresponding to the partition numbers, and
obtains the partition numbers of the partitions configuring the contiguous multilevel segment, and
sets a "second-pass available" status in the allocation status of the multi-partition allocation table entries corresponding to the partition numbers, and
an allocated partition number outputting step that
outputs the allocated partition number as one of allocation results for the file or memory area allocation request, and
wherein
the partition level of a smallest partition in the second-pass allocated segment coincides with the partition level of a smallest partition in the contiguous multilevel segment, and
two smallest partitions are made by dividing in half a partition at a partition level one higher than the above noted partition level in the multi-partition allocation table.

12. A region management method according to claim 11, wherein the first-pass allocatable partition searching step includes
a provisional allocation step that,
if a first-pass allocatable partition cannot be found at the partition level of the first-pass allocated segment,
searches for a first-pass allocatable partition at higher partition levels, referencing allocation statuses corresponding to partitions at the higher partition levels in the multi-partition allocation table, and
obtains the partition number of the first-pass allocatable partition, and
divides a provisionally allocated segment, which is the segment with that partition number, into
a first-pass allocated segment and a contiguous multilevel segment whose area is the remaining area of the provisionally allocated segment and is allocated contiguously to partitions at differing partition levels, in the sequence of partition levels, and
obtains the partition numbers of the partitions in the first-pass allocated segment, and
sets "unavailable" in the allocation status of the multi-partition allocation table entries corresponding to the partition numbers, and
obtains the partition numbers of the partitions configuring the contiguous multilevel segment, and
sets the "first-pass available" status in the allocation status of the multi-partition allocation table entries corresponding to the partition numbers.

13. A region management method according to claim 12, wherein if a partition cannot be found with the "first-pass available" status that can be allocated to a file or memory area for which allocation is requested,
the first-pass allocatable partition searching step
searches the multi-partition allocation table for a partition with the "second-pass available" status.

14. A region management method according to claim 13, the multi-partition management step includes steps of
a release request receiving step that
receives a release request for a file or memory area that includes a size and an allocation partition number, and
a first-pass allocated segment internal release step that,
if a release size, which is the size included in the release request, is the sum of the sizes of partitions at differing partition levels,
obtains the partition number of the smallest partition in the contiguous multilevel segment and reads out the allocation status from a multi-partition allocation table entry pointed to by that partition number, and
if the read-out allocation status is the "first-pass available" status or the "second-pass available" status,
sets a status other than the "first-pass available" status or the "second-pass available" status in the allocation status of multi-partition allocation table entries corresponding to the smallest partition in the second-pass allocated segment and the smallest partition in the contiguous multilevel segment,
while trying to release the partition at a partition level one higher than that of the smallest partitions, and
if the allocation status of the smallest partition in the contiguous multilevel segment is "unavailable",
makes the allocation status of the smallest partition in the second-pass allocated segment to be the "first-pass available" status, and
a higher level partition releasing step that
when the first-pass allocated segment has been released and the allocation status in the multi-partition allocation table entry pointed to by its partition number has been made the "first-pass available" status,
reads out, from the multi-partition allocation table, the allocation status of the partition
that is at the same partition level as the first-pass allocated segment and
that, when a partition at a partition level one higher is divided into two partitions and one of the subdivided partitions is taken to be the first-pass allocated segment, is the other of the subdivided partition, and
if the allocation status of the other of the subdivided partition is the "first-pass available" or the "second-pass available",
sets a status other than the "first-pass available" or the "second-pass available" in the allocation statuses for the multi-partition allocation table entries corresponding to the one and the other of the subdivided partitions,
while trying to release the partition at the higher partition level and,
if the allocation status of the other of the subdivided partitions is "unavailable",
makes the allocation status of the other of the two partitions to be the "first-pass available" status.

15. A non-transitory computer-readable storage medium storing a program that executes on a computer the region management method according to claim 8.

16. A storage device wherein the region is managed by the region management method according to claim 8.

17. A non-transitory computer-readable storage medium whose region is managed by the region management method according to claim 8 wherein the storage device includes a medium drive unit and a computer-readable storage medium.

18. A region management apparatus for managing a region of a storage device comprising:
a region size obtaining means that
obtains a region size, which is a size of the region;
a multi-partition allocation table generation means that,
when the region size is expressed as a product of a sum of mutually differing powers of 2 and a region allocation unit size,
by means of master partitions whose sizes are products of each power-of-2 configuring the sum and the region allocation unit size,
partitions a region by dividing the region in a sequence of the sizes of the master partitions, and
divides each master partition in half, and successively partitions the subdivided partitions with each size down to the region allocation unit size, and
generates a multi-partition allocation table that,
corresponding to each partition including a master partition, holds allocation information expressing allocation statuses of each of the subdivided partitions, and
performs initialization; and
when an exponent part of the power-of-2 that prescribes the partition size is taken to be a partition level of the partition,
the multi-partition allocation table
contains allocation information for partitions in a sequence of the partition levels and in a sequence of the partition arranged in the region at the same partition level, and
the multi-partition allocation table generation means
sets a "first-pass available" status, which expresses the fact that a partition is "first-pass available" to be used, as an initial value of the allocation information for the master partitions and
sets a status other than the "first-pass available", which expresses the fact that partition cannot be allocated, as the initial value in allocation information for the partitions obtained by dividing the master partitions.

19. A region management apparatus for managing a region of a storage device comprising:
a tangible non-transitory computer-readable storage apparatus having a multi-partition allocation table that,
when a region size, which is a size of the region, is expressed as a product of a sum of mutually differing powers of 2 and a region allocation unit size,
holds allocation information expressing an allocation status for each of the partitions allocated when a region is partitioned by dividing the region in a sequence of the sizes by means of master partitions whose sizes are products of each power-of-2 configuring the sum and the region allocation unit size, and each master partition is divided in half, and the subdivided partitions are successively partitioned in half down to the region allocation unit size, and
when an exponent part of the power-of-2 that prescribes the partition size is taken to be a partition level of the partition,
contains allocation information for partitions in the sequence of their partition levels and in a sequence of their disposition within that level, and specifies
a "first-pass available" status, which expresses the fact that a partition is "first-pass available" to be used, as an initial value of the allocation information for the master partitions and
a status other than the "first-pass available", which expresses the fact that partition cannot be allocated, as the initial value in allocation information for the partitions obtained by dividing the master partitions;
a multi-partition management part that
manages the allocation of each partition based on the allocation information stored in the multi-partition allocation table; and wherein
the multi-partition management part
assigns partition numbers, which are identification numbers that identify the partitions corresponding to the allocation information, in accordance with the stored sequence of the allocation information, and manages the allocation of partitions using the partition numbers.

20. A region management apparatus according to claim 19, wherein the multi-partition management part includes
an allocation request receiving means that
receives an allocation request for a file or a memory area that includes a size, and
a first-pass allocatable partition searching means that,
if an allocation request size, which is the size included in the allocation request, is expressed as a product of a sum of mutually differing powers of 2 and a region allocation unit size and is the sum of sizes of partitions at differing partition levels,
searches for, referencing a multi-partition management table, a first-pass allocatable partition that is to be allocated as a first-pass allocated segment at a partition level one higher than the partition level of a largest partition size in the allocation request and that has a size that is larger than the allocation request size, and
makes the partition number corresponding to the first-pass allocated segment to be an allocated partition number, and
if the allocation request size-is expressed a product of a power of 2 and the region allocation unit size,
searches for a first-pass allocatable partition as a first-pass allocated segment with the allocation request size and
makes the partition number corresponding to the first-pass allocated segment to be the allocated partition number, and
a second-pass allocation means that,
if the size of the first-pass allocated segment is larger than the allocation request size,
divides the first-pass allocated segment into
a second-pass allocated segment whose area is allocated contiguously from partitions at differing partition levels, in the sequence of partition levels, and
a contiguous multilevel segment whose area is the remaining area of the first-pass allocated segment and is allocated contiguously to partitions at differing partition levels, which level is determined in reverse order to the sequence of partition levels, and
obtains the partition numbers corresponding to each of the partitions in the second-pass allocated segment, and
sets "unavailable" in the allocation status of multi-partition allocation table entries corresponding to the partition numbers, and
obtains the partition numbers of the partitions configuring the contiguous multilevel segment, and
sets a "second-pass available" status in the allocation status of the multi-partition allocation table entries corresponding to the partition numbers, and
an allocated partition number outputting means that
outputs the allocated partition number as one of allocation results for the file or memory area allocation request, and
wherein
the partition level of a smallest partition in the second-pass allocated segment coincides with the partition level of a smallest partition in the contiguous multilevel segment and
two smallest partitions are made by dividing in half a partition at a partition level one higher than the above noted partition level in the multi-partition allocation table.

21. A region management apparatus according to claim 20, wherein the first-pass allocatable partition searching means includes
a provisional allocation means that,
if a first-pass allocatable partition cannot be found at the partition level of the first-pass allocated segment,
searches for a first-pass allocatable partition at higher partition levels, referencing allocation statuses corresponding to partitions at the higher partition levels in the multi-partition allocation table, and
obtains the partition number of the first-pass allocatable partition, and
divides a provisionally allocated segment, which is the segment with that partition number, into
a first-pass allocated segment and
a contiguous multilevel segment whose area is the remaining area of the provisionally allocated segment and is allocated contiguously to partitions at differing partition levels, in the sequence of partition levels, and
obtains the partition numbers of the partitions in the first-pass allocated segment, and sets "unavailable" in the allocation status of the
multi-partition allocation table entries corresponding to the partition numbers, and
obtains the partition numbers of the partitions configuring the contiguous multilevel segment, and
sets the "first-pass available" status in the allocation status of the multi-partition allocation table entries corresponding to the partition numbers.

22. A region management apparatus according to claim 21, wherein if a partition cannot be found with the "first-pass available" status that can be allocated to a file or memory area for which allocation is requested,
the first-pass allocatable partition searching means
searches the multi-partition allocation table for a partition with the "second-pass available" status.

23. A region management apparatus according to claim 22, the multi-partition management part further includes
a release request receiving means that
receives a file or memory area release request that includes a size and an allocated partition number, and
a first-pass allocated segment internal release means that,
if a release size, which is the size included in the release request, is the sum of the sizes of partitions at differing partition levels,
obtains the partition number of the smallest partition in the contiguous multilevel segment and
reads out the allocation status from the multi-partition allocation table entry pointed to by that partition number, and
if the read-out allocation status is the "first-pass available" status or the "second-pass available" status,
sets a status other than the "first-pass available" status or the "second-pass available" status in the allocation status of the multi-partition allocation table entries corresponding to the smallest partition in the second-pass allocated segment and the smallest partition in the contiguous multilevel segment,
while trying to release the partition at a partition level one higher than that of the smallest partitions, and
if the allocation status of the smallest partition in the contiguous multilevel segment is "unavailable",
makes the allocation status of the smallest partition in the second-pass allocated segment to be the "first-pass available" status, and
a higher level partition releasing means that,
when the first-pass allocated segment has been released and the allocation status in the multi-partition allocation table entry pointed to by its partition number has been made the "first-pass available" status,
reads out, from the multi-partition allocation table, the allocation status of the partition
that is at the same partition level as the first-pass allocated segment and
that, when a partition at a partition level one higher is divided into two partitions and one of the subdivided partitions is taken to be the first-pass allocated segment, is the other of the subdivided partitions, and
if the allocation status of the other of the subdivided partitions is the "first-pass available" or the "second-pass available",
sets a status other than "first-pass available" or the "second-pass available" in the allocation statuses for the multi-partition allocation table entries corresponding to the one and the other of the subdivided partitions,
while trying to release the partition at the higher partition level, and
if the allocation status of the other of the subdivided partitions is "unavailable",
makes the allocation status of the one of the subdivided partitions to be the "first-pass available" status.

24. A region management method executed by a region management apparatus for managing a region of a storage device comprising:
a region size obtaining step that
obtains a region size, which is a size of the region;
a master partitioning step that,
when the region size is expressed as a product of a sum of mutually differing powers of 2 and a region allocation unit size,
by means of master partitions whose sizes are products of each of the power-of-2 values configuring the sum and the region allocation unit size,
partitions a region by dividing the region in a sequence of the sizes of the master partitions;
a multi-partition allocation table generating step that
partitions each master partition
by dividing each in half and successively partitioning each size of the subdivided partitions down to the region allocation unit size, and
generates a multi-partition allocation table
holding allocation information expressing an allocation status of each of the partitions corresponding to each of the partitions including the master partitions; and wherein,
when the power-of-2 number that prescribes the partition size is made a partition level for a partition,
the multi-partition allocation table
holds allocation information for partitions in a sequence of partition levels and in the sequence of the partitions arranged in the region at the same partition level, and the multi-partition allocation table generation step
sets a "first-pass available" status, which expresses the fact that a partition is "first-pass available" to be used, as an initial value of the allocation information for the master partitions and
sets a status other than the "first-pass available", which expresses the fact that partition cannot be allocated, as the initial value in allocation information for the partitions obtained by dividing the master partitions.

25. A region management method executed by a region management apparatus according to claim 19, comprising:
an allocation request receiving step that
receives an allocation request for a file or a memory area that includes a size;
a first-pass allocatable partition searching step that,
if an allocation request size, which is the size included in the allocation request, is expressed as a product of a sum of mutually differing powers of 2 and the region allocation unit size and is the sum of sizes of partitions at differing partition levels,
searches for, referencing a multi-partition management table, a first-pass allocatable partition that is to be allocated as a first-pass allocated segment at a partition level one higher than the partition level of the largest partition size in the allocation request and that has a size that is larger than the allocation request size, and makes the partition number corresponding to the first-pass allocated segment to be an allocated partition number, and if the allocation request size is expressed as a product of a power of 2 and the region allocation unit size, searches for a first-pass allocatable partition as a first-pass allocated segment with the allocation request size and makes the partition number corresponding to the first-pass allocated segment to be the allocated partition number;

a second-pass allocation step that, if the size of the first-pass allocated segment is larger than the allocation request size, divides the first-pass allocated segment into a second-pass allocated segment whose area is allocated contiguously from partitions at differing partition levels, in a sequence of partition levels, and a contiguous multilevel segment whose area is the remaining area of the first-pass allocated segment and is allocated contiguously to partitions at differing partition levels, which level is determined in reverse order to the sequence of partition levels, and obtains the partition numbers corresponding to each of the partitions in the second-pass allocated segment, and sets "unavailable" in an allocation status of multi-partition allocation table entries corresponding to the partition numbers, and obtains the partition numbers of the partitions configuring the remaining contiguous multilevel segment, and sets a "second-pass available" status in the allocation status of the multi-partition allocation table entries corresponding to the partition numbers; and an allocated partition number outputting step that outputs the allocated partition number as one of allocation results for the file or memory area allocation request.

26. A region management method according to claim 25, wherein the partition level of the smallest partition in the second-pass allocated segment coincides with the partition level of the smallest partition in the contiguous multi-level segment, and two smallest partitions are made by dividing in half a partition at a partition level one higher than the above noted partition level in the multi-partition allocation table.

27. A region management method according to claim 26, wherein the first-pass allocatable partition searching step includes a provisional allocation step that, if a first-pass allocatable partition cannot be found at the partition level of the first-pass allocated segment, searches for a first-pass allocatable partition at higher partition levels, referencing allocation statuses corresponding to partitions at the higher partition levels in the multi-partition allocation table, and obtains the partition number of the first-pass allocatable partition, and divides a provisionally allocated segment, which is the segment with that partition number, into a first-pass allocated segment and a contiguous multilevel segment whose area is the remaining area of the provisionally allocated segment and is allocated contiguously to partitions at differing partition levels, in the sequence of partition levels, and obtains the partition numbers of the partitions in the first-pass allocated segment, and sets "unavailable" in the allocation status of the multi-partition allocation table entries corresponding to the partition numbers, and obtains the partition numbers of the partitions configuring the contiguous multilevel segment, and sets the "first-pass available" status in the allocation status of the multi-partition allocation table entries corresponding to the partition numbers.

28. A region management method according to claim 27, wherein if a partition cannot be found with the "first-pass available" status that can be allocated to a file or memory area for which allocation is requested, the first-pass allocatable partition searching step searches the multi-partition allocation table for a partition with the "second-pass available" status.

29. A storage area release method for releasing a file or memory area allocated within a region managed by the region management method according to claim 28, comprising:

a release request receiving step that receives a file or memory area release request that includes a size and an allocation partition number;

a first-pass allocated segment internal release step that, if a release size, which is the size included in the release request, is the sum of the sizes of partitions at differing partition levels, obtains the partition number of the smallest partition in the contiguous multilevel segment, and reads out the allocation status from a multi-partition allocation table entry pointed to by that partition number, and if the read-out allocation status is the "first-pass available" status or the "second-pass available" status sets a status other than the "first-pass available" status or the "second-pass available" status in the allocation status of multi-partition allocation table entries corresponding to the smallest partition in the second-pass allocated segment and the smallest partition in the contiguous multilevel segment, while trying to release the partition at a partition level one higher than that of the smallest partitions, and if the allocation status of the smallest partition in the contiguous multilevel segment is "unavailable", makes the allocation status of the smallest partition in the second-pass allocated segment to be the "first-pass available" status; and a higher level partition releasing step that, when the first-pass allocated segment has been released and the allocation status in the multi-partition allocation table entry pointed to by its partition number has been made the "first-pass available" status, reads out, from the multi-partition allocation table, the allocation status of the partition that is at the same partition level as the first-pass allocated segment and that, when a partition at a partition level one higher is divided into two partitions and one of the subdivided partitions is taken to be the first-pass allocated segment, is the other of the subdivided partitions, and if the allocation status of this partition is the "first-pass available" or the "second-pass available", sets a status other than the "first-pass available" or the "second-pass available" in the allocation statuses for the multi-partition allocation table entries corresponding to the one and the other of the subdivided partitions, while trying to release the partition at the higher partition level, and if the allocation status of the other of the subdivided partitions is "unavailable", makes the allocation status of the one of the subdivided partitions to be the "first-pass available" status.

30. A non-transitory computer-readable storage medium storing a program that executes on a computer the region management method according to claim 24.

31. A non-transitory computer-readable storage medium storing a program that executes on a computer the region management method according to claim 25.

32. A storage device wherein the region is managed by the region management method according to claim 24.

33. A storage device wherein the region is managed by the region management method according to claim 25.

34. A non-transitory computer-readable storage medium whose region is managed by the region management method according to claim 24 wherein the storage device includes a medium drive unit and a computer-readable storage medium.

35. A non-transitory computer-readable storage medium whose region is managed by the region management method according to claim 25 wherein the storage device includes a medium drive unit and a computer-readable storage medium.

36. A non-transitory computer-readable storage medium storing a data configuration for managing a region of a storage device, the data configuration comprising:

a multi-partition allocation table that, when a region size, which is a size of the region, is expressed as a product of a sum of mutually differing powers of 2 and a region allocation unit size, holds allocation information expressing an allocation status for each of the partitions allocated when a region is partitioned by dividing the region in a sequence of the sizes by means of master partitions whose sizes are products of each power-of-2 configuring the sum and the region allocation unit size, and each master partition is divided in half, and the subdivided partitions are successively partitioned in half down to the region allocation unit size, and when an exponent part of the power-of-2 that prescribes the partition size is taken to be a partition level of the partition, contains allocation information for partitions in a sequence of their partition levels and in a sequence of their disposition within that level, and specifies a "first-pass available" status, which expresses the fact that a partition is "first-pass available" to be used, as an initial value of the allocation information for the master partitions and a status other than the "first-pass available", which expresses the fact that partition cannot be allocated, as the initial value in allocation information for the partitions obtained by dividing the master partitions; and the data configuration enables management of a region that manages the allocation of the partitions using partition numbers, which are identification numbers that identify the partitions corresponding to the allocation information, and are assigned in accordance with the stored sequence of the allocation information.

37. A region management apparatus for managing a region of a storage device comprising:

an initialization part that includes a region size obtaining means that obtains a region size, which is a size of the region, and a multi-partition allocation table generation means that, when the region size is expressed as a product of a sum of mutually differing powers of 2 and a region allocation unit size, by means of master partitions whose sizes are products of each power-of-2 configuring the sum and the region allocation unit size, partitions a region by dividing the region in a sequence of the sizes of master partitions, and divides each master partition in half, and successively partitions the subdivided partitions with each size down to the region allocation unit size, and generates a multi-partition allocation table that, corresponding to each partition including a master partition, holds allocation information expressing allocation statuses of each of the subdivided partitions, and performs initialization of the multi-partition allocation table;

a multi-partition management part that manages the partitioning of each partition based on the allocation information held in the multi-partition allocation table; and wherein when the power-of-2 exponent that prescribes the partition size is made a partition level for a partition, the multi-partition allocation table holds the partition allocation information in a sequence of partition levels and in the sequence of the partitions arranged in the region at the same partition level, and the multi-partition table generation means makes a smallest region encompassing the region with a size that is the product of a power-of-2 value and the region allocation unit size to be a virtual region, and partitions the virtual region into a virtual master partition using a virtual partition whose size is the product of the power-of-2 value stipulating the size of the virtual region and the region allocation unit size, and divides the virtual master partition into half, successively partitioning a size of each partition down to the region allocation unit size, and assigns partition numbers, which are used to identify the virtually partitioned virtual partitions, in a partition level sequence of the virtual partitions at the same partition level and in a disposition sequence of the virtual partitions inside the virtual region, and the multi-partition management part
  manages the allocation of partitions using the partition numbers assigned to the virtual partitions corresponding to the subdivided partitions.

38. A region management apparatus according to claim 37, wherein the multi-partition allocation table generation means
  sets a "first-pass available" status, which expresses the fact that a partition is first-pass available to be used, as an initial value of the allocation information for the master partitions and
  sets a status other than the "first-pass available", which expresses the fact that partition cannot be allocated, as the initial value in allocation information for the partitions obtained by dividing the master partitions.

39. A region management apparatus according to claim 38, wherein the multi-partition management part includes
  an allocation request receiving means that
    receives an allocation request for a file or a memory area that includes a size, and
  a first-pass allocatable partition searching means that,
    if an allocation request size, which is the size included in the allocation request, is expressed as a product of a sum of mutually differing powers of 2 and the region allocation unit size and is the sum of sizes of partitions at differing partition levels,
      searches for, referencing a multi-partition management table, a first-pass allocatable partition that is to be allocated as a first-pass allocated segment at a partition level one higher than the partition level of a largest partition size in the allocation request and that has a size that is larger than the allocation request size and
      makes the partition number corresponding to the first-pass allocated segment to be an allocated partition number, and
    if the allocation request size is expressed as a product of a power of 2 and the region allocation unit size,
      searches for a first-pass allocatable partition as a first-pass allocated segment with the allocation request size and
      makes the partition number corresponding to the first-pass allocated segment to be the allocated partition number, and
  a second-pass allocation means that,
    if the size of the first-pass allocated segment is larger than the allocation request size,
      divides the first-pass allocated segment into
        a second-pass allocated segment whose area is allocated contiguously from partitions at differing partition levels, in the sequence of partition levels, and
        a contiguous multilevel segment whose area is the remaining area of the first-pass allocated segment and is allocated contiguously to partitions at differing partition levels, which level is determined in reverse order to the sequence of partition levels, and
      obtains the partition numbers corresponding to each of the partitions in the second-pass allocated segment, and
      sets "unavailable" in an allocation status of multi-partition allocation table entries corresponding to the partition numbers, and
      obtains the partition numbers of the partitions configuring the contiguous multilevel segment, and
      sets a "second-pass available" status in the allocation status of the multi-partition allocation table entries corresponding to the partition numbers, and
  an allocated partition number outputting means that
    outputs the allocated partition number as one of allocation results for the file or memory area allocation request, and
  wherein
    the partition level of a smallest partition in the second-pass allocated segment coincides with the partition level of a smallest partition in the contiguous multilevel segment, and
    two smallest partitions are made by dividing in half a partition at a partition level one higher than the above noted partition level in the multi-partition allocation table.

40. A region management apparatus according to claim 39, wherein the first-pass allocatable partition searching means includes
  a provisional allocation means that,
    if a first-pass allocatable partition cannot be found at the partition level of the first-pass allocated segment,
      searches for a first-pass allocatable partition at higher partition levels, referencing allocation statuses corresponding to partitions at the higher partition levels in the multi-partition allocation table, and
      obtains the partition number of the first-pass allocatable partition, and divides a provisionally allocated segment, which is the segment with that partition number, into
        a first-pass allocated segment and
        a contiguous multilevel segment whose area is the remaining area of the provisionally allocated segment and is allocated contiguously to partitions at differing partition levels, in the sequence of partition levels, and
      obtains the partition numbers of the partitions in the first-pass allocated segment, and
      sets "unavailable" in the allocation status of the multi-partition allocation table entries corresponding to the partition numbers, and
      obtains the partition numbers of the partitions configuring the contiguous multilevel segment, and
      sets the "first-pass available" status in the allocation status of the multi-partition allocation table entries corresponding to the partition numbers.

41. A region management apparatus according to claim 40, wherein, if a partition cannot be found with the "first-pass available" status that can be allocated to a file or memory area for which allocation is requested,
  the first-pass allocatable partition searching means
    searches the multi-partition allocation table for a partition with the "second-pass available" status.

42. A region management apparatus according to claim 41, wherein the multi-partition management part further includes
  a release request receiving means that
    receives a file or memory area release request that includes a size and allocated partition number, and
  a first-pass allocated segment internal release means that,
    if a release size, which is the size included in the release request, is the sum of the sizes of partitions at differing partition levels,
      obtains the partition number of the smallest partition in the contiguous multilevel segment and reads out the allocation status from the multi-partition allocation table entry pointed to by that partition number, and
if the read-out allocation status is the "first-pass available" status or the "second-pass available" status,
sets a status other than the "first-pass available" status or the "second-pass available" status in the allocation status of the multi-partition allocation table entries corresponding to the smallest partition in the second-pass allocated segment and the smallest partition in the contiguous multilevel segment,
while trying to release the partition at a partition level one higher than that of the smallest partitions, and
if the allocation status of the smallest partition in the contiguous multilevel segment is "unavailable",
makes the allocation status of the smallest partition in the second-pass allocated segment to be the "first-pass available" status, and
a higher level partition releasing means that,
when the first-pass allocated segment has been released and the allocation status in the multi-partition allocation table entry pointed to by its partition number has been made the "first-pass available" status,
reads out, from the multi-partition allocation table, the allocation status of the partition
that is at the same partition level as the first-pass allocated segment and
that, when a partition at a partition level one higher is divided into two partitions and one of the subdivided partitions is taken to be the first-pass allocated segment, is the other of the subdivided partitions, and
if the allocation status of the other of the subdivided partitions is the "first-pass available" or the "second-pass available",
sets a status other than the "first-pass available" or the "second-pass available" in the allocation statuses for the multi-partition allocation table entries corresponding to the one and the other of the subdivided partitions,
while trying to release the partition at the higher partition level, and
if the allocation status of the other of the subdivided partitions is "unavailable",
makes the allocation status of the one of the subdivided partitions to be the "first-pass available" status.

43. A region management method executed on a computer for managing a region of a storage device comprising:
a region size obtaining step that
obtains a region size, which is a size of the region;
a multi-partition allocation table generating step that,
when the region size is expressed as a product of a sum of mutually differing powers of 2 and a region allocation unit size,
by means of master partitions whose sizes are products of each of the power-of-2 values configuring that sum and the region allocation unit size,
partition a region by dividing the region in a sequence of the sizes of master partitions, and
divides each master partition in half, and successively partitions the subdivided partitions with each size down to the region allocation unit size, and
generates a multi-partition allocation table that,
corresponding to each partition including a master partitions,
holds allocation information expressing an allocation status of each of the subdivided partitions;
a multi-partition management step that
manages the allocation of each partition based on the allocation information stored in the multi-partition allocation table; and
wherein
when the power-of-2 exponent that prescribes the partition size is made a partition level for a partition,
the multi-partition allocation table
holds the partition allocation information in a sequence of partition levels and in the sequence of the partitions arranged in the region at the same partition level, and
the multi-partition table generation step
makes a smallest region encompassing the region with a size that is the product of a power-of-2 value and the region allocation unit size to be a virtual region, and
partitions the virtual region into virtual master partition using the partition whose size is the product of the power-of-2 value stipulating the size of the virtual region and the region allocation unit size, and
divides the virtual master partition into half, successively partitioning a size of each partition down to the region allocation unit size, and
assigns partition numbers, which are used to identify the virtually partitioned virtual partitions, in a partition level sequence of the virtual partitions at the same partition level and in a disposition sequence of the virtual partitions inside the virtual region, and
the multi-partition management step
manages the allocation of partitions using the partition numbers assigned to the virtual partitions corresponding to the subdivided partitions.

44. A region management method according to claim 43, wherein the multi-partition allocation table generation step
sets a "first-pass available" status, which expresses the fact that a partition is first-pass available to be used, as an initial value of the allocation information for the master partitions and
sets a status other than the "first-pass available", which expresses the fact that partition cannot be allocated, as the initial value in allocation information for the partitions obtained by dividing the master partitions.

45. A region management method according to claim 44, wherein the multi-partition management step includes steps of
an allocation request receiving step that
receives an allocation request for a file or a memory area that includes a size, and
a first-pass allocatable partition searching step that,
if an allocation request size, which is the size included in the allocation request, is expressed as a product of a sum of mutually differing powers of 2 and the region allocation unit size and is the sum of sizes of partitions at differing partition levels,
searches for, referencing a multi-partition management table, a first-pass allocatable partition that is to be allocated as a first-pass allocated segment at a partition level one higher than the partition level of a largest partition size in the allocation request and that has a size that is larger than the allocation request size, and makes the partition number corresponding to the first-pass allocated segment to be an allocated partition number, and if the allocation request size is expressed as a product of a power of 2 and the region allocation unit size, searches for a first-pass allocatable partition as a first-pass allocated segment with the allocation request size, and makes the partition number corresponding to the first-pass allocated segment to be the allocated partition number, and a second-pass allocation step that, if the size of the first-pass allocated segment is larger than the allocation request size, divides the first-pass allocated segment into a second-pass allocated segment whose area is allocated contiguously from partitions at differing partition levels, in the sequence of partition levels, and a contiguous multilevel segment whose area is the remaining area of the first-pass allocated segment and is allocated contiguously to partitions at differing partition levels, which level is determined in reverse order to the sequence of partition levels, and obtains the partition numbers corresponding to each of the partitions in the second-pass allocated segment, and sets "unavailable" in an allocation status of multi-partition allocation table entries corresponding to the partition numbers, and obtains the partition numbers of the partitions configuring the contiguous multilevel segment, and sets a "second-pass available" status in the allocation status of the multi-partition allocation table entries corresponding to the partition numbers, and an allocated partition number outputting means that outputs the allocated partition number as one of allocation results for the file or memory area allocation request, and wherein the partition level of a smallest partition in the second-pass allocated segment coincides with the partition level of a smallest partition in the contiguous multilevel segment and two smallest partitions are made by dividing in half a partition at a partition level one higher than the above noted partition level in the multi-partition allocation table.

46. A region management method according to claim 45, wherein the first-pass allocatable partition searching step includes a provisional allocation step that, if a first-pass allocatable partition cannot be found at the partition level of the first-pass allocated segment, searches for a first-pass allocatable partition at higher partition levels, referencing allocation statuses corresponding to partitions at the higher partition levels in the multi-partition allocation table, and obtains the partition number of the first-pass allocatable partition, and divides a provisionally allocated segment, which is the segment with that partition number, into a first-pass allocated segment and a contiguous multilevel segment whose area is the remaining area of the provisionally allocated segment and is allocated contiguously to partitions at differing partition levels, in the sequence of partition levels, and obtains the partition numbers of the partitions in the first-pass allocated segment, and sets "unavailable" in the allocation status of the multi-partition allocation table entries corresponding to the partition numbers, and obtains the partition numbers of the partitions configuring the contiguous multilevel segment, and sets the "first-pass available" status in the allocation status of the multi-partition allocation table entries corresponding to the partition numbers.

47. A region management method according to claim 46, wherein if a partition cannot be found with the first-pass available status that can be allocated to a file or memory area for which allocation is requested, the first-pass allocatable partition searching step searches the multi-partition allocation table for a partition with the "second-pass available" status.

48. The region management method according to claim 47, wherein the multi-partition management step further includes a release request receiving step that receives a release request for a file or memory area that includes a size and an allocation partition number, and a first-pass allocated segment internal release step that, if a release size, which is the size included in the release request, is the sum of the sizes of partitions at differing partition levels, obtains the partition number of the smallest partition in the contiguous multilevel segment and reads out the allocation status from the multi-partition allocation table entry pointed to by that partition number, and if the read-out allocation status is the "first-pass available" status or the "second-pass available" status, sets a status other than the "first-pass available" status or the "second-pass available" status in the allocation status of the multi-partition allocation table entries corresponding to the smallest partition in the second-pass allocated segment and the smallest partition in the contiguous multilevel segment, while trying to release the partition at a partition level one higher than that of the smallest partitions, and if the allocation status of the smallest partition in the contiguous multilevel segment is "unavailable", makes the allocation status of the smallest partition in the second-pass allocated segment to be the "first-pass available" status, and a higher level partition releasing step that, when the first-pass allocated segment has been released and the allocation status in the multi-partition allocation table entry pointed to by its partition number has been made the "first-pass available" status, reads out, from the multi-partition allocation table, the allocation status of the partition that is at the same partition level as the first-pass allocated segment and that, when a partition at a partition level one higher is divided into and one of the subdivided partitions is taken to be the first-pass allocated segment, is the other of the subdivided partitions, and if the allocation status of the other of the subdivided partitions is the "first-pass available" or the "second-pass available", sets the "first-pass available" or the "second-pass available" in the allocation statuses for the multi-partition allocation table entries corresponding to the one and the other of the subdivided partitions, while trying to release the partition at the higher partition level, and if the allocation status of the other of the subdivided partitions is "unavailable", makes the allocation status of the one of the subdivided partitions to be the "first-pass available" status.

49. A non-transitory computer-readable storage medium storing a program that executes on a computer the region management method according to claim 43.

50. A storage device wherein the region is managed by the region management method according to claim 43.

51. A non-transitory computer-readable storage medium whose region is managed by the region management method according to claim 43 wherein the storage device includes a medium drive unit and a computer readable storage medium.

52. A region management apparatus for managing a region of a storage device comprising:

a region size obtaining means that
obtains a region size which is the a size of the region;

a multi-partition allocation table generation means that,
when the region size is expressed as a product of a sum of mutually differing powers of 2 and a region allocation unit size,
by means of master partitions whose sizes are products of each power-of-2 configuring the sum and the region allocation unit size,
partitions a region by dividing the region in a sequence of the sizes of master partitions, and
divides each master partition in half, and successively partitions the subdivided partitions with each size down to the region allocation unit size, and
generates a multi-partition allocation table that,
corresponding to each partition including a master partition,
holds allocation information expressing allocation statuses of each of the partitions, and
performs initialization of the multi-partition allocation table; and when the power-of-2 exponent that prescribes the partition size is made a partition level for a partition,
the multi-partition allocation table
holds the partition allocation information in a sequence of partition levels and in the sequence of the partitions arranged in the region at the same partition level, and the multi-partition table generation means that
makes the smallest region encompassing the region with a size that is the product of a power-of-2 value and the region allocation unit size to be a virtual region, and
partitions the virtual region into a virtual master partition using a virtual partition whose size is the product of the power-of-2 value stipulating the size of the virtual region and the region allocation unit size, and
divides the virtual master partition into half, successively partitioning the size of each partition down to the region allocation unit size, and
sets a "first-pass available" status which expresses the fact that the partition is available as an initial value in the allocation information for the master partitions, and
sets a status other than the "first-pass available", which expresses the fact that partition cannot be allocated, as the initial value in allocation information for the partitions obtained by dividing the master partitions.

53. A region management apparatus for managing a region of a storage device comprising:

a tangible non-transitory computer-readable storage apparatus having a multi-partition allocation table that,
when
a region size, which is a size of the region, is expressed as a product of a sum of mutually differing powers of 2 and a region allocation unit size, and
by means of master partitions whose sizes are computed from the product of each power-of-2 configuring that sum and the region allocation unit size, the region is partitioned by dividing the region in a sequence of the sizes, and
each master partition is divided in half, and the subdivided partitions are successively partitioned with each size down to the region allocation unit size,
holds, corresponding to each partition including the master partition, allocation information expressing allocation statuses of each of the partitions, and also
when
the power-of-2 exponent that prescribes the partition size is made a partition level for a partition,
holds the allocation information in a sequence of partition levels and in the sequence of the partitions arranged in the region at the same partition level, and also
when
a smallest region encompassing the region with a size that is the product of a power-of-2 value and the region allocation unit size is made to be a virtual region, and
the virtual region is partitioned virtually into a virtual master partition using a virtual partition whose size is the product of the power-of-2 value stipulating the size of the virtual region and the region allocation unit size, and
master partition is divided in half successively and the subdivided partitions are divided virtually with each size down to the region allocation unit size, holds a "first-pass available" status which expresses that the partition is available as an initial value in the allocation information for the master partitions, and
a status other than a "first-pass available", which expresses the fact that partition cannot be allocated, is set as the initial value in allocation information for the partitions obtained by dividing the master partitions;

a multi-partition management part that manages the allocation of partitions based on the allocation information held in the multi-partition table; and wherein the multi-partition management part manages the allocation of partitions using partition numbers, which are used to identify the virtually partitioned virtual partitions and are assigned to the virtual partitions in a partition level sequence of the virtual partitions at the same partition level and in a disposition sequence of the virtual partitions inside the virtual region.

54. A region management apparatus according to claim 53, wherein the multi-partition management part includes an allocation request receiving means that receives an allocation request for a file or a memory area that includes a size, and a first-pass allocatable partition searching means that, if an allocation request size, which is the size included in the allocation request, is expressed as a product of a sum of mutually differing powers of 2 and the region allocation unit size and is the sum of sizes of partitions at differing partition levels, searches for, referencing a multi-partition management table, a first-pass allocatable partition that is to be allocated as a first-pass allocated segment at a partition level one higher than the partition level of a largest partition size in the allocation request and that has a size that is larger than the allocation request size, and makes the partition number corresponding to the first-pass allocated segment to be an allocated partition number, and if the allocation request size is expressed as a product of a power of 2 and the region allocation unit size, searches for a first-pass allocatable partition as a first-pass allocated segment with the allocation request size and makes the partition number corresponding to the first-pass allocated segment to be the allocated partition number, and a second-pass allocation means that, if the size of the first-pass allocated segment is larger than the allocation request size, divides the first-pass allocated segment into a second-pass allocated segment whose area is allocated contiguously from partitions at differing partition levels, in the sequence of partition levels, and a contiguous multilevel segment whose area is the remaining area of the first-pass allocated segment and is allocated contiguously to partitions at differing partition levels, which level is determined in reverse order to the sequence of partition levels, and obtains the partition numbers corresponding to each of the partitions in the second-pass allocated segment, and sets "unavailable" in an allocation status of multi-partition allocation table entries corresponding to the partition numbers, and obtains the partition numbers of the partitions configuring the contiguous multilevel segment, and sets a "second-pass available" status in the allocation status of the multi-partition allocation table entries corresponding to the partition numbers, and an allocated partition number outputting means that outputs the allocated partition number as one of allocation results for the file or memory area allocation request, and wherein the partition level of a smallest partition in the second-pass allocated segment coincides with the partition level of a smallest partition in the contiguous multilevel segment and two smallest partitions are made by dividing in half a partition at a partition level one higher than the above noted partition level in the multi-partition allocation table.

55. A region management apparatus according to claim 54, wherein the first-pass allocatable partition searching means includes a provisional allocation means that, if a first-pass allocatable partition cannot be found at the partition level of the first-pass allocated segment, searches for a first-pass allocatable partition at higher partition levels, referencing allocation statuses corresponding to partitions at the higher partition levels in the multi-partition allocation table, and obtains the partition number of the first-pass allocatable partition, and divides a provisionally allocated segment, which is the segment with that partition number, into a first-pass allocated segment and a contiguous multilevel segment whose area is the remaining area of the provisionally allocated segment and is allocated contiguously to partitions at differing partition levels, in the sequence of partition levels, and obtains the partition numbers of the partitions in the first-pass allocated segment, and sets "unavailable" in the allocation status of the multi-partition allocation table entries corresponding to the partition numbers, and obtains the partition numbers of the partitions configuring the contiguous multilevel segment, and sets the "first-pass available" status in the allocation status of the multi-partition allocation table entries corresponding to the partition numbers.

56. A region management apparatus according to claim 55, wherein if a partition cannot be found with the "first-pass available" status that can be allocated to a file or memory area for which allocation is requested, the first-pass allocatable partition searching means searches the multi-partition allocation table for a partition with the "second-pass available" status.

57. A region management apparatus according to claim 56, wherein the multi-partition management part further includes a release request receiving means that receives a file or memory area release request that includes a size and allocated partition number, and a first-pass allocated segment internal release means that, if a release size, which is the size included in the release request, is the sum of the sizes of partitions at differing the partition levels, obtains the partition number of the smallest partition in the contiguous multilevel segment and reads out the allocation status from the multi-partition allocation table entry pointed to by that partition number, and if the read-out allocation status is the "first-pass available" status or the "second-pass available" status, sets a status other than the "first-pass available" status or the "second-pass available" status in the allocation status of the multi-partition allocation table entries corresponding to the smallest partition in the second-pass allocated segment and the smallest partition in the contiguous multilevel segment,
while trying to release the partition at a partition level one higher than that of the smallest partitions, and
if the allocation status of the smallest partition in the contiguous multilevel segment is "unavailable",
makes the allocation status of the smallest partition in the second-pass allocated segment to be the "first-pass available" status, and
a higher level partition releasing means that,
when the first-pass allocated segment has been released and the allocation status in the multi-partition allocation table entry pointed to by its partition number has been made the "first-pass available" status,
reads out, from the multi-partition allocation table, the allocation status of the partition
that is at the same partition level as the first-pass allocated segment and
that, when a partition at a partition level one higher is divided into two partitions and one of the subdivided partitions is taken to be the first-pass allocated segment, is the other of the subdivided partitions, and
if the allocation status of the other of the subdivided partitions is the "first-pass available" or the "second-pass available",
sets an allocation status other than the "first-pass available" or the "second-pass available" in the allocation statuses for the multi-partition allocation table entries corresponding to the one and the other of these the subdivided partitions, while trying to release the partition at the higher partition level, and
if the allocation status of the other of the subdivided partitions is "unavailable",
makes the allocation status of the one of the subdivided partitions to be the "first-pass available" status.

58. A region management method executed by a region management apparatus for managing a region of a storage device comprising:
a region size obtaining step that
obtains a region size which is the a size of the region;
a multi-partition allocation table generating step that,
when the region size is expressed as a product of a sum of mutually differing powers of 2 and a region allocation unit size,
by means of master partitions whose sizes are products of each of the power-of-2 values configuring that sum and the region allocation unit size,
partitions a region by dividing the region in a sequence of the sizes of master partitions, and
divides each master partition in half, and successively partitions
each master partition by dividing each in half, and successively partitions the subdivided partitions with each size down to the region allocation unit size, and generates a multi-partition allocation table that,
corresponding to each partition including a master partition, holds allocation information expressing allocation statuses of the partitions; and
wherein,
when the power-of-2 exponent that prescribes the partition size is made a partition level for a partition,
the multi-partition allocation table
holds the partition allocation information in a sequence of partition levels and in the sequence of the partitions arranged in the region at the same partition level, and
the multi-partition table generation step
makes a smallest region encompassing the region with a size that is the product of a power-of-2 value and the region allocation unit size to be a virtual region, and
partitions the virtual region into a virtual master partition using a virtual partition whose size is the product of the power-of-2 value stipulating the size of the virtual region and the region allocation unit size, and
divides the virtual master partition into half, successively partitioning the size of each partition down to the region allocation unit size, and
sets a "first-pass available" status which expresses the fact that the partition is available as an initial value in the allocation information for the master partitions, and
sets a status other than the "first-pass available", which expresses the fact that partition cannot be allocated, as an initial value in allocation information of the partitions obtained by dividing the master partitions.

59. A region management method executed by a region management apparatus according to claim 53, comprising:
an allocation request receiving step that
receives an allocation request for a file or a memory area that includes a size;
a first-pass allocatable partition searching step that,
if an allocation request size, which is the size included in the allocation request, is expressed as a product of a sum of mutually differing powers of 2 and the region allocation unit size and is the sum of sizes of partitions at differing partition levels,
searches for, referencing a multi-partition management table, a first-pass allocatable partition that is to be allocated as a first-pass allocated segment at a partition level one higher than the partition level of a largest partition size in the allocation request and that has a size that is larger than the allocation request size, and
makes the partition number corresponding to the first-pass allocated segment to be an allocated partition number, and
if the allocation request size is expressed as a product of a power of 2 and the region allocation unit size,
searches for a first-pass allocatable partition as a first-pass allocated segment with the allocation request size and
makes the partition number corresponding to the first-pass allocated segment to be the allocated partition number;
a second-pass allocation step that,
if the size of the first-pass allocated segment is larger than the allocation request size,
divides the first-pass allocated segment into a second-pass allocated segment whose area is allocated contiguously from partitions at differing partition levels, in a sequence of partition levels, and a contiguous multilevel segment whose area is the remaining area of the first-pass allocated segment and is allocated contiguously to partitions at differing partition levels, which level is determined in reverse order to the sequence of partition levels, and obtains the partition numbers corresponding to each of the partitions in the second-pass allocated segment, and sets "unavailable" in an allocation status of multi-partition allocation table entries corresponding to the partition numbers, and obtains the partition numbers of the partitions configuring the contiguous multilevel segment, and sets a "second-pass available" status in the allocation status of the multi-partition allocation table entries corresponding to the partition numbers; and an allocated partition number outputting step that
outputs the allocated partition number as one of allocation results for the file or memory area allocation request.

60. A region management method according to claim 59, wherein
the partition level of a smallest partition in the second-pass allocated segment coincides with the partition level of a smallest partition in the contiguous multilevel segment and
two smallest partitions are made by dividing in half a partition at a partition level one higher than the above noted partition level in the multi-partition allocation table.

61. A region management method according to claim 60, wherein the first-pass allocatable partition searching step includes
a provisional allocation step that,
if a first-pass allocatable partition cannot be found at the partition level of the first-pass allocated segment, searches for a first-pass allocatable partition at higher partition levels, referencing allocation statuses corresponding to partitions at the higher partition levels in the multi-partition allocation table, and
obtains the partition number of the provisionally allocatable partition, and
divides a provisionally allocated segment, which is the segment with that partition number, into
a first-pass allocated segment and
a contiguous multilevel segment whose area is the remaining area of the provisionally allocated segment and is allocated contiguously to partitions at differing partition levels, in the sequence of partition levels, and
obtains the partition numbers of the partitions in the first-pass allocated segment, and
sets "unavailable" in the allocation status of the multi-partition allocation table entries corresponding to the partition numbers, and
obtains the partition numbers of the partitions configuring the contiguous multilevel segment, and
sets the "first-pass available" status in the allocation status of the multi-partition allocation table entries corresponding to the partition numbers.

62. A region management method according to claim 61, wherein if a partition with the "first-pass available" status that can be allocated for the file or memory area that is requested cannot be found,
the first-pass allocatable partition searching step
searches the multi-partition allocation table for a partition with the "second-pass available" status.

63. A storage area release method for releasing a file or memory area allocated within a region managed by the region management method according to claim 62, comprising:
a release request receiving step that
receives a release request for a file or memory area that includes a size and an allocation partition number;
a first-pass allocated segment internal release step that,
if a release size, which is the size included in the release request, is the sum of the sizes of partitions at differing the partition levels,
obtains the partition number of the smallest partition in the contiguous multilevel segment and reads out the allocation status from the multi-partition allocation table entry pointed to by that partition number, and
if the read-out allocation status is the "first-pass available" status or "second-pass available" status,
sets a status other than the "first-pass available" status or the "second-pass available" status in the allocation status of the multi-partition allocation table entries corresponding to the smallest partition in the second-pass allocated segment and the smallest partition in the contiguous multilevel segment,
while trying to release the partition at a partition level one higher than that of the smallest partitions, and
if the allocation status of the smallest partition in the contiguous multilevel segment is "unavailable",
makes the allocation status of the smallest partition in the second-pass allocated segment to be the "first-pass available" status; and
a higher partition releasing step that,
when the first-pass allocated segment has been released and the allocation status in the multi-partition allocation table entry pointed to by its partition number has been made the "first-pass available" status,
reads out, from the multi-partition allocation table, the allocation status of the partition
that is at the same partition level as the first-pass allocated segment and
that, when a partition at a partition level one higher is divided into two partitions and one of the subdivided partitions is taken to be the first-pass allocated segment, is the other of the subdivided partitions, and
if the allocation status of the other of the subdivided partitions is the "first-pass available" or the "second-pass available",
sets an allocation status other than the "first-pass available" or the "second-pass available" in the allocation statuses for the multi-partition allocation table entries corresponding to the one and the other of the subdivided partitions, while trying to release the partition at the higher partition level, and
if the allocation status of the other of the subdivided partitions is "unavailable", makes the allocation status of the one of the subdivided partitions to be the "first-pass available" status.

64. A non-transitory computer-readable storage medium storing a program that executes on a computer the region management method according to claim 58.

65. A non-transitory computer-readable storage medium storing a program that executes on a computer the region management method according to claim 59.

66. A storage device wherein the region is managed by the region management method according to claim 58.

67. A storage device wherein the region is managed by the region management method according to claim 59.

68. A non-transitory computer-readable storage medium whose region is managed by the region management method according to claim 58 wherein the storage device includes a medium drive unit and a computer readable storage medium.

69. A non-transitory computer-readable storage medium storing a data configuration for managing a region of a storage device, the data configuration comprising:
  a multi-partition allocation table that,
    when
      a region size, which is a size of the region, is expressed as a product of a sum of mutually differing powers of 2 and a region allocation unit size, and
      by means of master partitions whose sizes are products of each power-of-2 configuring that sum and the region allocation unit size, the region is partitioned by dividing the region in a sequence of the sizes of master partitions, and
      each master partition is divided in half, and the subdivided partitions are successively partitioned with each size down to the region allocation unit size,
    holds, corresponding to each partition including the master partition, allocation information expressing allocation statuses of each of the partitions, and also
    when
      the power-of-2 exponent that prescribes the partition size is made a partition level for a partition,
    holds the allocation information in a sequence of partition levels and in the sequence of the partitions arranged in the region at the same partition level, and also
    when
      a smallest region encompassing the region with a size that is the product of a power-of-2 value and the region allocation unit size is made to be a virtual region, and
      the virtual region is partitioned virtually into a virtual master partition using a virtual partition whose size is the product of the power-of-2 value stipulating the size of the virtual region and the region allocation unit size, and
      the virtual master partition is divided in half successively and the subdivided partitions are divided virtually with each size down to the region allocation unit size,
    holds a "first-pass available" status which expresses that the partition is available as an initial value in the allocation information for the master partitions, and
      a status other than the "first-pass available", which expresses the fact that partition cannot be allocated, is set as the initial value in allocation information for the partitions obtained by dividing the master partitions; and
  the multi-partition allocation table enables a region management that
    manages the allocation of the partitions using partition numbers, which are used to identify the virtually partitioned virtual partitions, in a partition level sequence of the virtual partitions at the same partition level and in a disposition sequence of the virtual partitions inside the virtual region.

* * * * *